United States Patent [19]
Korncoff et al.

[11] Patent Number: 5,247,447
[45] Date of Patent: Sep. 21, 1993

[54] EXCEPTION PROCESSOR SYSTEM

[75] Inventors: Alan Korncoff, Redmond; Karapurath Ramachandran, Maple Valley, both of Wash.

[73] Assignee: The Boeing Company, Seattle, Wash.

[21] Appl. No.: 609,180

[22] Filed: Oct. 31, 1990

[51] Int. Cl.$^5$ ..................... G06F 15/46; G06F 15/18
[52] U.S. Cl. .................... 364/468; 364/185; 364/551.01; 395/52; 395/912
[58] Field of Search ............... 364/468, 184-187, 364/550, 551.01, 551.02; 395/904, 905, 906, 912, 914, 50, 52, 68, 75

[56] References Cited

U.S. PATENT DOCUMENTS

| | | | |
|---|---|---|---|
| 3,976,977 | 8/1976 | Porter et al. | 340/172.5 |
| 4,075,686 | 2/1978 | Calle et al. | 364/200 |
| 4,325,120 | 4/1982 | Colley et al. | 364/200 |
| 4,649,515 | 3/1987 | Thompson et al. | 364/184 X |
| 4,731,736 | 3/1988 | Mothersole et al. | 364/200 |
| 4,758,950 | 7/1988 | Cruess et al. | 364/200 |
| 4,792,888 | 12/1988 | Agarwal et al. | 364/188 |
| 4,841,439 | 6/1989 | Nishikawa et al. | 364/200 |
| 4,841,456 | 6/1989 | Hogan, Jr. et al. | 371/25.1 X |
| 4,852,092 | 7/1989 | Makita | 371/12 |
| 4,866,635 | 9/1989 | Kahn et al. | 395/913 X |
| 4,875,160 | 10/1989 | Brown, III | 364/200 |
| 4,947,095 | 8/1990 | Kawamura et al. | 395/912 X |
| 4,967,337 | 10/1990 | English et al. | 395/912 X |

OTHER PUBLICATIONS

Eshelman et al—"Mole: A Knowledge Acquisition Tool That Uses Its Head"-Proc. AAAI-1986; Aug. 11-15, 1986-pp. 950-955.
Chesney et al—"'Almost' Real-Time Diagnosis and Correction of Manufacturing Scrap Wing Expert System"; Jan. 1987; pp. 223-229.

Primary Examiner—Joseph Ruggiero
Attorney, Agent, or Firm—Joan H. Pauly; Bruce A. Kaser

[57] ABSTRACT

An exception processing system for use in conjunction with manufacturing facilities, and automated manufacturing cells in particular is provided. The exception processor is adapted to receive alarms from a cell controller indicating that an unplanned event or exception has occurred in cell operation. The exception processor implements an automated recovery procedure that responds to the alarm, corrects the exception, and returns the cell to normal operation. The exception processor also statistically monitors cell operation in order to avoid exceptions before they occur, and to provide better control over cell processes.

15 Claims, 24 Drawing Sheets

EXCEPTION PROCESSOR SYSTEM

TECHNICAL FIELD

The invention disclosed here generally relates to error detection in automated manufacturing facilities, and more particularly, to systems or subsystems that have an automated capability to process or manage errors in such facilities, and return them to normal operation.

BACKGROUND INFORMATION

The degree of automation in manufacturing has continuously risen over the years as a result of new developments and improvements in computer technology. The driving force behind automation has been, and continues to be, the desire on the part of manufacturers to reduce labor requirements in a cost-effective manner, and to improve quality. To better realize these goals, most modern-day manufacturing facilities utilize automation to some degree, particularly those which are involved in the mass production of parts.

For example, numerically controlled machines or work stations have been commonplace in many manufacturing facilities for years. A more recent trend in automation is the development of manufacturing "cells" where a cell controller, or central computer, automatically coordinates a network of individually programmable work stations that carry out the various stages and processes required to produce a given part, or a set of related parts.

An automated "cell" generally manufactures parts by following predefined plans that deterministically order how each part should be made, generally as a sequential series of steps that are implemented at individual work stations. In addition to coordinating the work stations, the cell controller continuously verifies the completion of process techniques and steps from one work station to another. This is generally accomplished via a combination of sensor technology and microprocessor-based communications from individual work stations. The cell controller automatically detects an error, or an "exception," in the part's manufacture, and interrupts further operation of any one or more work stations in the cell until the error is corrected.

It is believed that, prior to the development of the present invention, error correction in manufacturing cells (hereinafter referred to as "exception processing") has chiefly been accomplished via manual means. That is to say, although the cell controller may have the capability of identifying the nature of an error, it does not have the capability of informing the human operator as to why or how the error occurred.

By way of illustration, the cell controller may indicate to the operator that a part is not properly positioned at some stage in the cell. However, it does not have the capability of informing the operator as to whether or not the improper position was caused by a materials problem (e.g., the part has an inherent dimensional defect), or an equipment problem involving an electronic or mechanical failure in some portion of a work station. It has always been left to the operator to discern the nature of the problem, and then fix it. In some cases, the operator has the capability to make the fix himself. In other cases, the operator calls in outside maintenance people having expertise beyond the operator's capabilities.

Past experience has shown that when an exception occurs in a manufacturing cell, as much as 80% of the total time required to fix or correct the exception is spent in simply identifying the cause of the exception, or in other words, identifying what is wrong. The remaining 20% is spent in physically implementing corrective action. For this reason, an automated tool having the capability of more efficiently ascertaining the cause of exceptions, and nothing else, would result in significant cost savings to the manufacturer.

As a person skilled in the art would know, automated manufacturing is evolutionary in nature. The degree of automation has progressed to higher and higher levels with new improvements in technology and an ever-expanding knowledge base of learned experience In reality, there are probably no fully automated manufacturing cells in existence today. In other words, virtually all "automated" cells are semi-automatic in the strictest technical sense, because all require, to varying degrees, some form of monitoring or control by human operators. In many cases, this may be no more than a person monitoring a CRT. In certain cases, it may involve a person physically handling materials during some stage of cell operation.

As will become apparent, the invention disclosed here provides yet another evolutionary advance in automated manufacturing cells that has heretofore been unknown in the art. First, it provides a tool that significantly improves the efficiency of both detecting and correcting exceptions in manufacturing cells, and correspondingly reduces the costs associated with past methods of manually correcting exceptions. Second, and just as important, it provides a tool that anticipates exceptions, and maintains better process control over a cell's operation. The end result is that the invention improves the overall quality of the parts produced by the cell.

SUMMARY OF THE INVENTION

The invention is an exception processing system that is designed to monitor operation of a manufacturing facility, and to both correct and anticipate unplanned events during the operation of such facility It is particularly well-suited for use in conjunction with automated manufacturing cells that generally carry out a plurality of preplanned steps and procedures to make parts. Such steps and procedures are implemented by a plurality of individual work stations whose respective operations and functions are coordinated by a central computer, which is commonly called a cell controller.

The exception processing system includes a computer that is operatively connected to the controller of the facility. The computer receives information from the controller, and sends information back to the same. For example, the controller is generally operable to provide an alarm when an unplanned event, or an exception, occurs in the operation of the facility. The exception processor is programmed or ably adapted to receive and acknowledge such alarm. The exception processing system's computer is further programmed to request data updates or information from the controller concerning part-making steps and procedures under its direct control, some of which may be requested for the purpose of correcting an unplanned event in response to a controller alarm, while other information may be periodically requested as part of the exception processor's ongoing monitoring and statistical process control over the facility. The exception processor's statistical process control involves continuously logging into memory, or a statistical knowledge base, any corrective action taken to correct an unplanned event, and any ongoing statistical monitoring that would permit analysis of cell operation for anticipating future exceptions. Statistical process control also involves logging the value of the parameter used to determine whether the process implemented by the cell is within control limits.

The exception processing system includes a set of preprogrammed recovery procedures, wherein each procedure is adapted to provide a certain preplanned pattern of possible corrective actions for returning the manufacturing facility to normal operation after a given unplanned event. Recovery procedures employ a combination of heuristic and deterministic techniques. The computer automatically accesses and implements at least one of such recovery procedures in response to a cell controller alarm.

Part of implementing a recovery procedure may involve requesting further data from the cell controller and/or facility sensors. It may also include requesting information from a human operator. With respect to the latter, the exception processing system has a user interface, preferably in the form of a conventional CRT and keyboard, that is connected to the computer for enabling it to prompt the input of certain information from the operator. The CRT is also used to display data such as drawings, instructions and documentation to the operator to assist him in performing recovery, repair or maintenance functions that require human intervention.

The computer is programmed by an "object-oriented" program which facilitates its adaptation to different automated manufacturing facilities. This type of programming method defines various portions of the exception processor system into "objects" which operate independently relative to each other, and process and respond to messages according to their own internal behavior and internal data. The objects as disclosed here are portioned into an exception processor handler object; an operator screen object; a recovery log object; a communication interface object; a protocol object; a message object; and a statistical processing object.

The exception processor handler object is essentially the brains of the exception processing system and defines how the system responds to given controller alarms, and defines the system's statistical process control over the manufacturing facility. The operator screen object provides the user interface (e.g. CRT and keyboard) with the exception processor system. The recovery log object records alarms or exception conditions and makes records of recovery procedure steps that are implemented in response to alarms. It also records the values of operator inputs and other parameters observed by the system's computer, regardless of whether or not such information is created as a result of implementing a recovery procedure, or as a result of the system's ongoing statistical monitoring of the facility. Any action taken by the operator or by the system's computer is also recorded by this object. The communication interface object links or operatively connects the exception processor's computer to the manufacturing cell. The protocol and message objects are linked to the communication interface object in that they respectively define digital communication protocols between devices, and the type of messages that are sent from one device to another.

If the facility is of a type that utilizes sensors to monitor manufacturing steps and procedures, the computer is operatively connected to such sensors for monitoring facility operation. Some facilities have independent work stations with their own built-in self-test capability. In such cases the system's computer may be operatively connected to such components, to implement work station self-tests in accordance with certain recovery procedure instructions.

An important advantage of the invention is that it provides an exception processing system that has the capability of automatically determining the cause of exceptions, and thus significantly reduces the amount of time required to correct the exception. The recovery log object's ability to log exception processing activities enables operators to investigate how the system arrived at certain conclustions, and provides statistics on exceptions that can be used to subjectively and quantitatively define the progress of manufacturing cell processes over defined time periods. Further, information from the operator can be input into the processor's knowledge base for later use by others. Unlike normal computer systems, the exception processor is programmed to accept "don't know" or "unknown" as valid answers to its queries, and thereafter continue toward a solution taking into account unknown variables.

The invention as summarized above, will become better understood and more fully explained upon consideration of the following description which is to be taken in conjunction with the drawings.

BRIEF DESCRIPTION OF THE DRAWINGS

In the drawings, like reference numerals and letters indicate like parts throughout the various views, unless indicated otherwise. The invention is designed to be used in conjunction with automated manufacturing systems involving complex steps and procedures under the control of a central computer. The description of these kinds of systems is particularly well-suited to the use of flow diagrams. Accordingly, many of the figures are in such form, where a generalized system and subsystems or substeps thereof are interrelated by reference numerals that incorporate decimal point notation. As the skilled person would immediately understand, the numeral in front of the decimal point is common to both a general system and its substeps. Numerals that follow the decimal point are unique to particular substeps.

BEST MODE FOR CARRYING OUT THE INVENTION

I. Introduction

Figure 1:
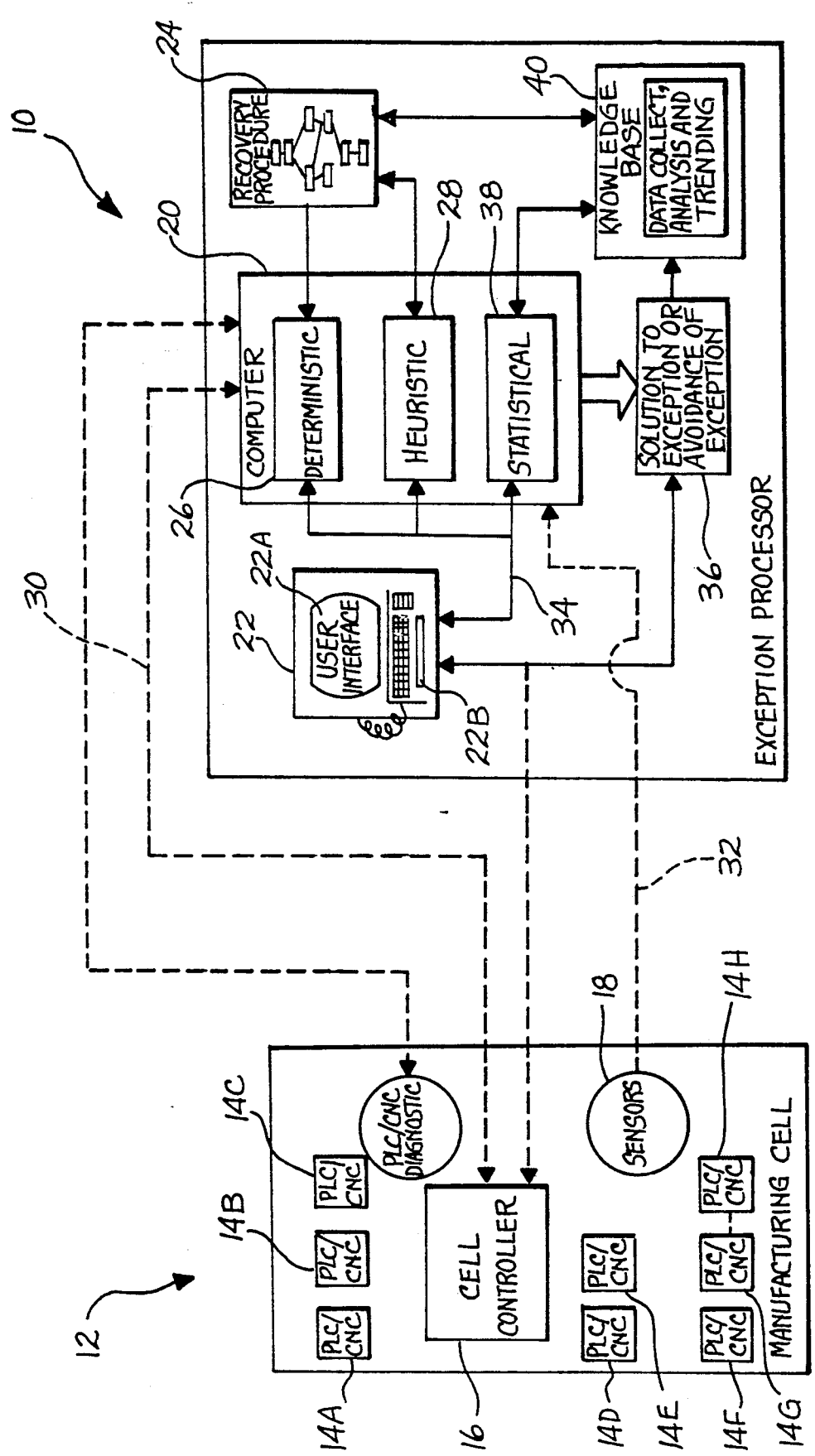
FIG. 1 is a schematic view illustrating the components of an exception processor system in accordance with the invention, and illustrates how the exception processor system is functionally and operatively connected to a manufacturing cell.

Referring now to the drawings, and first to FIG. 1, shown generally at 10 is an exception processor system (hereinafter "exception processor") in accordance with the invention. The exception processor 10 is shown operatively connected to a manufacturing facility (hereinafter "manufacturing cell") which is indicated generally at 12.

Figure 2:
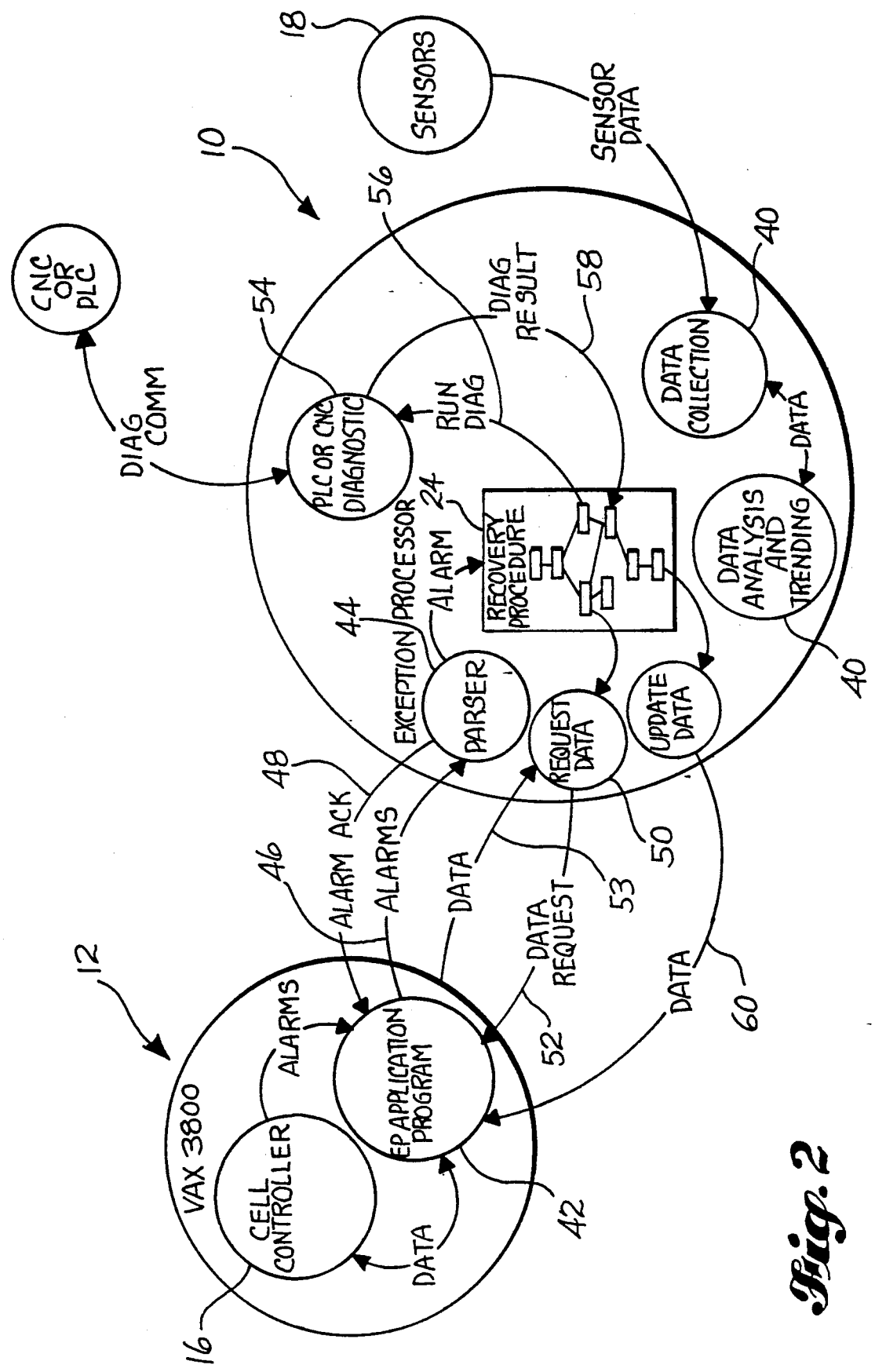
FIG. 2 is another schematic view of an exception processor system in accordance with the invention, and further illustrates the functional communication links between the exception processor system and the manufacturing cell.

Briefly, manufacturing cells typically include a plurality of work stations 14A-14H which cooperatively implement a plurality of preplanned steps and procedures for making parts. Typical work stations in modern-day manufacturing cells are often operated by computerized numerical control "CNC" methods or programmable logic controllers (PLCs). Use of these acronyms is shown in FIGS. 1 and 2, for example.

A cell controller 16, which is typically a computer, interfaces to each work station 14A-14H, and to cell sensors 18. The cell controller 16 coordinates work station activities, including verification of process techniques, and modifies machine motions at individual work stations. Any action taken by the cell controller 16 is generally taken as a result of preprogrammed procedures in combination with data provided to the controller 16 by any one or more work stations 14A-14H, or by cell sensors 18.

The above represents a generalized or generic description of manufacturing cells, and automated cells in particular. A more specific example of a manufacturing cell is illustrated at 12 in FIG. 3, and will be described in greater detail later on, but in the context of using the exception processor 10.

The exception processor 10 is preferably implemented as a stand alone unit that is operatively connected to the cell controller 16, and to the cell sensors 18. It includes a conventional microprocessor-based computer 20 that has a user interface 22 consisting of a CRT monitor 22A and a keyboard 22B. The preferable hardware components making up the computer and interface 20, 22 are described in a later section of this description.

The computer 20 is programmed to implement a certain recovery plan or procedure 24 in response to an exception alarm received from the cell controller 16. Any given recovery procedure 24 is taken from a library of recovery procedures, and is selected on the basis of the type of exception indicated by the cell controller 16. In some cases, an operator may note something going wrong with cell operation even though an alarm 10 has not been initiated by the cell controller 16. In such cases, the operator may directly initiate a heuristic recovery procedure by requesting advice from the exception processor 10.

Recovery procedures in accordance with the invention involve a combination of deterministic and heuristic procedures designed to automatically determine the cause of a given exception, and to propose a solution as indicated at 26, 28, 36 in FIG. 1. Recovery procedures are at least partially deterministic in the sense that they set forth a logical series of potential corrective steps to be implemented by the exception processor 10, until determination of cause, and solution to the exception, is achieved. Part of such task may require obtaining further data from the cell controller 16, as indicated schematically at 30, or from the cell sensors 18, as indicated schematically 32. It may also require the operator to input certain information requested or prompted by the exception processor 10, as indicated at 34. The latter may involve requesting the operator to manually perform or implement certain tasks as part of a recovery procedure There are generally three types of problems necessitating recovery. One is a process problem involving some fault in processing a part. The second is an equipment failure, such as a machine breakdown. The third is a material problem involving a defect in a piece of material that is being processed by the cell.

Recovery procedures 24 are obtained from vendor-specified recovery procedures, or they are developed by interviewing experienced operators and maintenance people having knowledge as to the causes of exceptions or breakdowns in automated cells, and how such exceptions are typically fixed. From these interviews, programmable recovery procedures are developed.

By way of example, a person having experience maintaining an automated cell or similar system will typically follow a certain logical path in diagnosing the root cause of an exception. Such path was developed from his or her past experiences in solving similar exceptions. Experience-based manual diagnostic procedures are very similar in most respects to flow chart diagrams that outline the logic for software programs. Hence, they are well-suited for adaptation to a programmable computer, where the computer is programmed to follow predefined steps that are outlined or developed from past maintenance experience, and thereby automatically determines the cause of exceptions. Once the cause has been identified, the corrective procedure required to solve the exception is often apparent.

Recovery procedures 24 utilize both forward and backward chaining methods. As the skilled person would know, backward chaining involves working backward from a known conclusion to determine whether or not certain actual parameters match assumed parameters that would justify the conclusion. Forward chaining involves working forward from known parameters or values to reach all conclusions that are logically consistent with the known parameters.

As mentioned above, exception processor recovery procedures 24 involve a combination of deterministic and heuristic methods. Deterministic methods are very much based on known cause and effect relationships. Heuristic methods are based on learned experience. They may or may not come into play in combination with determinsitic methods.

In some cases, purely deterministic recovery plans are inadequate to correct exceptions, but heuristic plans may provide the solution. In other words, sometimes a problem arises whose cure is known on the basis of prior learned experience, although why the cure works is unknown. Maintenance people that have experience with automated facilities over an extended period of time will have their own personal memories of these kinds of situations which, in some cases, occurred repeatedly. This kind of information is stored in the exception processor by way of interviewing maintenance people, and by way of the exception processor having its own unique capability of making use of operator experiences.

Heuristic experience is implemented in exception processor recovery procedures 24 as suggestions to the user as to possible courses of correction action, sometimes after a deterministic plan has been tried and failed. Other times, heuristic procedures are implemented either before or during some portion of a deterministic one.

The exception processor 10 also has the capability of avoiding future exceptions via ongoing statistic analysis or "statistical process control" of cell operation, as indicated at 38. The exception processor 10 logs the time, data and nature of each exception, and the corrective procedure or solution implemented to solve each exception. This is stored in a computerized knowledge base 40. The exception processor 10 continuously requests certain data updates from the cell controller 16, and from the cell's sensors 18. This information is also stored in the processor's knowledge base 40.

The exception processor 10 uses the data in its knowledge base 40 to continuously analyze cell operation, and to statistically determine past and future trends in cell operation. Over a period of time, the exception processor 10 may determined, statistically, that one type of exception occurs far more frequently at a given work station 14A-14H than others, suggesting an ongoing problem that may or may not be permanently fixed, depending on its nature. If it is fixable, then the overall result is that the exception processor 10 has functioned to improve the efficiency and quality of overall cell operation. If it cannot be permanently fixed, then at least the exception processor will have identified the problem in a way so as to anticipate like exceptions in the future, including the time they are likely to occur, so that preventative action can be taken and down-time minimized.

Along the same line, certain cell processes can be continuously monitored by the exception processor 10 in order to determine if each process was completed within a certain predefined design tolerance. Although a given process may be within tolerance, there may be a statistical deviation within the range of what is acceptable that indicates a situation progressing toward an exception.

Figure 4:
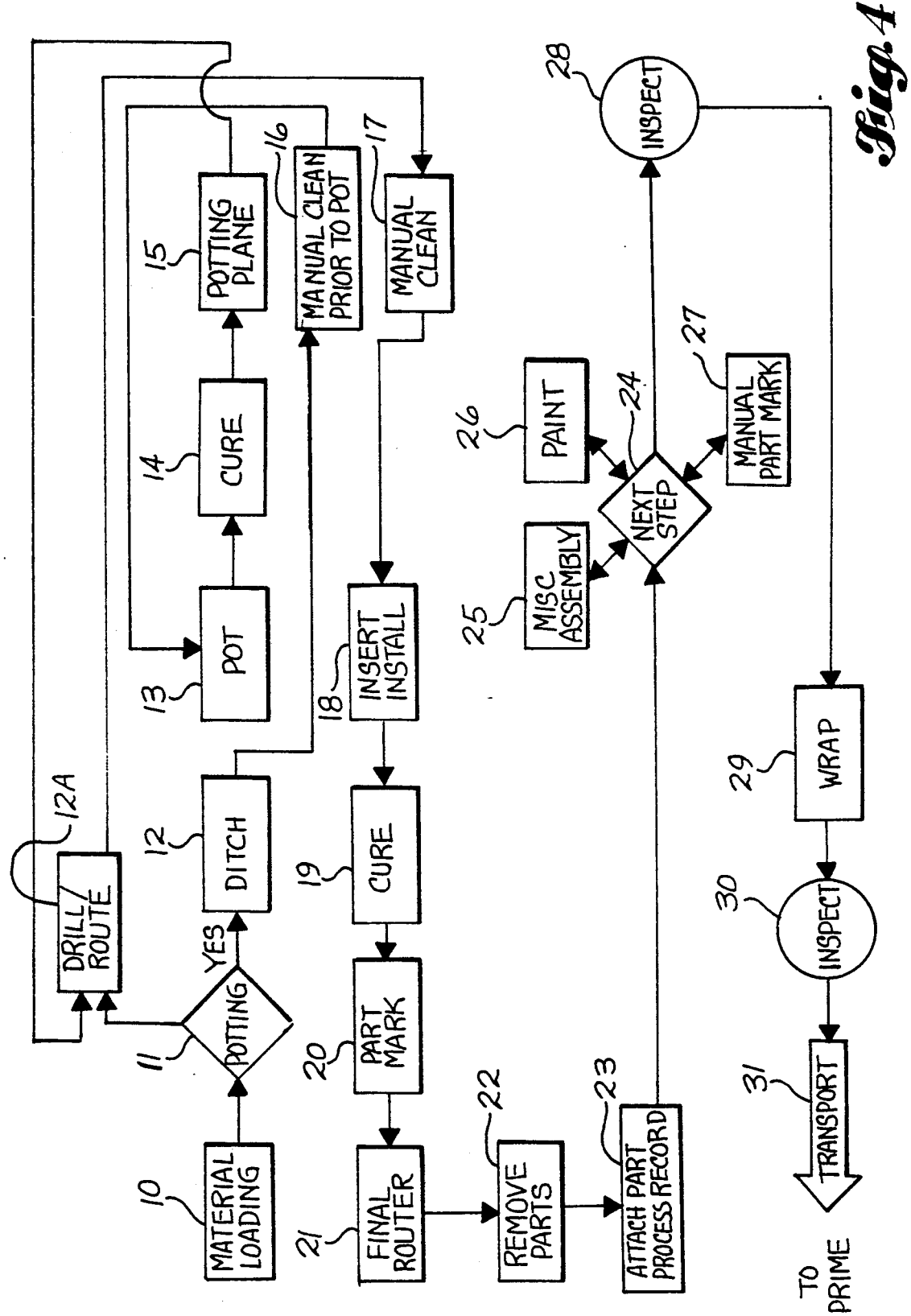
FIG. 4 is a flow diagram illustrating the various steps and procedures of the manufacturing cell shown in FIG. 3.

A more specific illustrative example, and one that is directed to the floor panel system shown in FIG. 4, is that at some point in the cell a measurable quantity of adhesive is applied to a part during an "insert installation" procedure. The specific item measured is the diameter of a ring of adhesive, which is acceptable if it falls within a certain range. The exception processor determines, on a statistical basis, whether or not the ring diameter is increasing or decreasing from one application to the next, albeit all may remain within an acceptable tolerance. Such statistical trending serves to indicate that the device applying the adhesive is possibly going out of adjustment or otherwise has a mechanical problem, and enables fixing the problem before the size of the adhesive exceeds tolerance, thus avoiding an exception.

Referring now to FIG. 2, the functional relationship and interconnections between the exception processor 10 and the manufacturing cell 12 will now be explained in greater detail. As the skilled person would know, automated manufacturing cells have a generic architecture. As will be explained in greater detail below, the programmable aspects of the exception processor are implemented via "object-oriented" programming, which is a form or technique of programming that would be familiar to those having a high level of expertise in computer science or computer programming. This form of programming makes the exception processor 10 easy to adapt to virtually any manufacturing cell 12.

Figure 3:
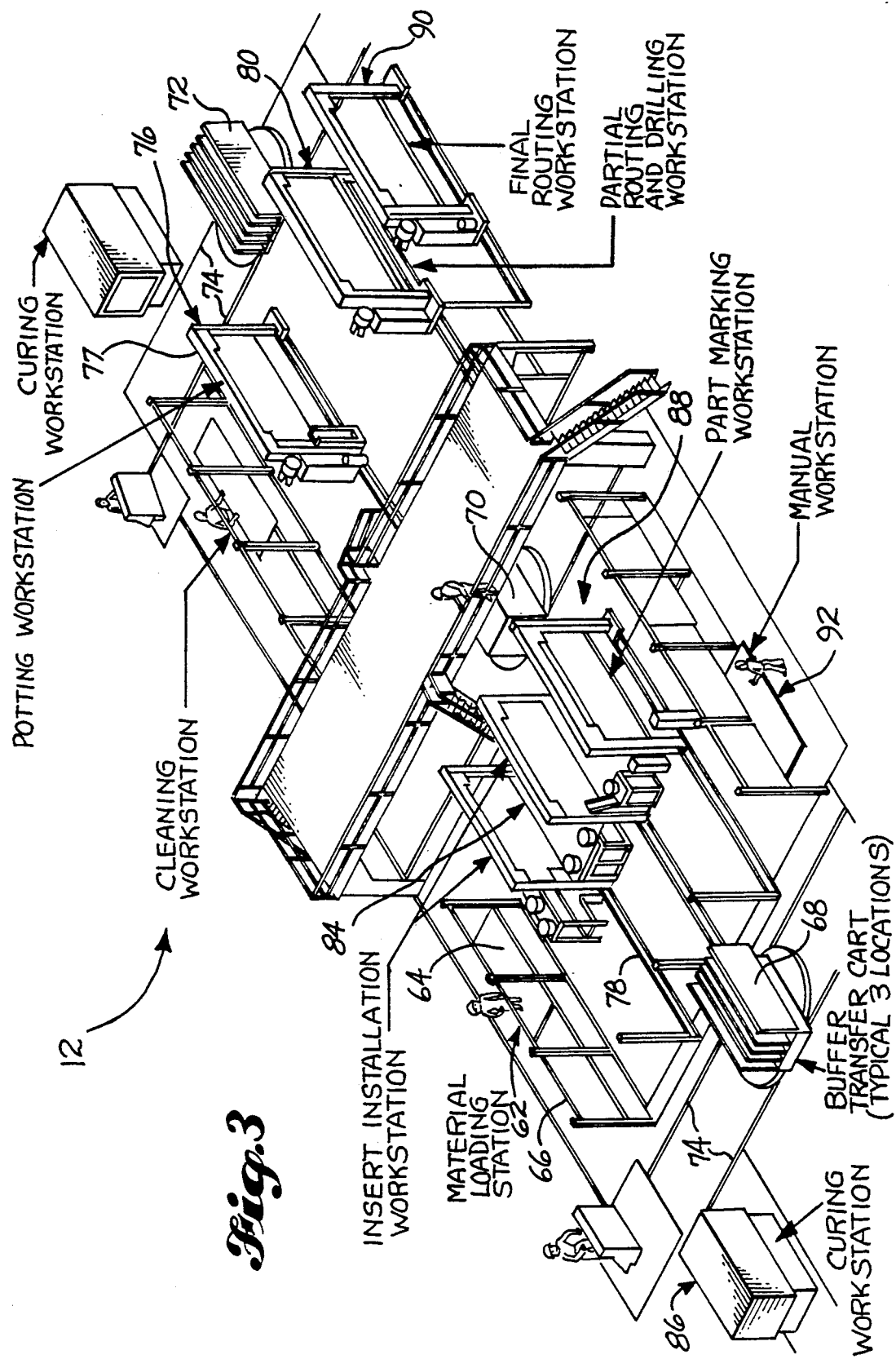
FIG. 3 is a pictorial view of a manufacturing cell for the automated fabrication and assembly of floor panels, and is typical of the kind of cell that would use the exception processor system disclosed here.

For example, the cell 12 illustrated in FIG. 3 is an automated floor panel fabrication and assembly cell operated by a VAX 3800 (trademark) cell controller. In order to operatively connect the exception processor 10 to such controller, it is necessary to interface the exception processor with the controller via an applications software package 42. As the skilled person would know, this involves simply interfacing the data protocols of the exception processor 10 with that of the of cell controller 16.

FIG. 2 illustrates the functional communication productivity between the exception processor 10 and the cell controller 16. The cell controller outputs alarms to the exception processor parser 44, as schematically indicated at 46. This informs the exception processor that an exception has occurred somewhere in the operation of cell 12. The exception processor acknowledges the alarm, as shown at 48, and takes over control of the cell 12.

Every alarm has its own unique code corresponding to a particular exception. The exception processor 10 fetches a recovery procedure 24 from its memory that is directly responsive to the particular alarm code indicated by the cell controller 16. In some cases, the cell controller 10 outputs a collection of alarms, all of which have a common root cause. In such case, the exception processor 10 recognizes a pattern that caused the alarms, and calls up a recovery procedure designed to address the root cause instead of calling up separate recovery procedures for each alarm.

As it implements a recovery procedure 24, part of the procedure may require a further request of data from the cell controller 16 as shown at 50, 52, 54. Periodic data updates may also be requested, as indicated at 60, as part of statistical monitoring. Data requests and data transmissions are communicated to and from the cell controller 16 via the applications program 42.

Depending on the particular recovery procedure, the exception processor may also request an individual work station to run its own diagnostic tests as shown at 54, 56, 58. Many PLCs or work stations have built-in diagnostic equipment enabling certain self-tests for hardware or software faults which, in some cases, can create exceptions to cell operation. Depending on the nature of the recovery procedure, self-tests may be requested and the resulting diagnosis may provide the cause of the exception, and suggest the solution required.

Having provided the above general description as to how the exception processor 10 works, attention is now directed to FIGS. 3-21 which illustrate implementation of the exception processor 10 in an automated floor panel fabrication and assembly cell 12 that has been implemented by The Boeing Company at its Spokane, Wash. manufacturing plant.

II. The Floor Panel Manufacturing Cell

The cell 12 shown in FIG. 3 is a system designed to produce floor panel parts for aircraft. Briefly, floor panel parts have a sandwich construction consisting of a Nomex (trademark) or aluminum honeycomb core, with thin sheets of fiberglass or graphite on each side of the core. The cell has a plurality of different work stations that are equivalent to the work stations 14A-14H indicated in FIG. 1. The first station is a material loading station, indicated generally at 62. There, a person loads sheets 64 onto a jig 66. Each sheet 64 is tilted upwardly into a vertical position. A set of three buffer carts 68, 70, 72 move transversely along rails 74, whose positions are obtained from encoders on the cart, to move sheets 64 from one work station to the next.

Sheets are automatically taken from cart 68, 70, 72 by frames 77 at each work station that move longitudinally along tracks 78. Such frames 77 clamp onto a particular sheet in accordance with all controller instructions when it is transferred from a cart 68, 70, 72. With the exception of manual work stations, each work station is a conventional X,Y station operable to move a sheet in two directions adjacent a fixed spindle.

The middle buffer cart 70 first transfers a sheet 64 from the material loading station 62 to a partial router work station, indicated generally at 80. Each cart has a plurality of numbered slots for holding more than one sheet 64, and the cell controller 66 keeps track of which sheet is in what slot. After partial routing, the sheet 64 is moved to a cleaning station 82 and then brought back to a potting station 76 for applying a potting compound. It is then sent to a curing station 86 followed by a planing station 76 to level the potting. It then goes back to the partial router station 80 for drilling holes. After drilling, the sheet 64 is moved to another station 84 for the application of adhesive and installation of inserts. Thereafter, the sheet 64 is moved into a curing station 86. This is followed by marking parts on the sheet as shown at 88, and final routing, as shown at 90. After final routing, parts are manually removed from the cell 12 as shown at 92.

Referring now to FIG. 4, there is shown a flow chart diagram of the FIG. 3 cell described above. FIGS. 5-17 provide a more detailed description as to the nature of the procedures which take place at each work station. In order to better facilitate understanding of how FIG. 4 relates with subsequent Figs., conventional reference numeral indications have been dispensed with. Instead, each block shown in FIG. 4 is identified by a particular numeral. For example, the "material loading" station, which is generally indicated by reference numeral 62 in FIG. 3, is indicated by number "10" in FIG. 4, and will hereinafter be designated as follows: "(10)". Other work stations or procedures in the FIG. 3 cell are indicated by sequential numbers, beginning with (10) at the material loading station, and ending with (22) at the final router work station (which is indicated generally at 90 in FIG. 3).

Figure 5:
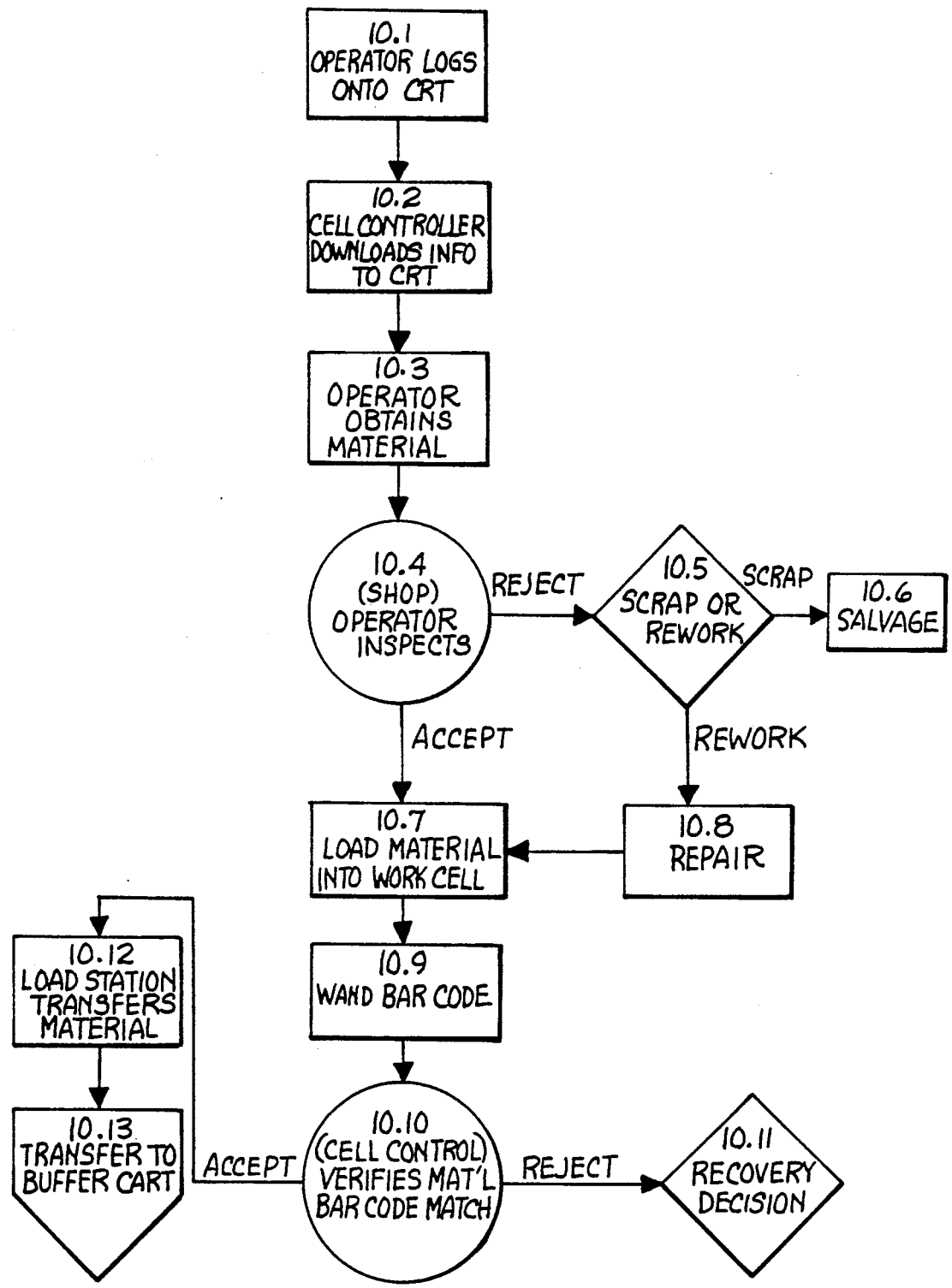
FIG. 5 is a flow diagram illustrating substeps of the "material loading" step shown in FIG. 4.

Referring now to FIG. 5, the various steps and procedures that take place at the material loading station (10) are illustrated. First, the operator logs a sheet onto a CRT which is dedicated to that particular work station. The cell controller 16 downloads information into the CRT, followed by the operator obtaining and inspecting the sheet (10.3, 10.4). If the sheet is acceptable, it is then loaded into the work station or work cell (10.7). If it is rejected, then it is either scrapped or reworked (10.5). If scrapped, then the sheet goes to salvage (10.6). If repairable (10.8), it is reworked and then loaded into the work cell (10.7). Loading the sheet is followed by a wand bar code procedure (10.9) which would be familiar to the skilled person.

The cell controller verifies the sheet by matching its bar code (10.10). If it matches, then the sheet is accepted and transferred from the material loading station to a buffer cart (10.12, 10.13), all of which is controlled by the cell controller 16. If the bar code does not match, then an exception occurs which is indicated to the exception processor 10 via an alarm from the cell controller (10.11).

Figure 18A:
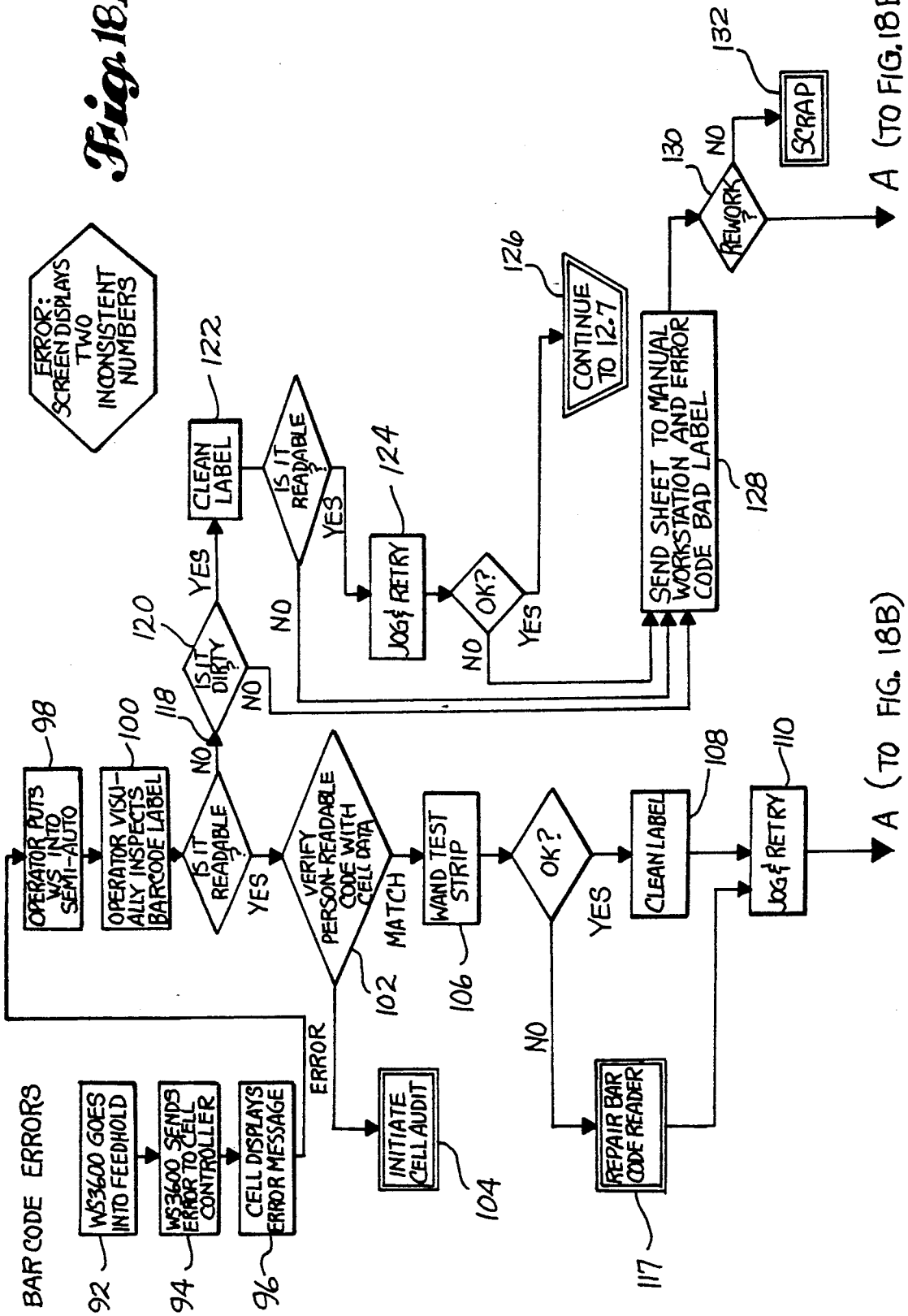
FIG. 18a is the first of a series of two views, and is a flow diagram illustrating a detailed recovery procedure in accordance with the invention, for correcting an exception relating to bar code errors in the manufacturing cell of FIGS. 3 and 4, and relates to recovery decisions called for in FIGS. 5, 6, 7, 8, 10, 11, 12a, 13, 15 and 16.
Figure 18B:
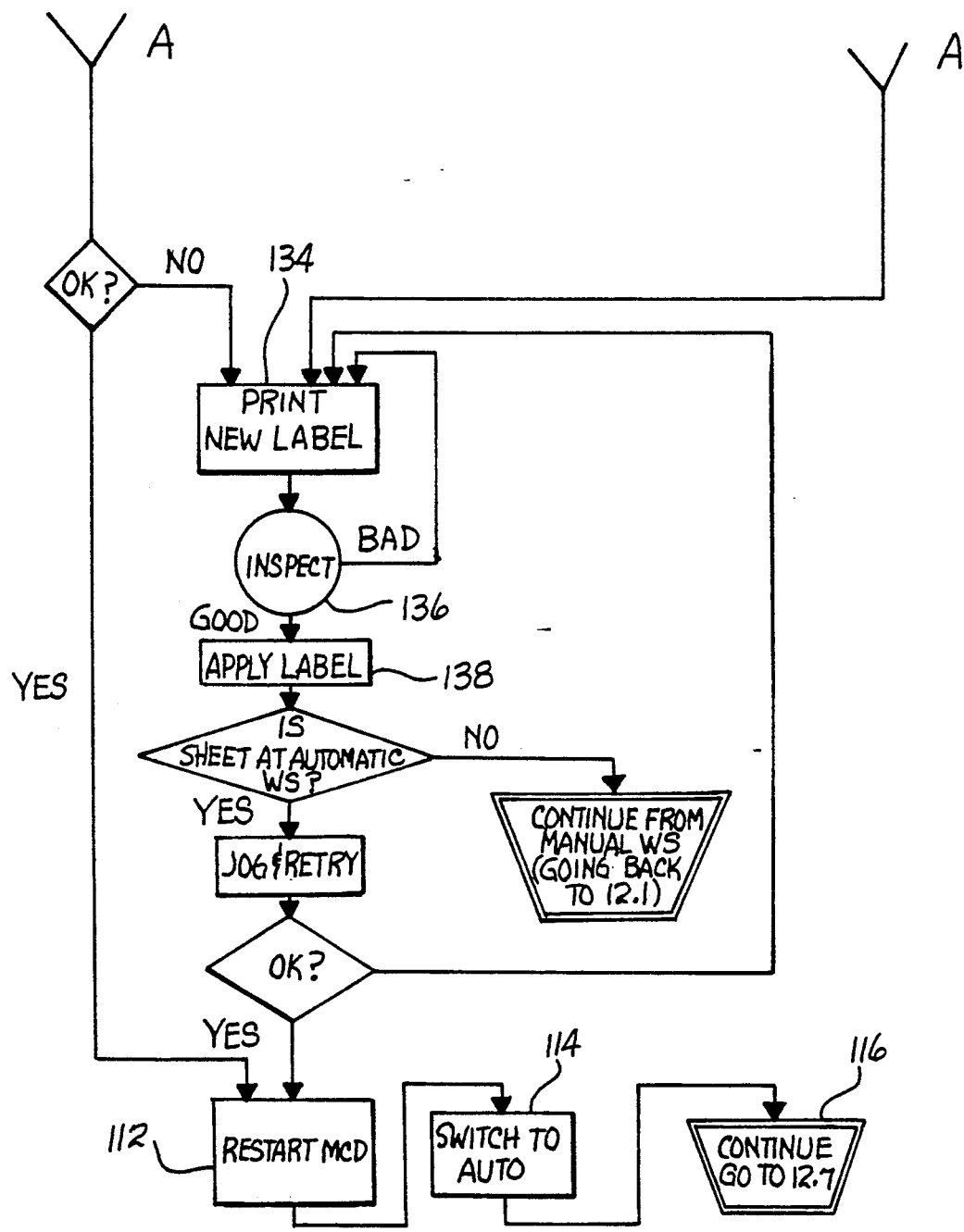
FIG. 18b is the second in a series of two views illustrating a bar code exception recovery procedure.

FIGS. 18a and 18b illustrate a recovery procedure in accordance with the invention for a bar code error. First, the work station goes into feedhold, as indicated at 92 in FIG. 18a. This is followed by the work station sending an error message to the cell controller, as shown at 94. The cell controller displays an error message 96 that causes the operator to put the work station into a semi-automatic mode 98.

The exception processor prompts the operator to visually inspect the bar code label, as shown at 100. If it is readable, then the operator is asked to verify the person-readable code with cell data, as shown at 102. If there is no match, then the exception processor initiates a cell audit 104. If there is a match, then the operator is asked to conduct a wand test strip 106. If this test turns out positive, then the operator is instructed to clean the label, as shown at 108, and retry the bar code read 110. If this is successful, then the exception processor returns the work station to normal operation, as schematically indicated at 112, 114, 116.

If the wand test strip was negative, then the exception processor indicates to the operator that the bar code reader must be repaired. This is shown at 117 in FIG. 18*a*. Such instruction could in turn implement still another recovery procedure designed to assist the operator in repairing the bar code reader by himself, or in at least identifying the exact nature of the problem so that he knows what kind of maintenance expertise is required to fix the problem. Such other recovery procedure is not disclosed here.

In the event the bar code label is not readable, as shown at 118, the exception processor prompts the operator and requests information as to whether or not the bar code label is dirty 120. If it is, the exception processor instructs the operator to clean it, as shown at 122. After cleaning, if the label is readable, then the exception processor instructs the operator to jog and retry the read which, if successful, returns the cell to normal operation, as shown at 124, 126.

In the event the label either was not dirty, or the jog and retry operation did not work, the exception processor instructs the operator and/or cell controller to return the sheet to the manual work station, as shown at 128. There, a determination is made as to whether or not the label can be reworked, as shown at 130. If not, the part is scrapped as shown at 132. If it can be reworked, then a new label is printed, and is inspected and applied if it is good. These procedures are respectively indicated at 134, 136, 138 in FIG. 18*b*. Thereafter, the cell is returned to normal operation.

Figure 6:
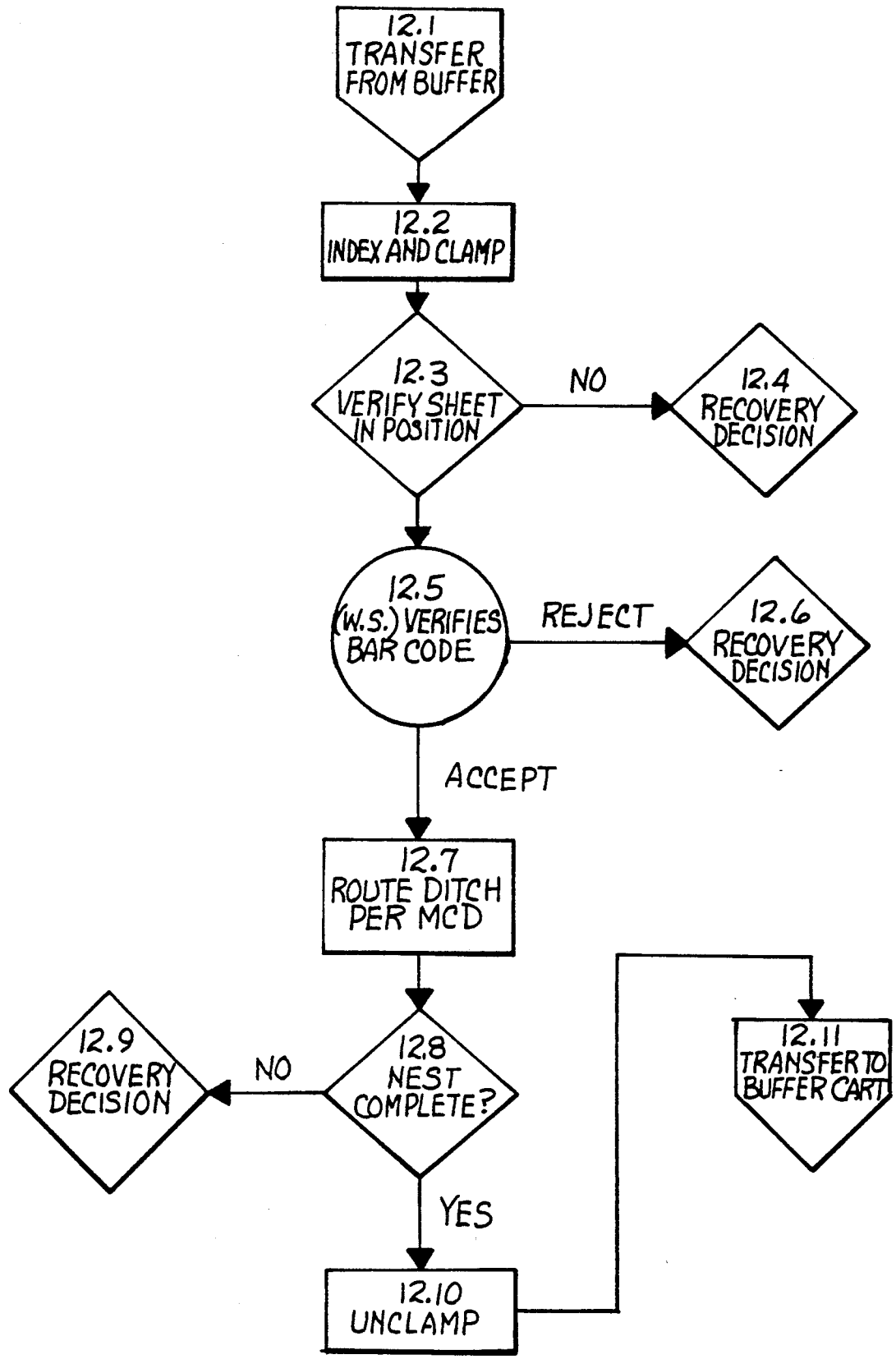
FIG. 6 is a flow diagram illustrating substeps of the "ditch" step shown in FIG. 4.
Figure 7:
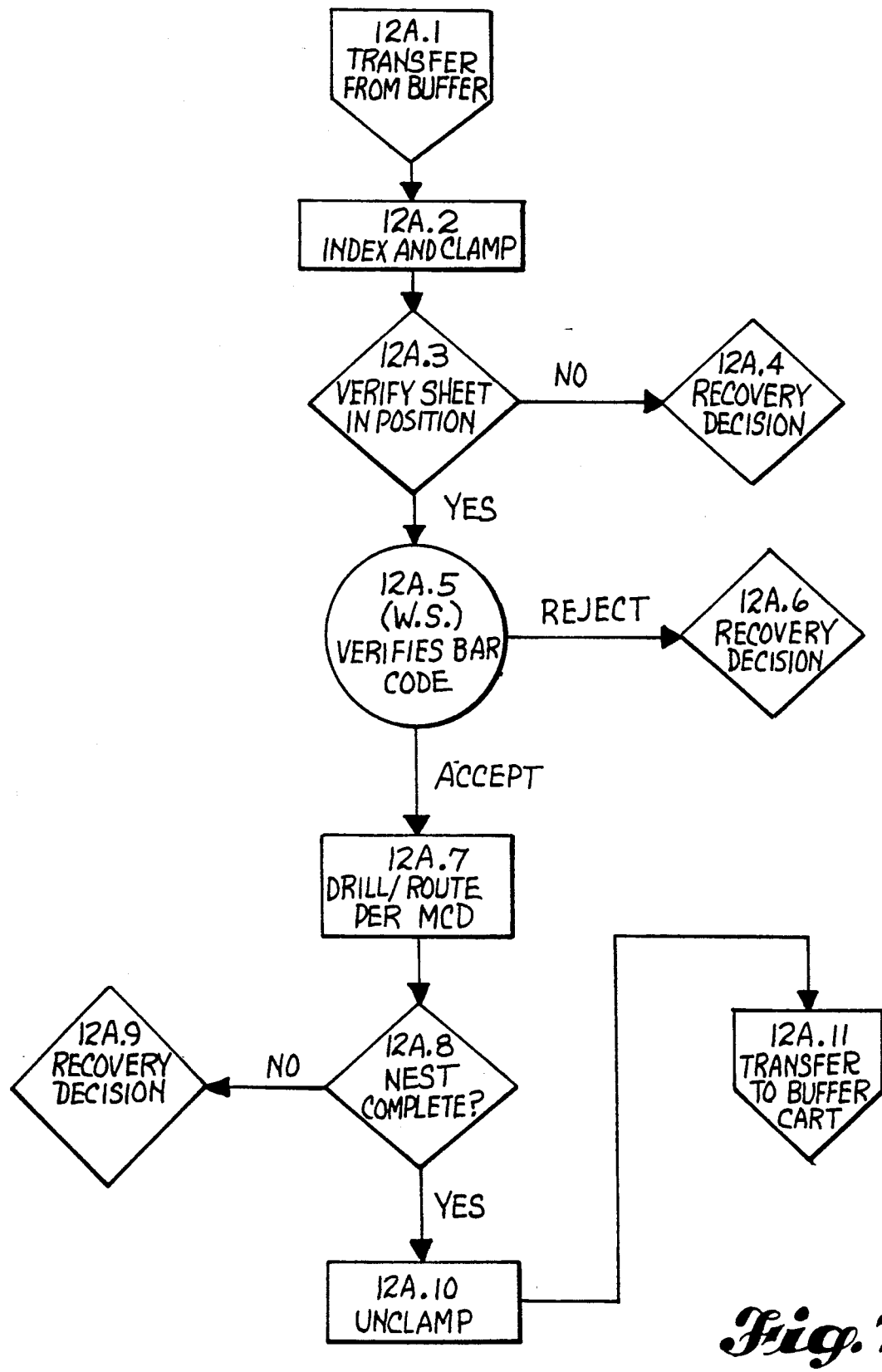
FIG. 7 is a flow diagram illustrating substeps of the "drill/route" step shown in FIG. 4.
Figure 8:
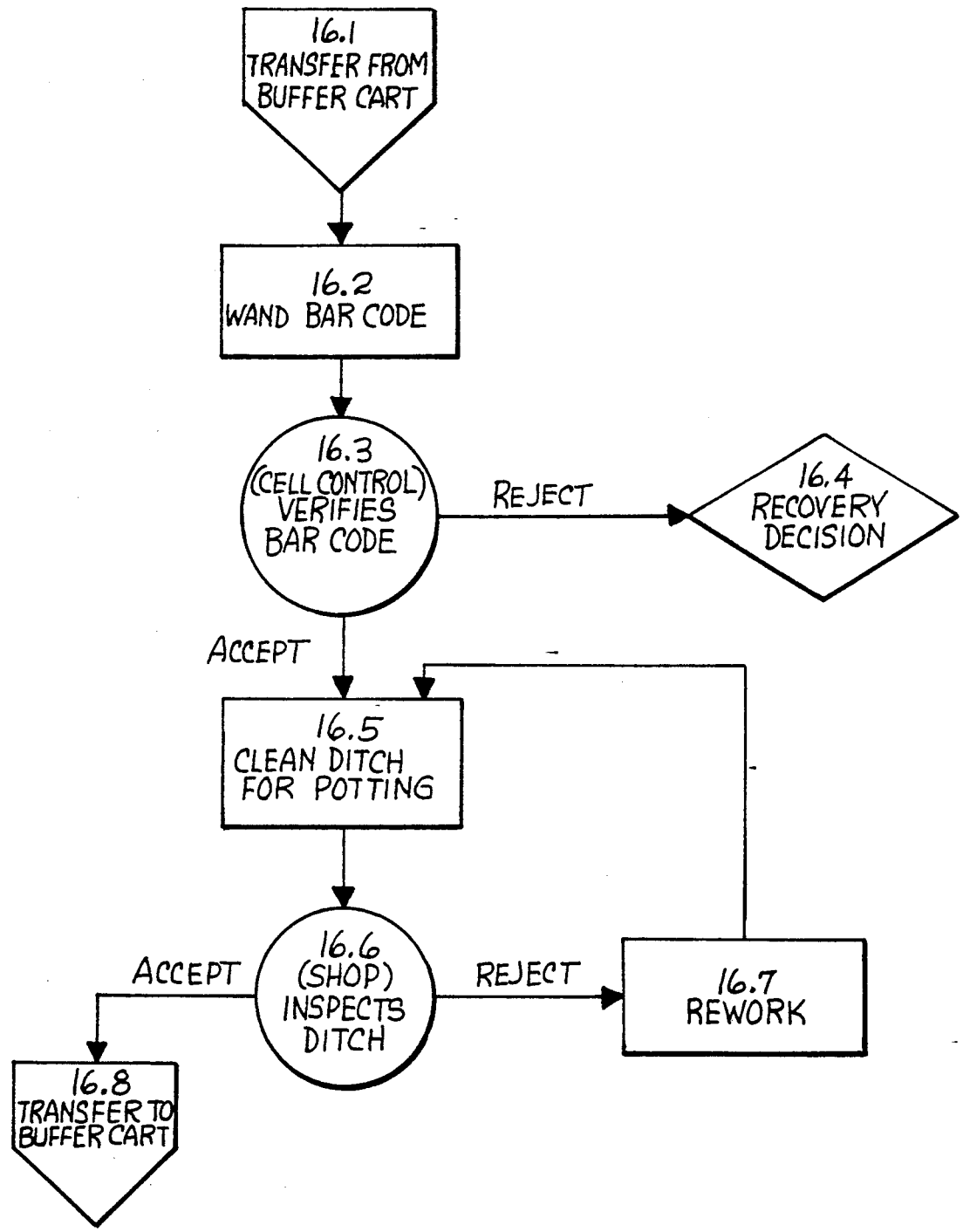
FIG. 8 is a flow diagram illustrating substeps of the "manual clean prior to pot" step shown in FIG. 4.
Figure 9:
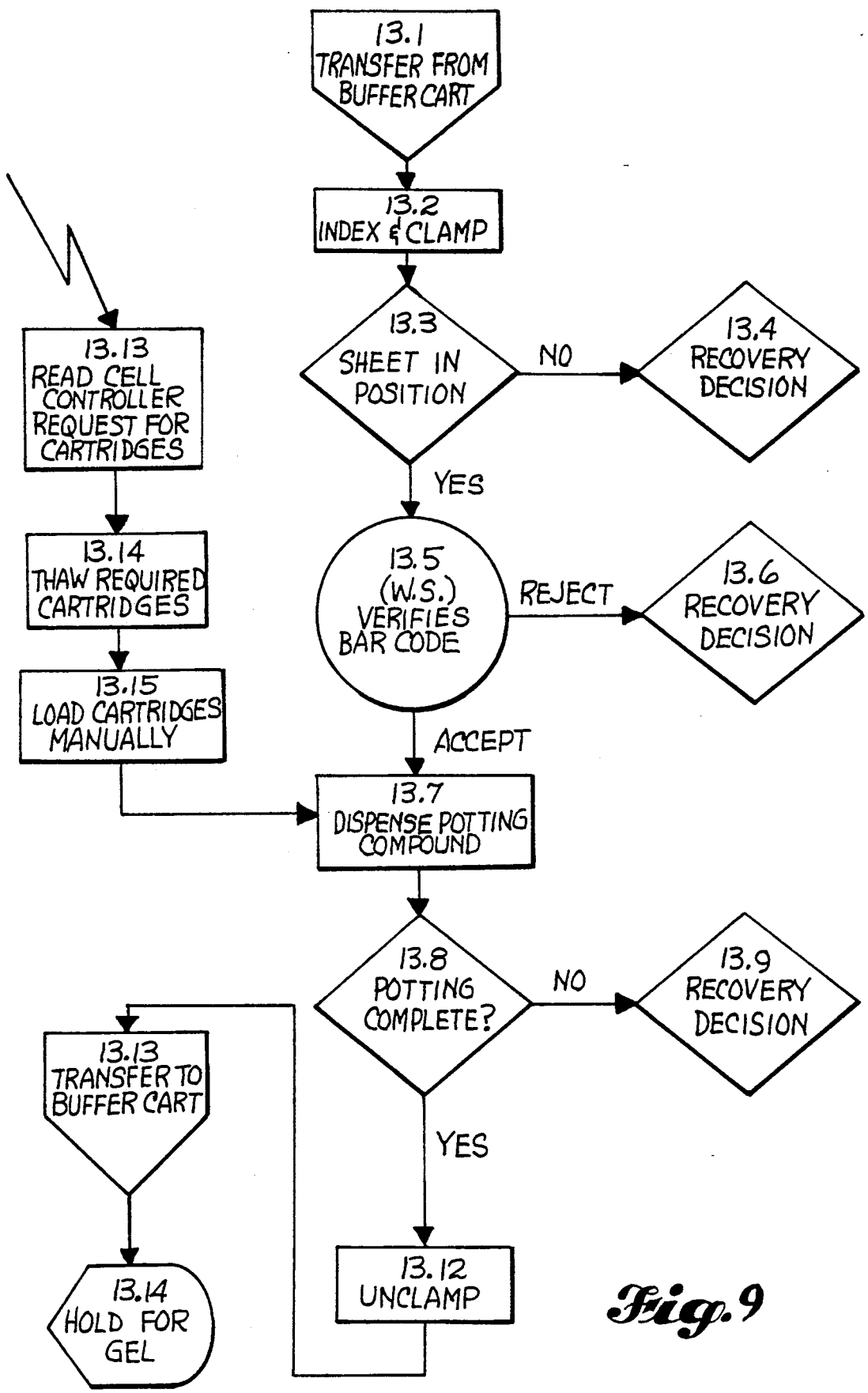
FIG. 9 is a flow diagram illustrating substeps of the "potting" step shown in FIG. 4.
Figure 10:
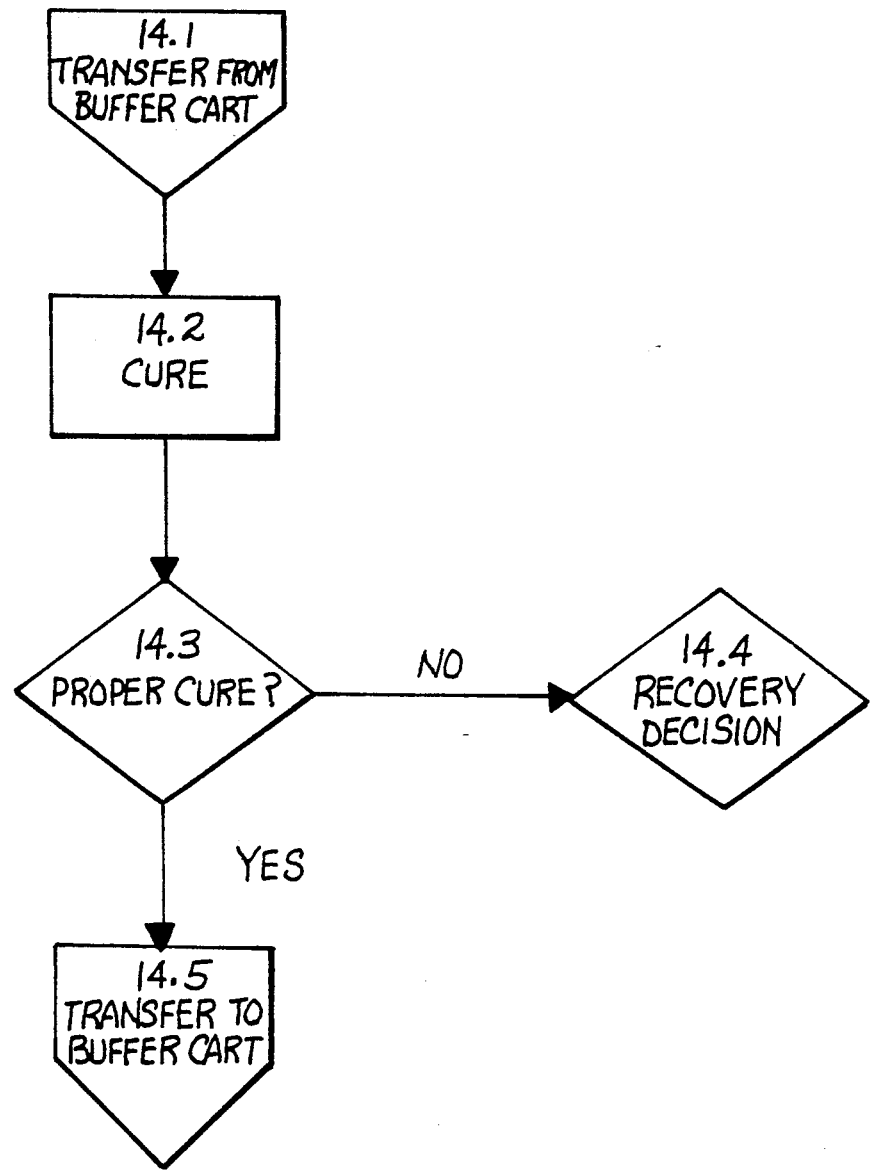
FIG. 10 is a flow diagram illustrating substeps of the "cure" step shown in FIG. 4.
Figure 11:
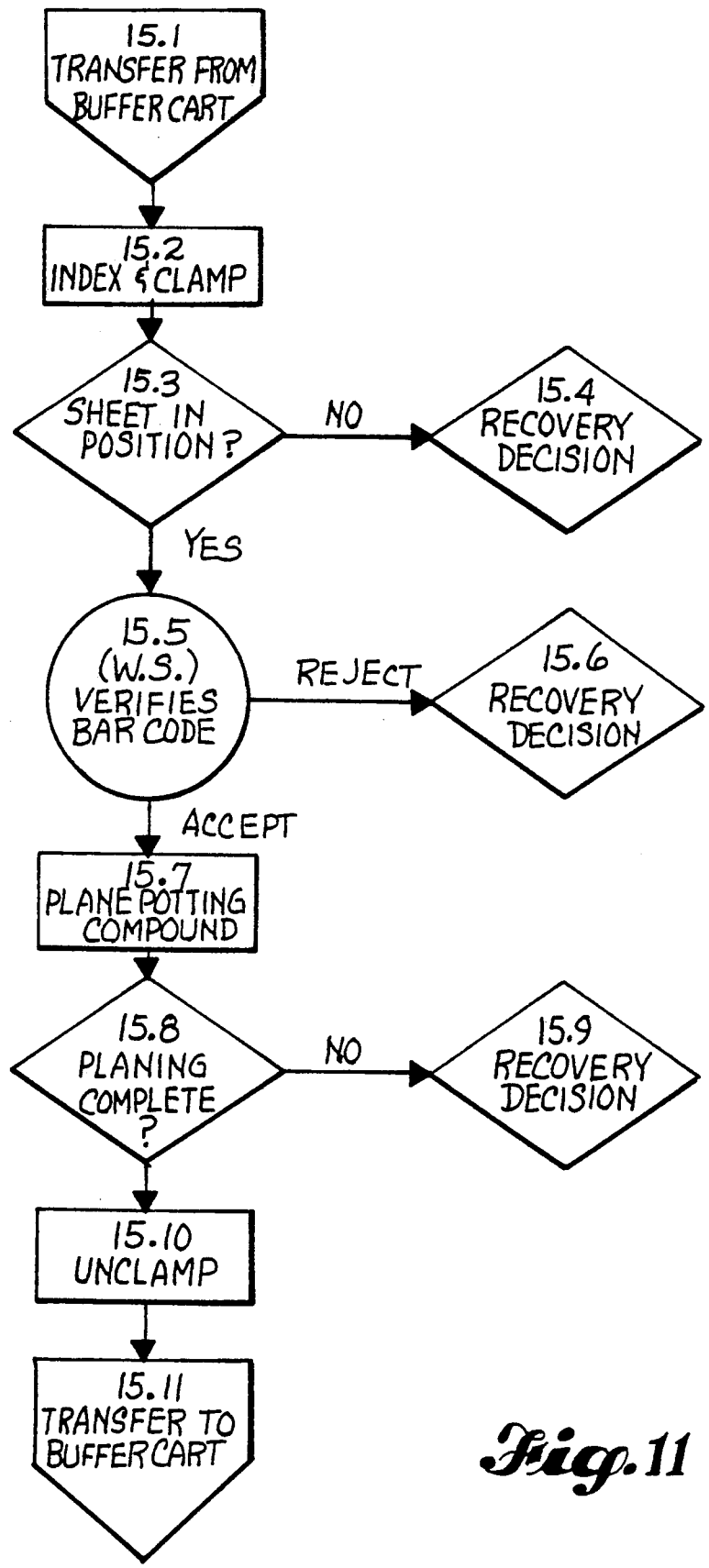
FIG. 11 is a flow diagram illustrating substeps of the "potting plane" step shown in FIG. 4.
Figure 12A:
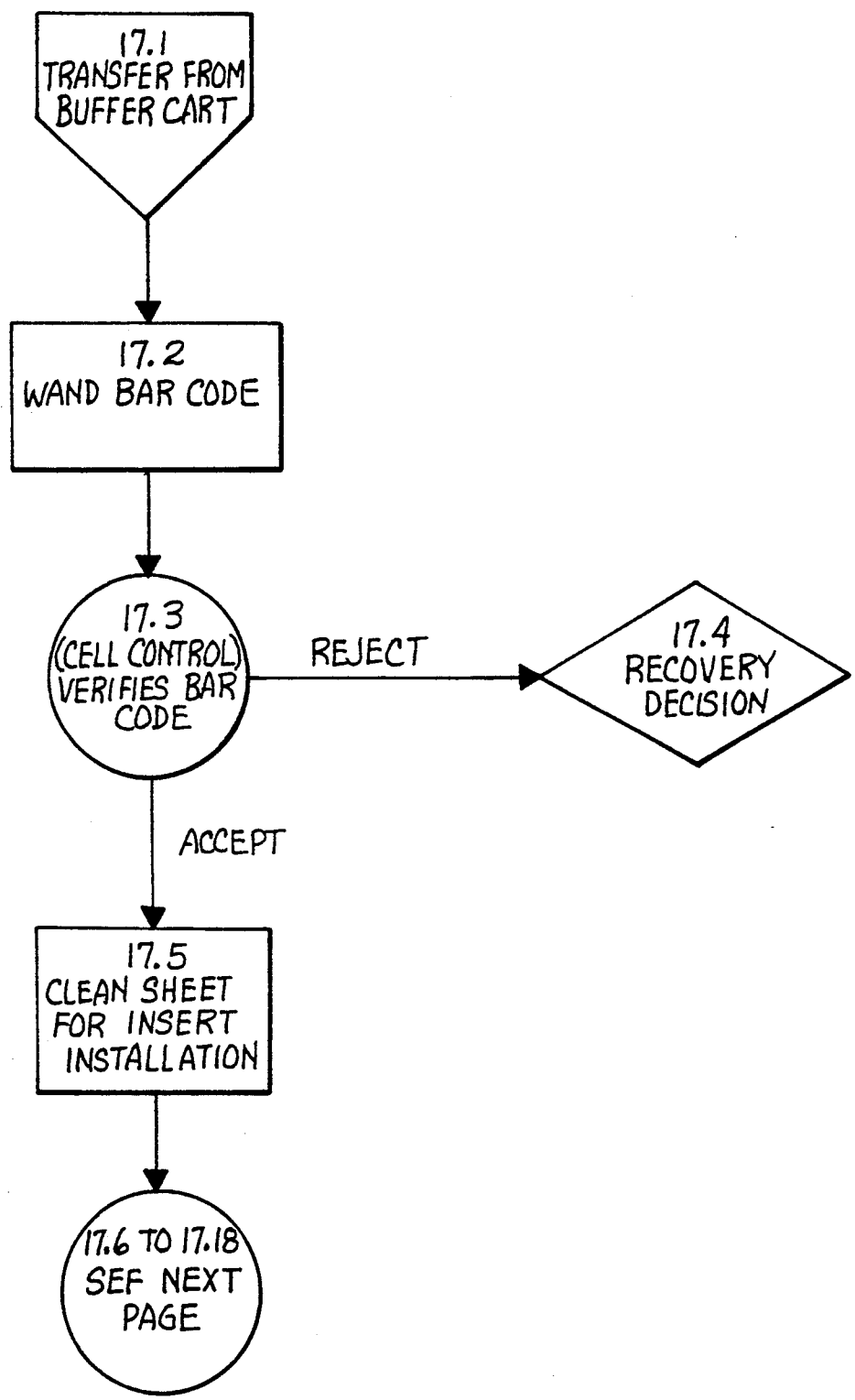
FIG. 12a is the first in a series of two views, is a flow diagram illustrating substeps of the "manual clean" step shown in FIG. 4.
Figure 12B:
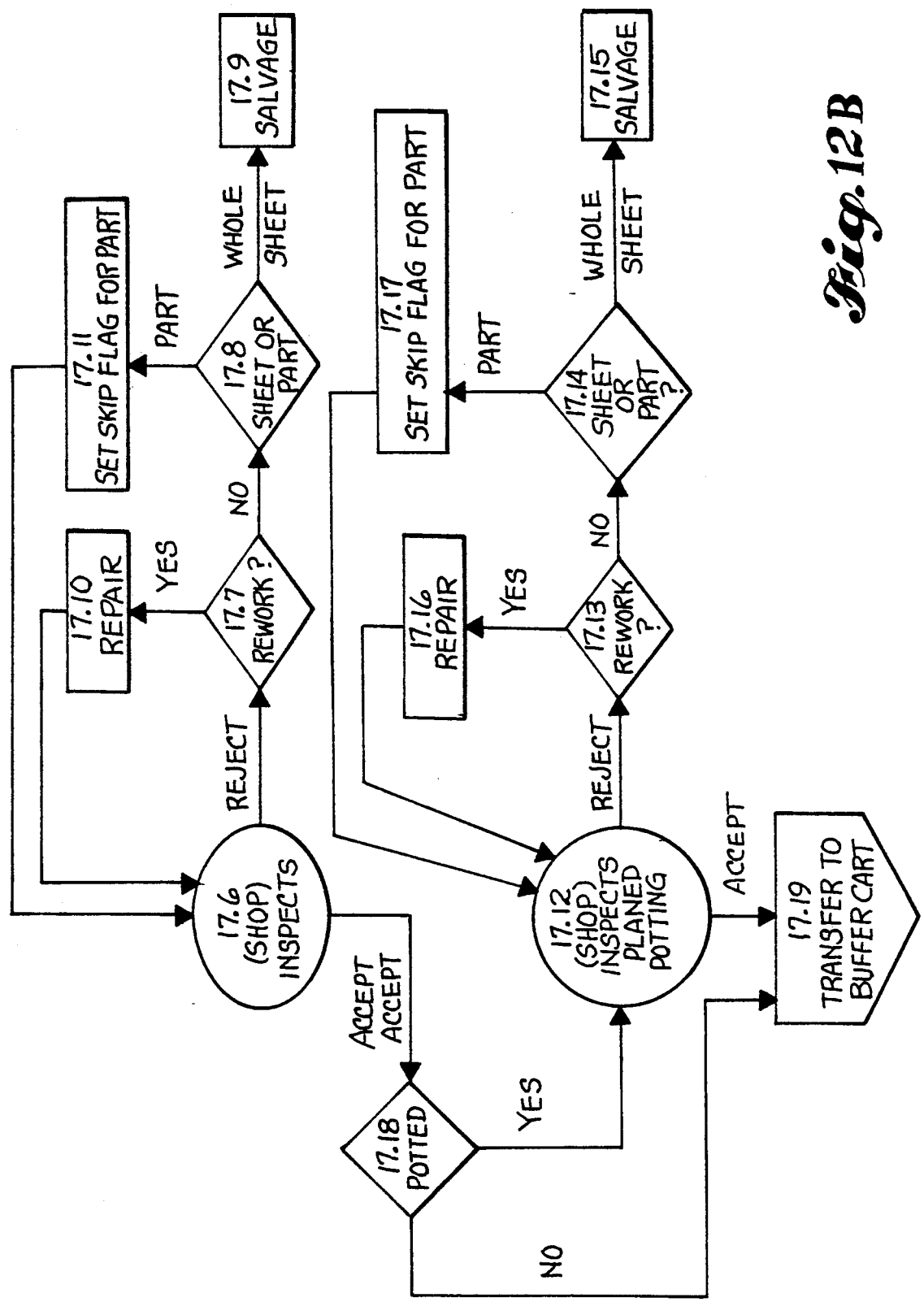
FIG. 12b is the second in a series of two views, and illustrates substeps of the "manual clean" step shown in FIG. 4.
Figure 13:
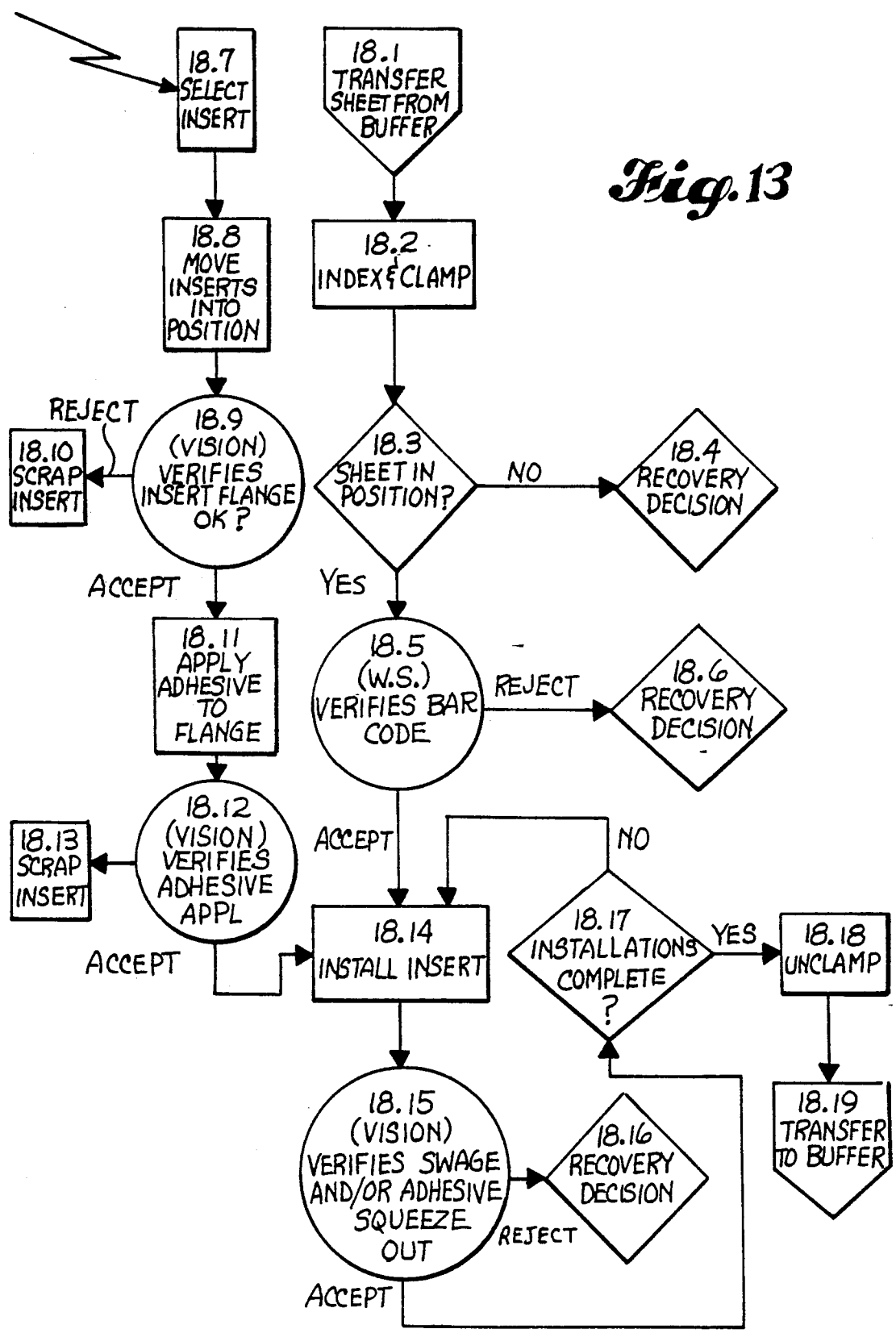
FIG. 13 is a flow diagram illustrating substeps of the "insert install" step shown in FIG. 4.
Figure 14:
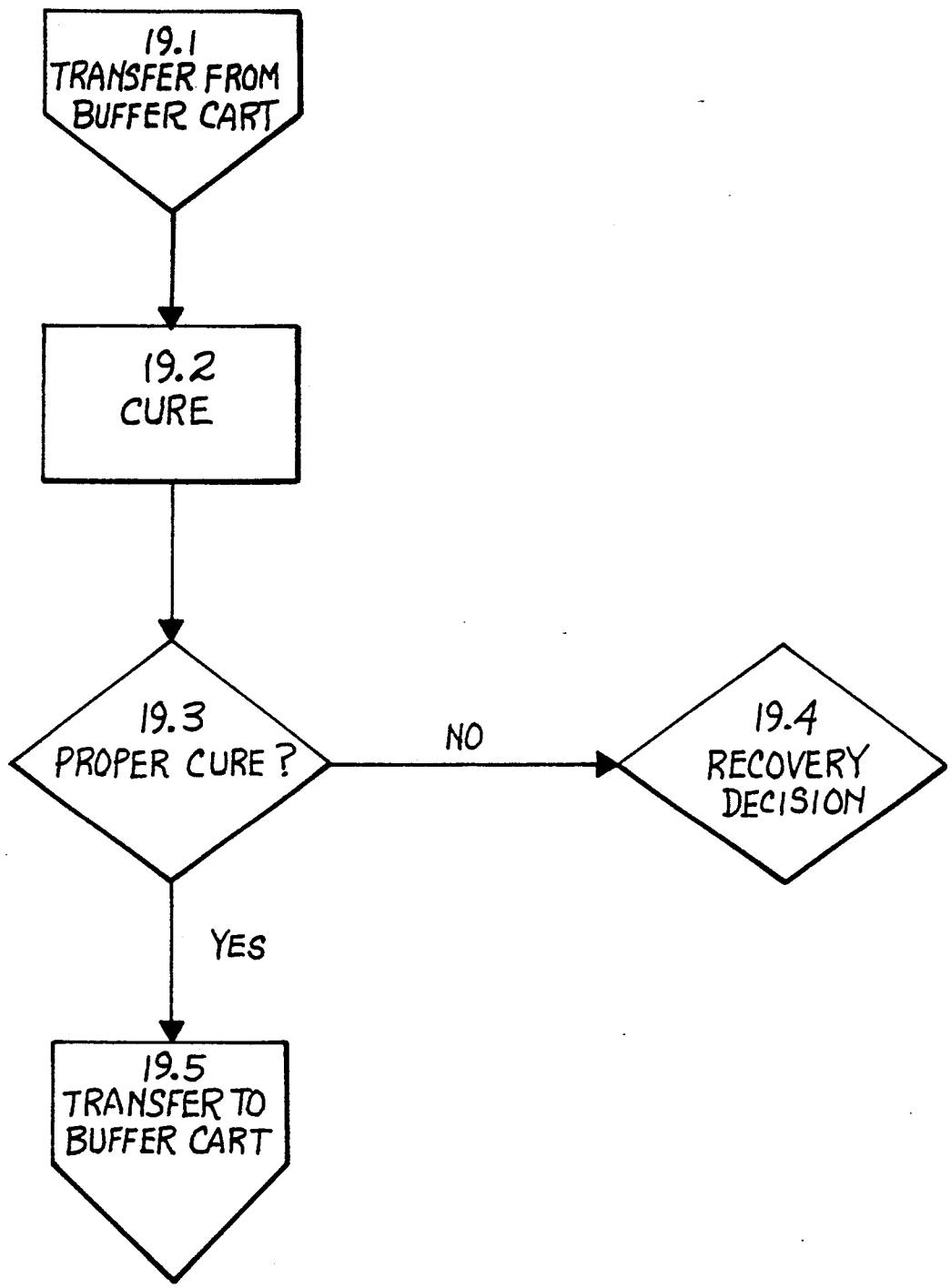
FIG. 14 is a flow diagram illustrating substeps of the "cure" step shown in FIG. 4.
Figure 15:
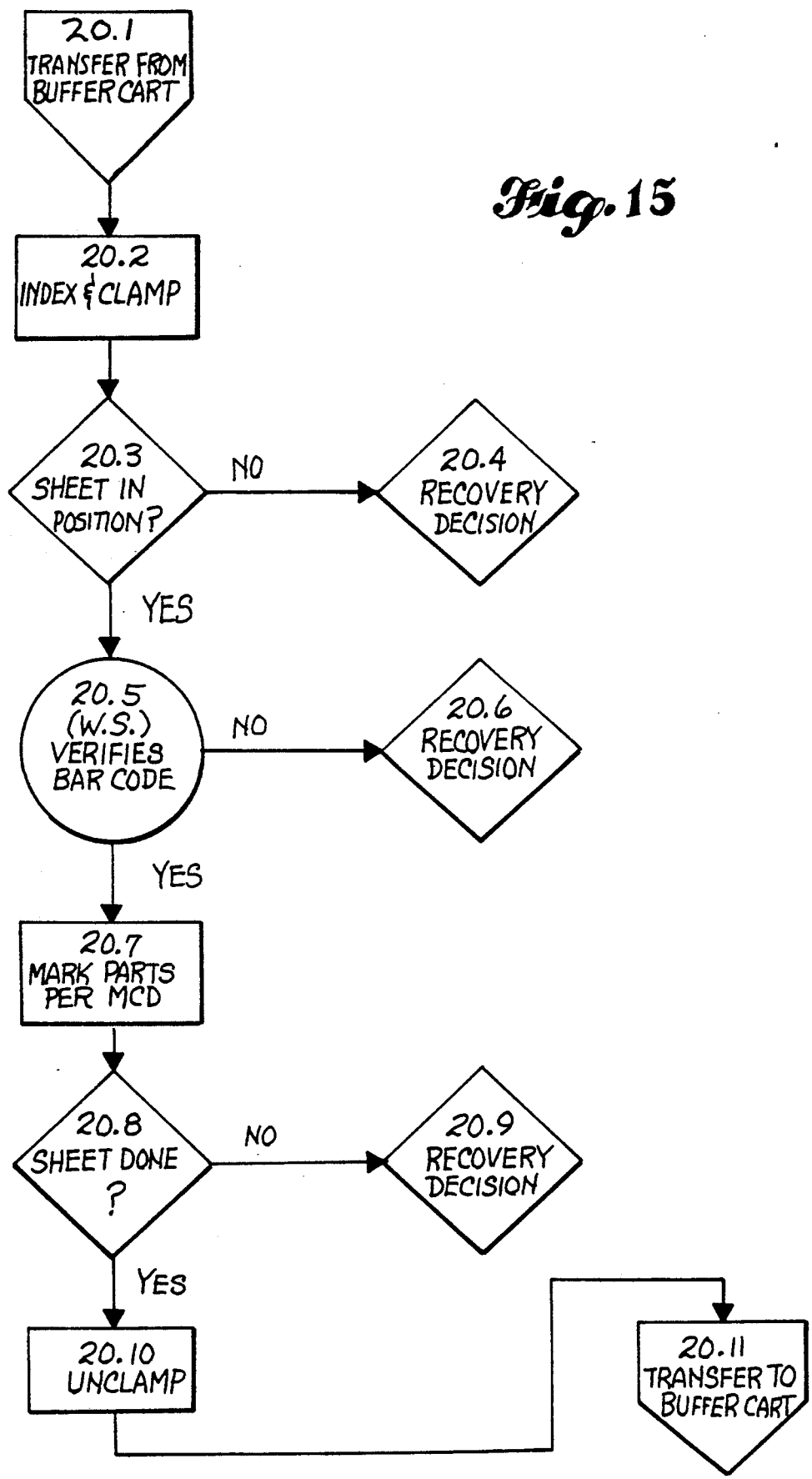
FIG. 15 is a flow diagram illustrating substeps of the "part mark" step shown in FIG. 4.
Figure 16:
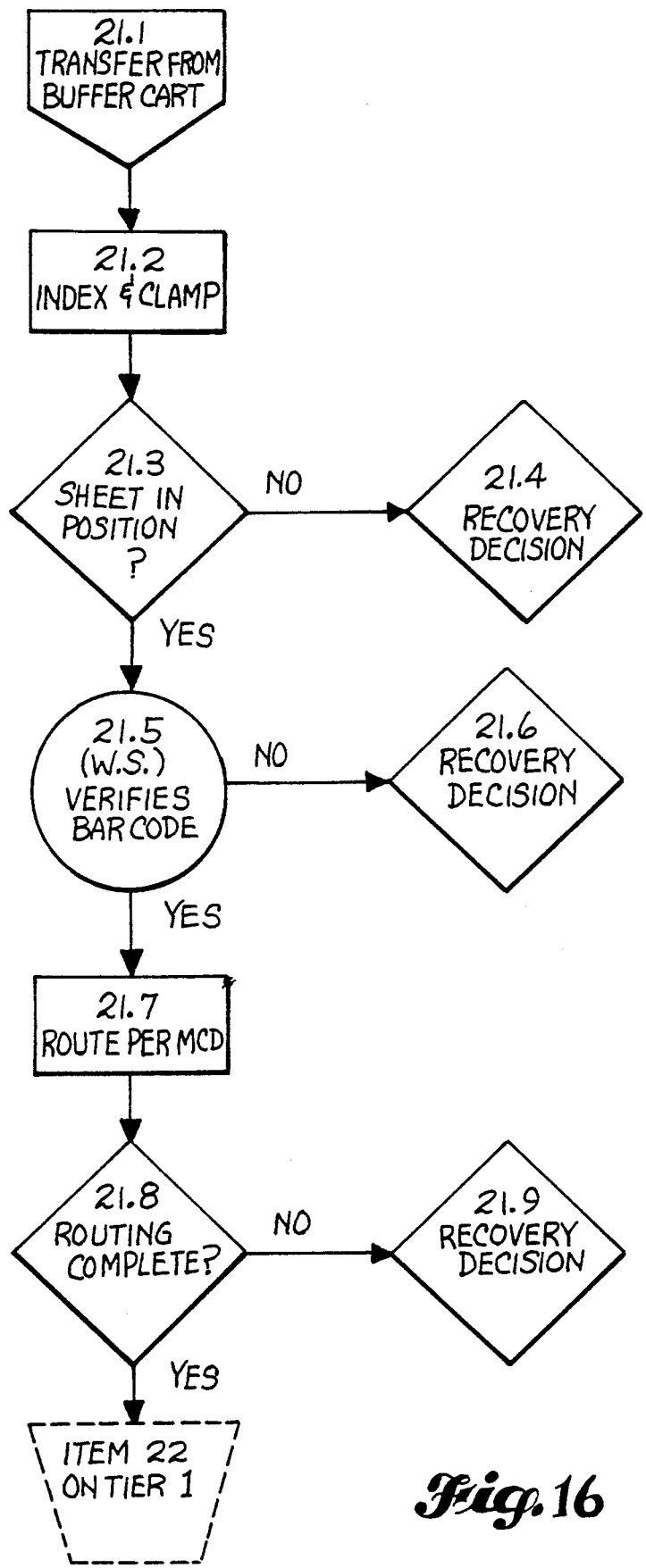
FIG. 16 is a flow diagram illustrating substeps of the "final route" step shown in FIG. 4.
Figure 17:
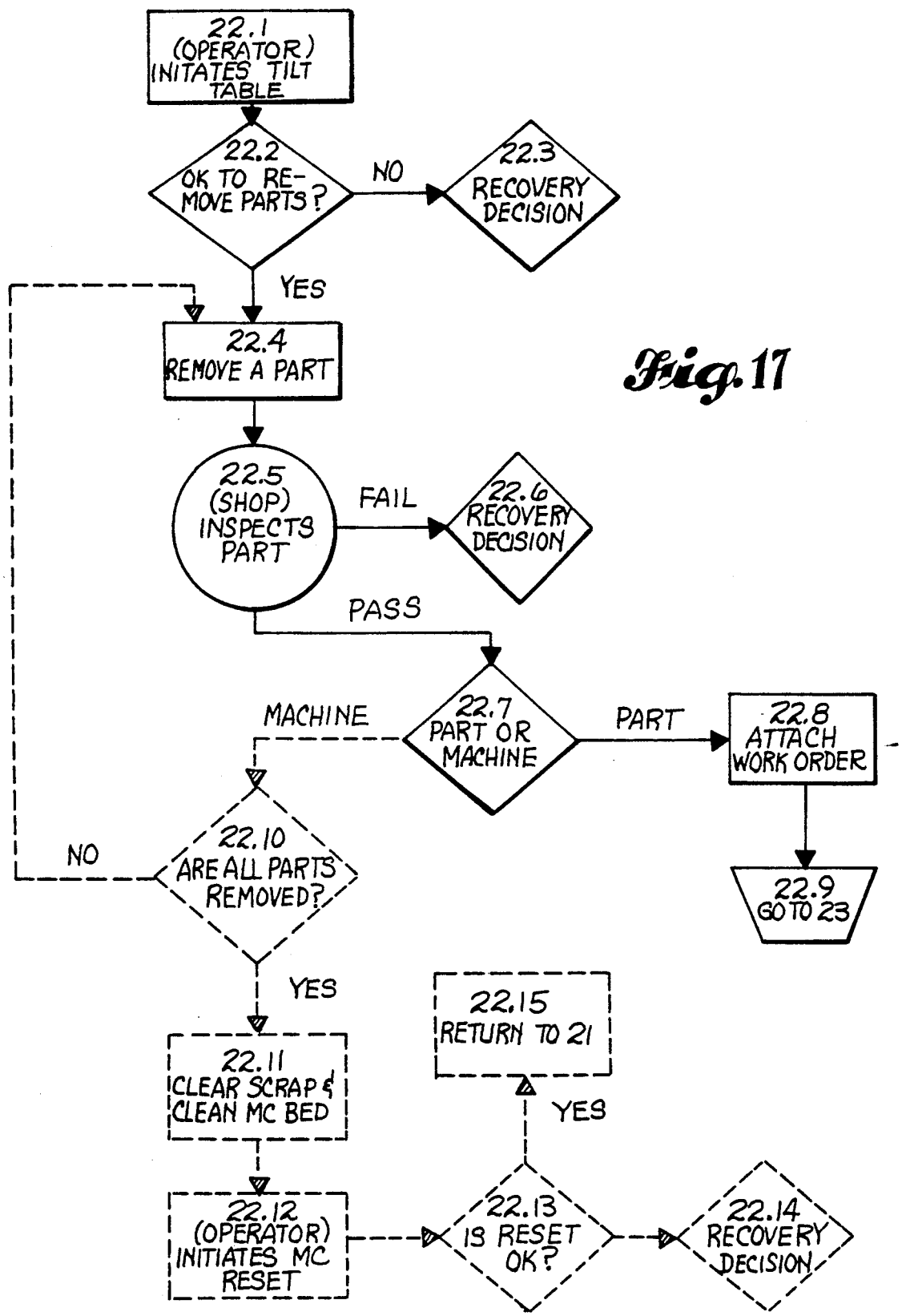
FIG. 17 is a flow diagram illustrating the substeps of the "remove parts" step shown in FIG. 4.

The various steps and procedures involved in the "ditch" step (12) in FIG. 4 are illustrated in FIG. 6. This procedure occurs at the partial routing and drilling work station 80 shown in FIG. 3. First, a sheet is transferred from a buffer cart (12.1). Then, a sliding frame 77 of the cell indexes and clamps the sheet (12.2). Indexing and clamping is followed by a verification of sheet position (12.3). if the sheet is not in proper position, then a sheet position exception occurs and the cell controller sends an alarm to the exception processor 10 calling for the implementation of a recovery decision (12.4).

Figure 19:
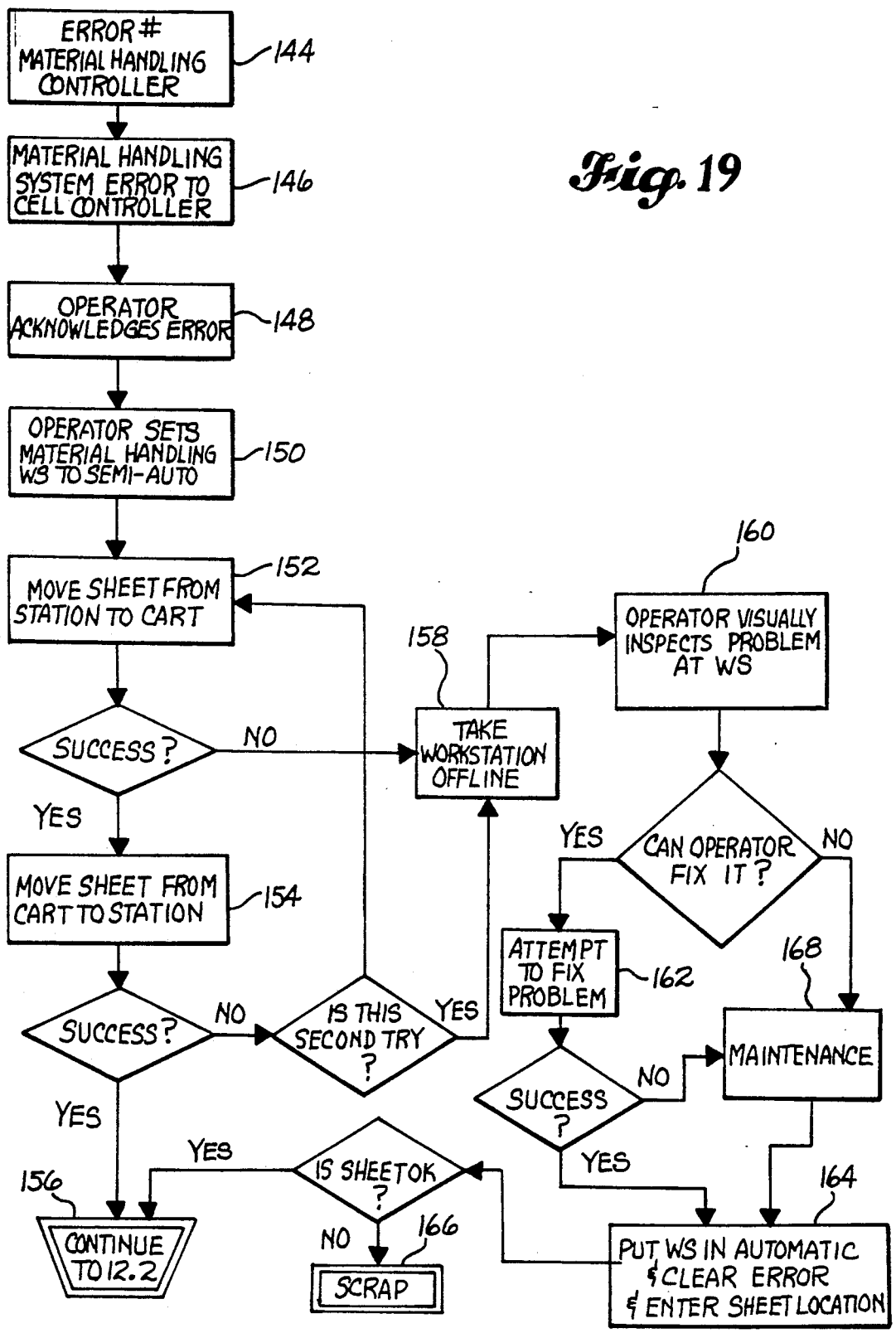
FIG. 19 is a flow diagram illustrating still another recovery procedure for correcting an exception in the system shown in FIGS. 3 and 4 that relates to a sheet position error, and relates to recovery decisions called for in FIGS. 6, 7, 8, 10, 13, 15 and 16.
Figure 20A:
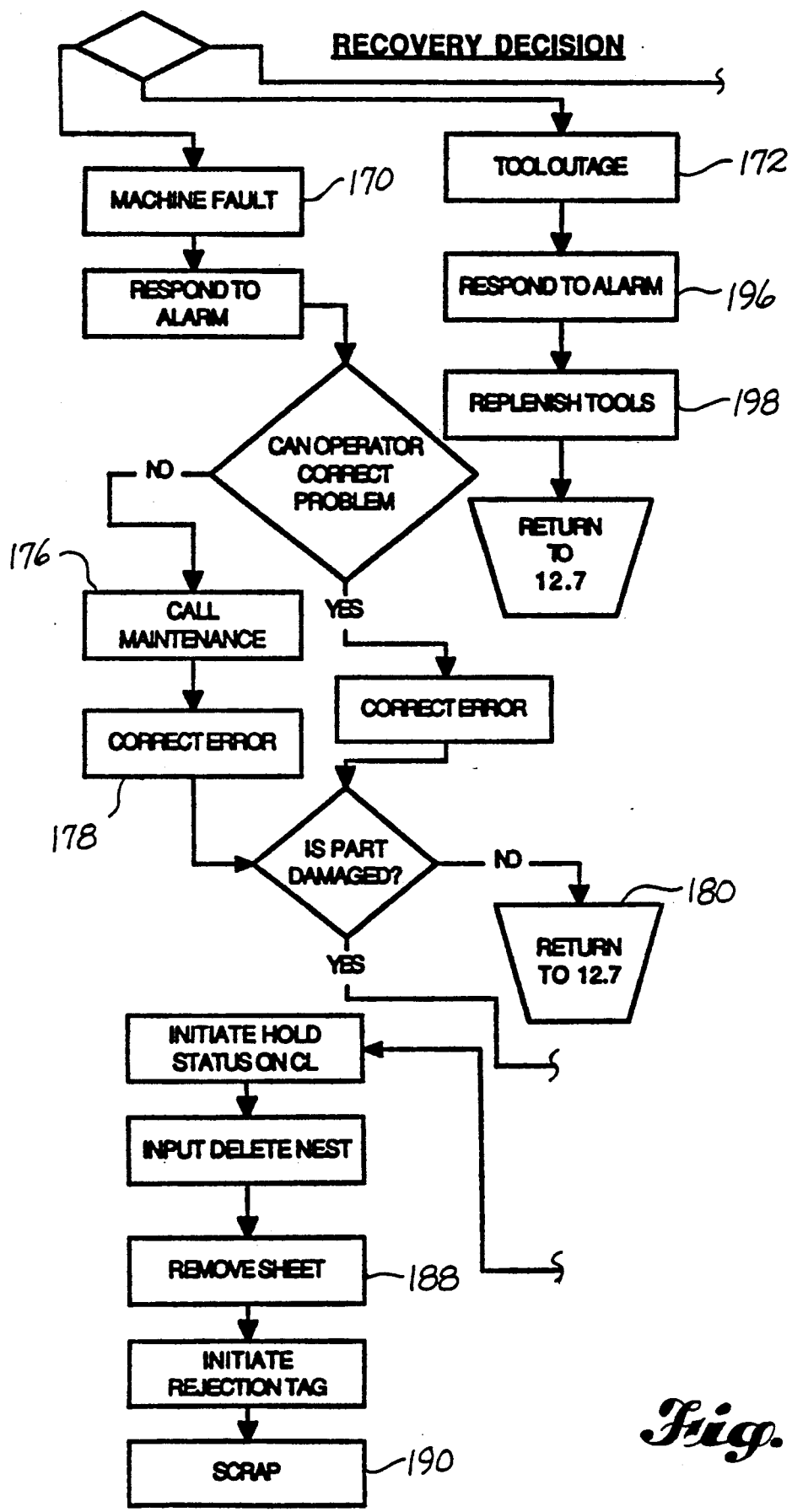
FIG. 20a is the first of a series of two views, and is a flow diagram illustrating still another recovery procedure for correcting an exception in the system of FIGS. 3 and 4, such exception relating to incomplete processing of a complete nest of parts, the recovery procedure further relating to recovery decisions called for in FIGS. 6 and 7.
Figure 20B:
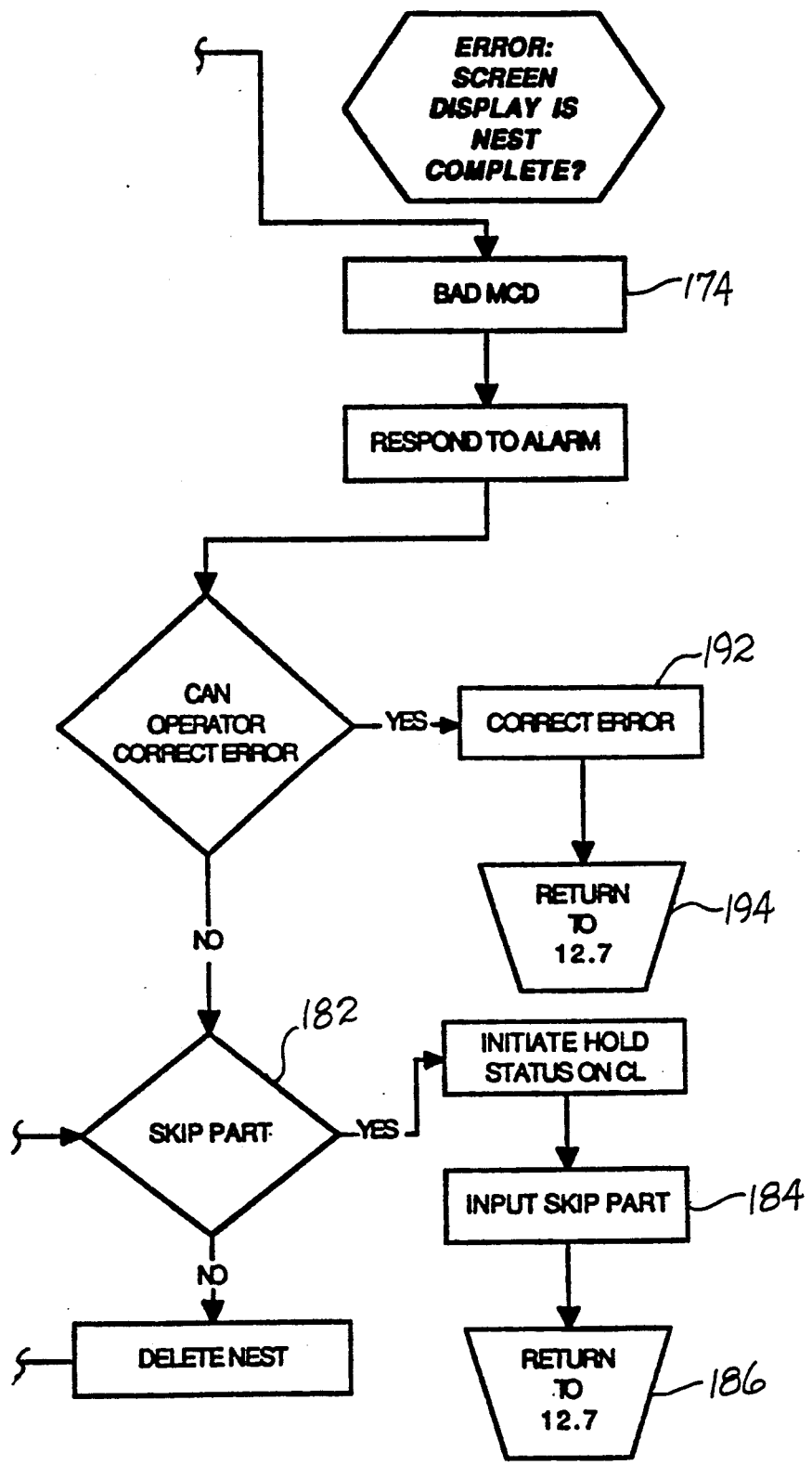
FIG. 20b is the second in a series of two views illustrating a recovery procedure for correcting an exception that relates to incomplete processing of a complete nest of parts.

A preferred recovery procedure for such exception is illustrated in FIG. 19. There, the material handling controller 144 first informs the cell controller that a material handling error exists, as indicated at 146. The operator or exception processor acknowledges such error, as indicated at 148, and takes over control of the work station, as indicated at 150. The exception processor first instructs that the sheet be moved from the work station back to a buffer cart, as shown at 152. If this is successful, then the sheet is returned to the work station, as shown at 154, and the sheet position is once again verified. If verification is a success, then the exception processor returns control to the work station as indicated at 156.

If the sheet was not successfully moved back from the work station to the buffer cart then the exception processor instructs the operator to take the work station off line, as shown at 158. The operator is instructed to visually inspect the problem, as shown at 160, and to determine whether or not he or she can fix it. If "yes," then a fix is attempted, as indicated at 162. If the fix is successful, the work station is returned to automatic, and the error is cleared, as shown at 164.

A visual inspection may indicate that the sheet was damaged or is not otherwise in good condition. If so, then it is scrapped, as shown at 166. If it is in good condition, then operation of the work station is returned to the cell controller.

If the operator determines that he or she cannot fix the problem, then a maintenance person is called in, as shown at 168. One advantage to the exception processor 10 described here is that the operator will be pre-informed by the recovery procedure as to the nature of the problem, and can communicate that to the appropriate maintenance person. This makes it easier for the maintenance person to anticipate what tools and/or parts may be required to make the fix, and results in lowering the down-time of the work station and/or the cell as a whole.

Referring again to FIG. 6, after the cell has recovered from the sheet position error, it then verifies the bar code (12.5). If the bar code is rejected, then a bar code exception occurs and the recovery plan previously described (see FIGS. 18*a* and 18*b*) is implemented. If the bar code is accepted, then the work station routes the ditch per MCD (machine control data) parameters, and determines whether or not all parts in the nest are complete (12.8). If not, then still another exception is created which calls for the recovery plan illustrated in FIGS. 20*a* and 20*b*. There, the exception processor queries the operator and/or the cell controller as to whether or not the exception may be attributed to a machine fault 170, tool outage 172, or bad MCD data 174.

If the exception appears to be a machine fault, then the exception processor requests whether or not the operator can correct the problem. If not, the operator is instructed to call maintenance to correct the error, as shown at 176, 178 in FIG. 20*a*. If the part was not damaged after correction, then normal operation is restored, as shown at 180.

If the operator was capable of fixing the problem, then the same procedure is followed. However, if the part is determined to be damaged, then a decision is made as to whether or not the part can be skipped, which is indicated at 182. If the part can be skipped, then the work station is instructed to skip it, as shown at 184, and normal cell operation is restored, as shown at 186. If the part can't be skipped, then the sheet is removed and scrapped as shown at 188, 190.

In the case of bad MCD parameters, after responding to the alarm, the operator makes the determination as to whether or not he or she can correct the error. If not, then a determination is made as to whether or not the part can be skipped, and the above-described procedure is followed. If the error can be corrected, then the operator corrects it and returns the work station to normal operation as shown at 192, 194.

in the case of tool outage, as indicated at 172, the exception processor responds to the alarm and instructs the operator to replenish tools, as indicated at 196, 198. Thereafter, the exception processor returns the cell to normal operation.

Referring again to FIG. 6, after nesting has been completed (12.8), the sheet is unclamped (12.10) and transferred to a buffer cart (12.11).

FIGS. 7–17 illustrate the remaining manufacturing procedures at each work station in FIG. 3, and where further possible recovery decisions or procedures should be implemented. All of the possible recovery decisions are not disclosed here as they are not necessary in order to understand the invention, and therefore add nothing to the above description.

With the above description, it should be clear how the exception processor 10 is implemented in the manufacturing cell 12 shown in FIG. 3. The exception processor 10 is designed to evolve and be improved upon over time. That is to say, the manner of implementing automated recovery procedures will change as further improvements are made. Therefore, in order to implement the invention, it is not necessary to describe each and every recovery procedure that was, or ever will be, developed for use in the FIG. 3 cell.

III. Hardware Requirements

As mentioned above, the cell controller 16 of the manufacturing cell 12 shown in FIG. 3 is a VAX 3800 computer. It is connected to individual cell Work stations via an Ethernet communications network, Which utilizes TCP/IP protocols. Both Ethernet and TCP/IP protocols would be familiar to the skilled person.

Figure 21:
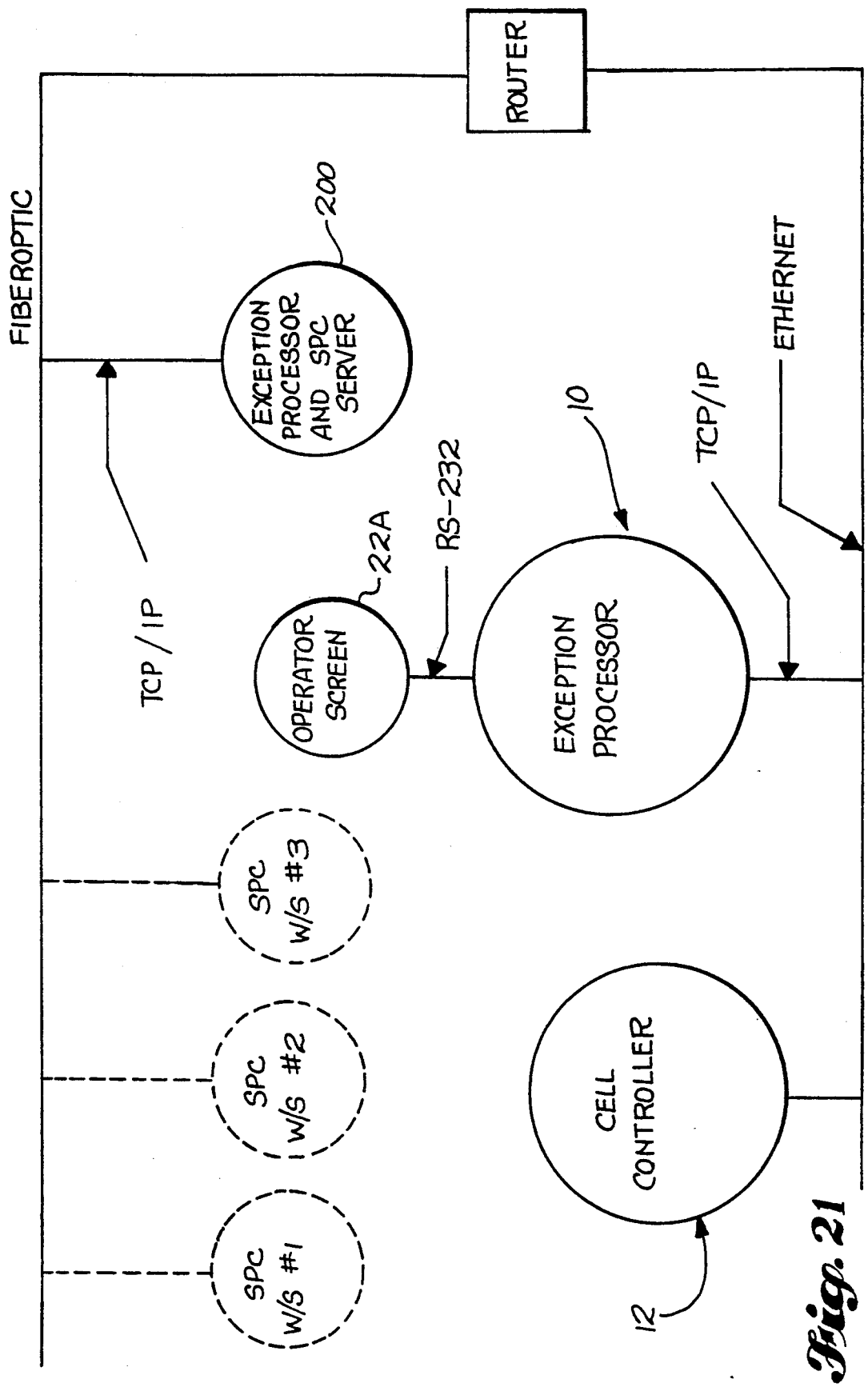
FIG. 21 is a schematic diagram illustrating the interface protocols between the invention and the system shown in FIG. 3.

FIG. 21 illustrates the interface protocols between the exception processor and the manufacturing cell. The cell controller interfaces with cell work stations via an Ethernet type of network. As mentioned above, the exception processor 10 utilizes object-oriented code that interfaces with the TCP/IP protocols of the Ethernet. The user interface or operator station 22a interfaces with the exception processor via RS/232 protocols. An advantage of the exception processor 10 is that it has the capability for off-line statistical analysis which is indicated schematically at 200 in FIG. 21. This is designated by the legend "SPC Server" where the acronym "SPC" stands for statistical process control.

Suitable hardware required to implement all aspects of the invention as described above are listed in Table I below.

TABLE I

1. Exception Processor:
    - 1 IMB Compatible 486-25 Mhz with 8 Mb 32-bit RAM, tower case, 200 Mb IDE hard drive and controller, 256 kb CPU cache, 1.2 Mb and 1.44 Mb floppy drives, ultra keyboard, (MS) DOS 4.01, Weitek 4167 co-processor socket, 14" amber monitor, Hercules compatible mono graphics card, clock/calendar, 5-year battery backup, 1 parallel port and 2 serial ports, and ground transportation.
    - 1 Upgrade hard drive and controller to ESDI 150 Mb.
    - 1 Specify 1.44 Mb floppy as drive A:
    - 1 Specify 1.2 Mb floppy as drive b:
    - 1 Specify Omnikey Ultra keyboard
    - 1 Specify tower case
    - 1 Specify (MS) DOS 4.0
    - 1 Specify NO monitor
    - 1 32-bit memory expansion card with 8 Mb RAM (8 @ 1 Mb × 9 × 80 ns)
    - 1 HardCache/ESDI Controller with 4 Mb memory
    - 1 Ungermann-Bass PC-NIU/ex (ISA bus network adaptor card) with Ungermann-Bass Net/One work station software (TCP9191) and Ungermann-Bass TCP software (TCP1010)
    - 1 Microsoft Serial Mouse
    - 1 NEC Multisync Graphics Engine with 1 Mb memory (256 color)
    - 1 NEC 4D 16" Color Monitor
2. Operator Station:
    - 1 IBM Compatible 486-25 Mhz with 8 Mb 32-bit RAM, tower case, 200 Mb IDE hard drive and controller, 256 kb CPU cache, 1.2 Mb and 1.44 Mb floppy drives, ultra keyboard, (MS) DOS 4.01, Weitek 4167 co-processor socket, 14" amber monitor, Hercules

TABLE I-continued compatible mono graphics card, clock/calendar, 5-year battery backup, parallel port and 2 serial ports, and ground transportation.
    - 1 Upgrade hard drive and controller to ESDI 600 Mb.
    - 1 Add additional ESDI 600 Mb hard drive only.
    - 1 Specify 1.44 Mb floppy as drive A:
    - 1 Specify 1.2 Mb floppy as drive b:
    - 1 Specify Omnikey Ultra keyboard
    - 1 Specify tower case
    - 1 Specify (MS) DOS 4.01
    - 1 Specify NO monitor
    - 1 32-bit memory expansion card with 8 Mb RAM (8 @ 1 Mb × 9 × 80 ns)
    - 1 HardCache/ESDI Controller with 4 Mb memory
    - 1 Ungermann-Bass PC-NIU/ex (ISA bus network adaptor card) with Ungermann-Bass Net/One work station software (TCP9191) and Ungermann-Bass TCP software (TCP1010)
    - 1 Microsoft Serial Mouse
    - 1 NEC Multisync Graphics Engine with 1 Mb memory (256 color)
    - 1 NEC 5D 19" Color Monitor
3. SPC Server:
    - 1 IBM Compatible 486-25 Mhz with 8 Mb 32-bit RAM, tower case, 200 Mb IDE hard drive and controller, 256 kb CPU cache, 1.2 Mb and 1.44 Mb floppy drives, ultra keyboard, (MS) DOS 4.01, Weitek 4167 co-processor socket, 14" amber monitor, Hercules compatible mono graphics card, clock/calendar, 5-yr. battery backup, 1 parallel port and 2 serial ports, and ground transportation.
    - 1 Upgrade hard drive and controller to ESDI 600 Mb.
    - 1 Add additional ESDI 600 Mb hard drive only.
    - 1 Specify 1.44 Mb floppy as drive A:
    - 1 Specify 1.2 Mb floppy as drive b:
    - 1 Specify Omnikey Ultra keyboard
    - 1 Specify tower case
    - 1 Specify (MS) DOS 4.01
    - 1 Specify 14" amber monochrome monitor with hercules compatible graphics card
    - 1 32-bit memory expansion card with 8 Mb RAM (8 @ 1 Mb × 9 × 80 ns)
    - 1 HardCache/ESDI Controller with 4 Mb memory
    - 1 Ungermann-Bass PC-NIU/ex (ISA bus network adaptor card) with Ungermann-Bass Net/One server software (hardware from the TCP9191 bundle and software from the TCP9193 bundle) and Ungermann-Bass TCP software (TCP1010)
4. Auxiliary Equipment:
    - 1 Hewlett Packard LaserJet III laser printer
    - 1 Pacific Data Products MB460 4 Mb memory board for HP LaserJet III
    - 1 Mountain FileSafe Model 7500 (525 Mb external tape drive with controller, cable, FileSafe software and FileTalk software)
    - 10 3M DC-6525 Data Cartridge Tape (525 Mb, ~$30@)

IV. Programming Requirements

The software architecture of the exception processor 10 is based on a technology called "object-oriented" programming. There are three features that distinguish object-oriented programming from traditional programming techniques.

The first feature is encapsulation. Each "object" has its own self-contained data processing capability and/or unique behavior that is independent from other objects. An object responds to a particular message according to its own internal behavior and internal data, and responds back with an answer.

The second feature that distinguishes object-oriented programming is its inheritance behavior. Hierarchies of objects can be easily developed where additional objects are defined by making successive refinements of properties of their parents. This capability makes it easy to generate a large number of objects with very specific behavior in a very fast manner.

The third feature that distinguishes object-oriented programming is its polymorphism. Different objects can respond to the same message uniquely. This makes it very easy to modify objects without doing a tremendous amount of self-test.

Attached hereto is an appendix of object-oriented code which implements the exception processor 10 as described above. The particular language package is implemented by a system called "SmallTalk " and a particular dialect identified by the trademark SmallTalk)IV 286. These packages are provided by Digitalk, Inc. of Los Angeles, Calif. The particular objects provided in the appendix are as follows: (1) exception processor handler object; (2) operator screen object; (3) recovery log object; (4) communication interface object; (5) protocol object; (6) message object; and (7) statistical processing object.

The skilled person, having the above description, and the hardware and software identified above, including the code appendix appended hereto, would be able to implement the exception processor 10 in conjunction with the automated cell shown in FIG. 3, or in other cells, as the case may be. It is to be understood that the preceding description of the exception processor is not intended to be limited to the FIG. 3 cell in any way, shape or form. It is to be further appreciated that the preceding description sets forth the best mode for carrying out the invention as it is presently known. It is a certainty that further developments and improvements to the invention will be made over time. For this reason, the preceding description is not to be taken in a limiting sense. Instead, the spirit and scope of the invention is to be limited only by the patent claim or claims which follow, the interpretation of which is to be made in accordance with the well-established doctrines of patent claim interpretation.

```
"
*******************************************************************************
Project : EPX
Date    : Oct 30, 1990
Time    : 20:29:35

Classes :
    ColorTextPane WorkEP WorkCellSuperModel

Methods :
    #isAsciiZ defined in Character.
    #copyWithoutLastOccurenceOf: defined in IndexedCollection.
    #copyWithoutFirstOccurenceOf: defined in IndexedCollection.
    #indexReverseOf:ifAbsent: defined in IndexedCollection.
    #lastTwo defined in Stream.
    #isACKorNAK defined in String.
    #isACK defined in String.
    #isAcknowledgement defined in String.
    #isYes defined in String.
    #isYesOrNo defined in String.
    #isDecimalInteger defined in String.
    #isRecoveryPlanRequest defined in String.
    #isNo defined in String.
    #isNAK defined in String.

*******************************************************************************
" !

TextPane subclass: #ColorTextPane
  instanceVariableNames:
    'foreColor backColor '
  classVariableNames: ''
  poolDictionaries: ''!

Object variableSubclass: #WorkEP
  instanceVariableNames:
    'busyState opmsgStream superModel symptomStream textStream '
  classVariableNames:
    'AlarmKeys '
  poolDictionaries: ''!

Smalltalk at: #Stream ifAbsent: [
Object subclass: #Stream
  instanceVariableNames:
    'collection position readLimit '
  classVariableNames: ''
  poolDictionaries:
    'CharacterConstants ']!

Smalltalk at: #Character ifAbsent: [
Magnitude subclass: #Character
  instanceVariableNames:
```

```
        'asciiInteger '
    classVariableNames: ''
    poolDictionaries:
        'CharacterConstants ']!

Object variableSubclass: #WorkCellSuperModel
    instanceVariableNames:
        'commInterface exceptionProcessor history historyStream inComingMessages tex
    classVariableNames:
        'TimeOutIntervalInSeconds '
    poolDictionaries:
        'ProtocolConstants CharacterConstants '!

Smalltalk at: #String ifAbsent: [
FixedSizeCollection variableByteSubclass: #String
    classVariableNames: ''
    poolDictionaries:
        'CharacterConstants ']!

Smalltalk at: #IndexedCollection ifAbsent: [
Collection subclass: #IndexedCollection
    instanceVariableNames: ''
    classVariableNames: ''
    poolDictionaries: '']!

!ColorTextPane class methods ! !

!ColorTextPane methods !

backColor

^ backColor!

backColor: anInteger backColor := anInteger!

foreColor

^ foreColor!

foreColor: anInteger foreColor := anInteger!

open
        "Private - Open the pane."
    selection  selectAfter: 0@1.
    self paneScanner setForeColor: foreColor backColor: backColor.
    self cancel! !

!WorkEP class methods !

alarmKeysInitialize

AlarmKeys := Dictionary new.
    AlarmKeys
        at: '1 3 6 A'
        put: #recoveryPlanCase3:;
        at: '9 8 7 B'
        put: #recoveryPlanCase1:;
        at: '1 3 3 A'
        put: #recoveryPlanCase2:;
        at: '1 1 1 A'
        put: #recoveryPlanCase5a:;
```

```
        at: '1 2 1 A'
        put: #recoveryPlanCase5b:;
        at: '1 3 1 A'
        put: #recoveryPlanCase5c:;
        at: '1 8 5 A'
        put: #recoveryPlanSample1:;
        at: '1 8 6 A'
        put: #recoveryPlanSample1:;
        at: '1 8 7 A'
        put: #recoveryPlanSample1:;
        at: '8 7 6 B'
        put: #recoveryPlanCase5:;
        at: '2 3 8 F'
        put: #recoveryPlanSample2:;
        at: '2 3 9 F'
        put: #recoveryPlanSample2:;
        at: '2 3 0 F'
        put: #recoveryPlanSample2:;
        at: '238F'
        put: #recoveryPlanSample2:;
        at: '1101'
        put: #recoveryPlanSample3:..!

getAlarmKeyFor: aString

^ AlarmKeys at: aString ifAbsent: [ nil]!

getAlarmKeys

^ AlarmKeys!

new self alarmKeysInitialize.
    ^ super new! !

!WorkEP methods !

acknowledgeAlarm: aString

" Revision Level ark02
    Date of Last Revision  Aug 24, 1990 "

"Answers
        true if the sent message is acknowledged,
        false if there are a combination of 3 NAKs or time outs'

Send an alarm acknowledgement for the alarm in aString (ascii)"

| alarmAcknowledgement numberOfTransmissionAttempts response | alarmAcknowledgement := AMessage alarmAcknowledgementMessageStringForAlarm:
    numberOfTransmissionAttempts := 0.

[ numberOfTransmissionAttempts < 3 ]
        whileTrue: [self write: ('Transmitting alarm acknowledgement for alarm '
                    self write: ('Awaiting acknowledgement.').
                    superModel transmitOutput: alarmAcknowledgement.
                    response := superModel waitForACKOrNAK.
                    ( response == #timeOut or: [ response isNAK ] )
                        ifTrue: [   Terminal bell.
                                    self write: ('Received a NAK while waiting
                                    numberOfTransmissionAttempts := numberOfTr
                                ]
                        ifFalse:[   ( response isACK )
                                        ifTrue: [ ^ true ]
                                ]
                ].

self write: ('No response after 3 tries.').
    ^ false!
```

```
busyState

^ busyState!

busyState: aBoolean busyState := aBoolean!

checkForAna

| a b c d e f | a := superModel inComingMessages.
    b := a includes: 'I am fine.' .
    c := a includes: 'a' .
    c ifTrue:[^ textStream nextPutAll: 'Got it';cr]
        ifFalse: [textStream nextPutAll: 'Dont have it';cr ].
    self halt.!

checkForAnInput

|a b c d e f g | a := CommScript new onPort:
        (CommPort port: 2).
    a ifTimeOut: [ Terminal bell.
                   Terminal bell].
     a echo: true.
     a waitForInput: 3.!

checkForAnx

| a b c d e f time timeLimit| timeLimit := Time totalSeconds + 10.
   [timeLimit <= Time totalSeconds ]
         whileFalse: [
     a := superModel inComingMessages.
     b := a includes: 'I am fine.' .
     c := a includes: 'x' .
     c ifTrue:[^ textStream nextPutAll: 'Got it';cr]
         ifFalse: [textStream nextPutAll: 'Dont have it';cr ].
                    ].
    self halt.

"
    nilCount := 0.
    (c := self processInput) isNil
        ifFalse: [^c].
    timeLimit := Time totalSeconds + seconds.
    [timeLimit <= Time totalSeconds]
        whileFalse: [
            (c := self processInput) isNil
                ifFalse: [^c]].
    captureStream isNil
        ifFalse: [captureStream flush].
    messageStream
        cr; cr;
        show: 'timed out';
        cr; cr.
    ^timeOutBlock value

"!

clearTextPane self changed: #text.
    self changed: #opmsg.
    self changed: #symptoms!
``` clockEvent: anInteger textStream nextPutAll: 'It is now ', Time now printString;cr.!

commTap superModel commTap!

dataUpdateForVariable: aString withValue: bString

" Revision Level ark01
    Date of Last Revision  Aug 24, 1990 "

"Answers
        true if the sent message is acknowledged,
        false if there are a combination of 3 NAKs or time outs'

Send a data update for the variable named (ascii) with value bString (ascii)

| dataUpdate numberOfTransmissionAttempts response | dataUpdate := AMessage dataUpdateMessageStringForVariableNamed: aString with
    numberOfTransmissionAttempts := 0.

[ numberOfTransmissionAttempts < 3 ]
        whileTrue: [self write: ('Updating value of variable ' , aString , ' to
                self write: ('Awaiting acknowledgement.').
                superModel transmitOutput: dataUpdate.
                response := superModel waitForACKOrNAK.
                ( response == #timeOut or: [ response isNAK ] )
                    ifTrue: [   Terminal bell.
                              self write: ('Received a NAK while waiting f
                              numberOfTransmissionAttempts := numberOfTran
                        ]
                    ifFalse:[   ( response isACK )
                            ifTrue: [ ^ true ]
                        ]
                ].
    self write: ('No response after 3 tries.').
    ^ false!

displayInfo: aString
      atWST: bString (superModel anyPendingInput) ifTrue: [ superModel getPendingInput2. "superModel self omsg1: aString.
textStream nextPutAll: ('Display the message, ', aString , ' at ' , bString);cr.
superModel transmitOutput: (bString, '/' , aString).!

displayMessage: aString textStream nextPutAll: aString;cr!

displayOperatorMessage: aString

" Revision Level ark02
    Date of Last Revision  Sep 27, 1990 "

"Answers
        nil if the request message is not acknowledged i.e. there are a
            combination of 3 NAKs or time outs in response to the request
            message,
        nil if there is no response that message was handled,
        an instance of a type 4 message containing the operator response
        to the message.

Send a TYPE 6 Mesage - Message to Operator"

| dataReceived dataExtracted numberOfTransmissionAttempts request response 3 timesRepeat: [

" Send the request and wait for an ACK"

```
    request := AMessage operatorMessageStringForTest: aString.
    numberOfTransmissionAttempts := 0.
    response := #NAK.

[ response -= #ACK ]
        whileTrue: [self write: ('Transmitting Operator Message Display for ' ,
                    self write: ('Awaiting acknowledgement.').
                    superModel transmitOutput: request.
                    response := superModel waitForACKOrNAKSymbol.
                    ( response == #timeOut or: [ response == #NAK ] )
                        ifTrue: [   Terminal bell.
                                    self write: ('Received a NAK while waiting
                                    numberOfTransmissionAttempts := numberOfTra
                                    ( numberOfTransmissionAttempts >= 3 )
                                        ifTrue: [ self write: ('No acknowledgeme
                                                    ^nil ]
                                    ]
                    ].
```

" Wait for return message ( assumed to be a TYPE 4 ) "

```
    self write: ('Waiting for the return.' ).

response := superModel waitForAMessageOfType: 4.
    ( response == #timeOut or: [ response == #NAK ] )
        ifTrue: [   Terminal bell.
                    self write: ('Received a NAK while waiting for handshake.').
                ]
        ifFalse:[   ^response "type 4 message with response from operator"
                ].

].
    self write: ('No handshake after 3 tries.').
    ^ nil!
``` displayOperatorPrompt: aString

" Revision Level ark01
Date of Last Revision  Oct 8, 1990 "

"Answers
    nil if the request message is not acknowledged i.e. there are a
        combination of 3 NAKs or time outs in response to the request
        message,
    nil if there is no response that message was handled,
    an instance of a type 4 message containing the operator response
    to the message.

Send a TYPE 7 Mesage - Prompt to Operator"

| dataReceived dataExtracted numberOfTransmissionAttempts request response 3 timesRepeat: [

" Send the request and wait for an ACK"

```
    request := AMessage operatorPromptStringForTest: aString.
    numberOfTransmissionAttempts := 0.
    response := #NAK.

[ response -= #ACK ]
        whileTrue: [self write: ('Transmitting Operator Prompt for ' , aString ,
                    self write: ('Awaiting acknowledgement.').
                    superModel transmitOutput: request.
                    response := superModel waitForACKOrNAKSymbol.
                    ( response == #timeOut or: [ response == #NAK ] )
                        ifTrue: [   Terminal bell.
                                    self write: ('Received a NAK while waiting f
                                    numberOfTransmissionAttempts := numberOfTran
                                    ( numberOfTransmissionAttempts >= 3 )
                                        ifTrue: [ self write: ('No acknowledgeme
                                                    ^nil ]
                                    ]
                    ].
```

```
"superModel transmitOutput: request. "

" Wait for return message ( assumed to be a TYPE 4 ) "

self write: ('Waiting for the return.' ).

response := superModel waitForAMessageOfType: 4.
    ( response == #timeOut or: [ response == #NAK ] )
        ifTrue: [    Terminal bell.
                    self write: ('Received a NAK while waiting for handshake.').
                    ]
        ifFalse:[    ^response "type 4 message with response from operator"
                    ].

].
        self write: ('No handshake after 3 tries.').
        ^ nil!

Doit can't access source code!

echoInput: aString textStream nextPutAll: ('Recovery plan received input = ' , aString printString)

empty

^ String new!

getACKNAK
    | a |
    a:= superModel getACKNAK.
    ^ a!

getACKorNAK

| a b c d timeOutCount|

1 to: 3 do: [   :invalidInputCount | a := nil. timeOutCount := 0.
    [ a isNil ] whileTrue: [

( timeOutCount >= 3) ifTrue: [
                        textStream nextPutAll: ('Time out');cr.
                    ^ nil ].

a := self getACKNAK.

timeOutCount := timeOutCount + 1.

].

textStream nextPutAll: ('Received input = ' , a );cr.

d := AMessage fromString: a.
    ( d notNil and: [ (d type = 99) or: [ d type = 98] ] ) ifTrue: [ ^ a].

].
    ^ 'false'!

getMeMyInput
    | a |
    a:= superModel getInput.
    ^ a!

getMeMyInput2
    | a |
    a:= superModel getInput2.
    ^ a!

getRecoveryPlanNameFor: aString
```

```
^ self class getAlarmKeyFor: aString!
``` initializeAlarmKeys

```
    self class alarmKeysInitialize!
``` inspectAlarmKeys

```
    "self class getAlarmKeys inspect"

AlarmKeys inspect!
``` invalidAlarm: aString

```
    |  answer1  | self recoveryProcedureStart: aString.

self write: ( 'No Recovery Plan is avaliable for alarm ' , aString ).

self recoveryProcedureCompleted.!
``` maskAll
```
    "Generate a mask to color the op msg  pane "
(BitBlt destForm: Display sourceForm: nil)
 mask: (BiColorForm color:14);
destRect:(opmsgStream pane frame);
combinationRule: Form andRule;
copyBits.
    "Generate a mask to color the symptom pane "
(BitBlt destForm: Display sourceForm: nil)
 mask: (BiColorForm color:14);
destRect:(symptomStream pane frame);
combinationRule: Form andRule;
copyBits!
``` maskAllMenu
```
    "Implement masks for the symptom and operator msg panes"
    ^ Menu labels: ' '
    lines: #()
    selectors:#(maskAll )!
``` maskItopmsg
```
    "Generate a mask to color the window pane "
"(BitBlt destForm: Display sourceForm: nil)
 mask: (BiColorForm color:14);
destRect:(opmsgStream pane frame);
combinationRule: Form andRule;
copyBits
"
self maskAll!
``` maskItSymptom
```
    "Generate a mask to color the window pane "
"(BitBlt destForm: Display sourceForm: nil)
 mask: (BiColorForm color:14);
destRect:(symptomStream pane frame);
combinationRule: Form andRule;
copyBits
"
 self maskAll!
``` omsg1: aString
```
        "Scroll up and output a text string to the Operator Message Pane "
        opmsgStream pane scrollUp: -126.
        opmsgStream nextPutAll: aString; cr.
      ^ self maskItopmsg!
``` omsgClear

```
    "Scroll up and clear the Operator Message Pane "

opmsgStream cr.
    opmsgStream pane scrollUp: (opmsgStream pane frame height) negated.
    self maskItopmsg.!
```

```
open

| opmsgPane symptomPane topPane textPane | busyState := false.

topPane := TopPane new label: 'EP Handler'.

topPane addSubpane:
        (textPane := TextPane new
            model: self;
            name: #text;
            menu: #textMenu;
            framingRatio: (0@0 corner: 1@(2/3) );
            yourself).

topPane addSubpane:
        (symptomPane := ColorTextPane new
            model: self;
            name: #opmsg;
            foreColor: 0;
            backColor: 14;
            framingRatio: (0@(2/3) corner: (1/3)@1 );
            yourself).

topPane addSubpane:
        ( opmsgPane:= ColorTextPane new
            model: self;
            name: #symptoms;
            foreColor: 0;
            backColor: 14;
            framingRatio: ((2/3)@(2/3) corner: 1@1 );
            yourself).

topPane addSubpane:
        (TextPane new
            model: self;
            name: #empty;
            menu: #maskAllMenu;
            framingRatio: ((1/3)@(2/3) corner: (2/3)@1 );
            yourself).

topPane reframe: (0@00 corner: 640@175).

textStream := textPane dispatcher.
    opmsgStream := opmsgPane dispatcher.
    symptomStream := symptomPane dispatcher.

topPane dispatcher openWindow scheduleWindow!

opmsg

^ String new!

planRequest: aString

"Process a request for a recovery plan"

| plan |

"Choose the correct plan e.g.

plan := planDictionary at: aString.
        self perfrom: plan.

"
    "busyState := true. "

superModel logHistoryFor: aString.
    plan := self getRecoveryPlanNameFor: aString.
    ( plan isNil )
        ifFalse:[ self perform: plan with: aString]
        ifTrue: [ self perform: #invalidAlarm: with: aString].

"busyState := false. "!
```

```
receiveDataFromWS: aString
         ofKind: aSelectorSymbol
         withPrompt: bString

| a b c d timeOutCount|

1 to: 3 do: [  :invalidInputCount  | a := nil. timeOutCount := 0.
    [ a isNil ] whileTrue: [

( timeOutCount >= 3) ifTrue: [
                    textStream nextPutAll: ('Time out');cr.
                    self displayInfo: ('Time out at ', aString) atWST: 'CO
            ^ 'nil' ].

self sendCommand: bString
            toWS: aString.

a := self getMeMyInput2.

timeOutCount := timeOutCount + 1.

].

textStream nextPutAll: ('Received from ' , aString , ' input = ' , a prints d := a perform: aSelectorSymbol.
    d ifTrue: [ ^ a].

(invalidInputCount < 3) ifTrue: [ textStream nextPutAll: ('Received incorrec
            ].

self displayInfo: ('Invalid response after three tries:\Message was, ' , bSt
        ' displayed on ' , aString ) withCrs
        atWST: 'COT#1'.
    ^ 'false'!

receiveInfoFromWST: aString
         ofKind: aSelectorSymbol
         withPrompt: bString

| a b c d timeOutCount|

1 to: 3 do: [   :invalidInputCount  | a := nil. timeOutCount := 0.
    [ a isNil ] whileTrue: [

( timeOutCount >= 3) ifTrue: [
                    textStream nextPutAll: ('Time out');cr.
                    self displayInfo: ('Time out at ', aString) atWST: 'CO
            ^ 'nil' ].

self displayInfo: bString
            atWST: aString.

a := self getMeMyInput2.

timeOutCount := timeOutCount + 1.

].

textStream nextPutAll: ('Received from ' , aString , ' input = ' , a printSt d := a perform: aSelectorSymbol.
    d ifTrue: [ self omsgClear. ^ a].

(invalidInputCount < 3) ifTrue: [ self displayInfo: 'Wrong input. Try again.
            ].
```

```
        self displayInfo: ('Invalid response after three tries:\Message was, ' , bSt
            ' displayed on ' , aString ) withCrs
            atWST: 'COT#1'.
    ^ 'false'!

receiveInput: aString textStream nextPutAll: aString;cr.!

recoveryPlanCase1: aString

| answer1 | self recoveryProcedureStart: aString.

self smsg1: 'No Sheet Motion'.
self write: 'Symptom is No Sheet Motion'.
self write: 'Error Code = NNNN  Device Number = XXXXXX'.

self sendCommand: ('Set Alarm ' , aString , ' ') toWS: 'CC'.
self displayInfo: ('Sheet not available - \Load Sheet') withCrs atWST: 'COT#1'.

self recoveryProcedureCompleted.!

recoveryPlanCase2: aString

| barCodeFromCC barCodeFromWand numberRead readable | self recoveryProcedureStart: aString.

self smsg1: 'No Sheet Motion'.
self write: 'Symptom is No Sheet Motion'.
self write: 'Error Code = NNNN  Device Number = XXXXXX'.

self sendCommand: 'Send Sheet from WS#1 to WS#7 ' toWS: 'CC'.

barCodeFromWand := self receiveInfoFromWST: 'WST#4'
                    ofKind: #isDecimalInteger
                    withPrompt: 'Barcode error - \Clean and Wand Barcode Num barCodeFromCC := self receiveDataFromWS: 'CC'
                    ofKind: #isDecimalInteger
                    withPrompt: 'Read BARCODE NUMBER '.

(barCodeFromCC = barCodeFromWand)
    ifTrue: [ self write: 'Barcode number matched'.
              self sendCommand: 'RESET ' toWS: 'WS#1'.
              self sendCommand: 'Send Sheet from WS#1 to WS#7 ' toWS: 'CC'.
            ]
    ifFalse:[ self write: 'Barcode number did not match'.
              readable := self receiveInfoFromWST: 'WST#4'
                            ofKind: #isYesOrNo
                            withPrompt: 'Is it PERSON READABLE ? (Yes or No)'
            ( readable isYes )
                ifTrue: [ numberRead := self receiveInfoFromWST: 'WST#4'
                                            ofKind: #isDecimalInteger
                                            withPrompt: 'Enter the Number: '.
                        ( numberRead ~~ barCodeFromCC )
                            ifTrue: [ self sendCommand: 'Initiate Cell Audit ' t
                                    ^ self recoveryProcedureCompleted
                                    ].
                        ]. "Do the following if it is not readable or it is re
              self sendCommand: 'PRINT BARCODE LABEL ' toWS: 'DPD#1'.
              self displayInfo: 'New Barcode Label printed - \APPLY TO SHEET' ;
            ].

self recoveryProcedureCompleted.!

recoveryPlanCase3: aString

| aCauseHasBeenFound answer1 answer2 clampSensor toolLife toolUsage vacuumGa
```

```
self recoveryProcedureStart: aString.

self smsg1: 'Excessive Flagging'.
self write: 'Symptom is Excessive Flagging'.
self write: 'Error Code = PERR   Device Number = NNNN'.
aCauseHasBeenFound := false.

self write: 'Checking first potential cause - Excessive Tool Wear'.

toolLife := self receiveDataFromWS: 'CC'
            ofKind: #isDecimalInteger
            withPrompt: 'Read TOOL LIFE '.
self echoInput: toolLife.

toolUsage := self receiveDataFromWS: 'WS#4'
            ofKind: #isDecimalInteger
            withPrompt: 'Read TOOL USAGE '.
self echoInput: toolUsage.

self write: 'Comparing TOOL USAGE with TOOL LIFE'.

( (toolUsage asInteger) < (toolLife asInteger) )
    ifTrue: [ self write: 'Ruling out Excessive Tool Wear as a cause'.]
    ifFalse:[ self write: 'Excessive Tool Wear detected'.
              aCauseHasBeenFound := true.
              answer1 := self receiveInfoFromWST: 'WST#4'
                      ofKind: #isYesOrNo
                      withPrompt: 'Excessive Tool Wear - \OK to change tool?
            ( answer1 isYes )
               ifTrue: [ self sendCommand: 'TOOL CHANGE' toWS: 'WS#4'.
                         self displayInfo: 'Tool Changed - Continue' atWST: 'WS
                    ]
            ].

self write: 'Checking second potential cause - Inadequate Vacuum'.

vacuumGage := self receiveDataFromWS: 'WS#4'
            ofKind: #isDecimalInteger
            withPrompt: 'Read VACUUM GAGE '.
self echoInput: vacuumGage.

self write: 'Comparing VACUUM GAGE Reading with ALLOWABLE VALUE'.

(vacuumGage asInteger <= 3)
    ifTrue: [ self write: 'Ruling out Inadequate Vacuum as a cause']
    ifFalse:[ self write: 'VACUUM GAGE Reading greater than allowable value of 3
              aCauseHasBeenFound := true.
              self write: 'Inadequate Vacuum detected'.
              self displayInfo: 'Clogged Vacuum Pickup - \Check and clean vacuum
                  atWST: 'WST#4'
            ].

self write: 'Checking third potential cause - Inadequate Clamping'.

clampSensor := self receiveDataFromWS: 'WSS#2'
            ofKind: #isDecimalInteger
            withPrompt: 'Read Sensor '.
self echoInput: clampSensor.

(clampSensor asInteger = 0)
    ifTrue: [ self write: 'Ruling out Inadequate Clamping as a cause'.]
    ifFalse:[ self write: 'Inadequate Clamping detected'.
              aCauseHasBeenFound := true.
              self displayInfo: 'Incorrect clamping - \Check clamp pressure.' wi
                  atWST: 'WST#4'.
            ].
"
(aCauseHasBeenFound)
    ifFalse: [ self displayInfo:
'Excessive Flagging has been detected.

The problem does not appear to be
the result of any of the known causes.
```

```
Operator J. Smith suggests increasing
the air blowoff by 10 psi.'
                    atWST: 'WST#4'.].
"
(aCauseHasBeenFound)
    ifFalse: [ answer2 := self receiveInfoFromWST: 'WST#4'
                              ofKind: #isYesOrNo
                              withPrompt:
'Excessive Flagging has been detected.

The problem does not appear to be
the result of any of the known causes.

Would you like to see some
operator suggestions ? (yes or no) '.
            ( answer2 isYes )
                ifTrue: [ "self displayInfo:
,
Operator J. Smith suggests increasing
the air blowoff by 10 psi.'
                    atWST: 'WST#4'."
self receiveInfoFromWST: 'WST#4'
    ofKind: #isAcknowledgement
    withPrompt:
,
Operator J. Smith suggests increasing
the air blowoff by 10 psi.'
                    ]
            ].
self recoveryProcedureCompleted.!

recoveryPlanCase5: aString

| answer1 a| self recoveryProcedureStart: aString.

a :=
'The following message is being sent to WST#4 -
Sheet may be short in length -
Divert to manual station for check ? (yes or no) '.

self displayInfo: a atWST: 'COT#1'.

answer1 := self receiveInfoFromWST: 'WST#4'
            ofKind: #isYesOrNo
            withPrompt: 'Sheet may be short in length -
Divert to manual station for check ? (yes or no) '.

(answer1 isYes)
    ifTrue: [ self sendCommand: 'Send Sheet from WS#5 to WS#4 '
                    toWS: 'CC'.
              self displayInfo: 'Sheet may be short in length - Check'
                    atWST: 'WST#4'.
            ].

self recoveryProcedureCompleted.!

recoveryPlanCase5a: aString self smsg1: 'Location Error'.
self write: '\Location Error detected for Operation 11.1' withCrs.
self write: 'Error Code = NNNNN  Device Number = DPD #1'.
self write: 'Cause is Sheet Length Too Small'.
self write: 'Non-procedural error\' withCrs.

self recoveryWarningCompleted!

recoveryPlanCase5b: aString self smsg1: 'Location Error'.
self write: '\Location Error detected for Operation 12.1' withCrs.
self write: 'Error Code = NNNNN  Device Number = DPD #2'.
```

```
self write: 'Cause is Sheet Length Too Small'.
self write: 'Non-procedural error\' withCrs.

self recoveryWarningCompleted!

recoveryPlanCase5c: aString self smsg1: 'Location Error'.
self write: '\Software Limit detected for Operation 13.1' withCrs.
self write: 'Error Code = XXXXX   Device Number = DPD #3'.
self write: 'Cause is Sheet Length Too Small'.
self write: 'Non-procedural error\' withCrs.

self recoveryWarningCompleted!

recoveryPlanSample1: aString

| answer1 | self recoveryProcedureStart: aString.

self write: ('Sample plan for ' , aString).

self recoveryProcedureCompleted.!

recoveryPlanSample2: aString

| answer1 | self recoveryProcedureStart: aString.

self write: ('Alarm Filtering Demo processing alarm ' , aString).

self receiveInfoFromWST: 'WST#4'
    ofKind: #IsDecimalInteger
    withPrompt: 'What is the data value ? ' withCrs.

self recoveryProcedureCompleted.!

recoveryPlanSample3: aString

| answer1 | self recoveryProcedureStart: aString.

self write: ('Protocol Test Demo processing alarm ' , aString).
"answer1 := self acknowledgeAlarm: aString."

"answer1 := superModel waitForAMessage."
"answer1 := superModel waitForAMessageOfType: 99."
"answer1 := superModel waitForACKOrNAK."
"answer1 := superModel waitForACKOrNAKSymbol."
"answer1 := self acknowledgeAlarm: aString."
"answer1 := self dataUpdateForVariable: 'ABCD' withValue: '1234'."
"answer1 := self requestForDataNamed: 'ABCD'. "
"answer1 := superModel waitForAMessage. "
"answer1 := superModel transmitOutput: '10023031303431313031110034144'."

"answer1 := superModel transmitOutput: (AMessage operatorMessageStringForTest).
"
answer1 := self displayOperatorMessage: ('ARK1990;', aString).

"answer1 := self acknowledgeAlarm: aString. "
"answer1 := self requestForDataNamed: 'ABCD;EFGH;IJKL'.
self write: ( 'Data returned = ' , answer1)."
"answer1 := self dataUpdateForVariable: 'ABCD' withValue: '1234'."

"self write: ('The response is ' ,  answer1 printString)."
"( answer1 isKindOf: AMessage ) ifTrue: [self write: ('The message data is ' ,
( answer1 isKindOf: AMessage ) ifTrue: [self write: ('The operator action taken
self recoveryProcedureCompleted.!
``` recoveryPlanSample3b: aString

| answer1 |

```
self recoveryProcedureStart: aString.
self write: ('Protocol Test Demo processing alarm ' , aString).
answer1 := self acknowledgeAlarm: aString.

"answer1 := superModel waitForAMessage."
"answer1 := superModel waitForAMessageOfType: 99."
"answer1 := superModel waitForACKOrNAK."
"answer1 := superModel waitForACKOrNAKSymbol."
"answer1 := self acknowledgeAlarm: aString."
"answer1 := self dataUpdateForVariable: 'ABCD' withValue: '1234'."
"answer1 := self requestForDataNamed: 'ABCD'. "
"answer1 := superModel waitForAMessage. "
"answer1 := superModel transmitOutput: '10023031303431313030311003041441'."
"answer1 := superModel transmitOutput: (AMessage operatorMessageStringForTest)."
"answer1 := self displayOperatorMessage: 'ARK1990'."
"answer1 := self acknowledgeAlarm: aString. "

answer1 := self requestForDataNamed: 'ABCD;EFGH;IJKL'.
self write: ( 'Data returned = ' , answer1).

answer1 := self dataUpdateForVariable: 'ABCD' withValue: '1234'.
self write: ('The response is ' ,  answer1 printString).

( answer1 isKindOf: AMessage ) ifTrue: [self write: ('The message data is ' ,  a self recoveryProcedureCompleted.!
``` recoveryPlanSample3c: aString

| answer1 |

```
self recoveryProcedureStart: aString.

self write: ('Protocol Test Demo processing alarm_' , aString).
"answer1 := self acknowledgeAlarm: aString."

"answer1 := superModel waitForAMessage."
"answer1 := superModel waitForAMessageOfType: 99."
"answer1 := superModel waitForACKOrNAK."
"answer1 := superModel waitForACKOrNAKSymbol."
"answer1 := self acknowledgeAlarm: aString."
"answer1 := self dataUpdateForVariable: 'ABCD' withValue: '1234'."
"answer1 := self requestForDataNamed: 'ABCD'. "
"answer1 := superModel waitForAMessage. "
"answer1 := superModel transmitOutput: '10023031303431313030311003041441'."

"answer1 := superModel transmitOutput: (AMessage operatorMessageStringForTest).
"
answer1 := self displayOperatorMessage: ('KR1990;', aString).

"answer1 := self acknowledgeAlarm: aString. "
"answer1 := self requestForDataNamed: 'ABCD;EFGH;IJKL'.
self write: ( 'Data returned = ' , answer1)."
"answer1 := self dataUpdateForVariable: 'ABCD' withValue: '1234'."

"self write: ('The response is ' ,  answer1 printString)."
( answer1 isKindOf: AMessage ) ifTrue: [self write: ('The operator action taken
self recoveryProcedureCompleted.!
``` recoveryPlanSample3d: aString

```
        | answer1 | self recoveryProcedureStart: aString.

self write: ('Protocol Test Demo processing alarm ' , aString).
"answer1 := self acknowledgeAlarm: aString."

"answer1 := superModel waitForAMessage."
"answer1 := superModel waitForAMessageOfType: 99."
"answer1 := superModel waitForACKOrNAK."
"answer1 := superModel waitForACKOrNAKSymbol."
"answer1 := self acknowledgeAlarm: aString."
"answer1 := self dataUpdateForVariable: 'ABCD' withValue: '1234'."
"answer1 := self requestForDataNamed: 'ABCD'. "
"answer1 := superModel waitForAMessage. "
"answer1 := superModel transmitOutput: '10023031304313130311003414'."

"answer1 := superModel transmitOutput: (AMessage operatorMessageStringForTest).
"
answer1 := self displayOperatorMessage: ('KR1990;', aString).

"answer1 := self acknowledgeAlarm: aString. "
"answer1 := self requestForDataNamed: 'ABCD;EFGH;IJKL'.
self write: ( 'Data returned = ' , answer1)."
"answer1 := self dataUpdateForVariable: 'ABCD' withValue: '1234'."

"self write: ('The response is ' ,  answer1 printString)."
( answer1 isKindOf: AMessage ) ifTrue: [self write: ('The operator action taken answer1 := self displayOperatorPrompt: 'What is the data value ? '.
( answer1 isKindOf: AMessage ) ifTrue: [self write: ('The value returned was: 'w
self recoveryProcedureCompleted.!

recoveryPlanSample3e: aString

| answer1 | self recoveryProcedureStart: aString.

self write: ('Protocol Test Demo processing alarm ' , aString).
"answer1 := self acknowledgeAlarm: aString."

"answer1 := superModel waitForAMessage."
"answer1 := superModel waitForAMessageOfType: 99."
"answer1 := superModel waitForACKOrNAK."
"answer1 := superModel waitForACKOrNAKSymbol."
"answer1 := self acknowledgeAlarm: aString."
"answer1 := self dataUpdateForVariable: 'ABCD' withValue: '1234'."
"answer1 := self requestForDataNamed: 'ABCD'. "
"answer1 := superModel waitForAMessage. "
"answer1 := superModel transmitOutput: '10023031304313130311003414'."

"answer1 := superModel transmitOutput: (AMessage operatorMessageStringForTest).
"
"answer1 := self displayOperatorMessage: ('KR1990;', aString)."

"answer1 := self acknowledgeAlarm: aString. "
"answer1 := self requestForDataNamed: 'ABCD;EFGH;IJKL'.
self write: ( 'Data returned = ' , answer1)."
"answer1 := self dataUpdateForVariable: 'ABCD' withValue: '1234'."

"self write: ('The response is ' ,  answer1 printString)."
"( answer1 isKindOf: AMessage ) ifTrue: [self write: ('The operator action take..

answer1 := self displayOperatorPrompt: 'What is the data value ? '.
( answer1 isKindOf: AMessage ) ifTrue: [self write: ('The value returned was: 'w
self recoveryProcedureCompleted.!
``` recoveryProcedureCompleted

"Clean up after a completed recovery procedure"

symptomStream cr.
symptomStream pane scrollUp: (symptomStream pane frame height) negated.
self maskItSymptom.

opmsgStream cr.
opmsgStream pane scrollUp: (opmsgStream pane frame height) negated.
self maskItopmsg.

textStream nextPutAll: ('*** recovery operation completed  ', (Date today pr self terminationOperations!

recoveryProcedureDone
    "Clean up after a completed recovery procedure:
        (1) Send a message to the recovery message log
        (2) Clear the Symptoms pane
        (3) Clear the Operator Message pane "

| a b c d e f |

" self rmsg1: '* recovery operation completed *'. "
    " symptomStream pane scrollUp: 1000. "
    " self smsg1: ' '.
    symptomStream pane homeCursor."
    " self changed: #symptoms.
     self maskItSymptom.
     self changed: #opmsg.
     self maskItopmsg "
    " Transcript show: symptomStream pane topCorner printString "
    " Transcript show: symptomStream pane textHolder extent printString"

" the argument to scrollup is 14* the number of lines to scroll.
Since the symptom pane and the operator mesage pane can hold
a maximum of 9 lines, the default argument is 9 * 14 = 126. "
    symptomStream cr.
    " symptomStream pane scrollUp: -126. "
    a := (symptomStream pane frame height) negated.
    symptomStream pane scrollUp: a.
    self maskItSymptom.
    opmsgStream cr.
    b := (symptomStream pane frame height) negated.
    " opmsgStream pane scrollUp: -126. "
    opmsgStream pane scrollUp: b.
    self maskItopmsg.
    " self samplePlan2    "

" Perform termination operations"

self terminationOperations!

recoveryProcedureStart: aString textStream cr;
        nextPutAll: '***Automatically starting Recovery Procedure for "', aStrin
        cr;
        nextPutAll: ('*** ', (Date today printString), ' ' ,(Time now printStri
        cr.!

recoveryWarningCompleted

"Clean up after a completed non-procedural error"

symptomStream cr.
    symptomStream pane scrollUp: (symptomStream pane frame height) negated.
    self maskItSymptom.

opmsgStream cr.
    opmsgStream pane scrollUp: (opmsgStream pane frame height) negated.
    self maskItopmsg.

```
"textStream nextPutAll: '*** recovery operation completed ***';cr. "

self terminationOperations!

requestForDataNamed: aString

" Revision Level ark04
    Date of Last Revision   Aug 31, 1990 "

"Answers
        nil if the request message is not acknowledged i.e. there are a
            combination of 3 NAKs or time outs in response to the request
            message,
        nil if there is no data transmission,
        a String (ascii) containing the value of the the variable named aString.

Send a TYPE 3 Mesage - Request For Data for the value for the variable
    named aString (ascii)"

| dataReceived dataExtracted numberOfTransmissionAttempts request response 3 timesRepeat: [

" Send the request and wait for an ACK"

request := AMessage requestForDataMessageStringForVariableNamed: aString.
    numberOfTransmissionAttempts := 0.
    response := #NAK.

[ response ~= #ACK ]
        whileTrue: [self write: ('Transmitting request for data for ' , aString
                    self write: ('Awaiting acknowledgement.').
                    superModel transmitOutput: request.
                    response := superModel waitForACKOrNAKSymbol.
                    ( response == #timeOut or: [ response == #NAK ] )
                        ifTrue: [    Terminal bell.
                                     self write: ('Received a NAK while waiting f
                                     numberOfTransmissionAttempts := numberOfTran
                                     ( numberOfTransmissionAttempts >= 3 )
                                         ifTrue: [ self write: ('No acknowledgem
                                                   ^nil ]
                                ]
                    ].

" Wait for a type 4 message ( Data transmission ) whose variable name
  matches aString "

self write: ('Waiting for the data transmission.' ).

dataReceived := superModel waitForAMessageDescribedBy:
                        [ :message | ( message type = 4 ) and:
                            [ (message extractVariableNameAndValue at: 1)
                                = aString
                            ]
                        ].

( dataReceived isKindOf: AMessage )
        ifTrue: [ dataExtracted := dataReceived extractVariableNameAndValue
                  self write: ('Data received = ' , dataExtracted printStri
                  ^ dataExtracted at: 2 ].

Terminal bell.
    self write: ('Time out waiting for data.').

].

self write: ('No data transmission after 3 tries.').
    ^ nil!

samplePlan1

|a b c d e f g | a := self getMeMyInput.
    textStream nextPutAll: 'Got it' , (a printString);cr.!
```

```
samplePlan10: aString

| a b| self recoveryProcedureStart: aString.

self smsg1: 'A Symptom'.

self displayInfo: 'Just a message for the operator'
        atWST: 'WST#2'.

self sendCommand: 'A command goes here'
        toWS: 'WS#9'.

a := self receiveInfoFromWST: 'WST#14'
         ofKind: #isDecimalInteger
         withPrompt: 'What is the temperature ? '.
textStream nextPutAll: ('Recovery plan received input = ' , a printString);cr.

a := self receiveInfoFromWST: 'WST#2'
         ofKind: #isDecimalInteger
         withPrompt: 'What is the pressure ? '.
textStream nextPutAll: ('Recovery plan received input = ' , a printString);cr.

a := self receiveInfoFromWST: 'WST#14'
         ofKind: #isDecimalInteger
         withPrompt: 'What is the volume ? '.
textStream nextPutAll: ('Recovery plan received input = ' , a printString);cr.

"
b := self receiveDataFromWS: 'CC'
         ofKind: #isDecimalInteger
         withPrompt: 'Poll ToolLife'.
textStream nextPutAll: ('Recovery plan received input = ' , b printString);cr.

b := self receiveDataFromWS: 'CC'
         ofKind: #isDecimalInteger
         withPrompt: 'Poll Tool'.
textStream nextPutAll: ('Recovery plan received input = ' , b printString);cr.

"
b := self receiveDataFromWS: 'WSS#2'
         ofKind: #isDecimalInteger
         withPrompt: 'Poll Tool'.
textStream nextPutAll: ('Recovery plan received input = ' , b printString);cr.

a := self receiveInfoFromWST: 'WST#14'
         ofKind: #isDecimalInteger
         withPrompt: 'What is the volume ? '.
textStream nextPutAll: ('Recovery plan received input = ' , a printString);cr.

self recoveryProcedureCompleted.!

samplePlan11: aString

| a b| self recoveryProcedureStart: aString.

self smsg1: 'A Symptom'.

self displayInfo:
'Just a message for the operator
that is second line here.'
        atWST: 'WST#2'.
```

```
self sendCommand:
'A command goes here
which is multi line
input.'
        toWS: 'WS#1'.

self sendCommand: 'Print new label' toWS: 'DPD#1'.

a := self receiveInfoFromWST: 'WST#4'
          ofKind: #isDecimalInteger
          withPrompt: 'What is the temperature ? '.
textStream nextPutAll: ('Recovery plan received input = ' , a printString);cr.

a := self receiveInfoFromWST: 'WST#2'
          ofKind: #isDecimalInteger
          withPrompt: 'What is the pressure ? '.
textStream nextPutAll: ('Recovery plan received input = ' , a printString);cr.

a := self receiveInfoFromWST: 'WST#4'
          ofKind: #isDecimalInteger
          withPrompt: 'What is the volume ? '.
textStream nextPutAll: ('Recovery plan received input = ' , a printString);cr.

b := self receiveDataFromWS: 'CC'
          ofKind: #isDecimalInteger
          withPrompt: 'Read ToolLife '.
textStream nextPutAll: ('Recovery plan received input = ' , b printString);cr.

b := self receiveDataFromWS: 'CC'
          ofKind: #isDecimalInteger
          withPrompt: 'Read Tool '.
textStream nextPutAll: ('Recovery plan received input = ' , b printString);cr.

b := self receiveDataFromWS: 'WSS#2'
          ofKind: #isDecimalInteger
          withPrompt: 'Read Tool '.
textStream nextPutAll: ('Recovery plan received input = ' , b printString);cr.

a := self receiveInfoFromWST: 'WST#4'
          ofKind: #isDecimalInteger
          withPrompt: 'What is the volume ? '.
textStream nextPutAll: ('Recovery plan received input = ' , a printString);cr.

b := self receiveDataFromWS: 'WS#1'
          ofKind: #isDecimalInteger
          withPrompt: 'Read Tool1 '.
textStream nextPutAll: ('Recovery plan received input = ' , b printString);cr.

b := self receiveDataFromWS: 'WS#4'
          ofKind: #isDecimalInteger
          withPrompt: 'Read Tool4 '.
textStream nextPutAll: ('Recovery plan received input = ' , b printString);cr.

b := self receiveDataFromWS: 'WS#5'
          ofKind: #isDecimalInteger
          withPrompt: 'Read Tool5 '.
textStream nextPutAll: ('Recovery plan received input = ' , b printString);cr.

b := self receiveDataFromWS: 'WS#7'
          ofKind: #isDecimalInteger
          withPrompt: 'Read Tool7 '.
textStream nextPutAll: ('Recovery plan received input = ' , b printString);cr.

self recoveryProcedureCompleted.!
``` samplePlan2

```
    |a b c d e f g | b := self getMeMyInput.  (b = 'stop') ifTrue: [^self].
    textStream cr;
        nextPutAll: '***Automatically starting Recovery Procedure for "', b, '"'
        cr;
        nextPutAll: ('*** ', (Date today printString), ' ' ,(Time now printStri
        cr.

self smsg1: 'No Sheet Motion'.
    self omsg1: 'Just an informative message.'.

textStream nextPutAll: 'Display an informative message on WST#14';cr.
    superModel transmitOutput: 'WST#14/Just an informative message. '.

self omsg1: 'What is the temperature ? '.
    textStream nextPutAll: 'Display on WST#2 - What is the temperature ? ';cr.
    superModel transmitOutput: 'WST#2/What is the temperature ? '.
    a := self getMeMyInput.
    textStream nextPutAll: 'Received from WST#2 a temperature reading of ' , a ;

textStream cr;
        nextPutAll: '*** recovery operation completed ***';
        cr.

self recoveryProcedureDone!
``` samplePlan3

```
    |a b c d e f g | b := self getMeMyInput.  (b = 'stop') ifTrue: [^self].
    textStream cr;
        nextPutAll: '***Automatically starting Recovery Procedure for "', b, '"'
        cr;
        nextPutAll: ('*** ', (Date today printString), ' ' ,(Time now printStri
        cr.

self smsg1: 'No Sheet Motion'.

self omsg1: 'Just an informative message.'.
    textStream nextPutAll: 'Display an informative message on WST#14';cr.
    superModel transmitOutput: 'WST#14/Just an informative message. '.

self omsg1: 'What is the temperature ? '.
    textStream nextPutAll: 'Display on WST#2 - What is the temperature ? ';cr.
    superModel transmitOutput: 'WST#2/What is the temperature ? '.
    a := self getMeMyInput.
    textStream nextPutAll: 'Received from WST#2 a temperature reading of ' , a ;

textStream nextPutAll: 'Send Sheet from WS1 to WS7.';cr.
    superModel transmitOutput: 'CC/Send Sheet from WS1 to WS7. '.

textStream
        nextPutAll: '* recovery operation completed *';
        cr.

self recoveryProcedureDone!
``` samplePlan4: aString

```
    |a b c d e f g |

" b := self getMeMyInput.  (b = 'stop') ifTrue: [^self]."
    textStream cr;
        nextPutAll: '***Automatically starting Recovery Procedure for "', aStrin
        cr;
        nextPutAll: ('*** ', (Date today printString), ' ' ,(Time now printStri
        cr.

self smsg1: 'No Sheet Motion'.
```

```
        self omsgl: 'Just an informative message.'.
        textStream nextPutAll: 'Display an informative message on WST#14';cr.
        superModel transmitOutput: 'WST#14/Just an informative message. '.

self omsgl: 'What is the temperature ? '.
        textStream nextPutAll: 'Display on WST#2 - What is the temperature ? ';cr.
        superModel transmitOutput: 'WST#2/What is the temperature ? '.
        a := self getMeMyInput.
        textStream nextPutAll: 'Received from WST#2 a temperature reading of ' , a ;

Terminal bell.
        textStream nextPutAll: 'Send Sheet from WS1 to WS7.';cr.
        superModel transmitOutput: 'CC/Send Sheet from WS1 to WS7. '.
Terminal bell.

textStream
            nextPutAll: '* recovery operation completed *';
            cr.

self recoveryProcedureDone!

samplePlan5: aString

|a b c d e f g |

" b := self getMeMyInput.  (b = 'stop') ifTrue: [^self]."
        textStream cr;
            nextPutAll: '***Automatically starting Recovery Procedure for "', aStrin
            cr;
            nextPutAll: ('*** ', (Date today printString), '   ' ,(Time now printStri
            cr.

self smsgl: 'No Sheet Motion'.

self omsgl: 'Just an informative message.'.
        textStream nextPutAll: 'Display an informative message on WST#14';cr.
        superModel transmitOutput: 'WST#14/Just an informative message. '.

self omsgl: 'What is the temperature ? '.
        textStream nextPutAll: 'Display on WST#2 - What is the temperature ? ';cr.
        superModel transmitOutput: 'WST#2/What is the temperature ? '.
        a := self getMeMyInput.
        textStream nextPutAll: 'Received from WST#2 a temperature reading of ' , a ;

"Terminal bell."
        textStream nextPutAll: 'Send Sheet from WS1 to WS7.';cr.
"Terminal bell."
        superModel transmitOutput: 'CC/Send Sheet from WS1 to WS7. '.
"Terminal bell. "

textStream
            nextPutAll: '* recovery operation completed *';
            cr.

self recoveryProcedureDone!

samplePlan6: aString

|a b c d e f g |

" b := self getMeMyInput.  (b = 'stop') ifTrue: [^self]."
        textStream cr;
            nextPutAll: '***Automatically starting Recovery Procedure for "', aStrin
            cr;
            nextPutAll: ('*** ', (Date today printString), '  ' ,(Time now printStri
            cr.

self smsgl: 'No Sheet Motion'.

self omsgl: 'Just an informative message.'.
        textStream nextPutAll: 'Display an informative message on WST#14';cr.
        superModel transmitOutput: 'WST#14/Just an informative message. '.
```

```
      " self omsg1: 'What is the temperature ? '.
        textStream nextPutAll: 'Display on WST#2 - What is the temperature ? ';cr.
        superModel transmitOutput: 'WST#2/What is the temperature ? '.
        a := self getMeMyInput.
        textStream nextPutAll: 'Received from WST#2 a temperature reading of ' , a ;
      "
"Terminal bell. "
        textStream nextPutAll: 'Send Sheet from WS1 to WS7.';cr.
        superModel transmitOutput: 'CC/Send Sheet from WS1 to WS7. '.
"Terminal bell. "

textStream
            nextPutAll: '* recovery operation completed *';
            cr.

self recoveryProcedureDone!

samplePlan7: aString

|a b c d e f g |

" b := self getMeMyInput.  (b = 'stop') ifTrue: [^self]."
        textStream cr;
            nextPutAll: '***Automatically starting Recovery Procedure for "', aStrin
            cr;
            nextPutAll: ('*** ', (Date today printString), ' ' ,(Time now printStri
            cr.

self smsg1: 'No Sheet Motion'.

self omsg1: 'Just a multi line informative message.'.
        textStream nextPutAll: 'Display an informative message on WST#14';cr.
        superModel transmitOutput: 'WST#14/Just an informative message. That
takes up several lines.
And just keeps going. '.

" self omsg1: 'What is the temperature ? '.
        textStream nextPutAll: 'Display on WST#2 - What is the temperature ? ';cr.
        superModel transmitOutput: 'WST#2/What is the temperature ? '.
        a := self getMeMyInput.
        textStream nextPutAll: 'Received from WST#2 a temperature reading of ' , a ;
      "
"Terminal bell. "
        textStream nextPutAll: 'Send Sheet from WS1 to WS7.';cr.
        superModel transmitOutput: 'CC/Send Sheet from WS1 to WS7. '.
"Terminal bell. "

textStream
            nextPutAll: '* recovery operation completed *';
            cr.

self recoveryProcedureDone!

samplePlan8: aString

|a b c d e f g |

" b := self getMeMyInput.  (b = 'stop') ifTrue: [^self]."
        textStream cr;
            nextPutAll: '***Automatically starting Recovery Procedure for "', aStrin
            cr;
            nextPutAll: ('*** ', (Date today printString), ' ' ,(Time now printStri
            cr.

self smsg1: 'No Sheet Motion'.

self omsg1: 'Just a multi line informative message.'.
        textStream nextPutAll: 'Display an informative message on WST#14';cr.
        superModel transmitOutput: 'WST#14/Just an informative message. That
takes up several lines.
And just keeps going. '.
```

```
    self omsg1: 'What is the temperature ? '.
    textStream nextPutAll: 'Display on WST#2 - What is the temperature ? ';cr.
    superModel transmitOutput: 'WST#2/What is the temperature ? '.
    a := self getMeMyInput.
    textStream nextPutAll: 'Received from WST#2 a temperature reading of ' , a ;

self omsg1: 'Just a simple informative message.'.
    textStream nextPutAll: 'Display an informative message on WST#14';cr.
    superModel transmitOutput: 'WST#14/Just an informative message. '.

"Terminal bell. "
    textStream nextPutAll: 'Send Sheet from WS1 to WS7.';cr.
    superModel transmitOutput: 'CC/Send Sheet from WS1 to WS7. '.
"Terminal bell. "

textStream
        nextPutAll: '* recovery operation completed *';
        cr.

self recoveryProcedureDone!

samplePlan9: aString

| a b c d e f g |

" b := self getMeMyInput.  (b = 'stop') ifTrue: [^self]."
    textStream cr;
        nextPutAll: '***Automatically starting Recovery Procedure for "', aStrin
        cr;
        nextPutAll: ('*** ', (Date today printString), ' ' ,(Time now printStri
        cr.

self smsg1: 'No Sheet Motion'.

self omsg1: 'Just a multi line informative message.'.
    textStream nextPutAll: 'Display an informative message on WST#14';cr.
    superModel transmitOutput: 'WST#14/Just an informative message. That
takes up several lines.
And just keeps going. '.

self omsg1: 'The temperature message here. '.
    textStream nextPutAll: 'Display on WST#2 - The temperature message here. ';c
    superModel transmitOutput: 'WST#2/The temperature message here. '.
"    a := self getMeMyInput.
    textStream nextPutAll: 'Received from WST#2 a temperature reading of ' , a ;
"
    self omsg1: 'Just a simple informative message.'.
    textStream nextPutAll: 'Display an informative message on WST#14';cr.
    superModel transmitOutput: 'WST#14/Just an informative message. '.

"Terminal bell. "
    textStream nextPutAll: 'Send Sheet from WS1 to WS7.';cr.
    superModel transmitOutput: 'CC/Send Sheet from WS1 to WS7. '.
"Terminal bell. "

textStream
        nextPutAll: '* recovery operation completed *';
        cr.

self recoveryProcedureDone!

sendCommand: aString
    toWS: bString (superModel anyPendingInput) ifTrue: [ superModel getPendingInput2. "superModel textStream nextPutAll: ('Send the command, ', aString , 'to ' , bString);cr. sel
superModel transmitOutput: (bString, '/' , aString).!

sendType2MessageForAlarm: aString
```

```
" Revision Level ark01
  Date of Last Revision  Aug 16, 1990 "

"Send an alarm acknowledgement for the alarm in aString (ascii)"

| alarmAcknowledgement | self write: ('Transmitting alarm acknowledgement for alarm ' , aString , '.'
alarmAcknowledgement := AMessage alarmAcknowledgementMessageStringForAlarm:
superModel transmitOutput: alarmAcknowledgement.
^ true!

smsg1: aString
    "Output a text string to the Symptoms Pane "
     symptomStream nextPutAll: aString; cr.
    ^ self maskItSymptom.!

superModel

^ superModel!

superModel: aModel superModel := aModel!

symptoms

^ String new!

terminationOperations

| a |

"  superModel transmitOutput: 'CC/Exception Processor Done. '.
    "
    "  a := superModel getStackedRecoveryPlanRequest.
       ( a notNil )
          ifTrue: [ self planRequest: a].
    "
     " superModel epDone "!

testMessageToWST14 superModel transmitOutput: 'WST#14/How are you ? '.!

text

^ String new!

textMenu

^Menu
        labels: 'Test Message to WST#14\Check for an  a\Check for an x\Check for
        lines: #(1 )
        selectors: #( testMessageToWST14  checkForAna checkForAnx checkForAnInpu timerSet Time initialize.
    Time clockTickPeriod: 40.!

timerUnset

Time clockTicksOff!

write: aString
```

```
textStream nextPutAll: aString;cr.!

xdisplayOperatorMessage: aString

" Revision Level ark01
    Date of Last Revision  Sep 11, 1990 "

"Answers
        false if the request message is not acknowledged i.e. there are a
            combination of 3 NAKs or time outs in response to the request
            message,
        false if there is no handskae that message was handled,
        true if there was a protocol ack and a handshake that the message
            was displayed.

Send a TYPE 6 Mesage - Message to Operator"

| dataReceived dataExtracted numberOfTransmissionAttempts request response 3 timesRepeat: [

" Send the request and wait for an ACK"

request := AMessage operatorMessageStringForTest: aString.
    numberOfTransmissionAttempts := 0.
    response := #NAK.

[ response ~= #ACK ]
        whileTrue: [self write: ('Transmitting Operator Message Display for ' ,
                    self write: ('Awaiting acknowledgement.').
                    superModel transmitOutput: request.
                    response := superModel waitForACKOrNAKSymbol.
                    ( response == #timeOut or: [ response == #NAK ] )
                        ifTrue: [   Terminal bell.
                                    self write: ('Received a NAK while waiting f
                                    numberOfTransmissionAttempts := numberOfTran
                                    ( numberOfTransmissionAttempts >= 3 )
                                        ifTrue: [ self write: ('No acknowledgeme
                                            ^false ]
                                ]
                    ].

" Wait for a handshake message ( assumed to be an ACK ) "

self write: ('Waiting for the handshake.' ).

response := superModel waitForHandshakeSymbol.
    ( response == #timeOut or: [ response == #NAK ] )
        ifTrue: [   Terminal bell.
                    self write: ('Received a NAK while waiting for handshake.').
                ]
        ifFalse:[   ( response == #ACK )
                        ifTrue: [ ^ true ]
                ].

].
    self write: ('No handshake after 3 tries.').
    ^ false!

xopen

| topPane textPane | topPane := TopPane new label: 'Test Exception Processor'.

topPane addSubpane:
        (textPane := TextPane new
            model: self;
            name: #text;
            menu: #textMenu;
            framingRatio: (0@0 corner: 1@1);
            yourself).

topPane reframe: (0@00 corner: 640@125).
```

```
        textStream := textPane dispatcher.

topPane dispatcher openWindow scheduleWindow!

xreceiveInfoFromWST: aString
            ofKind: aSelectorSymbol

| a b c d| a := self getMeMyInput.

d := a perform: aSelectorSymbol.
    d ifTrue: [ ^ a]
       ifFalse: [ ^ nil]!

xreceiveInfoFromWST: aString
            ofType: aClass

| a b c d| a := self getMeMyInput. self halt.
    c := [ :q | q isMemberOf: aClass ].
    d := c value: a.
    d ifTrue: [ ^ a]
       ifFalse: [ ^ nil]!

xrecoveryPlanCase3: aString

| aCauseHasBeenFound answer1 answer2 clampSensor toolLife toolUsage vacuumGa self recoveryProcedureStart: aString.

self smsg1: 'Excessive Flagging'.
self write: 'Symptom is Excessive Flagging'.
self write: 'Error Code = PERR  Device Number = NNNN'.
aCauseHasBeenFound := false.

self write: 'Checking first potential cause - Excessive Tool Wear'.

toolLife := self receiveDataFromWS: 'CC'
            ofKind: #isDecimalInteger
            withPrompt: 'Read TOOL LIFE '.
self echoInput: toolLife.

toolUsage := self receiveDataFromWS: 'WS#4'
            ofKind: #isDecimalInteger
            withPrompt: 'Read TOOL USAGE '.
self echoInput: toolUsage.

self write: 'Comparing TOOL USAGE with TOOL LIFE'.

( (toolUsage asInteger) < (toolLife asInteger) )
    ifTrue: [ self write: 'Ruling out Excessive Tool Wear as a cause'.]
    ifFalse:[ self write: 'Excessive Tool Wear detected'.
             aCauseHasBeenFound := true.
             answer1 := self receiveInfoFromWST: 'WST#4'
                        ofKind: #isYesOrNo
                        withPrompt: 'Excessive Tool Wear - \OK to change tool?
             ( answer1 isYes )
               ifTrue: [ self sendCommand: 'TOOL CHANGE' toWS: 'WS#4'.
                         self displayInfo: 'Tool Changed - Continue' atWST: 'WS
                        ]
            ].

self write: 'Checking second potential cause - Inadequate Vacuum'.

vacuumGage := self receiveDataFromWS: 'WS#4'
            ofKind: #isDecimalInteger
            withPrompt: 'Read VACUUM GAGE '.
self echoInput: vacuumGage.

self write: 'Comparing VACUUM GAGE Reading with ALLOWABLE VALUE'.
```

```
(vacuumGage asInteger <= 3)
    ifTrue: [ self write: 'Ruling out Inadequate Vacuum as a cause']
    ifFalse:[ self write: 'VACUUM GAGE Reading greater than allowable value of
            aCauseHasBeenFound := true.
            self write: 'Inadequate Vacuum detected'.
            self displayInfo: 'Clogged Vacuum Pickup - \Check and clean vacuum
                atWST: 'WST#4'
            ].

self write: 'Checking third potential cause - Inadequate Clamping'.

clampSensor := self receiveDataFromWS: 'WSS#2'
            ofKind: #isDecimalInteger
            withPrompt: 'Read Sensor '.
self echoInput: clampSensor.

(clampSensor asInteger = 0)
    ifTrue: [ self write: 'Ruling out Inadequate Clamping as a cause'.]
    ifFalse:[ self write: 'Inadequate Clamping detected'.
            aCauseHasBeenFound := true.
            self displayInfo: 'Incorrect clamping - \Check clamp pressure.' wi
                atWST: 'WST#4'.
            ].
"
(aCauseHasBeenFound)
    ifFalse: [ self displayInfo:
'Excessive Flagging has been detected.

The problem does not appear to be
the result of any of the known causes.
Operator J. Smith suggests increasing
the air blowoff by 10 psi.'
                atWST: 'WST#4'.].
"
(aCauseHasBeenFound)
    ifFalse: [ answer2 := self receiveInfoFromWST: 'WST#4'
                            ofKind: #isYesOrNo
                            withPrompt:
'Excessive Flagging has been detected.

The problem does not appear to be
the result of any of the known causes.

Would you like to see some
operator suggestions ? (yes or no) '.
            ( answer2 isYes )
                ifTrue: [ self displayInfo:
'
Operator J. Smith suggests increasing
the air blowoff by 10 psi.'
                            atWST: 'WST#4'.
                        ]
            ].
self recoveryProcedureCompleted.! !

!WorkCellSuperModel class methods !

new

TimeOutIntervalInSeconds := 1500.
    super new initialize! !

!WorkCellSuperModel methods !

anyPendingInput

^commInterface anyPendingInput!

changeTimeOutIntervalInSeconds
```

| a |

[a := Prompter prompt: 'Enter the Time Out Interval in Seconds'
            default: TimeOutIntervalInSeconds printString.
 a isDecimalInteger] whileFalse: [Terminal bell].
TimeOutIntervalInSeconds := a asInteger.!

checkForAnInput

|a b c d e f g | a := CommScript new onPort:
        (CommPort port: 2).
    a ifTimeOut: [ Terminal bell.
                   Terminal bell].
    a echo: true.
    a waitForInput: 3.!

clearAlarmCalled: aString

| a b c d e f |
    exceptionProcessor write: ('\Clearing alarm  ' withCrs , aString).
    b :=  inComingMessages copyWithoutFirstOccurenceOf: aString.
    inComingMessages := b.
    self changed: #text.
    self logHistoryFor: (aString , ' (clear)').!

clearAndResetAll self resetHistory.
    self resetData.
    self reInitializeInComingMessages.

exceptionProcessor clearTextPane; maskAll.
    self resetEP.

commInterface clearPanes.!

clearCurrentAlarmCalled: aString

| a b c d e f |
    exceptionProcessor write: ('\Clearing alarm  ' withCrs , aString).
"   b :=  inComingMessages copyWithoutFirstOccurenceOf: aString.
    inComingMessages := b.
    self changed: #text. "
    self logHistoryFor: (aString , ' (clear)').!

commInterface

^ commInterface!

commInterface: aCommModel commInterface := aCommModel!

commTap commInterface showCommContents2!

data

^ String new!

dataMenu

^Menu
        labels: 'reset data\inspect data\ HALT' withCrs
        lines: #(1 )
        selectors: #( resetData   inspectData halt)!

```
determineWhatEPShouldDo: aString

" check for patterns here"

| a b c d e f |
    "This is a made up pattern:

check sequence
        13.3 (CC) Verifies Barcode
        13.6 (Shop) Inspects Ditch
        13.3 (CC) Verifies Barcode
     if matched do just the first 13.3
     and clear the rest
    "
    "
    ( recoveryPlanHistory includes: '13.3 (CC) Verifies Barcode'
        and: [ (aString = '13.6 (Shop) Inspects Ditch')
            and: [ incomingMessages includes: '13.3 (CC) Verifies Barcode']
            ]
    ) ifTrue: [ exceptionProcessor  displayMessage: '\\Eliminating pattern' with
            self clearAlarmCalled: '13.3 (CC) Verifies Barcode'.
            ^ self ]
    "
" ********* C H E C K   P A T T E R N  185A 186A 187A  ********************"
    " check a pattern of 185A 186A 187A
      Assume 185A has been processed and key on 186A.
      Action is to clear 186A and 187A"

( aString = '1 8 6 A' and:
        [ (a:= history last) = '1 8 5 A' and:
            [ inComingMessages includes: '1 8 7 A']
        ] )
        ifTrue: [ Terminal bell .
b :=
'\I have detected a Pattern of Alarms.

The pattern is 1 8 5 A followed by 1 8 6 A and 1 8 7 A.
Since 1 8 5 A has already been processed, I can clear
1 8 6 A and 1 8 7 A.' withCrs.
            exceptionProcessor write: b .
            self clearCurrentAlarmCalled: '1 8 6 A'.
            self clearAlarmCalled: '1 8 7 A'.
            ^ self].
" ********* E N D   P A T T E R N  185A 186A 187A  ********************"

" ********* C H E C K   P A T T E R N  238F 239F 230F  ********************"
    "This pattern is functionally the same as the 185a 186A 187A except
    that the alarms are started manually/individually from from CC while
    the 18xx series can be started by a single pick on the 185A operation"

" check a pattern of 238F 239F 230F
      Assume 238F has been processed and key on 239F.
      Action is to clear 239F and 230F"

( aString = '2 3 9 F' and:
        [ (a:= history last) = '2 3 8 F' and:
            [ inComingMessages includes: '2 3 0 F']
        ] )
        ifTrue: [ Terminal bell .
b :=
'\I have detected a Pattern of Alarms.

The pattern is 2 3 8 F followed by 2 3 9 F  and 2 3 0 F.
Since 2 3 8 F has already been processed, I can clear 2 3 9 F  and 2 3 0 F.' withCrs.
            exceptionProcessor write: b .
            self clearCurrentAlarmCalled: '2 3 9 F'.
            self clearAlarmCalled: '2 3 0 F'.
            ^ self].
" ********* E N D   P A T T E R N  238F 239F 230F  ********************"
```

" ******* C H E C K   P A T T E R N  CASE 5 ******************"

" If the 3 non-procedural error occur (111A 121A 131A) execute recoveryPlan5"

```
    ( (aString = '1 3 1 A')
        and: [ (history includes: '1 2 1 A') & (history includes: '1 1 1 A')] )
            ifTrue: [ Terminal bell.
b :=
'\Three  non-procedural error have occured which are symtoms
of SHEET LENGTH TOO SMALL.

The warning for the last of these will be logged and then,
Recovery plan 876B will being queued.' withCrs.
                        exceptionProcessor write: b.
                        exceptionProcessor planRequest: '1 3 1 A'.
                        inComingMessages addFirst: '8 7 6 B'.
                        self changed: #text.
                         ^ self].
```

" *** Process the selected plan ***"

```
    exceptionProcessor planRequest: aString.!
``` determineWhatToDoNext

```
    | a b c d e f|

[ true ] whileTrue: [

(self anyPendingInput)
        ifTrue: [ self getPendingInput2 ].

a := self getStackedRecoveryPlanRequest.
    ( a notNil )
        ifTrue: [ "exceptionProcessor planRequest: a"
                    self determineWhatEPShouldDo: a. ]
        ifFalse:[ ^ nil ]

].!
```

Doit can't access source code!

dummy

```
    ^ self!
``` dummy: aSymbol

```
    ^ Terminal bell!
``` epDone
```
        | a b c d e f| a := self getStackedRecoveryPlanRequest.
        ( a notNil  )
            ifTrue: [ "exceptionProcessor planRequest: a"
                        self determineWhatEPShouldDo: a].!
``` exceptionProcessor

```
    ^ exceptionProcessor!
``` exceptionProcessor: anExceptionProcessor

```
    exceptionProcessor := anExceptionProcessor!
``` getACKNAK

```
    |a b c d e f g |
```

```
    a := CommScript new onPort:
        (CommPort port: 2).
    b := WriteStream on: String new.
    a captureIn: b.
    a ifTimeOut: [ Terminal bell. Terminal bell.^nil
                 ].
     a echo: true.
     a wait: TimeOutIntervalInSeconds forString: "Lf" "( 0 asCharacter )" "′′"
    c := b lastTwo .
    ^c!
``` getInput

```
    |a b c d e f g |

(false) " is data requested on stack"
        ifTrue:[ "^ data"]
        ifFalse:[ d := ' '. " d := recoveryPlan"
    [ d isRecoveryPlanRequest] whileTrue:
        [
    a := CommScript new onPort:
        (CommPort port: 2).
    b := WriteStream on: String new.
    a captureIn: b.
    a ifTimeOut: [ Terminal bell.
                   Terminal bell.
                 ].
     a echo: true.
     a wait: 15 forCharacter: "Lf" ( 0 asCharacter ).
    "^ b contents "
    c := b contents.
    d := c zapCrs trimBlanks.    "self halt. "
        ] .
    ^ d

]!
``` getInput2

```
    |a b c d e f g |

(false) " is data requested on stack"
        ifTrue:[ "^ data"]
        ifFalse:[ d := ' '. " d := recoveryPlan"
    [ d isRecoveryPlanRequest] whileTrue:
        [
    a := CommScript new onPort:
        (CommPort port: 2).
    b := WriteStream on: String new.
    a captureIn: b.
    a ifTimeOut: [ Terminal bell. Terminal bell.^nil
                 ].
     a echo: true.
     a wait: TimeOutIntervalInSeconds forCharacter: "Lf" "( 0 asCharacter )" ( 6
    "^ b contents "
    c := b contents.
    d := c zapCrs "trimBlanks."    "self halt. "
        ] .
    ^ d

]!
``` getPendingInput

```
    |a b c d e f g |

(false) " is data requested on stack"
        ifTrue:[ "^ data"]
        ifFalse:[
```

```
                d := ' '. " d := recoveryPlan"
              [ d isRecoveryPlanRequest] whileTrue:
                 [
             a := CommScript new onPort:
                    (CommPort port: 2).
             b := WriteStream on: String new.
             a captureIn: b.
             a ifTimeOut: [ Lf
                             ].
              a echo: true.
              a wait: 1 forCharacter: Lf.
              "^ b contents "
             c := b contents.
             d := c zapCrs trimBlanks.
                 ] .
             ^ d

]!

getPendingInput2 commInterface getPendingInput!

getStackedRecoveryPlanRequest

| a b c d e f |
"
    a := inComingMessages detect: [ :each | each isRecoveryPlanRequest]
                           ifNone: [ ^nil].
    b :=  inComingMessages copyWithoutFirstOccurenceOf: a.
    inComingMessages := b.
    self changed: #text.
    ^ a
"
    ( inComingMessages isEmpty ) ifTrue: [ ^ nil].
    a := inComingMessages removeFirst.
    self changed: #text.
    ^ a!

history

^ String new!

historyMenu

^Menu
        labels: 'reset history\inspect history\ HALT' withCrs
        lines: #(1 )
        selectors: #( resetHistory  inspectHistory halt)!

inComingMessages

^ inComingMessages!

initialize

| a b c | inComingMessages := OrderedCollection new.

a := WorkEP new.
    a superModel: self.
    self exceptionProcessor: a.

CommModel checkCommPrimitives.
    c:= CommModel new.
    c superModel: self.
    self commInterface: c.

self open!
``` inspectData dataInput inspect.!

inspectHistory history inspect.!

logHistoryFor: aString

"Place the recovery plan identified in aString
in the history log"

(history isNil) ifTrue:[history := OrderedCollection new].

history addLast: aString.
historyStream nextPutAll: aString;cr.!

open

```
    | dataPane historyPane topPane textPane | topPane := TopPane new label: 'EP Executive'.

topPane addSubpane:
        (textPane := ListPane new
            model: self;
            name: #text;
            menu: #textMenu;
            change: #dummy:;
            framingRatio: ((1/3)@0 corner: (2/3)@1);
            yourself).

topPane addSubpane:
        (dataPane := TextPane new
            model: self;
            name: #data;
            menu: #dataMenu;
            change: #dummy:;
            framingRatio: (0@0 corner: (1/3)@1);
            yourself).

topPane addSubpane:
        (historyPane := TextPane new
            model: self;
            name: #history;
            menu: #historyMenu;
            change: #dummy:;
            framingRatio: ((2/3)@0 corner: 1@1);
            yourself).

topPane reframe: (250@200 corner: 640@350).

dataInputStream := dataPane dispatcher.
    textStream := textPane dispatcher.
    historyStream := historyPane dispatcher.

topPane dispatcher openWindow scheduleWindow!
``` openCommInterface commInterface open!

openTestEP exceptionProcessor open!

```
receiveInput2: aMessage

" self halt. "

"exceptionProcessor receiveInput: aString. "
    " self halt. "

" inComingMessages addLast: aString.
     self changed: #text.
   "

"(aString isRecoveryPlanRequest)
       ifTrue:[ (exceptionProcessor busyState)   ""is the EP idle ?" "
                  ifFalse: [ ""^ exceptionProcessor planRequest: aString" "
                              ^ self determineWhatEPShouldDo: aString ]
                  ifTrue:[ textStream pane topPane activateWindow.
                            inComingMessages addLast: aString.
                            self changed: #text.
                            ^ aString]

]
        ifFalse:[ "" input is data. Assume that CommScript will handle" "
                   dataInput addLast: ('***' , aString).
                   self changed: #data.
                   ^ aString
                 ]
   "

(aMessage isRecoveryPlanRequest)
       ifTrue: [ "textStream pane topPane activateWindow."
                  inComingMessages addLast: (aMessage extractAlarmID).
                  self changed: #text.
                  (exceptionProcessor  busyState)
                    ifFalse: [   exceptionProcessor  busyState: true.
                                 self determineWhatToDoNext .
                                 exceptionProcessor  busyState: false.
                             ]

]
       ifFalse:[ "input is data. Assume CommScript will handle."
                  "dataInput addLast: ('***', aString).
                   self changed: #data."
                  dataInputStream nextPutAll: aMessage data;cr.
               ].
   .!

receiveInput: aString

" self halt. "

"exceptionProcessor receiveInput: aString. "
    " self halt. "

" inComingMessages addLast: aString.
     self changed: #text.
   "

(aString isRecoveryPlanRequest)
       ifTrue:[ (exceptionProcessor busyState)   "is the EP idle ?"
                  ifFalse: [ "^ exceptionProcessor planRequest: aString"
                              ^ self determineWhatEPShouldDo: aString ]
                  ifTrue:[ inComingMessages addLast: aString.
                            self changed: #text.
                            ^ aString]

]
        ifFalse:[ " input is data. Assume that CommScript will handle"
                   inComingMessages addLast: ('***' , aString).
                   self changed: #text.
                   ^ aString
                 ]!
``` reInitializeInComingMessages inComingMessages := OrderedCollection new.
    self changed: #text.!

resetData dataInput := OrderedCollection new.
    self changed: #data!

resetEP exceptionProcessor busyState: false!

resetHistory history := OrderedCollection new.
    self changed: #history!

resetTimeOut

"   Revision Level ark01
    Date of Last Revision   Sep 12, 1990 "

"   comment"

| a b| a := TimeOutIntervalInSeconds.
    TimeOutIntervalInSeconds := 20.
    b := TimeOutIntervalInSeconds.

self halt.!

runTimeTest

| a b| a := Time millisecondsToRun: [ self getPendingInput2 ] .

b := Time millisecondsToRun: [ 1 to: 100 do: [ :dummy | self anyPendingInput]
                              ] .

self halt.!

testMessageToWST14 self transmitOutput: 'WST#14/How are you ? '.!

testUpdateInComingMessages inComingMessages addLast: 'a'.
     self changed: #text.!

text

" ^'Text Messages here '" .

^ inComingMessages!

textMenu

^Menu
        labels: 'Reset EP\Open Comm Interface \Test Message to WST#14\Open Test
        lines: #(1 )
        selectors: #(resetEP openCommInterface testMessageToWST14 openTestEP tes timeOutIntervalInSeconds

^ TimeOutIntervalInSeconds!

transmitOutput: aString commInterface transmitOutput: aString!

waitForACKOrNAK

"   Revision Level ark01
    Date of Last Revision  Aug 24, 1990 "

"   comment"

^commInterface waitForACKOrNAKForSeconds: TimeOutIntervalInSeconds!

waitForACKOrNAKSymbol

"   Revision Level ark01
    Date of Last Revision  Aug 24, 1990 "

"   comment"

^commInterface waitForACKOrNAKSymbolForSeconds: TimeOutIntervalInSeconds!

waitForAMessage

"   Revision Level ark01
    Date of Last Revision  Aug 23, 1990 "

"   comment"

^ commInterface waitForAMessageForSeconds: TimeOutIntervalInSeconds.!

waitForAMessageDescribedBy: aBlock

"   Revision Level ark01

Date of Last Revision  Aug 24, 1990 "

"   comment"

^ commInterface waitForAMessageDescribedBy: aBlock
             forSeconds: TimeOutIntervalInSeconds.!

waitForAMessageForSeconds: anInteger

"   Revision Level ark01
    Date of Last Revision  Aug 23, 1990 "

"   comment"

^ commInterface waitForAMessageForSeconds: TimeOutIntervalInSeconds.!

waitForAMessageOfType: anInteger

"   Revision Level ark01
    Date of Last Revision  Aug 23, 1990 "

"   comment"

^ commInterface waitForAMessageOfType: anInteger
             forSeconds: TimeOutIntervalInSeconds.!

waitForHandshakeSymbol

"   Revision Level ark01
    Date of Last Revision  Sep 13, 1990 "

"   comment"

^commInterface waitForACKOrNAKSymbolForSeconds: 1500.!

xgetInput

```
|a b c d e f g | a := CommScript new onPort:
    (CommPort port: 2).
a ifTimeOut: [ Terminal bell.
               Terminal bell.
               nil].
a echo: true.
b := a waitForInput: 3.
^ b! !
```

!Character methods !
isAsciiZ

```
^ self == ( 0 asCharacter )! !
```

!IndexedCollection methods !
copyWithoutLastOccurenceOf: anObject
        "Answer a copy of the receiver excluding
         the last element that equals anObject,
         if any.  This corrects the copyWithout: method
         which actually removes ALL occurences
         of anObject."
    | index |
    index := self
        indexReverseOf: anObject
        ifAbsent: [^self copy].
    ^(self copyFrom: 1 to: index - 1),
        "("(self copyFrom: index + 1 to: self size)
          " copyWithout: anObject) "! !

!IndexedCollection methods !
copyWithoutFirstOccurenceOf: anObject
        "Answer a copy of the receiver excluding
         the first element that equals anObject,
         if any.  This corrects the copyWithout: method
         which actually removes ALL occurences
         of anObject."
    | index |
    index := self
        indexOf: anObject
        ifAbsent: [^self copy].
    ^(self copyFrom: 1 to: index - 1),
        "("(self copyFrom: index + 1 to: self size)
          " copyWithout: anObject) "! !

!IndexedCollection methods !
indexReverseOf: anObject ifAbsent: aBlock
        "Answer the index position of the element equal
         to anObject starting from the end of the receiver.  If no such element
         is found, evaluate aBlock (without any arguments)."
    | index size |
    size := self size.
    index := size.
    [index > 0]
        whileTrue: [
            (self at: index) = anObject
                ifTrue: [^index].
            index := index - 1].
    ^aBlock value! !

!Stream methods !
lastTwo

" Revision Level ark01
    Date of Last Revision  Aug 20, 1990 "

"Answer a string containing the last two characters of the reciever stream"
    | a b c e f g |

```
        a := collection at: (position - 1).
        b:= collection at: position.
        c := String new: 2.
        c at: 1 put: a.
        c at: 2 put: b.

^ c.
    " ^ (String new: 2)
        at: 1 put: (collection at: (position - 1));
        at: 2 put: (collection at: (position   ))
    "! !
```

!String methods !

isACKorNAK

^ (self isACK or: [ self isNAK])! !

!String methods !
isACK

^ self = ''! !

!String methods !
isAcknowledgement

^ true! !

!String methods !
isYes

^ ( (self trimBlanks at: 1) asLowerCase = $y)! !

!String methods !
isYesOrNo

^ (self isYes or: [ self isNo])! !

!String methods !
isDecimalInteger self detect: [ :char |
        ('0123456789' includes: char) not ]
        ifNone: [ ^true ].
    ^false! !

!String methods !
isRecoveryPlanRequest

^self includes: $ .! !

!String methods !
isNo

^ ( (self trimBlanks at: 1) asLowerCase = $n)! !

!String methods !
isNAK

^ self = ''! !
"construct application"
    ((Smalltalk at: #Application ifAbsent: [])
        isKindOf: Class) ifTrue: [
            ((Smalltalk at: #Application) for:'EPX')
                addClass: ColorTextPane;
                addClass: WorkEP;
                addClass: WorkCellSuperModel;
                addMethod: #isAsciiZ forClass: Character;
                addMethod: #copyWithoutLastOccurenceOf: forClass: IndexedColle
                addMethod: #copyWithoutFirstOccurenceOf: forClass: IndexedColle
                addMethod: #indexReverseOf:ifAbsent: forClass: IndexedCollection
                addMethod: #lastTwo forClass: Stream;
                addMethod: #isACKorNAK forClass: String;
                addMethod: #isACK forClass: String;

```
            addMethod: #isAcknowledgement forClass: String;
            addMethod: #isYes forClass: String;
            addMethod: #isYesOrNo forClass: String;
            addMethod: #isDecimalInteger forClass: String;
            addMethod: #isRecoveryPlanRequest forClass: String;
            addMethod: #isNo forClass: String;
            addMethod: #isNAK forClass: String;
        comments: nil;
        initCode: nil;
        finalizeCode: nil;
        startUpCode: nil]!
```

"
*********************************************************************
Project : CommEP
Date    : Oct 30, 1990
Time    : 20:30:25

Classes :
    CommScript CommPort CommModel CommDispatcher
    CommSuperModel

Methods :
    #hexByteToCharacter defined in String.
    #peekAt defined in Stream.
    #peekBack defined in Stream.

*********************************************************************
"!

Object subclass: #CommScript
  instanceVariableNames:
    'commPort timeOutBlock messageStream echo whenPatterns checkedChars captureS
  classVariableNames: ''
  poolDictionaries:
    'CharacterConstants '!

Object subclass: #CommPort
  instanceVariableNames:
    'port baudRateDivisor lineControlRegister ignoreParity inputPending driverEn
  classVariableNames:
    'Ports IgnoreErrors QueuedFlag '
  poolDictionaries:
    'CharacterConstants '!

Object subclass: #CommModel
  instanceVariableNames:
    'superModel commPort commPane commPaneIn commPaneOut echoIsOn portSettings c
  classVariableNames: ''
  poolDictionaries:
    'ProtocolConstants CharacterConstants '!

TextEditor subclass: #CommDispatcher
  instanceVariableNames:
    'lineBuffer checkChanges '
  classVariableNames: ''
  poolDictionaries:
    'ProtocolConstants CharacterConstants '!

Smalltalk at: #Stream ifAbsent: [
Object subclass: #Stream
  instanceVariableNames:
    'collection position readLimit '
  classVariableNames: ''
  poolDictionaries:
    'CharacterConstants ']!

Object variableSubclass: #CommSuperModel
  instanceVariableNames:
    'commModel '
  classVariableNames: ''
  poolDictionaries: ''!

```
Smalltalk at: #String ifAbsent: [
FixedSizeCollection variableByteSubclass: #String
  classVariableNames: ''
  poolDictionaries:
    'CharacterConstants ']!

!CommScript class methods ! !

!CommScript methods !

captureIn: aStream
        "Set the captureStream of the receiver to be aStream.
         This causes all future communications input read by
         the receiver to be written into aStream."
    self captureOff.
    captureStream := aStream.
    "    messageStream
            cr;
            show: 'script -- capturing in file: ', aStream pathName;
            cr
    "!

captureOff
        "If currently capturing input, flush the captureStream
         (force everything to be written). Set the captureStream
         to nil."
    captureStream isNil
        ifFalse: [
            captureStream flush.
            echo ifFalse: [
                messageStream
                    cr;
                    show: 'script -- capture complete';
                    cr].
            captureStream := nil]!

echo: aBoolean
        "Set echo to aBoolean.  If true, then all input
         processed is echoed on the messageStream."
    echo := aBoolean!

ifTimeOut: aBlock
        "Set the timeout block to be aBlock."
    timeOutBlock := aBlock!

ignore: aString
        "Remove the pattern with string aString from the whenPatterns.
         This means that this pattern is no longer matched
         against characters read from the communications port."
    whenPatterns do: [ :pattern |
        pattern input = aString
            ifTrue: [
                whenPatterns := whenPatterns copyWithout: pattern]]!

messageStream: aStream
        "Set messageStream for the receiver to be aStream."
    messageStream := aStream!

onPort: aCommPort
        "Initialize the receiver to use aCommPort. Set timeOutBlock
         to an empty block, whenPatterns to be empty, and
         messageStream to be the commPort message stream."
    commPort := aCommPort.
    messageStream := commPort handler messageStream.
    timeOutBlock := [].
    whenPatterns := Array new.
    checkedChars := Dictionary new.
    echo := false!
```

```
processInput
    | c |
    (c := commPort next) isNil
        ifFalse: [
            captureStream isNil
                ifFalse: [captureStream nextPut: c].
            echo ifTrue: [messageStream nextPut: c].
            whenPatterns do: [ :pattern |   pattern match: c]].
    ^c!

reply: aString
        "Write aString on the communications port."
    commPort nextPutAll: aString!

replyCharacter: aCharacter
        "Write aCharacter on the communications port."
    commPort nextPut: aCharacter!

replyLine: aString
        "Write aString followed by the character Cr on the
         communications port."
    aString do: [:char| commPort nextPut: char].
    commPort nextPut: Cr!

wait: numberOfSeconds
        "Do nothing for numberOfSeconds."
    | timeLimit |
    timeLimit := Time totalSeconds + numberOfSeconds.
    [timeLimit < Time totalSeconds]
        whileFalse: [1000 timesRepeat: []].!

wait: seconds forCharacter: aCharacter
        "Process input until the character aCharacter is read.
         If no input is received for the period seconds, then
         time out."
    echo ifFalse: [
        messageStream cr; show:
            'script -- waiting for character: ',
             aCharacter printString trimBlanks].
    [aCharacter == (self waitForInput: seconds)]
        whileFalse: []. self halt.
    echo ifFalse: [
        messageStream
            tab;
            show: 'got it';
            cr].
    ^true!

wait: seconds forString: aString
        "Process input until the string aString is read.
         If no input is received for the period seconds, then
         time out."
    | index |
    echo ifFalse: [
        messageStream cr; show:
            'script -- waiting for string: ',
                aString trimBlanks printString].
    index := 1.
    [index <= aString size]
        whileTrue: [
            (aString at: index) == (self waitForInput: seconds)
                ifTrue: [index := index + 1]
                ifFalse: [index := 1]].
    "commPort enableInput."
    echo ifFalse: [
        messageStream
            tab;
            show: 'got it';
            cr].
    ^true!
```

```
wait: seconds forString: aString orString: bString
        "Process input until a NAK or ACK is read is read.
         If no input is received for the period seconds, then
         time out."
    | index input|
    echo ifFalse: [
        messageStream cr; show:
            'script -- waiting for string: ',
                aString trimBlanks printString].
    index := 1.
    [index <= aString size]
        whileTrue: [ input :=  (self waitForInput: seconds).
            ( ((aString at: index) == input) or: [ (bString at: index) == input ]
                ifTrue: [index := index + 1]
                ifFalse: [index := 1]].
    "commPort enableInput."
    echo ifFalse: [
        messageStream
            tab;
            show: 'got it';
            cr].
    ^true!

waitForInput: seconds
        "Answer the next character read from the communications
         port.  If no input is received for the period seconds,
         time out.  All input read is written on the captureStream
         if appropriate and matched against all whenPatterns if any."
    | c timeLimit nilCount | nilCount := 0.
    (c := self processInput) isNil
        ifFalse: [^c].
    timeLimit := Time totalSeconds + seconds.
    [timeLimit <= Time totalSeconds]
        whileFalse: [
            (c := self processInput) isNil
                ifFalse: [^c]].
    captureStream isNil
        ifFalse: [captureStream flush].
"   messageStream
        cr; cr;
        show: 'timed out';
        cr; cr. "
    ^timeOutBlock value!

when: aString do: aBlock
        "Add the pattern aString to the whenPatterns.  When
         input read from the communications port matches aString
         the block of code aBlock will be executed."
    | block |
    block := [ commPort enableInput. aBlock value].
    whenPatterns do: [:pattern|
        pattern input = aString
            ifTrue: [
                pattern matchBlock: block.
                ^self]].
    whenPatterns := whenPatterns copyWith:
        ((Pattern new: aString) matchBlock: block)! !

!CommPort class methods !

commInterrupt

QueuedFlag
        ifFalse: [
            PendingEvents addLast:
                (Message new
                selector: #commEvent;
                arguments: #()).
            QueuedFlag := true].
            KeyboardSemaphore signal!
```

```
commServicePrimitive
    <primitive: commServicePrimitive>
    IgnoreErrors ifTrue: [^0].
    self error: 'user prim failed'!

fromUser
        "Answer the comm port chosen by the user."
    | choice |
    choice := (Menu
        labels: ' COM1 \ COM2 ' withCrs
        lines: Array new
        selectors: #( 1 2 ))
            popUpAt: Cursor offset.
    choice isNil
        ifFalse: [choice := CommPort port: choice].
    ^choice!

initialize
        "Initialize COM1 and COM2 communications ports.
         NOTE: this method should not be called if there
         are any instances of CommPort (remove them first)."
    QueuedFlag := false.
    IgnoreErrors := false.
    Ports := Array new: 2.
    1 to: 2 do: [ :i |
        Ports at: i put: (self new port: i)]!

port: anInteger
        "Answer the communications port initialized for port
         number anInteger.  If anInteger is 1, this will be
         the port for COM1.  If anInteger is 2, this will
         be the port for COM2."
    ^Ports at: anInteger!

processEvent
        "A comm event has been read.  Get comm service status
         and report any errors.  Then process any pending input."
    | portNumber anInteger|
    QueuedFlag := false.
    anInteger := self commServicePrimitive.
    anInteger == 0
        ifFalse: [
            portNumber := anInteger bitAnd: 16rFF.
            (portNumber between: 1 and: Ports size)
                ifFalse: [^self spuriousInterruptOn: portNumber].
            (Ports at: portNumber) processInterruptCondition: anInteger.
            self processInputs]!

processInputs
        "Communications port input can be processed now.  Tell
         all the active ports to process all pending input."
    | moreInput |
    moreInput := false.
    Ports do: [:port|
        port inputEnabled
            ifTrue: [moreInput := port processInput | moreInput]].
    moreInput
        ifTrue: [CurrentEvent queue: #commEvent withArguments: #()]!

shutDown
        "Tell all the active ports to be silent."
    IgnoreErrors := true.
    (Smalltalk checkPrimitive: 'commPrimitive')
        ifTrue: [
            Ports do: [:port |
                port inputEnabled
                    ifTrue: [port disableInput]]]!

spuriousInterruptOn: aPortNumber
        "Record the fact that a spurious interrupt has
         occurred by writing a message in the system
         transcript."
    Transcript cr; show: 'spurious comm interrupt'! !
```

!CommPort methods !

baudRate
        "Answer a String describing the current baud rate
          of the communications port."
    baudRateDivisor = 12 ifTrue: [^'9600 baud'].
    baudRateDivisor = 48 ifTrue: [^'2400 baud'].
    baudRateDivisor = 96 ifTrue: [^'1200 baud'].
    baudRateDivisor = 384 ifTrue: [^'300 baud'].
    baudRateDivisor = 1047 ifTrue: [^'110 baud'].
    ^'unknown baud rate'!

configureLine
        "Prompt the user for a new communication line
          configuration and set the port to the values
          chosen."
    | choice |
    choice := (Menu
        labels: ' 9600 baud \ 2400 baud \ 1200 baud \ 300 baud \ 110 baud ' with
        lines: Array new
        selectors: #( 12 48 96 384 1047 ) )
            popUpAt: Cursor offset.
    choice isNil
        ifFalse: [baudRateDivisor := choice].
    choice := (Menu
        labels: ' 8 data bits \ 7 data bits ' withCrs
        lines: Array new
        selectors: #( 3 2 ) )
            popUpAt: Cursor offset.
    choice isNil
        ifFalse: [
            lineControlRegister :=
                (lineControlRegister bitAnd: 16rFC) bitOr: choice].
    choice := (Menu
        labels: ' 2 stop bits \ 1 stop bit ' withCrs
        lines: Array new
        selectors: #( 4 0 ) )
            popUpAt: Cursor offset.
    choice isNil
        ifFalse: [
            lineControlRegister :=
                (lineControlRegister bitAnd: 16rFB) bitOr: choice].
    choice := (Menu
        labels: (' even parity \ odd parity \ no parity \ ignore parity ',
                '\ one parity \ zero parity') withCrs
        lines: Array new
        selectors: #( 16r18 16r8 0 ignore 16r38 16r28) )
            popUpAt: Cursor offset.
    choice isNil
        ifFalse: [
            (ignoreParity := (choice = #ignore))
                ifTrue: [choice := 0].
            lineControlRegister :=
                (lineControlRegister bitAnd: 16rC7) bitOr: choice].
    self resetPort.!

dataBits
        "Answer a String describing the current number of
          data bits that the communications port is set to use."
    | dataBits |
    dataBits := lineControlRegister bitAnd: 16r3.
    dataBits = 2 ifTrue: [^'7 data bits'].
    dataBits = 3 ifTrue: [^'8 data bits'].
    ^'unknown number of data bits'!

disableDriver
        "Disable communications driver port interrupts.  After this
          method is executed, the driver no longer monitors the

```
        communications hardware (it receives no hardware interrupts)."
    self primitiveWith: port with: nil with: nil function: 6.
    self status!

disableInput
        "Disable input from the communications driver.  After this
        method is executed the driver is still buffering communications
        input into an internal buffer, but the driver will not notify
        the Smalltalk virtual machine when it has input pending."
    self primitiveWith: port with: false with: nil function: 3.
    self status!

driverEnabled
        "Answer true if the communications driver is enabled (i.e., has
        taken control of the hardware interrupts that control the port),
        else answer false."
    self status.
    ^driverEnabled!

enableDriver
        "Enable the communications driver (i.e., take control of the
        hardware interrupts that control the port)."
    self primitiveWith: port with: nil with: nil function: 0.
    self status!

enableInput
        "Enable input from the communications driver.  After executing
        this method, the driver will notify the Smalltalk virtual machine
        whenever it has input pending."
    self driverEnabled
        ifFalse: [self enableDriver].
    self primitiveWith: port with: true with: nil function: 3.
    self status!

handler
        "Answer the interrupt handler object for the communications
        port."
    ^handler!

handler: anObject
        "Set the interrupt handler for the communications
        port to anObject."
    handler := anObject!

inputEnabled
        "Answer true if the communications driver is enabled for input
        (i.e., notifies the Smalltalk virtual machine whenever there
        is input pending from the communications port),
        else answer false."
    ^inputEnabled!

inputPending
        "Answer true if the communications driver has input pending in
        the driver's buffer, else answer false."
    self status.
    ^inputPending!

lineConfiguration
        "Answer a String describing the current communications
        port configuration in terms of baud rate, data bits,
        stop bits, and parity."
    | answer |
    answer := WriteStream on: (String new: 64).
    answer
        nextPutAll: self baudRate;
        nextPutAll: ', ';
        nextPutAll: self dataBits;
        nextPutAll: ', ';
        nextPutAll: self stopBits;
        nextPutAll: ', ';
        nextPutAll: self parity.
    ^answer contents!
``` next
"Answer the next unprocessed character from the
communications port. If there is none, answer nil.
Ignore all Cr characters."

"Mod 1/16/90 to retain Crs"

"   | c |
    (c := self primitiveWith: port with: nil with: nil function: 4) == Cr
        ifTrue: [^self next]
        ifFalse: [
            c == nil
                ifTrue: [inputPending := false]
                ifFalse: [
                    ignoreParity
                        ifTrue: [c := (c asciiValue bitAnd: 127) asCharacter]].
            ^c] "

"
    | c |
        c := self primitiveWith: port with: nil with: nil function: 4.
        c == nil
            ifTrue: [inputPending := false]
            ifFalse: [ ignoreParity
                        ifTrue: [c := (c asciiValue bitAnd: 127) asCharacter]].
        ^c
"
"   Revision Level ark01
    Date of Last Revision  Aug  9, 1990 "

"Answers
    the next ASCII byte at the port or
    nil if there is no input at the port.

This method converts hex input to ASCII 2 hex bytes at a time.

It will try 100 times to read a character from the port.  If
there is none it assumes that there is no pending input and
answers nil"

| characterInput characterCount  nilCount   input | characterInput := String new: 2.
    characterCount := 1.
    nilCount := 0.

[input := self primitiveWith: port with: nil with: nil function: 4.
      ( input == nil )
        ifFalse: [ignoreParity
                    ifTrue: [input := (input asciiValue bitAnd: 127) asChara
                  (input between: $0 and: $F) ifFalse: [ self error: 'OOPs - I c
                  characterInput at: characterCount put: input.
                  characterCount := characterCount + 1.
                  nilCount := 0
                ]
        ifTrue:[ nilCount := nilCount + 1.
                ( nilCount > 100 )
                    ifTrue: [ inputPending := false.
                              ^ nil ]
                ].
    (characterCount > 2 )
    ] whileFalse: [].

^ characterInput hexByteToCharacter!

nextPut: aCharacter
    "Write aCharacter on the communications port."
    self primitiveWith: port
        with: aCharacter
        with: nil
        function: 5!

nextPutAll: aString
    "Write aString on the communications port."
    aString do: [:each | self nextPut: each]!

parity
    "Answer a String describing the parity being used
     by the communications port."
    | parity |
    ignoreParity ifTrue: [^'don''t care parity'].
    parity := lineControlRegister bitAnd: 16r38.
    parity = 0 ifTrue: [^'no parity'].
    parity = 16r38 ifTrue: [^'one parity'].
    parity = 16r28 ifTrue: [^'zero parity'].
    parity = 16r8 ifTrue: [^'odd parity'].
    parity = 16r18 ifTrue: [^'even parity'].
    ^'unknown parity'!

port
    "Answer the port number the communications port
     is using. If COM1 is being used answer 1.  If COM2
     is being used answer 2."
    ^port!

port: portNumber
    "Set the port number that the communications port
     will use.  If portNumber is 1, COM1 will be used.
     If portNumber is 2, COM2 will be used."
    port := portNumber.
    lineControlRegister := 3.
    baudRateDivisor := 96.
    ignoreParity := driverEnabled := inputEnabled := inputPending := false.
    handler := nil!

portSettings
    "Answer the current port settings in an Array"
    ^Array with: baudRateDivisor with: lineControlRegister with: ignoreParity!

portSettings: portSettings
    "Set the communication port setting to the values
     in portSettings. Thes values should have been
     retrieved previously by using the portSettings
     message."
    baudRateDivisor := portSettings at: 1.
    lineControlRegister := portSettings at: 2.
    ignoreParity := portSettings at: 3.
    self resetPort!

primitiveWith: portNumber with: arg1 with: arg2 function: functionCode
    "Request function functionCode from communications
     primitive.  For all the functions, arg1 is the port
     number as an Integer.  The function codes and arguments
     supported by the driver are as follows:
        Note: arguments not mentioned are ignored,
              all functions except 4 and 7 return nil.
        0 = Enable driver interrupts,
        1 = Reset Hayes Smartmodem,
        2 = Configure Port (arg1 = baud rate divisor
                            arg2 = line control register),
        3 = Enable virtual machine interrupts,
        4 = Read port, returns the character read,
        5 = Write port (arg1 = the character to write),
        6 = Disable driver interrupts,
        7 = Port status, returns an Integer (see status method for encoding)
    | error |
    <primitive: commPrimitive>
    error := 'Comm function ', functionCode printString, ' failed'.
    IgnoreErrors
        ifTrue: [Transcript cr; show: error; cr; show: ' ignored ']
        ifFalse: [^self error: error]!

printError: anInteger
    "Decode the error condition, anInteger, returned
     by the communications port and write the appropriate
     message on the interrupt handler's messageStream."
    | messageStream errorCode |

```
    messageStream := handler isNil
        ifTrue: [Transcript]
        ifFalse: [handler messageStream].
    messageStream nextPutAll: 'port ', port printString,
        ' reports the following errors: ';cr.
    anInteger = 3
        ifTrue: [^messageStream nextPutAll: 'buffer overrun';cr].
    errorCode := anInteger bitShift: -1.
    errorCode odd
        ifTrue: [messageStream nextPutAll: 'overrun error';cr].
    errorCode := errorCode bitShift: -1.
    errorCode odd
        ifTrue: [messageStream nextPutAll: 'parity error';cr].
    errorCode := errorCode bitShift: -1.
    errorCode odd
        ifTrue: [messageStream nextPutAll: 'framing error';cr].
    errorCode := errorCode bitShift: -1.
    errorCode odd
        ifTrue: [messageStream nextPutAll: 'break detect';cr]!

processInput

"Have the port interrupt handler process any
          communications port input. Answer if there is any
          unprocessed input left after the handler is finished."
    handler isNil
        ifTrue: [ [self next == nil] whileFalse: [] ]
        ifFalse: [handler processCommInput].
    self status.
    ^inputPending!

processInterruptCondition: anInteger
        "The communications port has interrupted for the
          reason described by anInteger. Handle any error
          conditions."
    | error |
    inputEnabled
        ifFalse: [^self class spuriousInterruptOn: port].
    error := (anInteger bitAnd: 16rFF00) bitShift: -8.
    error > 0
        ifTrue: [self printError: error]!

resetModem
        "Send the Hayes Smartmodem reset sequence using
          the OUT1 signal to the port aPortNumber.
          If aPortNumber is 1, use COM1. If aPortNumber is 2,
          use COM2."
    self primitiveWith: port with: nil with: nil function: 1!

resetPort
        "Reset the communications port settings and flush
          all pending and buffered input."
    self primitiveWith: port
        with: baudRateDivisor
        with: lineControlRegister
        function: 2!

startUp
    driverEnabled := false.
    inputEnabled := false!

status
        "Answer an Integer containing the port status. The status
          is bit encoded as follows:
            bit 0 set = driver enabled,
            bit 1 set = input enabled,
            bit 2 set = input pending."
    | status |
    status := self primitiveWith: port with: nil with: nil function: 7.
    (status isKindOf: Integer)
        ifTrue: [
            driverEnabled := (status bitAnd: 1) = 1.
```

```
        inputEnabled := (status bitAnd: 2) = 2.
        inputPending := (status bitAnd: 4) = 4.
        ^status]
    ifFalse: [^nil]!

stopBits
    "Answer a String describing the number of stop bits
     being used by the communcations port."
    | stopBits |
    stopBits := lineControlRegister bitAnd: 16r4.
    stopBits = 0 ifTrue: [^'1 stop bit'].
    stopBits = "1" 4 ifTrue: [^'2 stop bits']    "mod 8/15/90"! !

!CommModel class methods !

checkCommPrimitives ((Smalltalk checkPrimitive: 'commPrimitive') and:
            [Smalltalk checkPrimitive: 'commServicePrimitive'])
        ifFalse: [Smalltalk loadPrimitivesFrom: 'commprim.bin']! !

!CommModel methods !

activateWindow
    "The window controlled by the receiver has been activated.
     Make sure that the communications driver for the port
     is enabled for input"
    | moreInput |

CommModel checkCommPrimitives.
    commPort
        handler: self;
        enableInput.
    self processCommInput.
    commPort inputPending
        ifTrue: [CurrentEvent queue: #commEvent withArguments: #()]!

anyPendingInput

^commPort inputPending!

captureOff
    "Close the capture file and cease further capturing
     of input."
    captureFile isNil
        ifFalse: [
            captureFile close.
            captureFile := nil.
            self changed: #label]!

captureOn
    "Capture all input into a file"
    | file stream |
    file := Prompter
        prompt: 'capture file name?'
        default: 'capture.txt'.
    file isNil ifTrue: [^nil].
    captureFile := File pathName: file.
    captureFile setToEnd.
    self changed: #label!

clearPanes self changed: #incomingText.
    self changed: #commText.!

closeIt
    "The window controlled by the receiver is being closed.
```

```
        Reset the interrupt handler of the communications port
        to nil."
    commPort handler: nil.
    commPaneOut dispatcher closeIt      " Mod 1/19/90"!

commMenu
        "Answer the menu for the tty emulator pane."
    captureFile isNil
        ifTrue: [
            echoIsOn
                ifTrue: [
            ^Menu
                labels: ' configure line \ capture \ send it \ edit menu \ echo
                lines: Array new
                selectors: #(configureLine captureOn sendIt popUpEditMenu echoO ifFalse: [
            ^Menu
                labels: ' configure line \ capture \ send it \ edit menu \ echo
                lines: Array new
                selectors: #(configureLine captureOn sendIt popUpEditMenu echoOn
                        ]
        ifFalse: [
            echoIsOn
                ifTrue: [
            ^Menu
                labels: ' configure line \ capture off\ send it \ edit menu \ ec
                lines: Array new
                selectors: #(configureLine captureOff sendIt popUpEditMenu echoO ifFalse: [
            ^Menu
                labels: ' configure line \ capture off\ send it \ edit menu \ ec
                lines: Array new
                selectors: #(configureLine captureOff sendIt popUpEditMenu echoO
                    ]!

commText
        "Answer the saved text in the tty emulator pane.  Since
        text is not saved, this is always an empty String."
    ^String new!

configureLine
        "Prompt the user for new baud rate, parity, data and
        stop bit settings and reconfigure the communications
        port."
    commPort configureLine.
    portSettings := commPort portSettings.
    self messageStream
        nextPutAll: commPort lineConfiguration;
        cr!

echoIsOn

^echoIsOn!

echoIsOn: aBoolean echoIsOn  :=  aBoolean!

echoOff echoIsOn := false.
    self changed: #label!

echoOn
        " mod 1/16/90"
    echoIsOn := true .
    self changed: #label!

getAMessage

"  Revision Level ark01
    Date of Last Revision  Aug 23, 1990 "
```

"   Answers
        An instance of AMesssage if there is a valid message
        nil if there is no input or if there is not a valid message.

Sends ACK/NAK in response"

| characterRead dispatcher dispatcherReturn message | dispatcherReturn := nil.
    dispatcher := commPaneIn dispatcher.

[ dispatcherReturn isNil ]
        whileTrue: [
            characterRead := commPort next.
            dispatcherReturn := dispatcher process: characterRead
                ].

( dispatcherReturn isEmpty )
        ifTrue: [ ^nil ].

message := AMessage fromString: dispatcherReturn.
    ( message isNil )
        ifTrue: [   self sendNAK.
                    ^nil
                ]
        ifFalse:[   ( message isACKOrNAK )
                        ifFalse:[ self sendACK ].
                    ^message
                ]!

getCheckSum

" Revision Level ark01
    Date of Last Revision  Aug 13, 1990 "

"Read the next 2 characters off the port and return them as the check sum"

| checkSum nilCount characterCount input| checkSum := String new: 2.
    characterCount := 1.
    nilCount := 0.

[input := commPort next.
     ( input notNil )
        ifTrue: [ checkSum at: characterCount put: input.
                  characterCount := characterCount + 1.
                  nilCount := 0
                ]
        ifFalse:[ nilCount := nilCount + 1.
                  ( nilCount > 100 )
                     ifTrue: [ characterCount := characterCount + 1.
                               nilCount := 0
                             ]
                ].
     (characterCount > 2 )
    ] whileFalse: [].

^ checkSum!

getPendingInput

"Terminal bell. "

self processCommInput

"   self showCommContents2 "

" Terminal bell.     "!

incomingText

^String new!

label
        "Answer the label for the window."
    | echoFlag |
    echoIsOn
        ifTrue: [ echoFlag := ' Echo On ']
        ifFalse: [ echoFlag := ' Echo Off '].
    captureFile isNil
        ifTrue: [^'Comm Line ', commPort port printString , echoFlag ]
        ifFalse: [
            ^'Comm Line ', commPort port printString,  echoFlag ,
            '    capturing in ', captureFile pathName]!

messageStream
        "Answer the tty pane distacher.  This is the
         stream on which the communications port is to report errors
         and informative messages."
    ^commPaneIn dispatcher!

open
        "Open a communications window on the CommPort chosen
         by the user."
    | port |
    (port := CommPort fromUser) isNil
        ifFalse: [self openOn: port]!

openOn1
        "Open a new window on the communiciatons port aCommPort."
    self halt.
    commPaneIn := TextPane new
        model: self;
        name: #incomingText;
        framingRatio: ( 0@0 extent: 1@1);
        dispatcher: TextEditor new;
        yourself.

(TopPane new
        label: 'Comm Line ';
        model: self;
        addSubpane: commPaneIn;

dispatcher)
            open scheduleWindow!

openOn: aCommPort
        "Open a new window on the communiciatons port aCommPort."
    commPort := aCommPort.
    echoIsOn := false.     " modified 1/16/90"
    commPaneIn := TextPane new
        model: self;
        name: #incomingText;
        dispatcher: CommDispatcher new;
        framingRatio: ( 0@0 corner: 1@(1/2) );
        yourself.
    commPaneOut := TextPane new
        model: self;
        name: #commText;
        menu: #commMenu;
        dispatcher: CommDispatcher new;
        framingRatio: ( 0@(1/2) corner: 1@1 );
        yourself.
    "commPane := TextPane new
        model: self;
        name: #commText;
        menu: #commMenu;
        dispatcher: CommDispatcher new;
        framingRatio: ( 0@(3/4) corner: 1@1 );

```
                yourself. "
        (TopPane new
            label: "'Comm Line ', commPort port printString;" self label;
            model: self;
            "minimumSize: SysFontWidth * 40 @
                (SysFontHeight * 10); "
            addSubpane: commPaneIn;
            addSubpane: commPaneOut;
            "addSubpane: commPane; "
            dispatcher)
                open scheduleWindow!

popUpEditMenu
        "Pop up the standard text editing menu and perform
         whatever functions the user selects."
    | activePane |
    commPaneIn hasCursor ifTrue: [ activePane := commPaneIn].
    commPaneOut hasCursor ifTrue: [ activePane := commPaneOut].

activePane popUp: TextEditor menu      "Mod 1/19/90"!

processCommInput
        "The communications port has input.  Read the input
         from the port.  All input read is sent to the tty emulator
         pane dispatcher to be displayed."

"Mod 9\5\90 "

| input |

[ input := self getAMessage.
      (input notNil ) ifTrue: [ superModel receiveInput2: input ].
      self anyPendingInput
    ]   whileTrue: []!

processCommInput2 -
        "The communications port has input.  Read the input
         from the port. "

self processCommInput!

processInputKey: key
        "Send the character key out the communications port.
         Cr characters are converted to Lf characters."
    (Cr == key or: [Lf == key])
        ifTrue: [commPort nextPut: "Cr" Lf]    "modified 1/16/90"
        ifFalse: [commPort nextPut: key]!

receiveInput: aString

| checkSum messageString message| message := AMessage fromString: aString.

( message notNil )
        ifTrue: [
            (  (message type -= 98) & (message type -= 99)  )
                ifTrue: [self sendACK ]
                ]
        ifFalse:[ ^ self sendNAK ].

(superModel respondsTo: #receiveInput2:)
        ifTrue: [ superModel receiveInput2: message]!

resetPort
        "Reset the communications port settings (baud divisor
         and line control register values)."
    portSettings isNil
        ifTrue: [commPort resetPort]
        ifFalse: [commPort portSettings: portSettings]!

sendACK
```

```
" Revision Level ark01
Date of Last Revision  Aug 16, 1990 "

"comment"

| ack | self transmitOutput: ACKStringInHex!
``` sendIt

```
    "Send the selected text in the tty emulator pane out
     the communications port."
| c theActivePane a|
"   commPane selectedString trimBlanks do: [ :each | "

"   theActivePane := commPaneIn topPane subpanes detect: [ :pane | pane hasCurs
    theActivePane selectedString trimBlanks do: [ :each | "
    a := commPaneOut selectedString trimBlanks asAsciiZ.
    a do: [ :each |
        self processInputKey: each.
        each == Lf
            ifTrue: [
                [commPaneIn dispatcher nextPut: (c := commPort next).
                 c == nil]
                    whileFalse: []]].
    self processInputKey: Cr!
``` sendNAK

```
" Revision Level ark01
Date of Last Revision  Aug 16, 1990 "

"comment"

| ack | self transmitOutput: NAKStringInHex!
``` showCommContents

```
| c b g t | c := $a.

b := WriteStream on: Array new.

[ c ~= (0 asCharacter) ]
    whileTrue: [ c := commPort next.
                 b nextPut: c] .
self halt.!
``` showCommContents2

```
| c b g t | g := self anyPendingInput.

c := $a.

b := WriteStream on: Array new.

1 to: 50 do: [ :dummy |
    c := commPort next.
    b nextPut: c] .

self halt.!
``` superModel

```
^ superModel!
``` superModel: aCommSuperModel

```
        superModel:= aCommSuperModel!

transmitOutput: bString

| a aString cString |

"Terminal bell."

aString := bString , (String with: 10 asCharacter).
    cString := bString "asAsciiZ".

( echoIsOn )
      ifTrue: [   commPaneOut dispatcher nextPutAllEcho: aString ].

cString do: [ :char |   commPort nextPut: char  ] .

"Terminal bell."!

waitForACKOrNAKForSeconds: bInteger

"   Revision Level ark02
    Date of Last Revision  Aug 27, 1990 "

"   Answers
        ACK or NAK message instance,
        #timeOut if neither is found."

^self waitForAMessageDescribedBy: [:message | message isACKOrNAK ]
        forSeconds: bInteger!

waitForACKOrNAKSymbolForSeconds: bInteger

"   Revision Level ark01
    Date of Last Revision  Aug 24, 1990 "

"   Answers
        #ACK or #NAK symbols if an ACk or NAk message is found,
        #timeOut if neither is found."

| response | response := self waitForAMessageDescribedBy: [:message | (message type = 98)
                forSeconds: bInteger.

( response isACK ) ifTrue: [ ^ #ACK ].
    ( response isNAK ) ifTrue: [ ^ #NAK ].
    ( response == #timeOut ) ifTrue: [ ^#timeOut ].!

waitForAMessageDescribedBy: aBlock forSeconds: bInteger

"   Revision Level ark01

Date of Last Revision  Aug 24, 1990 "

"   Answers
        an instance of AMessage of that causes aBlock to evaluate to true,
        the symbol #timeOut if no such message was found after bInteger seconds if the message found is not of type aInteger then pass the message along
    to the superModel for handling"

| messageFound |

[   messageFound := self waitForAMessageForSeconds: bInteger.
        ( messageFound == #timeOut )
            ifTrue: [ ^#timeOut ].
        ( aBlock value: messageFound )
    ]
        whileFalse: [ superModel receiveInput2: messageFound ].

^messageFound!

waitForAMessageForSeconds: anInteger
```

```
"   Revision Level ark01
    Date of Last Revision  Aug 23, 1990 "

"   Answers
        an instance of AMessage if one is found in anInteger number of seconds,
        the symbol #timeOut if no message is found in anInteger number of second

| messageFound timeLimit | messageFound := self getAMessage.
    ( messageFound notNil )
        ifTrue: [ ^messageFound ].

timeLimit := Time totalSeconds + anInteger.
    [ timeLimit >= Time totalSeconds ]
        whileTrue: [    messageFound := self getAMessage.
                        ( messageFound notNil )
                            ifTrue: [ ^messageFound ]
                    ].

^#timeOut!

waitForAMessageOfType: aInteger forSeconds: bInteger

"   Revision Level ark01
    Date of Last Revision  Aug 23, 1990 "

"   Answers
        an instance of AMessage of type aInteger,
        the symbol #timeOut if no such message was found after bInteger seconds.

if the message found is not of type aInteger then pass the message along
    to the superModel for handling"

| messageFound |

[   messageFound := self waitForAMessageForSeconds: bInteger.
        ( messageFound == #timeOut )
            ifTrue: [ ^#timeOut ].
        (messageFound type = aInteger)
    ]
        whileFalse: [ superModel receiveInput2: messageFound ].

^messageFound!

xactivateWindow
    "The window controlled by the receiver has been activated.
     Make sure that the communications driver for the port
     is enabled for input"
    | moreInput |

CommModel checkCommPrimitives.
    commPort
        handler: self;
        enableInput.
    self processCommInput.
    commPort inputPending
        ifTrue: [CurrentEvent queue: #commEvent withArguments: #()]!

xprocessCommInput2
    "The communications port has input.  Read the input
     from the port.  All input read is sent to the tty emulator
     pane dispatcher to be displayed."

"Mod 1/19/90 to reference one of the commpaneIn"

| dispatcher c count d e f g h i j |
    commPaneIn topPane collapsed
        ifTrue: [^self].
    count := 0.
    e:= WriteStream on: Array new.
```

```
        dispatcher := commPaneIn dispatcher.
        [ (c := commPort next).
            e nextPut: c.
    " ( c = Lf ) ifTrue: [ e nextPut: $+. self halt.]. "
    "   Transcript show: c printString ;cr.   "
    " ( c = $n ) ifTrue: [ d := commPort next.
                            self halt. ] . "

( c -= nil ) ifTrue: [dispatcher nextPut: c].

c == nil
            or: [captureFile == nil ifFalse: [captureFile nextPut: c].
                (count := count + 1) > 1000]]
            whileFalse: [].
        commPaneIn putSelectionAtEnd.
        self halt.!

xshowWindow
        "The window controlled by the receiver has been activated.
         Make sure that the communications driver for the port
         is enabled for input"
    | moreInput |
    Terminal bell.
    CommModel checkCommPrimitives.
    commPort
        handler: self;
        enableInput.
    self processCommInput.
    commPort inputPending
        ifTrue: [CurrentEvent queue: #commEvent withArguments: #()]!

xtransmitOutput: aString

| a | a:= commPaneOut dispatcher.
Terminal bell.
    aString do: [ :each | a processInputKey: each   ].
    a processInputKey: Lf.
Terminal bell.!

xwaitForACKOrNAKForSeconds: bInteger -

"   Revision Level ark01
    Date of Last Revision   Aug 24, 1990 "

"   Answers
        ACK or NAK message instance,
        #timeOut if neither is found."

^self waitForAMessageDescribedBy: [:message | (message type = 98) or: [messa
            forSeconds: bInteger!

xxtransmitOutput: aString

| a |
Terminal bell.
    ( echoIsOn )
        ifTrue: [   a := commPaneOut dispatcher.
                    aString do: [ :char |
                        a nextPutEcho: char.
                        (Cr == char or: [Lf == char])
                            ifTrue: [commPort nextPut: "Cr" Lf]   "modified 1/16/90"
                            ifFalse: [commPort nextPut: char]
                                ]
                    ]
        ifFalse: [ aString do: [ :char |
                    (Cr == char or: [Lf == char])
                        ifTrue: [commPort nextPut: "Cr" Lf]   "modified 1/16/90"
                        ifFalse: [commPort nextPut: char]
                            ]
                ]
```

```
Terminal bell.!

ytransmitOutput: bString

| a aString|
Terminal bell.
    aString := bString , (String with: 10 asCharacter).
  ( echoIsOn )
    ifTrue: [   a := commPaneOut dispatcher.
                aString do: [ :char |
                " a nextPutEcho: char. "
                    (Cr == char or: [Lf == char])
                        ifTrue: [commPort nextPut: "Cr" Lf]   "modified 1/16/90"
                        ifFalse: [commPort nextPut: char]
                        ]
                ]
    ifFalse: [ aString do: [ :char |
                (Cr == char or: [Lf == char])
                    ifTrue: [commPort nextPut: "Cr" Lf]   "modified 1/16/90"
                    ifFalse: [commPort nextPut: char]
                    ]
            ].
Terminal bell.!

zprocessCommInput2
        "The communications port has input.  Read the input
         from the port.  All input read is sent to the tty emulator
         pane dispatcher to be displayed."

"Mod 1/19/90 to reference one of the commpaneIn"

| dispatcher c count d e f g h i j |
    commPaneIn topPane collapsed
        ifTrue: [^self].
    count := 0.
    e:= WriteStream on: Array new.
    dispatcher := commPaneIn dispatcher.
    [ (c := commPort next).
        e nextPut: c.
    " ( c = Lf ) ifTrue: [ e nextPut: $+. self halt.]. "
    "   Transcript show: c printString ;cr.   "
    " ( c = $n ) ifTrue: [ d := commPort next.
                          self halt. ] .   "

( c -= nil ) ifTrue: [dispatcher nextPut: c"
                            ( c = Lf ) ifTrue: [ self halt.]. "
                        ].
    "c == nil
        or: [
captureFile == nil ifFalse: [captureFile nextPut: c]."
            (count := count + 1) > 1000 " ]" ]
        whileFalse: [].
    commPaneIn putSelectionAtEnd.
    "self halt."!

zzzprocessCommInput
        "The communications port has input.  Read the input
         from the port.  All input read is sent to the tty emulator
         pane dispatcher to be displayed."

"Mod 1/19/90 to reference one of the commpaneIn"

| dispatcher c count |
    commPaneIn topPane collapsed
        ifTrue: [^self].
    count := 0.

dispatcher := commPaneIn dispatcher.
    [ (c := commPort next).

" (c -= nil ) ifTrue: [      ""mod 1/30/90  so TEXTEditor doesn't get a nil
                        ( c == Cr ) ifTrue: [dispatcher nextPut: Lf]
                            ifFalse: [
                                    ( c == Bs ) ifTrue: [dispatcher
```

```
                                                              dispatcher
                                                        ifFalse: [dispatche
                        ]
              ]. "

( c -= nil ) ifTrue: [dispatcher nextPut: c].
     c == nil
        or: [captureFile == nil ifFalse: [captureFile nextPut: c].
             (count := count + 1) > 1000]]
          whileFalse: [].
    commPaneIn putSelectionAtEnd.
" dispatcher reduceLinesTo: 500 "!

zzzprocessCommInput2
        "The communications port has input.  Read the input
         from the port.  All input read is sent to the tty emulator
         pane dispatcher to be displayed."

"Mod 3/20/90 to account for nils in the input
         from the port which appear before the
         Lf (terminator character.  These nils would cause
         a premature exit from this method (i.e. exit prior
         to getting the Lf which would trigger the
         processing at the dispatcher"

"Mod 1/19/90 to reference one of the commpaneIn"

| dispatcher c count |
    commPaneIn topPane collapsed
          ifTrue: [^self].
    count := 0.

dispatcher := commPaneIn dispatcher.
    [ (c := commPort next).

"   ( c -= nil ) ifTrue: [        ""mod 1/30/90  so TEXTEditor doesn't get a nil
                         ( c == Cr ) ifTrue: [dispatcher nextPut: Lf]
                                     ifFalse: [
                                              ( c == Bs ) ifTrue: [dispatcher
                                                                   dispatcher
                                                           ifFalse: [dispatche
                                                 ]
               ]. "

( c -= nil ) ifTrue: [dispatcher nextPut: c].
     c == nil
        or: [captureFile == nil ifFalse: [captureFile nextPut: c]. "see Mod 3/90
             (count := count + 1) > 1000]
    ]
          whileFalse: [].
    commPaneIn putSelectionAtEnd.
" dispatcher reduceLinesTo: 500 "! !

!CommDispatcher class methods ! !

!CommDispatcher methods !

backspace
        "If the selection is within the existing text of the
         text pane, perform a normal backspace function.
         Otherwise send the backspace character out the
         communications port."
     pane isSelectionAtEnd
         ifTrue: [ pane model echoIsOn
                           ifTrue:[ super backspace].   " mod 1/17/90"
                 ^pane model processInputKey: Bs].
     ^super backspace!

checkChanges: aBoolean
```

" Any selection from a list pane will normally cause
  the textPane to see if any changes were made
  and query the user as to whether or not to save
  the changes. This method turns that mechanism
  on or off."

checkChanges := aBoolean!

cr super nextPut: Lf.!

flush
        "Force any buffered output to be written to the
         text pane."
    lineBuffer size > 0
        ifTrue: [
            pane appendText: lineBuffer contents.
            lineBuffer reset truncate].
    super flush!

initialize
        "Initialize the instance variable lineBuffer to be
         an empty ReadWriteStream."
    lineBuffer := ReadWriteStream on: (String new: 120).
    lineBuffer reset truncate.
    checkChanges := true.
    super initialize!

modified

^super modified and: [checkChanges]!

nextPut: aCharacter
        "Display aCharacter in the text pane. This method buffers
         an entire line into lineBuffer before displaying.
         Special processing is included for Bs Tab Lf Cr and nil."

| response checkSum | pane hideSelection.
    aCharacter == Bs
        ifTrue: [
            lineBuffer position > 0
                ifTrue: [^lineBuffer skip: -1; truncate]
                ifFalse: [
                    pane selectAtEnd.
                    ^super backspace]].
    aCharacter == Tab
        ifTrue: [
            pane
                appendText: lineBuffer contents;
                appendChar: aCharacter;
                selectAtEnd.
            ^lineBuffer reset truncate].
    "aCharacter == Cr
        ifTrue: [^self]. "    " modified 1/16/90 "
    " ( (aCharacter == Lf)  or: [ aCharacter == Cr ]) "    " modified 1/16/90 "
    ( aCharacter isAsciiZ )
        ifTrue: [    self halt.
            pane
                appendText: lineBuffer contents;
                appendChar: "aCharacter" Lf;  " modified 1/16/90"
                appendChar: Lf;   "" modified 3/5/90"
                selectAtEnd; makeSelectionVisible.

( pane model respondsTo: #receiveInput:)
                ifTrue: [    response := lineBuffer contents.
                            lineBuffer reset truncate.
                            ^pane model receiveInput: response ].

^lineBuffer reset truncate].

"*******************Process DLE ETX ***************"
    (aCharacter == (3 asCharacter) and: [lineBuffer peekAt == (16 asCharacter)]
        ifTrue: [ lineBuffer nextPut: aCharacter .
              checkSum := pane model getCheckSum.
              lineBuffer nextPutAll: checkSum.
               pane
              appendText: lineBuffer contents;
              appendChar: "aCharacter" Lf;  " modified 1/16/90"
        "    appendChar:  Lf;  "" modified 3/5/90"
              selectAtEnd; makeSelectionVisible.

( pane model respondsTo: #receiveInput:)
              ifTrue: [   response := lineBuffer contents.
                          lineBuffer reset truncate.
                          ^pane model receiveInput: response ].

^lineBuffer reset truncate].
" **************** Process ACK *******************"
    (aCharacter == (6 asCharacter) and: [lineBuffer peekAt == (16 asCharacter)] )
        ifTrue: [ lineBuffer nextPut: aCharacter .

pane
              appendText: lineBuffer contents;
              appendChar: "aCharacter" Lf;  " modified 1/16/90"
        "    appendChar:  Lf;  "" modified 3/5/90"
              selectAtEnd; makeSelectionVisible.

( pane model respondsTo: #receiveInput:)
              ifTrue: [   response := lineBuffer contents.
                          lineBuffer reset truncate.
                          ^pane model receiveInput: response ].

^lineBuffer reset truncate].
" **************** Process NAK *******************"
    (aCharacter == (5 asCharacter) and: [lineBuffer peekAt == (16 asCharacter)] )
        ifTrue: [ lineBuffer nextPut: aCharacter .
               pane
              appendText: lineBuffer contents;
              appendChar: "aCharacter" Lf;  " modified 1/16/90"
        "    appendChar:  Lf;  "" modified 3/5/90"
              selectAtEnd; makeSelectionVisible.

( pane model respondsTo: #receiveInput:)
              ifTrue: [   response := lineBuffer contents.
                          lineBuffer reset truncate.
                          ^pane model receiveInput: response ].

^lineBuffer reset truncate].

aCharacter == nil
        ifTrue: [
           pane
              appendText: lineBuffer contents;
              selectAtEnd.
           self pane forceEndOntoDisplay.
           ^lineBuffer reset truncate].
    lineBuffer nextPut: aCharacter!

nextPutAll: aString
        "Display aString in the text pane.  Any output in
         lineBuffer is flushed first."
    lineBuffer size > 0
        ifTrue: [
    -        pane appendText: lineBuffer contents.
             lineBuffer reset truncate].
    super nextPutAll: aString!

nextPutAllEcho: aString

"Echo to the sender commPane"    "mod 3/30/90"

super nextPutAll: aString.
    " pane selectAtEnd "!

nextPutEcho: aChar

"Echo to the sender commPane"    "mod 1/16/90"

super nextPut: aChar.
" pane selectAtEnd "!

process: aCharacter

"   Revision Level ark01
    Date of Last Revision  Aug 23, 1990 "

"   Answers
      nil if a character has been processed,
      a String of characters already processed if aCharacter is nil (note
         that if there is no input pending then the string of characters
         already processed will be an empty string, otherwise it will be
         a string of characters already collected up to the end of input),
      a String of characters up to and including the DLE ETX terminators
         plus the following 2 characters as a checkSum,
      a String for an ACK if the characters already processed has a DLE ACK
         sequence (note any characers preceeding the DLE ACK are discarded),
      a String for an NAK if the characters already processed has a DLE NAK
         sequence (note any characers preceeding the DLE NAK are discarded),
"

| checkSum processedCharacters |

"None or No more input"
    ( aCharacter isNil )
        ifTrue: [    processedCharacters := lineBuffer contents.
               ( processedCharacters isEmpty)
                  ifFalse:[   pane
                                    appendText: (processedCharacters , '...'
                                    appendChar: Lf;
                                    selectAtEnd; makeSelectionVisible
                            ].
               lineBuffer reset truncate.
               ^processedCharacters
            ].

"DLE ETX"
    ( aCharacter == (3 asCharacter) and: [lineBuffer peekAt == (16 asCharacter)]
        ifTrue: [   lineBuffer nextPut: aCharacter.
               checkSum := pane model getCheckSum.
               lineBuffer nextPutAll: checkSum.
               processedCharacters := lineBuffer contents.
               pane
                   appendText: processedCharacters;
                   appendChar: Lf;
                   selectAtEnd; makeSelectionVisible.
               lineBuffer reset truncate.
               ^processedCharacters
            ].

" ACK "
    ( aCharacter == (6 asCharacter) and: [lineBuffer peekAt == (16 asCharacter)]
        ifTrue: [   lineBuffer nextPut: aCharacter .
               pane
                   appendText: lineBuffer contents;
                   appendChar: Lf;
                   selectAtEnd; makeSelectionVisible.
               lineBuffer reset truncate.
               ^ACKString
            ].

" NAK "
    ( aCharacter == (5 asCharacter) and: [lineBuffer peekAt == (16 asCharacter)]
        ifTrue: [   lineBuffer nextPut: aCharacter .
               pane
                   appendText: lineBuffer contents;
                   appendChar: Lf;

```
                    selectAtEnd; makeSelectionVisible.
                lineBuffer reset truncate.
                ^NAKString
        ].

" Any other character "
    lineBuffer nextPut: aCharacter.
    ^nil!

processControlKey: aCharacter
        "Private - Process Bs Lf Cr in the super class.
         Treat all others as normal input keys."
"   (Bs == aCharacter
     or: [Lf == aCharacter
     or: [Cr == aCharacter]])
        ifTrue: [^super processControlKey: aCharacter]
        ifFalse: [^self processInputKey: aCharacter ] "

^super processControlKey: aCharacter!

processInputKey: key
        "If the selection is within the existing text of the
         text pane, treat the input character, key, as normal
         editing input.  Otherwise send key out on the
         communications port."
    pane isSelectionAtEnd
        ifTrue: [  pane model echoIsOn
                        ifTrue:[ self nextPutEcho: key].    " mod 1/16/90"
                    pane model processInputKey: key]
        ifFalse: [^super processInputKey: key].!

reduceLinesTo: anInteger
        "Retain only the last anInteger lines of text in the
         text pane."
    pane selection origin y > anInteger
        ifTrue: [
            pane
                hideSelection;
                selectFrom: 0 @ 1 to: 0 @ (anInteger // 2);
                replaceWithChar: Lf;
                selectAtEnd;
                forceSelectionOntoDisplay]! !

!CommSuperModel class methods !

go

CommSuperModel new openCommModel! !

!CommSuperModel methods !

openCommModel commModel := CommModel new.
    commModel superModel: self.
    commModel open!

write: aString commModel write: aString! !

!String methods !
hexByteToCharacter
    " Revision Level ark01
      Date of Last Revision  Aug  9, 1990 "

"Convert the 2 hex digits in the receiver to a character"

^ Character value: (
```

```
            ( (self at: 1) digitValue  * 16)
                + ( (self at: 2) digitValue)
                        )! !
```

```
!Stream methods !
peekAt

" Revision Level ark01
    Date of Last Revision  Aug 10, 1990 "

"Answer the object in the receiver
    at the present position.
    If the stream is at the beginning,
    answer nil"

(position = 0) ifTrue: [ ^ nil].
    ^ collection at: position! !

!Stream methods !
peekBack

" Revision Level ark01
    Date of Last Revision  Aug 10, 1990 "

"Answer the object in the receiver
    just before the present position.
    If the stream is at the beginning,
    answer nil"

(position = 0) ifTrue: [ ^ nil].
    ^ collection at: (position - 1)! !
"construct application"
    ((Smalltalk at: #Application ifAbsent: [])
        isKindOf: Class) ifTrue: [
            ((Smalltalk at: #Application) for:'CommEP')
                addClass: CommScript;
                addClass: CommPort;
                addClass: CommModel;
                addClass: CommDispatcher;
                addClass: CommSuperModel;
                addMethod: #hexByteToCharacter forClass: String;
                addMethod: #peekAt forClass: Stream;
                addMethod: #peekBack forClass: Stream;
            comments: nil;
            initCode: nil;
            finalizeCode: nil;
            startUpCode: nil]!
"
****************************************************************************
Project : Protocol
Date    : Oct 30, 1990
Time    : 20:30:52

Classes :
    AMessage

Methods :
    #asHex defined in Character.
    #decimalToHex defined in Integer.
    #padLeftToTwoBytes defined in String.
    #convertHexToAscii defined in String.
    #padLeftToOneByte defined in String.
    #hexByteToDecimal defined in String.
    #convertAsciiToHex defined in String.
    #hexByteToCharacter defined in String.
    #between:and: defined in String.

****************************************************************************
"!

Smalltalk at: #Integer ifAbsent: [
Number subclass: #Integer
    instanceVariableNames: ''
```

```
    classVariableNames: ''
    poolDictionaries: '']!

Smalltalk at: #Character ifAbsent: [
Magnitude subclass: #Character
    instanceVariableNames:
        'asciiInteger '
    classVariableNames: ''
    poolDictionaries:
        'CharacterConstants ']!

Object variableSubclass: #AMessage
    instanceVariableNames:
        'dataInAscii dataInHex length theString type '
    classVariableNames: ''
    poolDictionaries:
        'ProtocolConstants '!

Smalltalk at: #String ifAbsent: [
FixedSizeCollection variableByteSubclass: #String
    classVariableNames: ''
    poolDictionaries:
        'CharacterConstants ']!

!AMessage class methods !

alarmAcknowledgementMessageStringForAlarm: aString

" Revision Level ark02
    Date of Last Revision  Aug 31, 1990 "

"Generate a TYPE 2 message - Alarm Acknowledgement
    Answer the string of hex characters that is the
    message to acknowledge the alarm whose ascii
    representation is in aString.

It is assumed that all alarms are 4 characters long"

"DLE STX 02 0004         xxxx                    DLE ETX 8E"

"  ^ '1002303230303034' , aString convertAsciiToHex , '10033845'"

| messageFront checksum | messageFront := '1002303230303034' , aString convertAsciiToHex , '1003'.
        checksum := self calculateChecksum: messageFront.

^ messageFront , checksum!

calculateChecksum: aString

" Revision Level ark01
    Date of Last Revision  Aug 17, 1990 "

"Answer the hex representation of the checksum for aString which is a string

| b c e d f | b := ReadStream on: aString.
c := 0.
[ b atEnd ]
    whileFalse:
        [c := c + (b next: 2) hexByteToDecimal].
d := (c \\ 256 ) .
e := d decimalToHex.
f := e padLeftToOneByte convertAsciiToHex.

^ f!

calculateChecksumHex1: aString

" Revision Level ark01
```

Date of Last Revision  Aug 29, 1990 "

"Answer the hex representation of the checksum for aString
as 2 hex digits"

| b c e d f | b := ReadStream on: aString.
c := 0.
[ b atEnd ]
    whileFalse:
        [c := c + (b next: 2) hexByteToDecimal].
d := (c \\ 256 ) .
e := d decimalToHex.
^ e!

calculateChecksumHex2: aString

" Revision Level ark01
    Date of Last Revision  Aug 29, 1990 "
    "Answer the hex representation of the checksum for aString
    as 2 hex digits"

| b c e d f | b := aString convertHexToAscii.
c := 0.
b do: [ :char | c := c + char asciiValue ].
d := c bitAnd: 255.
e := d decimalToHex.
^ e!

calculateChecksumInAscii: aString

" Revision Level ark01
    Date of Last Revision  Aug 29, 1990 "

"Answer the hex representation of the checksum for aString of ASCII characte
    as 2 hex digits"

| b c sum | sum := 0.
aString do: [ :char | sum := sum + char asciiValue ].
b := sum bitAnd: 255.
c := b decimalToHex padLeftToOneByte.

^ c!

dataUpdateMessageStringForVariableNamed: aString withValue: bString

" Revision Level ark01
    Date of Last Revision  Aug 17, 1990 "

"Generate a TYPE 5 Message - Data Update

Answer the string of hex characters that is the
    message to transmit the variable whose name in
    ascii representation is in aString and whose
    value is bString"

"DLE STX 05 length    variable name  ,  value    DLE ETX checksum"

| length messageFront checksum data | data := (aString , ',' , bString).
    length := data size printString padLeftToTwoBytes convertAsciiToHex.
    messageFront := '10023035' , length , data convertAsciiToHex , '1003'.
    checksum := self calculateChecksum: messageFront.

^ messageFront , checksum!

defineDecimalToHexConstants

" Revision Level ark01
Date of Last Revision  Aug  9, 1990 "

"Define the pool dictionary of hex equivalents to decimal numbers.
Range is '00' to 'FF'. Note that the hex equivalent to decimal number i
is at the i+1 array location.
This is done to avoid the costly conversion via decimalToHex method.
See method asHex in Character"

| a |

(Smalltalk at: #DecimalToHexConstants put: (Array new: 256)).
a:= Smalltalk at: #DecimalToHexConstants.
0 to: 255 do: [ :int |
a at: (int + 1) put: (int decimalToHex padLeftToOneByte)
         ].!

defineProtocolConstants

" Revision Level ark01
Date of Last Revision  Aug  9, 1990 "

"Define the pool dictionary of special characters used in the protocol."

" Note: ('10' hexByteToDecimal asCharacter ) = $ "

| a | a := (Dictionary new)
    at: 'ACK' put: '' ; " x06"
    at: 'DLE' put: '' ; " x10"
    at: 'ETX' put: '' ; " x03"
    at: 'NAK' put: '' ; " x05"
    at: 'STX' put: '' ; " x02"
    at: 'ACKcharacter' put: $ ; " x06"
    at: 'DLEcharacter' put: $ ; " x10"
    at: 'ETXcharacter' put: $ ; " x03"
    at: 'NAKcharacter' put: $ ; " x05"
    at: 'STXcharacter' put: $ ; " x02"
    at: 'ACKString' put: '';  "DLE ACK"
    at: 'ACKStringInHex' put: '1006'; "DLE ACK"
    at: 'NAKString' put: ''; "DLE ACK"
    at: 'NAKStringInHex' put: '1005'; "DLE ACK"
    yourself.
Smalltalk at: #ProtocolConstants put: a.

^ a!

fromString: aString

" Revision Level ark01
Date of Last Revision  Aug 13, 1990 "

"Answer the message object represented
by aString or nil if aString is not a
syntactically correct message"

^ self new fromString: aString!

operatorMessageStringForTest

" Revision Level ark01
Date of Last Revision  Sep 11, 1990 "
"Generate a TYPE 6 message - Test Operator Display Answer the string of hex characters that is the
message to test the operator display."

"DLE STX 05 length    messageID    DLE ETX checksum"

```
| length messageFront messageID checksum data | messageID := 'ARK1990'.
    data := messageID.
    length := data size printString padLeftToTwoBytes convertAsciiToHex.
    messageFront := '10023036' , length , data convertAsciiToHex , '1003'.
    checksum := self calculateChecksum: messageFront.

^ messageFront , checksum!

operatorMessageStringForTest: aString

" Revision Level ark01
    Date of Last Revision  Sep 11, 1990 "

"Generate a TYPE 6 message - Test Operator Display

Answer the string of hex characters that is the
    message to test the operator display."

"DLE STX 05 length    messageID     DLE ETX checksum"

| length messageFront messageID checksum data | data := aString.
    length := data size printString padLeftToTwoBytes convertAsciiToHex.
    messageFront := '10023036' , length , data convertAsciiToHex , '1003'.
    checksum := self calculateChecksum: messageFront.

^ messageFront , checksum!

operatorPromptStringForTest: aString

" Revision Level ark01
    Date of Last Revision  Oct 8, 1990 "

"Generate a TYPE 7 message - Test Operator Display

Answer the string of hex characters that is the
    message to test the operator display."

"DLE STX 07 length    messageID     DLE ETX checksum"

| length messageFront messageID checksum data | data := aString.
    length := data size printString padLeftToTwoBytes convertAsciiToHex.
    messageFront := '10023037' , length , data convertAsciiToHex , '1003'.
    checksum := self calculateChecksum: messageFront.

^ messageFront , checksum!

requestForDataMessageStringForVariableNamed: aString

" Revision Level ark01
    Date of Last Revision  Aug 17, 1990 "

"Generate a TYPE 3 Message - Request for Data

Answer the string of hex characters
    that is the message to request the
    value of the variable whose name in
    ascii representation is in aString"

"DLE STX 03 length    variable name       DLE ETX checksum"

| length messageFront checksum |
```

```
length := aString size printString padLeftToTwoBytes convertAsciiToHex.
messageFront := '10023033' , length , aString convertAsciiToHex , '1003'.
checksum := self calculateChecksum: messageFront.

^ messageFront , checksum! !

!AMessage methods !

ackMessage

" Revision Level ark01
    Date of Last Revision   Aug 16, 1990 "

"comment"

| theMessage |

^ AMessage new
        type: 99;
        length: 3;
        dataInAscii:·'ACK';
        yourself!

checkCheckSum

" Revision Level ark01
    Date of Last Revision   Aug 14, 1990 "

"Check the recieved value of the checksum"

| checkSum checkSumCalculated length messageFront | length := theString size.
    messageFront := theString copyFrom: 1 to: (length - 2 ).
    checkSum := theString copyFrom: ( length - 1 ) to: length.
    checkSumCalculated := AMessage calculateChecksumInAscii: messageFront.
    ^ ( checkSum = checkSumCalculated )!

checkETX

" Revision Level ark01
    Date of Last Revision   Aug 14, 1990 "

"comment"

^ true!

checkSTX

" Revision Level ark01
    Date of Last Revision   Aug 13, 1990 "

"Check that the message starts with DLE STX"

^ ( (theString at: 1) == DLEcharacter)
        and: [ (theString at: 2) == STXcharacter ]!

data

" Revision Level ark01
    Date of Last Revision   Aug 14, 1990 "

"comment"

^ dataInAscii!

dataInAscii

" Revision Level ark01
    Date of Last Revision   Aug 14, 1990 "

"comment"
```

```
    ^ dataInAscii!

dataInAscii: aString

" Revision Level ark01
    Date of Last Revision  Aug 14, 1990 "

"comment"

dataInAscii:= aString!

dataInHex

" Revision Level ark01
    Date of Last Revision  Aug 14, 1990 "

"comment"

^ dataInHex!

dataInHex: aString

" Revision Level ark01
    Date of Last Revision  Aug 14, 1990 "

"comment"

dataInHex:= aString!

extractAlarmID

" Revision Level ark01
    Date of Last Revision  Aug 14, 1990 "

"comment"

^ dataInAscii!

extractVariableNameAndValue

" Revision Level ark01
    Date of Last Revision  Aug 17, 1990 "

"For the receiver, a TYPE 4 Message - Data Transmission

Answer an array the first element of
    which is the variable name and the
    second is a string containing the
    value.

The variable name may have 0 or more
    qualifiers separted by semicolons and
    the value is separated from the
    variable name by a semicolon"

| a c  value variable | a := ReadStream on: dataInAscii.
    variable := a  upTo: $, .
    value := dataInAscii copyFrom: ( a position + 1 ) to: ( a size ).

^ Array with: variable with: value!

fromString: aString

" Revision Level ark01
    Date of Last Revision  Aug 13, 1990 "

"Answer the message object represented
    by aString or nil if aString is not a
    syntactically correct message.  Perform
    syntax checks as required.
    Specs are from Art Hughes 7/90"
```

| checkType |
"
^ AMessage new
    type: 2;
    dataInAscii: '238F';
    dataInHex: 'HHHH';
    length: 9;
    yourself
"
    theString := aString.

(theString = ACKString) ifTrue: [ ^ self ackMessage].
    (theString = NAKString) ifTrue: [ ^ self nakMessage].

( self checkSTX ) ifFalse: [ ^ nil ].
    ( self checkETX ) ifFalse: [ ^ nil ].
    ( self checkCheckSum ) ifFalse: [ ^ nil ].

( (type := self getMessageType) == nil) ifTrue: [ ^ nil ].
    ( (length := self getMessageLength) == nil) ifTrue: [ ^ nil ].
    ( (dataInAscii := self getMessageData) == nil) ifTrue: [ ^ nil ].

^ self!

getMessageData

" Revision Level ark01
    Date of Last Revision  Aug 15, 1990 "

"Retrieve the type field"

( length > 0 )
        ifFalse: [ ^self error: 'Length value not valid for a Message.'].

^ theString copyFrom: 9 to: ( 9 + length - 1)!

getMessageLength

" Revision Level ark01
    Date of Last Revision  Aug 15, 1990 "

"Retrieve the type field"

| theLength answer | theLength := String new: 4.
    theLength at: 1 put: (theString at: 5).
    theLength at: 2 put: (theString at: 6).
    theLength at: 3 put: (theString at: 7).
    theLength at: 4 put: (theString at: 8).

( ( answer := theLength asInteger )
        > 0 )
            ifFalse: [ ^ nil ]
            ifTrue:  [ ^ answer ]!

getMessageType

" Revision Level ark01
    Date of Last Revision  Aug 15, 1990 "

"Retrieve the type field"

| theType answer | theType := String new: 2.
    theType at: 1 put: (theString at: 3).
    theType at: 2 put: (theString at: 4).

( ( answer := theType asInteger )

```
            between: 1 and: 5 )
                ifFalse: [ ^ nil ]
                ifTrue:  [ ^ answer ]!
``` isACK

```
    " Revision Level ark01
    Date of Last Revision  Aug 14, 1990 "

"comment"

^ (type = 99)!
``` isACKOrNAK

```
    " Revision Level ark01
    Date of Last Revision  Aug 14, 1990 "

"comment"

^ ( self isACK or: [ self isNAK ] )!
``` isNAK

```
    " Revision Level ark01
    Date of Last Revision  Aug 14, 1990 "

"comment"

^ (type = 98)!
``` isRecoveryPlanRequest

```
    " Revision Level ark01
    Date of Last Revision  Aug 14, 1990 "

"comment"

^ (type = 1)!
``` length

```
    " Revision Level ark01
    Date of Last Revision  Aug 14, 1990 "

"comment"

^ length!
``` length: anInteger

```
    " Revision Level ark01
    Date of Last Revision  Aug 14, 1990 "

"comment"

length:= anInteger!
``` nakMessage

```
    " Revision Level ark01
    Date of Last Revision  Aug 16, 1990 "

"comment"

| theMessage |

^ AMessage new
        type: 98;
        length: 3;
        dataInAscii: 'NAK';
        yourself!
``` pprintOn: aStream

```
" Revision Level ark01
Date of Last Revision  Aug 14, 1990 "

"Append the ASCII representation of the receiver
    to aStream. "

aStream nextPutAll: (self data , '***')!
``` stuff

```
" Revision Level ark01
Date of Last Revision  Aug  9, 1990 "

"comment"
^ DLE , STX , '02041101' , DLE , ETX , '8E'!
``` stuff2

```
" Revision Level ark01
Date of Last Revision  Aug  9, 1990 "

"comment"
| a b c| a := DLE , STX , '02041101' , DLE , ETX , '8E' .
b := (a at: 1) .
c := ( b = DLEcharacter ).
self halt.!
``` stuff3

```
" Revision Level ark01
Date of Last Revision  Aug  9, 1990 "

"comment"
^ DLE , STX , '02041101' , DLE , ETX , '8E', ACK , NAK!
``` type

```
" Revision Level ark01
Date of Last Revision  Aug 14, 1990 "

"comment"

^ type!
``` type: anInteger

```
" Revision Level ark01
Date of Last Revision  Aug 14, 1990 "

"comment"

type:= anInteger!
``` xextractVariableNameAndValue

```
" Revision Level ark01
Date of Last Revision  Aug 17, 1990 "

"For the receiver, a TYPE 4 Message - Data Transmission

Answer an array the first element of
which is the variable name and the
second is a string containing the
value.

The variable name may have 0 or more
qualifiers separted by semicolons and
the value is separated from the
variable name by a semicolon"
```

```
| a c  value variable | a := ReadStream on: (dataInAscii reversed).
value := (a  upTo: $;) reversed.
c := a size - a position.
variable := dataInAscii copyFrom: 1 to: c.

^ Array with: variable with: value!
``` xgetMessageLength

```
" Revision Level ark01
Date of Last Revision  Aug 15, 1990 "

"Retrieve the type field"

| theLength answer | theLength := String new: 2.
theLength at: 1 put: (theString at: 5).
theLength at: 2 put: (theString at: 6).

( ( answer := theLength asInteger )
    > 0 )
        ifFalse: [ ^ nil ]
        ifTrue:  [ ^ answer ]! !
```

!Character methods !
asHex

```
" Revision Level ark01
Date of Last Revision  Aug  9, 1990 "

"Convert the receiver to a hex byte.

This is an alternative to the more costly conversion
via  e.g. $1 asciiValue decimalToHex.
The definition for DecimalToHexConstants is in the
class method of AMessage."

^ DecimalToHexConstants at: (self asciiValue + 1)! !
```

!Integer methods !
decimalToHex

```
" Revision Level ark01
  Date of Last Revision  Aug  9, 1990"

"Answer a string containing the hex digits
representing the receiver decimal integer"

| aStream | aStream := WriteStream on: (String new: 16).
self printOn: aStream base: 16.
^aStream copyFrom: 4 to: (aStream position)! !
```

!String methods !
padLeftToTwoBytes

```
" Revision Level ark01
Date of Last Revision  Aug  9, 1990 "

"If the reciver string is 1 character,
 answer the reciver with a 0 padded
 on the left"

(self size = 1)
    ifTrue: [^ '000' , self].
(self size = 2)
    ifTrue: [^ '00' , self].
```

```
    (self size = 3)
        ifTrue: [^ '0' , self]
        ifFalse:[^ self]! !

!String methods !
convertHexToAscii

" Revision Level ark01
    Date of Last Revision  Aug  9, 1990 "

"Answer the hex byte conversion of the receiver string"

| input result | input := ReadStream on: self.
    result := WriteStream on: (String new: (self size // 2)).
    [input atEnd]
        whileFalse:[ result nextPut: ( (input next: 2) hexByteToCharacter ) ].
    ^ result contents! !

!String methods !
padLeftToOneByte

" Revision Level ark01
    Date of Last Revision  Aug  9, 1990 "

"If the reciver string is 1 character,
     answer the reciver with a 0 padded
     on the left"

(self size = 1)
        ifTrue: [^ '0' , self]
        ifFalse:[^ self]! !

!String methods !
hexByteToDecimal

" Revision Level ark01
    Date of Last Revision  Aug  9, 1990 "

"Convert the 2 hex digits in the receiver to a decimal integer"

^ ( (self at: 1) digitValue  * 16)
      +  ( (self at: 2) digitValue)! !

!String methods !
convertAsciiToHex

" Revision Level ark01
    Date of Last Revision  Aug  9, 1990 "

"Answer the hex byte conversion of the receiver string"

| result | result := WriteStream on: (String new: (self size * 2)).
    self do: [ :char | result nextPutAll: (char asHex) ].
    ^ result contents! !

!String methods !
hexByteToCharacter

" Revision Level ark01
    Date of Last Revision  Aug  9, 1990 "

"Convert the 2 hex digits in the receiver to a character"

^ Character value: (
            ( (self at: 1) digitValue  * 16)
               +  ( (self at: 2) digitValue)
                    )! !

!String methods !
```

```
between: min and: max
    "Answer true if the receiver is greater than or
    equal to min and less than or equal to max,
    else answer false."
    ^(min <= self) and: [self <= max]! !
"construct application"
    ((Smalltalk at: #Application ifAbsent: [])
        isKindOf: Class) ifTrue: [
            ((Smalltalk at: #Application) for:'Protocol')
                addClass: AMessage;
                addMethod: #asHex forClass: Character;
                addMethod: #decimalToHex forClass: Integer;
                addMethod: #padLeftToTwoBytes forClass: String;
                addMethod: #convertHexToAscii forClass: String;
                addMethod: #padLeftToOneByte forClass: String;
                addMethod: #hexByteToDecimal forClass: String;
                addMethod: #convertAsciiToHex forClass: String;
                addMethod: #hexByteToCharacter forClass: String;
                addMethod: #between:and: forClass: String;
            comments: nil;
            initCode: nil;
            finalizeCode: nil;
            startUpCode: nil]!
"
*******************************************************************************
Project : ComMessage
Date    : Oct 30, 1990
Time    : 17:22:05

Classes :
    NestStatus DispatchChangeAcknowledgement
    NegativeAcknowledgement CartModeChangeAcknowledgement
    CartStatusData CartModeChangeRequest
    StationStatusRequest DispatchChangeRequest
    ModeChangeRequest FieldStructure NestStatusRequest
    StationStatusData ModeChangeAcknowledgement
    AlarmNotification MaterialHandlerStatus AlarmMessages
    AlarmAcknowledge AlarmClear InterfaceSoftwareError
    CartStatusRequest NestStatusData StationStatus
    CommunicationMessage Methods :
    #makeString defined in Object.
    #convertToStringOfLength: defined in Object.
    #sol: defined in Object.
    #padLeftWithZerosToLength: defined in String.
    #padRightWithBlanksToLength: defined in String.
    #calculateLength defined in String.

*******************************************************************************
"!

Miscellaneous variableSubclass: #NegativeAcknowledgement
    instanceVariableNames:
        'requestedMessageType returnCode '
    classVariableNames: ''
    poolDictionaries: ''!

Array variableSubclass: #FieldStructure
    instanceVariableNames: ''
    classVariableNames: ''
    poolDictionaries: ''!

Smalltalk at: #String ifAbsent: [
FixedSizeCollection variableByteSubclass: #String
    classVariableNames: ''
    poolDictionaries:
        'CharacterConstants ']!

Smalltalk at: #Object ifAbsent: [
nil subclass: #Object
    instanceVariableNames: ''
```

```
    classVariableNames:
      'RecursionInError Dependents RecursiveSet '
    poolDictionaries: ''!

Miscellaneous variableSubclass: #InterfaceSoftwareError
    instanceVariableNames:
      'messageText '
    classVariableNames: ''
    poolDictionaries: ''!

Object variableSubclass: #CommunicationMessage
    instanceVariableNames:
      'length messageType '
    classVariableNames: ''
    poolDictionaries:
      'ProtocolConstants FieldsInOrder FieldLengths '!

CommunicationMessage variableSubclass: #NestStatus
    instanceVariableNames:
      'batchId '
    classVariableNames: ''
    poolDictionaries: ''!

NestStatus variableSubclass: #NestStatusRequest
    instanceVariableNames: ''
    classVariableNames: ''
    poolDictionaries: ''!

CommunicationMessage variableSubclass: #AlarmMessages
    instanceVariableNames:
      'alarmCode location '
    classVariableNames: ''
    poolDictionaries: ''!

AlarmMessages variableSubclass: #AlarmAcknowledge
    instanceVariableNames: ''
    classVariableNames: ''
    poolDictionaries: ''!

AlarmMessages variableSubclass: #AlarmClear
    instanceVariableNames: ''
    classVariableNames: ''
    poolDictionaries: ''!

CommunicationMessage variableSubclass: #MaterialHandlerStatus
    instanceVariableNames:
      'cartId '
    classVariableNames: ''
    poolDictionaries: ''!

MaterialHandlerStatus variableSubclass: #CartStatusRequest
    instanceVariableNames: ''
    classVariableNames: ''
    poolDictionaries: ''!

NestStatus variableSubclass: #NestStatusData
    instanceVariableNames:
      'currentLocation stationId taskStatus wipStatus '
    classVariableNames: ''
    poolDictionaries: ''!

CommunicationMessage variableSubclass: #StationStatus
    instanceVariableNames:
      'stationId '
    classVariableNames: ''
    poolDictionaries: ''!

AlarmMessages variableSubclass: #AlarmNotification
    instanceVariableNames:
      'diagnosticData timeSet '
    classVariableNames: ''
```

```
    poolDictionaries: ''!

StationStatus variableSubclass: #ModeChangeRequest
    instanceVariableNames:
        'stationMode '
    classVariableNames: ''
    poolDictionaries: ''!

StationStatus variableSubclass: #DispatchChangeRequest
    instanceVariableNames:
        'dispatchMode '
    classVariableNames: ''
    poolDictionaries: ''!

MaterialHandlerStatus variableSubclass: #CartStatusData
    instanceVariableNames:
        'cartMode communicationStatus controllerStatus machineStatus '
    classVariableNames: ''
    poolDictionaries: ''!

StationStatus variableSubclass: #StationStatusRequest
    instanceVariableNames: ''
    classVariableNames: ''
    poolDictionaries: ''!

MaterialHandlerStatus variableSubclass: #CartModeChangeRequest
    instanceVariableNames:
        'cartMode '
    classVariableNames: ''
    poolDictionaries: ''!

StationStatus variableSubclass: #DispatchChangeAcknowledgement
    instanceVariableNames:
        'dispatchMode '
    classVariableNames: ''
    poolDictionaries: ''!

MaterialHandlerStatus variableSubclass: #CartModeChangeAcknowledgement
    instanceVariableNames:
        'cartMode '
    classVariableNames: ''
    poolDictionaries: ''!

StationStatus variableSubclass: #StationStatusData
    instanceVariableNames:
        'communicationStatus faultStatus stationDispatchMode stationMode stationStat
    classVariableNames: ''
    poolDictionaries: ''!

StationStatus variableSubclass: #ModeChangeAcknowledgement
    instanceVariableNames:
        'stationMode '
    classVariableNames: ''
    poolDictionaries: ''!

!NestStatus class methods ! !

!NestStatus methods !

batch

"Method Version: ark1
         Date of Last Revision: Date today  Oct  5, 1990
         Copyright (C) 1990 The Boeing Company
            All Rights Reserved"

"Answers the receivers batchId to aString "

^ batchId!
``` batchId: aString

```
    "Method Version: ark1
      Date of Last Revision: Date today  Oct  5, 1990
      Copyright (C) 1990 The Boeing Company
        All Rights Reserved"
```

"Answers the receiver"

"Set the recievers batchId to aString "

batchId := aString! !

!DispatchChangeAcknowledgement class methods ! !

!DispatchChangeAcknowledgement methods !

dispatchMode

```
    "Method Version: ark1
      Date of Last Revision: Date today  Oct  5, 1990
      Copyright (C) 1990 The Boeing Company
        All Rights Reserved"
```

"Answer the dispatch mode of the receiver "

^ dispatchMode!

dispatchMode: anInteger

```
    "Method Version: ark1
      Date of Last Revision: Date today  Oct  5, 1990
      Copyright (C) 1990 The Boeing Company
        All Rights Reserved"
```

"Answer the receiver "

"Set the dispatch mode of the receiver to anInteger
    0 => manual
    1 => automatic "

( #( 0 1 ) includes: anInteger ) ifFalse: [ self error: 'Invalid value for stati
dispatchMode := anInteger!

initialize

```
    "Method Version: ark1
      Date of Last Revision: Date today  Oct 10, 1990
      Copyright (C) 1990 The Boeing Company
        All Rights Reserved"
```

" "

messageType := '09'.! !

!NegativeAcknowledgement class methods ! !

!NegativeAcknowledgement methods !

initialize

```
    "Method Version: ark1
      Date of Last Revision: Date today  Oct 10, 1990
      Copyright (C) 1990 The Boeing Company
        All Rights Reserved"
```

" "

```
messageType := '17'.!

requestedMessageType

"Method Version: ark1
          Date of Last Revision: Date today  Oct  5, 1990
          Copyright (C) 1990 The Boeing Company
             All Rights Reserved"

"Answers receivers requested message type"

^ requestedMessageType!

requestedMessageType: anInteger

"Method Version: ark1
          Date of Last Revision: Date today  Oct  5, 1990
          Copyright (C) 1990 The Boeing Company
             All Rights Reserved"

"Answers the receiver"
"Set the receivers requested message type to anInteger"

requestedMessageType := anInteger!

returnCode

"Method Version: ark1
          Date of Last Revision: Date today  Oct  5, 1990
          Copyright (C) 1990 The Boeing Company
             All Rights Reserved"

"Answers receivers return code"

^ returnCode!

returnCode: anInteger

"Method Version: ark1
          Date of Last Revision: Date today  Oct  5, 1990
          Copyright (C) 1990 The Boeing Company
             All Rights Reserved"

"Answers the receiver"
"Set the receivers return code to anInteger"

returnCode := anInteger! !

!CartModeChangeAcknowledgement class methods ! !

!CartModeChangeAcknowledgement methods !

cartMode

"Method Version: ark1
          Date of Last Revision: Date today  Oct  5, 1990
          Copyright (C) 1990 The Boeing Company
             All Rights Reserved"

"Answer the cart mode of the receiver  "

^ cartMode!

cartMode: anInteger

"Method Version: ark1
```

Date of Last Revision: Date today  Oct  5, 1990
       Copyright (C) 1990 The Boeing Company
          All Rights Reserved"

"Answer the receiver  "

"Set the cart mode of the receiver to anInteger
    0 => automatic
    1 => manual
    2 => offline   "

( #( 0 1 2 ) includes: anInteger ) ifFalse: [ self error: 'Invalid value for car
cartMode := anInteger!

initialize

"Method Version: ark1
        Date of Last Revision: Date today  Oct 10, 1990
        Copyright (C) 1990 The Boeing Company
           All Rights Reserved"

" "

messageType := '15'.! !

!CartStatusData class methods ! !

!CartStatusData methods !

cartMode

"Method Version: ark1
        Date of Last Revision: Date today  Oct  5, 1990
        Copyright (C) 1990 The Boeing Company
           All Rights Reserved"

"Answer the cart mode of the receiver  "

^ cartMode!

cartMode: anInteger

"Method Version: ark1
        Date of Last Revision: Date today  Oct  5, 1990
        Copyright (C) 1990 The Boeing Company
           All Rights Reserved"

"Answer the receiver  "

"Set the cart mode of the receiver to anInteger
    0 => automatic
    1 => manual
    2 => offline   "

( #( 0 1 2 ) includes: anInteger ) ifFalse: [ self error: 'Invalid value for car
cartMode := anInteger!

communicationStatus

"Method Version: ark1
        Date of Last Revision: Date today  Oct  5, 1990
        Copyright (C) 1990 The Boeing Company
           All Rights Reserved"

"Answer the communication status of the receiver  "

^ communicationStatus!

communicationStatus: anInteger

```
"Method Version: ark1
 Date of Last Revision: Date today  Oct  5, 1990
 Copyright (C) 1990 The Boeing Company
    All Rights Reserved"
```

"Answer the receiver  "

"Set the communication status of the receiver to anInteger
    0 => unknown
    1 => up
    2 => down  "

( #( 0 1 2 ) includes: anInteger ) ifFalse: [ self error: 'Invalid value for c_
communicationStatus := anInteger!

controllerStatus

```
"Method Version: ark1
 Date of Last Revision: Date today  Oct  5, 1990
 Copyright (C) 1990 The Boeing Company
    All Rights Reserved"
```

"Answer the controller-status of the receiver  "

^ controllerStatus!

controllerStatus: anInteger

```
"Method Version: ark1
 Date of Last Revision: Date today  Oct  5, 1990
 Copyright (C) 1990 The Boeing Company
    All Rights Reserved"
```

"Answer the receiver  "

"Set the controller status of the receiver to anInteger
    0 => unknown
    1 => network
    2 => local  "

( #( 0 1 2 ) includes: anInteger ) ifFalse: [ self error: 'Invalid value for con
controllerStatus := anInteger!

initialize

```
"Method Version: ark1
 Date of Last Revision: Date today  Oct 10, 1990
 Copyright (C) 1990 The Boeing Company
    All Rights Reserved"
```

"  "

messageType := '13'.!

machineStatus

```
"Method Version: ark1
 Date of Last Revision: Date today  Oct  5, 1990
 Copyright (C) 1990 The Boeing Company
    All Rights Reserved"
```

"Answer the machine status of the receiver  "

^ machineStatus!

machineStatus: anInteger

```
"Method Version: ark1
 Date of Last Revision: Date today  Oct  5, 1990
 Copyright (C) 1990 The Boeing Company
    All Rights Reserved"
```

"Answer the receiver   "

"Set the machine status of the receiver to anInteger
    0 => unknown
    1 => up
    2 => down"

( #( 0 1 2) includes: anInteger ) ifFalse: [ self error: 'Invalid value for mach
machineStatus := anInteger! !

!CartModeChangeRequest class methods ! !

!CartModeChangeRequest methods !

cartMode

"Method Version: ark1
         Date of Last Revision: Date today  Oct  5, 1990
         Copyright (C) 1990 The Boeing Company
            All Rights Reserved"

"Answer the cart mode of the receiver   "

^ cartMode!

cartMode: anInteger

"Method Version: ark1
         Date of Last Revision: Date today  Oct  5, 1990
         Copyright (C) 1990 The Boeing Company
            All Rights Reserved"

"Answer the receiver   "

"Set the cart mode of the receiver to anInteger
    0 => automatic
    1 => manual
    2 => offline   "

( #( 0 1 2 ) includes: anInteger ) ifFalse: [ self error: 'Invalid value for car
cartMode := anInteger!

initialize

"Method Version: ark1
         Date of Last Revision: Date today  Oct 10, 1990
         Copyright (C) 1990 The Boeing Company
            All Rights Reserved"

" "

messageType := '14'.! !

!StationStatusRequest class methods ! !

!StationStatusRequest methods !

initialize

"Method Version: ark1
         Date of Last Revision: Date today  Oct 10, 1990
         Copyright (C) 1990 The Boeing Company
            All Rights Reserved"

" "

messageType := '04'.! !

!DispatchChangeRequest class methods ! !

!DispatchChangeRequest methods !

dispatchMode

"Method Version: ark1
Date of Last Revision: Date today  Oct  5, 1990
Copyright (C) 1990 The Boeing Company
    All Rights Reserved"

"Answer the  dispatch mode of the receiver  "

^ dispatchMode!

dispatchMode: anInteger

"Method Version: ark1
Date of Last Revision: Date today  Oct  5, 1990
Copyright (C) 1990 The Boeing Company
    All Rights Reserved"

"Answer the receiver  "

"Set the dispatch mode of the receiver to anInteger
    0 => manual
    1 => automatic  "

( #( 0 1 ) includes: anInteger ) ifFalse: [ self error: 'Invalid value for stati
dispatchMode := anInteger!

initialize

"Method Version: ark1
Date of Last Revision: Date today  Oct 10, 1990
Copyright (C) 1990 The Boeing Company
    All Rights Reserved"

"  "

messageType := '08'.! !

!ModeChangeRequest class methods ! !

!ModeChangeRequest methods !

initialize

"Method Version: ark1
Date of Last Revision: Date today  Oct 10, 1990
Copyright (C) 1990 The Boeing Company
    All Rights Reserved"

"  "

messageType := '06'.!

stationMode

"Method Version: ark1
Date of Last Revision: Date today  Oct  5, 1990
Copyright (C) 1990 The Boeing Company
    All Rights Reserved"

"Answer the station mode of the receiver  "

^ stationMode!

stationMode: anInteger

"Method Version: ark1
Date of Last Revision: Date today  Oct  5, 1990
Copyright (C) 1990 The Boeing Company
    All Rights Reserved"

"Answer the receiver "

"Set the station mode of the receiver to anInteger
    0 => automatic
    1 => manual
    2 => offline  "

( #( 0 1 2 ) includes: anInteger ) ifFalse: [ self error: 'Invalid value for sta
stationMode := anInteger! !

!FieldStructure class methods ! !

!FieldStructure methods !

getFetchMethod

"Method Version: ark1
        Date of Last Revision: Date today  Oct 30, 1990
        Copyright (C) 1990 The Boeing Company
            All Rights Reserved"

"Answer the symbol which is the name of the get method for this field  "

^ self at: 1!

getFieldLength

"Method Version: ark1
        Date of Last Revision: Date today  Oct 30, 1990
        Copyright (C) 1990 The Boeing Company
            All Rights Reserved"

"Answer the integer which is the length of this field  "

^ self at: 2! !

!NestStatusRequest class methods ! !

!NestStatusRequest methods !

initialize

"Method Version: ark1
        Date of Last Revision: Date today  Oct 10, 1990
        Copyright (C) 1990 The Boeing Company
            All Rights Reserved"

" "

messageType := '10'.! !

!StationStatusData class methods ! !

!StationStatusData methods !

communicationStatus

"Method Version: ark1

```
    Date of Last Revision: Date today  Oct  5, 1990
    Copyright (C) 1990 The Boeing Company
        All Rights Reserved"
```

"Answer the communication status of the receiver  "

^ communicationStatus!

communicationStatus: anInteger

```
    "Method Version: ark1
    Date of Last Revision: Date today  Oct  5, 1990
    Copyright (C) 1990 The Boeing Company
        All Rights Reserved"
```

"Answer the receiver  "

"Set the communication status of the receiver to anInteger
    0 => unknown
    1 => up
    2 => down  "

( #( 0 1 2 ) includes: anInteger ) ifFalse: [ self error: 'Invalid value for com
communicationStatus := anInteger!

faultStatus

```
    "Method Version: ark1
    Date of Last Revision: Date today  Oct  5, 1990
    Copyright (C) 1990 The Boeing Company
        All Rights Reserved"
```

"Answer the fault status of the receiver  "

^ faultStatus!

faultStatus: anInteger

```
    "Method Version: ark1
    Date of Last Revision: Date today  Oct  5, 1990
    Copyright (C) 1990 The Boeing Company
        All Rights Reserved"
```

"Answer the receiver  "

"Set the fault status of the receiver to anInteger
    0 => unknown
    1 => up
    2 => down"

( #( 0 1 2) includes: anInteger ) ifFalse: [ self error: 'Invalid value for faul
faultStatus := anInteger!

initialize

```
    "Method Version: ark1
    Date of Last Revision: Date today  Oct 10, 1990
    Copyright (C) 1990 The Boeing Company
        All Rights Reserved"
```

"  "

messageType := '05'.!

stationDispatchMode

```
    "Method Version: ark1
    Date of Last Revision: Date today  Oct  5, 1990
    Copyright (C) 1990 The Boeing Company
        All Rights Reserved"
```

"Answer the station dispatch mode of the receiver  "

^ stationDispatchMode!

stationDispatchMode: anInteger

"Method Version: ark1
         Date of Last Revision: Date today  Oct  5, 1990
         Copyright (C) 1990 The Boeing Company
             All Rights Reserved"

"Answer the receiver  "

"Set the station dispatch mode of the receiver to anInteger
    0 => manual
    1 => automatic  "

( #( 0 1 ) includes: anInteger ) ifFalse: [ self error: 'Invalid value for stati
stationDispatchMode := anInteger!

stationMode

"Method Version: ark1
         Date of Last Revision: Date today  Oct  5, 1990
         Copyright (C) 1990 The Boeing Company
             All Rights Reserved"

"Answer the station mode of the receiver  "

^ stationMode!

stationMode: anInteger

"Method Version: ark1
         Date of Last Revision: Date today  Oct  5, 1990
         Copyright (C) 1990 The Boeing Company
             All Rights Reserved"

"Answer the receiver  "

"Set the station mode of the receiver to anInteger
    0 => automatic
    1 => manual
    2 => offline  "

( #( 0 1 2 ) includes: anInteger ) ifFalse: [ self error: 'Invalid value for sta
stationMode := anInteger!

stationStatus

"Method Version: ark1
         Date of Last Revision: Date today  Oct  5, 1990
         Copyright (C) 1990 The Boeing Company
             All Rights Reserved"

"Answer the station status of the receiver  "

^ stationStatus!

stationStatus: anInteger

"Method Version: ark1
         Date of Last Revision: Date today  Oct  5, 1990
         Copyright (C) 1990 The Boeing Company
             All Rights Reserved"

"Answer the receiver  "

"Set the station status of the receiver to anInteger
    0 => unknown
    1 => network
    2 => local  "

( #( 0 1 2 ) includes: anInteger ) ifFalse: [ self error: 'Invalid value for sta
stationStatus := anInteger! !

!ModeChangeAcknowledgement class methods ! !

!ModeChangeAcknowledgement methods !

initialize

```
"Method Version: ark1
  Date of Last Revision: Date today  Oct 10, 1990
  Copyright (C) 1990 The Boeing Company
     All Rights Reserved"
```

" "

messageType := '07'.!

stationMode

```
"Method Version: ark1
  Date of Last Revision: Date today  Oct  5, 1990
  Copyright (C) 1990 The Boeing Company
     All Rights Reserved"
```

"Answer the station mode of the receiver  "

^ stationMode!

stationMode: anInteger

```
"Method Version: ark1
  Date of Last Revision: Date today  Oct  5, 1990
  Copyright (C) 1990 The Boeing Company
     All Rights Reserved"
```

"Answer the receiver  "

"Set the station mode of the receiver to anInteger
    0 => automatic
    1 => manual
    2 => offline  "

( #( 0 1 2 ) includes: anInteger ) ifFalse: [ self error: 'Invalid value for sta
stationMode := anInteger! !

!AlarmNotification class methods !

alarmCode: anInteger
location: aString
timeSet: aDateAndTimeStamp
diagnosticData: bString

```
"Method Version: ark1
  Date of Last Revision: Date today  Oct  5, 1990
  Copyright (C) 1990 The Boeing Company
     All Rights Reserved"
```

" "

^ (self new
    alarmCode: anInteger;
    location: aString;
    timeSet: aDateAndTimeStamp;
    diagnosticData: bString )  package! !

!AlarmNotification methods !

alarmCode: anInteger
location: aString
timeSet: aDateAndTimeStamp
diagnosticData: bString

```
"Method Version: ark1
   Date of Last Revision: Date today  Oct   5, 1990
   Copyright (C) 1990 The Boeing Company
      All Rights Reserved"
" "

^ (self
   alarmCode: anInteger;
   location: aString;
   timeSet: aDateAndTimeStamp;
   diagnosticData: bString )   package!
``` diagnosticData

```
"Method Version: ark1
   Date of Last Revision: Date today  Oct   5, 1990
   Copyright (C) 1990 The Boeing Company
      All Rights Reserved"
```

"Answers the receivers diagnostic data "

^ diagnosticData!

diagnosticData: aString

```
"Method Version: ark1
   Date of Last Revision: Date today  Oct   5, 1990
   Copyright (C) 1990 The Boeing Company
      All Rights Reserved"
```

"Answers the receiver"

"Set the recievers diagnostic data  to aString "

diagnosticData := aString!

initialize

```
"Method Version: ark1
   Date of Last Revision: Date today  Oct 10, 1990
   Copyright (C) 1990 The Boeing Company
      All Rights Reserved"
" "
``` messageType := '01'.!

printString

```
"Method Version: ark1
   Date of Last Revision: Date today  Oct 24, 1990
   Copyright (C) 1990 The Boeing Company
      All Rights Reserved"
" "
```
^ alarmCode printString, '***'!

timeSet

```
"Method Version: ark1
   Date of Last Revision: Date today  Oct   5, 1990
   Copyright (C) 1990 The Boeing Company
      All Rights Reserved"
```

"Answers the receivers set time "

^ timeSet!

timeSet: aDateAndTimeStamp

"Method Version: ark1
         Date of Last Revision: Date today  Oct  5, 1990
         Copyright (C) 1990 The Boeing Company
             All Rights Reserved"

"Answers the receiver"

"Set the receivers set time to aDateAndTimeStamp"

timeSet := aDateAndTimeStamp! !

!MaterialHandlerStatus class methods ! !

!MaterialHandlerStatus methods !

cartId

"Method Version: ark1
         Date of Last Revision: Date today  Oct  5, 1990
         Copyright (C) 1990 The Boeing Company
             All Rights Reserved"

"Answer the cart ID of the receiver "

^ cartId!

cartId: anInteger

"Method Version: ark1
         Date of Last Revision: Date today  Oct  5, 1990
         Copyright (C) 1990 The Boeing Company
             All Rights Reserved"

"Answer the receiver  "

"Set the cart ID of the receiver to anInteger
 Values are  0, 1, 2 "

( #( 0 1 2 ) includes: anInteger ) ifFalse: [ self error: 'Invalid value for car
cartId := anInteger! !

!AlarmMessages class methods ! !

!AlarmMessages methods !

alarmCode

"Method Version: ark1
         Date of Last Revision: Date today  Oct  5, 1990
         Copyright (C) 1990 The Boeing Company
             All Rights Reserved"

"Answers the receivers alarm code  "

^ alarmCode!

alarmCode: anInteger

"Method Version: ark1
         Date of Last Revision: Date today  Oct  5, 1990
         Copyright (C) 1990 The Boeing Company
             All Rights Reserved"

"Answers the receiver"

"Set the recievers alarm code to anInteger "

alarmCode := anInteger sol: 4!

location

"Method Version: ark1
    Date of Last Revision: Date today  Oct  5, 1990
    Copyright (C) 1990 The Boeing Company
        All Rights Reserved"

"Answers the receivers location   "

^ location!

location: aString

"Method Version: ark1
    Date of Last Revision: Date today  Oct  5, 1990
    Copyright (C) 1990 The Boeing Company
        All Rights Reserved"

"Answers the receiver"

"Set the recievers location to aString "

location := aString!

xdefaultValues

"Method Version: ark1
    Date of Last Revision: Date today  Oct 11, 1990
    Copyright (C) 1990 The Boeing Company
        All Rights Reserved"

" "
super defaultValues.
"location:= 'location from AlarmMessages'."
^ self.! !

!AlarmAcknowledge class methods ! !

!AlarmAcknowledge methods !

initialize

"Method Version: ark1
    Date of Last Revision: Date today  Oct 10, 1990
    Copyright (C) 1990 The Boeing Company
        All Rights Reserved"

" "

messageType := '02'.! !

!AlarmClear class methods ! !

!AlarmClear methods !

initialize

"Method Version: ark1
    Date of Last Revision: Date today  Oct 10, 1990
    Copyright (C) 1990 The Boeing Company
        All Rights Reserved"

" "

messageType := '03'.! !

!InterfaceSoftwareError class methods ! !

!InterfaceSoftwareError methods !

initialize

"Method Version: ark1
Date of Last Revision: Date today  Oct 10, 1990
Copyright (C) 1990 The Boeing Company
    All Rights Reserved"
" "

messageType := '16'.!

messageText

"Method Version: ark1
Date of Last Revision: Date today  Oct  5, 1990
Copyright (C) 1990 The Boeing Company
    All Rights Reserved"

"Answer the receivers message text "

^ messageText!

messageText: aString

"Method Version: ark1
Date of Last Revision: Date today  Oct _5, 1990
Copyright (C) 1990 The Boeing Company
    All Rights Reserved"

"Answer the receiver  "

"Set the recievers message text to aString"

messageText := aString! !

!CartStatusRequest class methods ! !

!CartStatusRequest methods !

initialize

"Method Version: ark1
Date of Last Revision: Date today  Oct 10, 1990
Copyright (C) 1990 The Boeing Company
    All Rights Reserved"
" "

messageType := '12'.! !

!NestStatusData class methods ! !

!NestStatusData methods !

currentLocation

```
"Method Version: ark1
 Date of Last Revision: Date today  Oct  5, 1990
 Copyright (C) 1990 The Boeing Company
    All Rights Reserved"
```

"Answers the receivers current location to aString "

^ currentLocation!

currentLocation: aString

```
"Method Version: ark1
 Date of Last Revision: Date today  Oct  5, 1990
 Copyright (C) 1990 The Boeing Company
    All Rights Reserved"
```

"Answers the receiver"

"Set the recievers current location to aString "

currentLocation := aString!

initialize

```
"Method Version: ark1
 Date of Last Revision: Date today  Oct 10, 1990
 Copyright (C) 1990 The Boeing Company
    All Rights Reserved"
```

" "

messageType := '11'.!

stationId

```
"Method Version: ark1
 Date of Last Revision: Date today  Oct  5, 1990
 Copyright (C) 1990 The Boeing Company
    All Rights Reserved"
```

"Answers the receivers stationId"

^ stationId!

stationId: aString

```
"Method Version: ark1
 Date of Last Revision: Date today  Oct  5, 1990
 Copyright (C) 1990 The Boeing Company
    All Rights Reserved"
```

"Answers the receiver"

"Set the recievers stationId to aString "

stationId := aString!

taskStatus

```
"Method Version: ark1
 Date of Last Revision: Date today  Oct  5, 1990
 Copyright (C) 1990 The Boeing Company
    All Rights Reserved"
```

"Answers the receivers task status "

^ taskStatus!

taskStatus: anInteger

"Method Version: ark1
    Date of Last Revision: Date today Oct 5, 1990
    Copyright (C) 1990 The Boeing Company
       All Rights Reserved"

"Answers the receiver"

"Set the recievers task status to anInteger
    0 => null
    1 => created
    2 => in progress
    3 => complete
    3 => suspended
    3 => aborted "

( #( 0 1 2 3 4 5 ) includes: anInteger ) ifFalse: [ self error: 'Invalid value f
taskStatus := anInteger!

wipStatus

"Method Version: ark1
    Date of Last Revision: Date today Oct 5, 1990
    Copyright (C) 1990 The Boeing Company
       All Rights Reserved"

"Answers the receivers WIP status "

^ wipStatus!

wipStatus: anInteger

"Method Version: ark1
    Date of Last Revision: Date today Oct 5, 1990
    Copyright (C) 1990 The Boeing Company
       All Rights Reserved"

"Answers the receiver"

"Set the recievers WIP status to anInteger
    0 => pending
    1 => in process
    2 => unknown
    3 => idle "

( #( 0 1 2 3) includes: anInteger ) ifFalse: [ self error: 'Invalid value for WI
wipStatus := anInteger! !

!StationStatus class methods ! !

!StationStatus methods !

stationId

"Method Version: ark1
    Date of Last Revision: Date today Oct 5, 1990
    Copyright (C) 1990 The Boeing Company
       All Rights Reserved"

"Answers the receivers stationId"

^ stationId!

stationId: aString

"Method Version: ark1
    Date of Last Revision: Date today Oct 5, 1990
    Copyright (C) 1990 The Boeing Company All Rights Reserved"

"Answers the receiver"

"Set the recievers stationId to aString "

stationId := aString! !

!CommunicationMessage class methods !

defineMessageStructures

```
"Method Version: ark1
 Date of Last Revision: Date today  Oct 25, 1990
 Copyright (C) 1990 The Boeing Company
    All Rights Reserved"
```

"Define the global dictionary containing
the descriptor for the fields in each type
of message "

Smalltalk at: #FieldsInOrder put: Dictionary new.

```
FieldsInOrder
at: '01' "Alarm Notification"
    put: ( (OrderedCollection new: 5)
            add: (FieldStructure with: #messageType with: 2);
            add: (FieldStructure with: #alarmCode with: 4 );
            add: (FieldStructure with: #location with: 10 );
            add: (FieldStructure with: #timeSet with: 12 );
            add: (FieldStructure with: #diagnosticData with: 216 );
            yourself
        ).
```

^ 'OK'!

new

```
"Method Version: ark1
 Date of Last Revision: Date today  Oct 10, 1990
 Copyright (C) 1990 The Boeing Company
    All Rights Reserved"
```

" "

^ super new defaultValues initialize! !

!CommunicationMessage methods !

defaultValues

```
"Method Version: ark1
 Date of Last Revision: Date today  Oct 11, 1990
 Copyright (C) 1990 The Boeing Company
    All Rights Reserved"
```

" "
"length := 'length from CommunicationMessage'. "
^ self!

getFieldStructureDescription

```
"Method Version: ark1
 Date of Last Revision: Date today  Oct 30, 1990
 Copyright (C) 1990 The Boeing Company
    All Rights Reserved"
```

"Answer the collection of descriptions for
 the fields in the receiver.  Descriptors are stored in a global dictionary called
FieldsInOrder which is defined by class
method defineFieldsInOrder. "

^ FieldsInOrder at: (self messageType)!

initialize

"Method Version: ark1
Date of Last Revision: Date today Oct 10, 1990
Copyright (C) 1990 The Boeing Company
All Rights Reserved"

"To be implemented by subclasses "

^ self!

length

"Method Version: ark1
Date of Last Revision: Date today Oct 5, 1990
Copyright (C) 1990 The Boeing Company
All Rights Reserved"

"Answers receivers length"

^ length!

length: anInteger

"Method Version: ark1
Date of Last Revision: Date today Oct 5, 1990
Copyright (C) 1990 The Boeing Company
All Rights Reserved"

"Answers self"

"Set the receiver length: to anInteger "

length := anInteger sol: 4!

messageType

"Method Version: ark1
Date of Last Revision: Date today Oct 5, 1990
Copyright (C) 1990 The Boeing Company
All Rights Reserved"

"Answers receivers messageType"

^ messageType!

messageType: anInteger

"Method Version: ark1
Date of Last Revision: Date today Oct 5, 1990
Copyright (C) 1990 The Boeing Company
All Rights Reserved"

"Answers self"

"Set the receiver type to anInteger "

messageType := anInteger sol: 2!

package

"Method Version: ark1

```
        Date of Last Revision: Date today  Oct  5, 1990
        Copyright (C) 1990 The Boeing Company
            All Rights Reserved"
```

"Answer
    a string - the message string in the appropriate protocol
    nil - if the string cannot be produced "

"There is a separate package method for RS-232C and for TCP/IP"

^ self! !

printString

```
        "Method Version: ark1
         Date of Last Revision: Date today  Oct 11, 1990
         Copyright (C) 1990 The Boeing Company
            All Rights Reserved"
```

" "

^ 'A Message of type ' , messageType! !

!Object methods !
makeString

```
        "Method Version: ark1
         Date of Last Revision: Date today  Oct 24, 1990
         Copyright (C) 1990 The Boeing Company
            All Rights Reserved"
```

"Answer the reciever as a string  "

( self isKindOf: String ) ifTrue: [ ^ self ].
^ self printString! !

!Object methods !
convertToStringOfLength: anInteger

```
        "Method Version: ark1
         Date of Last Revision: Date today  Oct 24, 1990
         Copyright (C) 1990 The Boeing Company
            All Rights Reserved"
```

"Answer the receiver as a string either
truncated or blank padded on the right
to length anInteger  "

^ self makeString padRightWithBlanksToLength: anInteger! !

!Object methods !
sol: anInteger

```
        "Method Version: ark1
         Date of Last Revision: Date today  Oct 24, 1990
         Copyright (C) 1990 The Boeing Company
            All Rights Reserved"
```

"Answer the receiver as a string either
truncated or blank padded on the right
to length anInteger  "

^ self makeString padRightWithBlanksToLength: anInteger! !

!String methods !
padLeftWithZerosToLength: anInteger

" Revision Level ark01
    Date of Last Revision  Oct 24, 1990 "

"Answer the reciever padded to the
left with zeros to make it length
anInteger. If reciever is longer than
anInteger, it is truncated"

| answer |

(self size > anInteger)
    ifTrue: [^ self copyFrom: 1 to: anInteger].

answer := self.
[ answer size = anInteger ]
    whileFalse: [ answer := '0' , answer ].

^ answer! !

!String methods !
padRightWithBlanksToLength: anInteger

" Revision Level ark01
    Date of Last Revision  Oct 24, 1990 "

"Answer the reciever padded to the
right with blanks to make it length
anInteger. If reciever is longer than
anInteger, it is truncated"

(self size = anInteger)
    ifTrue: [^ self ].

(self size > anInteger)
    ifTrue: [^ self copyFrom: 1 to: anInteger].

^ self , ( String new: ( anInteger - self size ) )! !

!String methods !
calculateLength

"Method Version: ark1
    Date of Last Revision: Date today  Oct 25, 1990
    Copyright (C) 1990 The Boeing Company
       All Rights Reserved"

"Answer the hex representation of the
length of the reciever which is assumed
to be a string of hex characters for a
message "

^ ( self size printString padLeftWithZerosToLength: 4) convertAsciiToHex! !
"construct application".
    ((Smalltalk at: #Application ifAbsent: [])
        isKindOf: Class) ifTrue: [
            ((Smalltalk at: #Application) for:'ComMessage')
                addClass: NestStatus;
                addClass: DispatchChangeAcknowledgement;
                addClass: NegativeAcknowledgement;
                addClass: CartModeChangeAcknowledgement;
                addClass: CartStatusData;
                addClass: CartModeChangeRequest;
                addClass: StationStatusRequest;
                addClass: DispatchChangeRequest;
                addClass: ModeChangeRequest;
                addClass: FieldStructure;
                addClass: NestStatusRequest;
                addClass: StationStatusData;
                addClass: ModeChangeAcknowledgement;
                addClass: AlarmNotification;
                addClass: MaterialHandlerStatus;
                addClass: AlarmMessages;
                addClass: AlarmAcknowledge;
                addClass: AlarmClear;
                addClass: InterfaceSoftwareError;

```
                addClass: CartStatusRequest;
                addClass: NestStatusData;
                addClass: StationStatus;
                addClass: CommunicationMessage;
                addMethod: #makeString forClass: Object;
                addMethod: #convertToStringOfLength: forClass: Object;
                addMethod: #sol: forClass: Object;
                addMethod: #padLeftWithZerosToLength: forClass: String;
                addMethod: #padRightWithBlanksToLength: forClass: String;
                addMethod: #calculateLength forClass: String;
            comments: nil;
            initCode: nil;
            finalizeCode: nil;
            startUpCode: nil]!
"
*************************************************************************
Project : SQC
Date    : Oct 30, 1990
Time    : 18:11:56

Introduction
============

*********************** COMMENTS ***********************
    Date of Last Revision: Date today  Apr  9, 1990
    Date of Last File Out: Date today  Apr  9, 1990

The SQC Application is designed to connect Smalltalk
    applications with SQC code modules written in C.

In addition, this application will automatically use
    the following applications if they are installed:

FourColorMenu

This application is NOT SUPPORTED, however, bug reports,
    improvement suggestions, and kudos can be directed to
    the author (please refrain from criticisms until they
    have metamorphed into constructive suggestions):

Steve O'Neill
        Org. G-8941, MS 7L-22
        Phone 865-3452

Invoked By:
===========

This startup code will not be executed.
    This is a template for starting the application.
    The following code fragment can be used to
    start-up an SQC application:

SQCData new.

Description
===========

Classes :
    SQCData Float

Methods :

*************************************************************************
"!

"Initialize"
```

```
        "The initialize code will be executed automatically,
         at the beginning of the fileIn.  "

Transcript
            cr;
            nextPutAll: 'Filing in SQC Application...';
            cr;
            nextPutAll: '   (requires aprox. <1 min.) ';
            cr.
    !

Object subclass: #SQCData
    instanceVariableNames:
        'superModel dataError rangeError period data '
    classVariableNames:
        'ErrorCodes '
    poolDictionaries: ''!

Number variableByteSubclass: #Float
    classVariableNames: ''
    poolDictionaries: ''!

!SQCData class methods !

errorString: anInteger

"Revision of Method: spol. "
        "Date of Last Revision: Date today  Dec 19, 1989"

"Return the error string for code anInteger.  "

(ErrorCodes includesKey: anInteger)
        ifFalse: [
            ^self new
                error: ('Illegal Index: ' , (anInteger printString))
            ].
    ^ErrorCodes at: anInteger!

initErrorCodes

"Revision of Method: spol. "
        "Date of Last Revision: Date today  Dec 19, 1989"

"Create a new Error Codes dictionary.  "

ErrorCodes :=
        (IdentityDictionary new)
            at: 0
            put: 'No Western Electric Rules Violated';
            at: 1
            put: 'Single Data Point More Than 3 S.D. > Mean';
            at: 2
            put: 'Two of Three Data Points More Than 2 S.D. > Mean';
            at: 3
            put: 'Four of Five Data Points More Than 2 S.D. > Mean';
            at: 4
            put: 'Eight Consecutive Data Points > Mean';
            at: 9
            put: 'Single Data Point More Than 3 S.D. < Mean';
            at: 10
            put: 'Two of Three Data Points More Than 2 S.D. < Mean';
            at: 11
            put: 'Four of Five Data Points More Than 2 S.D. < Mean';
            at: 12
            put: 'Eight Consecutive Data Points < Mean';
            at: 999
            put: 'No Western Electric Rules Violated';
            yourself.!

new
```

"Revision of Method: spo3. "
"Date of Last Revision: Date today  Dec  4, 1989"

"Create a new instance of the receiver. "

ErrorCodes isNil ifTrue: [self initErrorCodes].
^super new initialize! !

!SQCData methods !

at: anInteger

"Revision of Method: spo1. "
    "Date of Last Revision: Date today  Apr 12, 1990"

"Return the anInteger element of the data array. "
    "STUBBED FOR DEMO ONLY--NO TO BE USEDD. "

(anInteger between: 1 and: data size)
        ifFalse: [^self error: ('Illegal Index: ' , anInteger printString)].
    ^data at: anInteger!

at: anInteger put: aFloat

"Revision of Method: spo2. "
    "Date of Last Revision: Date today  Nov 29, 1989"

"Set the anInteger element of the data array
     of the receiver to aFloat. "

(aFloat isKindOf: Float)
        ifFalse: [^self error: ('Not a Float: ' , aFloat printString)].
    (anInteger between: 1 and: data size)
        ifFalse: [^self error: ('Illegal Index: ' , anInteger printString)].
    data at: anInteger put: aFloat!

computeSQC

"Method Version: spo1. "
    "Date of Last Revision: Date today Apr 11, 1990"

"Perform an SQC computation.  Default is
     to perform both a short-term analysis and
     a long-term analysis, using one SQCData object.
     Return a two element array containing the
     short-term results and the long-term results. "
    | array |
    array := Array new: 2.
    self computeSQC: 0.
    array at: 1 put: self results.
    self computeSQC: 1.
    array at: 2 put: self results.
    ^array!

computeSQC: anInteger

"Revision of Method: spo3. "
    "Date of Last Revision: Date today  Nov 29, 1989"

"Compute the values for the receiver,
     based on function anInteger. "

"Filter out all objects anInteger,
                     which are not an instance of
                     positive SmallInteger."
    ((anInteger isMemberOf: SmallInteger)
        and: [anInteger >= 0])
        ifFalse: [
           ^self
              error: (
                 'Illegal SQC Function: ' ,

```
                (anInteger printString)
                )
            ].
    self primComputeSQC: anInteger.!
``` computeSQCLong

```
        "Method Version: spo1.  "
        "Date of Last Revision: Date today Apr 11, 1990"

"Perform an SQC long-term analysis.
         Return self.  "

self primComputeSQC: 1.!
``` computeSQCShort

```
        "Method Version: spo1.  "
        "Date of Last Revision: Date today Apr 11, 1990"

"Perform an SQC short-term analysis.
         Return self.  "

self primComputeSQC: 0.!
``` data

```
        "Revision of Method: spo2.  "
        "Date of Last Revision: Date today  Nov 29, 1989"

"Return the data array of the receiver.  "

^data!
``` dataError

```
        "Revision of Method: spo3.  "
        "Date of Last Revision: Date today  dec 15, 1989"

"Return the data error code of the receiver.  "

^dataError!
``` error: aString

```
        "Method Version: spo1.  "
        "Date of Last Revision: Date today  Dec 15, 1989"

"Post an error message.  "

(superModel notNil)
        ifTrue: [^superModel error: aString].

(Smalltalk includesKey: #FourColorMenu)
        ifTrue: [
            CursorManager normal change.
            (Smalltalk at: #FourColorMenu)
                message: ('Error: ' , aString)
                colorArray: #(4 14 14 4).
            ^false
                ]
        ifFalse: [
            CursorManager normal change.
            Menu
                message: ('Error: ' , aString).
            ^false
                ].!
``` initFlag

```
        "Revision of Method: spo1.  "
        "Date of Last Revision: Date today  Apr 11, 1990"
```

"Return a Boolean indicating
 whether or not any data computation
 has been made by the receiver. "

^(data at: 6) = (-1 asFloat)!

initialize

"Revision of Method: spo6. "
"Date of Last Revision: Date today  Apr 11, 1990"

"Initialize the defaults for the receiver. "

dataError := 0.
rangeError := 0.
period := 1.
data := Array new: 40.
1 to: data size do: [:index |
    data at: index put: Float new.
                    ].
data
    "Initialize the Init Flag"
    at: 6
    put: -1 asFloat;
        "Initialize the random sample size. "
    at: 28
    put: 4 asFloat.!

mean

"Revision of Method: spo1. "
"Date of Last Revision: Date today  Apr 11, 1990"

"Return the mean of the receiver. "

^data at: 1!

newValue: aFloat

"Revision of Method: spo3. "
"Date of Last Revision: Date today  Apr 30, 1990"

"Set aFloat as the new data value for
 further processing. "

(aFloat isKindOf: Float)
    ifFalse: [^self error: ('Not a Float: ' , aFloat printString)].
self initFlag
    ifTrue: [
        self period: 1.
        data at: 1 put: aFloat.
        data at: 2 put: (aFloat / 3).
            ].
data at: 5 put: aFloat.!

period

"Revision of Method: spo2. "
"Date of Last Revision: Date today  Nov 29, 1989"

"Return the period of the receiver. "

^period!

period: anInteger

"Revision of Method: spo3. "
"Date of Last Revision: Date today  Apr  9, 1990"

"Set the receivers period to anInteger. "
"anInteger should be a SmallInteger
 (between -65536 to +65535 inclusive). "

```
        (anInteger isKindOf: Integer)
            ifFalse: [^self error: ('Not a Integer: ' , anInteger printString)].
        period := anInteger!

primComputeSQC: anInteger

"Revision of Method: spo3.  "
        "Date of Last Revision: Date today  Nov 29, 1989"
        "Compute the values for the receiver,
          based on function anInteger, using
          the user primitive #computeSQC.  "

"Default primitive assumptions:
            (anInteger == 0)  --> SQC Short-Term
            (anInteger == 1)  --> SQC Long-Term
            (anInteger > 1)   --> Undefined
        "

<primitive: computeSQC>
        self primitiveFailed.!

rangeError

"Revision of Method: spo3.  "
        "Date of Last Revision: Date today  dec 15, 1989"

"Return the range error code of the receiver.  "

^rangeError!

release

"Revision of Method: spo1.  "
        "Date of Last Revision: Date today  Dec 15, 1989"

"Release the superModel of the receiver.  "

superModel := nil.!

release: anObject

"Revision of Method: spo1.  "
        "Date of Last Revision: Date today  Apr  9, 1990"

"If the receiver is attached to anObject, release
          it from the receiver, and inform it to release
          the receiver.  Otherwise, do nothing.  "

(anObject = #all)
        ifTrue: [
            ^self release: superModel
                ].

(anObject = superModel)
        ifTrue: [
            superModel := nil.
            ^anObject release: self
                ].

^true!

results

"Revision of Method: spo1.  "
        "Date of Last Revision: Date today  Dec 19, 1989"

"Return an Array containing the error codes
          and their string interpretations.  "
```

```
^Array
    with: dataError
    with: (SQCData errorString: dataError)
    with: rangeError
    with: (SQCData errorString: rangeError)!
``` standardDeviation

```
    "Revision of Method: spo1. "
    "Date of Last Revision: Date today  Apr 11, 1990"

"Return the standard deviation of the receiver. "

^data at:2!
``` superModel

```
    "Revision of Method: spo1. "
    "Date of Last Revision: Date today  Dec 15, 1989"

"Return the superModel of the receiver. "

^superModel!
``` superModel: anSQCModel

```
    "Revision of Method: spo1. "
    "Date of Last Revision: Date today  Dec 15, 1989"

"Set the superModel of the receiver. "

superModel := anSQCModel.!
``` value

```
    "Revision of Method: spo1. "
    "Date of Last Revision: Date today  Apr 30, 1990"

"Return aFloat which is the data value. "

^data at: 5! !
```

!Float class methods !

floatError
```
    "Query the floating point coprocessor as
        to the type of exception and report it."
    | status |
    status := self status.
    (status bitAnd: 8) -= 0
        ifTrue: [^self error: 'Float overflow exception'].
    (status bitAnd: 16r10) -= 0
        ifTrue: [^self error: 'Float underflow exception'].
    (status bitAnd: 4) -= 0
        ifTrue: [^self error: 'Float divide by zero exception'].
    (status bitAnd: 2) -= 0
        ifTrue: [^self error: 'Float denormalized operand'].
    (status bitAnd: 1) -= 0
        ifTrue: [^self error: 'Float invalid operation'].
    (status bitAnd: 16r80) -= 0
        ifTrue: [^self error: 'Math coprocessor missing'].
    ^self error: 'Float undefined exception'!
``` fromInteger: anInteger
```
    "Check to see if the math coprocessor is present. If it is then
        use the original primitive, else call user defined primitive.
        Answer a floating point representation of the argument
        anInteger."
    | result status |
    <primitive: 40>
    status := self status.
    (status bitAnd: 16r80) -= 0
```

```
                ifTrue: [result := self new.
                        self new floatPrimWith: 0 with: anInteger with: result.
                        ^result]
                ifFalse: [^self floatError]!

new
        "Answer a float initialized to zero"
    ^self basicNew: 8!

pi
        "Answer the floating point
         representation of pi."
    ^1 arcTan * 4!

status
        "Answer the status of the floating point
         coprocessor as a small integer (refer to
         coprocessor status word definition)."
    <primitive: 86>! !

!Float methods !

* aNumber
        "Check to see if the math coprocessor is present. If it is then
         use the original primitive, else call user defined primitive.
         Answer the result of multiplying the receiver by aNumber."
    | result status |
    <primitive: 49>
    aNumber class == Float
        ifTrue: [status := self class status.
                 (status bitAnd: 16r80) ~= 0
                    ifTrue: [result := self class new.
                             self floatPrimWith: 12 with: aNumber with: result.
                             ^result]
                    ifFalse: [^self class floatError]]
        ifFalse: [^self * (aNumber asFloat)]!

+ aNumber
        "Check to see if the math coprocessor is present. If it is then
         use the original primitive, else call user defined primitive.
         Answer sum of the receiver and aNumber."
    | result status |
    <primitive: 41>
    aNumber class == Float
        ifTrue: [status := self class status.
                 (status bitAnd: 16r80) ~= 0
                    ifTrue: [result := self class new.
                             self floatPrimWith: 10 with: aNumber with: result.
                             ^result]
                    ifFalse: [^self class floatError]]
        ifFalse: [^self + (aNumber asFloat)]!

- aNumber
        "Check to see if the math coprocessor is present. If it is then
         use the original primitive, else call user defined primitive.
         Answer the result of subtracting the receiver and aNumber."
    | result status |
    <primitive: 42>
    aNumber class == Float
        ifTrue: [status := self class status.
                 (status bitAnd: 16r80) ~= 0
                    ifTrue: [result := self class new.
                             self floatPrimWith: 11 with: aNumber with: result.
                             ^result]
                    ifFalse: [^self class floatError]]
        ifFalse: [^self - (aNumber asFloat)]!

/ aNumber
        "Check to see if the math coprocessor is present. If it is then
         use the original primitive, else call user defined primitive.
         Answer the result of dividing the receiver by aNumber."
```

```
| result status |
<primitive: 50>
aNumber class == Float
    ifTrue: [status := self class status.
            (status bitAnd: 16r80) ~= 0
                ifTrue: [aNumber = 0 ifTrue: [^self error: '0 divisor'].
                        result := self class new.
                        self floatPrimWith: 13 with: aNumber with: result.
                        ^result]
                ifFalse: [^self class floatError]]
    ifFalse: [^self / (aNumber asFloat)]!

// aNumber
    "Answer the integer quotient after dividing
     the receiver by aNumber with truncation
     towards negative infinity."
    | answer quotient |
    quotient := self / aNumber.
    answer := quotient truncated.
    quotient < 0
        ifTrue: [
            answer = quotient
                ifFalse: [^answer - 1]].
    ^answer!

< aNumber
    "Check to see if the math coprocessor is present. If it is then
     use the original primitive, else call user defined primitive.
     Answer true if the receiver is less than aNumber, else answer false."
    | result status |
    <primitive: 43>
    aNumber class == Float
        ifTrue: [status := self class status.
                (status bitAnd: 16r80) ~= 0
                    ifTrue: [result := self class new.
                            ^self floatPrimWith: 15 with: aNumber with: result]
                    ifFalse: [^self class floatError]]
        ifFalse: [(aNumber isKindOf: Number)
                    ifTrue: [^self < (aNumber asFloat)]
                    ifFalse: [^false]]!

<= aNumber
    "Answer true if the receiver is less than
     or equal to aNumber, else answer false."
    ^(aNumber asFloat < self) not!

= aNumber
    "Check to see if the math coprocessor is present. If it is then
     use the original primitive, else call user defined primitive.
     Answer true if the receiver is equal to aNumber, else answer false."
    | result status |
    <primitive: 47>
    aNumber class == Float
        ifTrue: [status := self class status.
                (status bitAnd: 16r80) ~= 0
                    ifTrue: [result := self class new.
                            ^self floatPrimWith: 16 with: aNumber with: result]
                    ifFalse: [^self class floatError]]
        ifFalse: [(aNumber isKindOf: Number)
                    ifTrue: [^self = (aNumber asFloat)]
                    ifFalse: [^false]]!

> aNumber
    "Answer true if the receiver is greater
     than aNumber, else answer false."
    ^aNumber asFloat < self!

>= aNumber
    "Answer true if the receiver is greater than
     or equal to aNumber, else answer false."
    ^(self < aNumber) not!
```

```
\\ aNumber
    "Answer the integer remainder after dividing
    the receiver by aNumber with truncation
    towards negative infinity."
    ^(self - (self // aNumber * aNumber))
        truncated!

arcTan
    "Check to see if the math coprocessor is present. If it is then
    use the original primitive, else call user defined primitive.
    Answer the arc-tangent, an angle in radians, of the receiver."
    | result status |
    <primitive: 85>
    status := self class status.
    (status bitAnd: 16r80) ~= 0
        ifTrue: [result := self class new.
            self floatPrimWith: 6 with: self with: result.
            ^result]
        ifFalse: [^self class floatError]!

asFloat
    "Answer the receiver as a floating
    point number."
    ^self!

cos
    "Check to see if the math coprocessor is present. If it is then
    use the original primitive, else call user defined primitive.
    Answer the cosine of the receiver.  The receiver is an angle
    measured in radians"
    | result status |
    <primitive: 30>
    status := self class status.
    (status bitAnd: 16r80) ~= 0
        ifTrue: [result := self class new.
            self floatPrimWith: 4 with: self with: result.
            ^result]
        ifFalse: [^self class floatError]!

degreesToRadians
    "Answer the number of radians the
    receiver represents in degrees."
    ^self * Float pi / 180!

exp
    "Check to see if the math coprocessor is present. If it is then
    use the original primitive, else call user defined primitive.
    Answer the exponential of the receiver."
    | result status |
    <primitive: 45>
    status := self class status.
    (status bitAnd: 16r80) ~= 0
        ifTrue: [result := self class new.
            self floatPrimWith: 1 with: self with: result.
            ^result]
        ifFalse: [^self class floatError]!

exponent
    "Check to see if the math coprocessor is present. If it is then
    use the original primitive, else call user defined primitive.
    Answer the floating point number whose value
    is the exponent part of the floating
    point representation of the receiver."
    | result status |
    <primitive: 53>
    status := self class status.
    (status bitAnd: 16r80) ~= 0
        ifTrue: [result := self class new.
            self floatPrimWith: 18 with: self with: result.
            ^result]
        ifFalse: [^self class floatError]!

floatPrimWith: aFunction
    with: anInteger
    with: result
```

```
        "Call user's primitive to perform
        floating point calculations"
    <primitive: dispatch>
    self primitiveFailed!

hash
        "Answer the integer hash value for the receiver."
    | answer index |
    answer := 0.
    index := 8.
    [index <= 4]
        whileFalse: [
            answer := answer + ((self at: index) hash).
            index := index - 1].
    ^answer!

ln
        "Check to see if the math coprocessor is present. If it is then
        use the original primitive, else call user defined primitive.
        Answer the natural log of the receiver."
    | result status |
    <primitive: 46>
    status := self class status.
    (status bitAnd: 16r80) -= 0
        ifTrue: [result := self class new.
                self floatPrimWith: 2 with: self with: result.
                ^result]
        ifFalse: [^self class floatError]!

negated
        "Answer the receiver subtracted from zero."
    ^0 asFloat - self!

printOn: aStream
        "Answer the receiver.  Append the ASCII
        representation (maximum of 8 digits) of
        the receiver to aStream."
    | digitCount integer number rounder scale n |
    (number := self) < 0
        ifTrue: [
            aStream nextPut: $-.
            number := self negated].
    rounder := 1/20000000.
    number = 0
        ifTrue: [^aStream nextPutAll: '0.0'].
    scale := 0.
    [number >= 10]
        whileTrue: [
            number := number / 10.
            scale := scale + 1].
    [number < 1]
        whileTrue: [
            number := number * 10.
            scale := scale - 1].
    number := number + rounder.
    number >= 10
        ifTrue: [
            number := number /10.
            scale := scale + 1].
    (scale > 7 or: [
    scale < -7 or: [
    scale < 0 and: [
    n := number * (10 raisedToInteger: 7 + scale).
    ((n - n truncated) * (10 raisedToInteger:
        scale negated)) truncated -= 0]]])
        ifFalse: [
            number := number * (10 raisedToInteger: scale).
            rounder := rounder * (10 raisedToInteger: scale).
            scale := 0].
    digitCount := aStream position.
    integer := number truncated.
```

```
        number := number - integer.
        integer printOn: aStream.
        aStream nextPut: $..
        rounder := rounder + rounder.
        digitCount := 9 - (aStream position - digitCount).
        [number := number * 10.
        integer := number truncated.
        number := number - integer.
        aStream nextPut: (Character digitValue: integer).
        (digitCount := digitCount - 1) > 0 and:
        [(rounder := rounder * 10) <= number]]
            whileTrue: -[].
        scale = 0
            ifFalse: [
                aStream nextPut: $e.
                scale printOn: aStream]!

radiansToDegrees
        "Answer the number of degrees the
         receiver represents in radians."
        ^self * 180 / Float pi!

reciprocal
        "Answer one divided by the receiver."
        ^1 asFloat / self!

significand
        "Check to see if the math coprocessor is present. If it is then
         use the original primitive, else call user defined primitive.
         Answer the floating point number whose value
         is the significand part of the floating
         point representation of the receiver."
        | result status |
        <primitive: 52>
        status := self class status.
        (status bitAnd: 16r80) -= 0
            ifTrue: [result := self class new.
                    self floatPrimWith: 9 with: self with: result.
                    ^result]
            ifFalse: [^self class floatError]!

sin
        "Check to see if the math coprocessor is present. If it is then
         use the original primitive, else call user defined primitive.
         Answer the sine of the receiver.  The receiver is an angle
         measured in radians"
        | result status |
        <primitive: 48>
        status := self class status.
        (status bitAnd: 16r80) -= 0
            ifTrue: [result := self class new.
                    self floatPrimWith: 3 with: self with: result.
                    ^result]
            ifFalse: [^self class floatError]!

sqrt
        "Check to see if the math coprocessor is present. If it is then
         use the original primitive, else call user defined primitive.
         Answer the square root of the receiver."
        | result status |
        <primitive: 44>
        status := self class status.
        (status bitAnd: 16r80) -= 0
            ifTrue: [result := self class new.
                    self floatPrimWith: 7 with: self with: result.
                    ^result]
            ifFalse: [^self class floatError]!

tan
        "Check to see if the math coprocessor is present. If it is then
         use the original primitive, else call user defined primitive.
         Answer the tangent of the receiver.  The
```

```
        receiver is an angle measured in radians"
| result status |
<primitive: 83>
status := self class status.
(status bitAnd: 16r80) -= 0
    ifTrue: [result := self class new.
            self floatPrimWith: 5 with: self with: result.
            ^result]
    ifFalse: [^self class floatError]!

timesTwoPower: anInteger
    "Check to see if the math coprocessor is present. If it is then
     use the original primitive, else call user defined primitive.
     Answer 2 to the exponent anInteger multiplied by the receiver."
| result status |
<primitive: 54>
status := self class status.
(status bitAnd: 16r80) -= 0
    ifTrue: [result := self class new.
            self floatPrimWith: 14 with: anInteger with: result.
            ^result]
    ifFalse: [^self class floatError]!

truncated

"Check to see if the math coprocessor
     is present. If it is then use the original
     primitive, else call user defined primitive.
     Answer the receiver as a kind of Integer
     truncating the fraction part."
    "I modified this according to October, 1989
     SCOOP bug fix. "

| answer float i partialInt result scale status |
<primitive: 51>
status := self class status.
(status bitAnd: 16r80) -= 0
    ifTrue: [
        i := 0.
        result := 0.
        [(self abs) >= (result abs)]
            whileTrue: [result := (2 raisedToInteger: i).
                        i := i + 1].
        result := (self sign) * (result - 1).

^self floatPrimWith: 8 with: self with: result
        ]
    ifFalse: [
        scale := self exponent truncated.
        float := self timesTwoPower: scale \\ 13 - scale.
        answer := float truncated.
        float := float - answer asFloat.
        scale // 13 timesRepeat: [
            float := float timesTwoPower: 13.
            partialInt := float truncated.
            answer := answer * 8192 + partialInt.
            float := (float - partialInt asFloat).
                            ].
        ^answer
         ]! !
```

"construct application"
    ((Smalltalk at: #Application ifAbsent: [])
        isKindOf: Class) ifTrue: [
            ((Smalltalk at: #Application) for:'SQC')
                addClass: SQCData;
                addClass: Float;
                comments: '********************** COMMENTS ******************
    Date of Last Revision: Date today   Apr  9, 1990
    Date of Last File Out: Date today   Apr  9, 1990

The SQC Application is designed to connect Smalltalk
    applications with SQC code modules written in C.

In addition, this application will automatically use
the following applications if they are installed:

FourColorMenu

This application is NOT SUPPORTED, however, bug reports,
improvement suggestions, and kudos can be directed to
the author (please refrain from criticisms until they
have metamorphed into constructive suggestions):

Steve O''Neill
    Org. G-8941, MS 7L-22
    Phone 865-3452

';

initCode: '
"The initialize code will be executed automatically,
 at the beginning of the fileIn. "

Transcript
    cr;
    nextPutAll: ''Filing in SQC Application...'';
    cr;
    nextPutAll: ''   (requires aprox. <1 min.) '';
    cr.

';

finalizeCode: '
"The finalize code will be executed automatically,
 when the fileIn is complete. "
                            "Initialize the ErrorCodes dictionary. "
    (Smalltalk at: #SQCData)
        initErrorCodes.

Transcript
        cr;
        nextPutAll: ''Modifying GO file...'';
        cr.

(Disk file: ''go'')
        upTo: (33 asCharacter);
        cr;
        nextPutAll:
            ''Smalltalk loadPrimitivesFrom: (Disk fullDirName , ''''sqc.bin''''
        nextPut: (33 asCharacter);
        cr;
        close.

Transcript
        cr;
        nextPutAll: ''Loading primitive...'';
        cr.

Smalltalk
        loadPrimitivesFrom:
            (Disk fullDirName , ''sqc.bin'').

Transcript
        cr;
        nextPutAll: ''SQC Application FileIn Complete.'';
        cr.

';

startUpCode: '
    This startup code will not be executed.
    This is a template for starting the application.
    The following code fragment can be used to
    start-up an SQC application:

SQCData new.

']!

"Finalize"

```
    "The finalize code will be executed automatically,
     when the fileIn is complete. "

"Initialize the ErrorCodes dictionary. "
    (Smalltalk at: #SQCData)
        initErrorCodes.

Transcript
        cr;
        nextPutAll: 'Modifying GO file...';
        cr.

(Disk file: 'go')
      upTo: (33 asCharacter);
      cr;
      nextPutAll:
          'Smalltalk loadPrimitivesFrom: (Disk fullDirName , ''sqc.bin'').';
      nextPut: (33 asCharacter);
      cr;
      close.

Transcript
      cr;
      nextPutAll: 'Loading primitive...';
      cr.

Smalltalk
      loadPrimitivesFrom:
          (Disk fullDirName , 'sqc.bin').

Transcript
      cr;
      nextPutAll: 'SQC Application FileIn Complete.';
      cr.
!
"
****************************************************************************
Project : ESQC
Date    : Oct 30, 1990
Time    : 18:16:29

Introduction
============

*********************** COMMENTS ************************
    Date of Last Revision: Date today   May  2, 1990
    Date of Last File Out: Date today   May  2, 1990
    Application Version: 2.10

The ESQC Application is designed to connect Smalltalk
    applications with SQC code modules written in C,
    and to provide extended capabilities for creation
    and display of graphs.

This application requires the following applications
    to be previously installed:

ChangePane
        Edit Pane/Menu Classes
        Dictionary Inspector
        UniqueFile
        FileBrowser
        NetworkPrinter
        ColorConverter
        PostScriptPrinter
        FreeDrawing
        Table In addition, this application will automatically use
    the following applications if they are installed:
```

```
    PagingMenu
    FourColorMenu
    ColorPrompter
    Escape

This application is NOT SUPPORTED, however, bug reports,
improvement suggestions, and kudos can be directed to
the author (please refrain from criticisms until they
have metamorphed into constructive suggestions):

Steve O'Neill
    Org. G-8941, MS 7L-22
    Phone 865-3452

Invoked By:
===========

This startup code will not be executed.
    This is a template for starting the application.
    The following code fragment can be used to
    start-up an ESQC application:

SQCModel new.

Description
===========

Classes :
    SQCFileManager DateTimeStamp SQCData SQCPlotter
    SQCPrinter CenteredListPane HierarchyMenu
    SQCModel SQCSuperModel Float SQCDisplay
    DictionaryEditor DataSample Methods :
    #asTime defined in String.
    #centeredTitleInPane: defined in String.
    #asDate defined in String.
    #convertToForm defined in ColorForm.
    #collect: defined in Dictionary.
    #subtractSeconds: defined in Time.
    #addSeconds: defined in Time.
    #previous defined in FileStream.
    #defaultPath defined in Directory.
    #waitSeconds: defined in Time class.
    #fromString: defined in Time class.
    #getFileName:ext: defined in File class.
    #fileName:extension: defined in File class.
    #getDisk defined in Directory class.
    #yesOrNoFor: defined in Menu class.
    #labelArray:lineArray:selectorArray: defined in Menu class.
    #fromString: defined in Date class.

************************************************************************
"!

"Initialize"

"The initialize code will be executed automatically,
     at the beginning of the fileIn. "

Transcript
        cr;
        nextPutAll: 'Filing in ESQC Application...';
        cr;
        nextPutAll: '   (requires aprox. <1 min.) ';
        cr.
!
```

```
Object subclass: #SQCFileManager
  instanceVariableNames:
    'fileFormat fileStream lastEntry namingConvention periodEnd periodStart supe
  classVariableNames: ''
  poolDictionaries: ''!

Object subclass: #DateTimeStamp
  instanceVariableNames:
    'date time '
  classVariableNames: ''
  poolDictionaries: ''!

Object subclass: #SQCData
  instanceVariableNames:
    'superModel dataError rangeError period data '
  classVariableNames:
    'ErrorCodes '
  poolDictionaries: ''!

Smalltalk at: #ColorForm ifAbsent: [
Form subclass: #ColorForm
  instanceVariableNames: ''
  classVariableNames: ''
  poolDictionaries: '']!

Smalltalk at: #File ifAbsent: [
Object subclass: #File
  instanceVariableNames:
    'name fileId directory '
  classVariableNames:
    'PageSize '
  poolDictionaries: '']!

Object subclass: #SQCPlotter
  instanceVariableNames:
    'averagingPeriods colors dataStream form limit midPoint part pen process sam
  classVariableNames: ''
  poolDictionaries: ''!

Smalltalk at: #Date ifAbsent: [
Magnitude subclass: #Date
  instanceVariableNames:
    'day '
  classVariableNames:
    'MonthNames MonthStrings '
  poolDictionaries: '']!

Smalltalk at: #String ifAbsent: [
FixedSizeCollection variableByteSubclass: #String
  classVariableNames: ''
  poolDictionaries:
    'CharacterConstants ']!

Smalltalk at: #Dictionary ifAbsent: [
Set subclass: #Dictionary
  instanceVariableNames: ''
  classVariableNames: ''
  poolDictionaries: '']!

Object subclass: #SQCPrinter
  instanceVariableNames:
    'colorConverter outputStream pageCounter pause printerPort printerType start
  classVariableNames:
    'Printers Ports '
  poolDictionaries: ''!

ListPane subclass: #CenteredListPane
  instanceVariableNames:
    'centeredList '
  classVariableNames: ''
```

```
    poolDictionaries: ''!

Object subclass: #SQCModel
  instanceVariableNames:
    'display endDateTime longData longFileManager part plotter printer proces.
  classVariableNames: ''
  poolDictionaries: ''!

Smalltalk at: #FileStream ifAbsent: [
ReadWriteStream subclass: #FileStream
  instanceVariableNames:
    'file pageStart writtenOn lastByte lineDelimiter '
  classVariableNames: ''
  poolDictionaries:
    'CharacterConstants ']!

Smalltalk at: #Directory ifAbsent: [
Object subclass: #Directory
  instanceVariableNames:
    'drive pathName volumeLabel '
  classVariableNames: ''
  poolDictionaries: '']!

Smalltalk at: #Time ifAbsent: [
Magnitude subclass: #Time
  instanceVariableNames:
    'seconds '
  classVariableNames:
    'TimeTickOn ValueArray '
  poolDictionaries: '']!

Object subclass: #SQCSuperModel
  instanceVariableNames:
    'exceptionProcessor sqcModels '
  classVariableNames: ''
  poolDictionaries: ''!

Number variableByteSubclass: #Float
  classVariableNames: ''
  poolDictionaries: ''!

FreeDrawing subclass: #SQCDisplay
  instanceVariableNames:
    'buttons controls messagePane startUpFlag '
  classVariableNames: ''
  poolDictionaries:
    'FunctionKeys '!

DictionaryInspector subclass: #DictionaryEditor
  instanceVariableNames: ''
  classVariableNames: ''
  poolDictionaries: ''!

Smalltalk at: #Menu ifAbsent: [
Object subclass: #Menu
  instanceVariableNames:
    'backColor colorArray currentLine foreColor frame hiddenArea highlightColor
  classVariableNames: ''
  poolDictionaries:
    'FunctionKeys CharacterConstants ']!
Object subclass: #DataSample
  instanceVariableNames:
    'dateTimeStamp equalityBlock miscInfo value '
  classVariableNames: ''
  poolDictionaries: ''!

Menu subclass: #HierarchyMenu
  instanceVariableNames:
    'subMenus '
  classVariableNames: ''
  poolDictionaries:
    'FunctionKeys CharacterConstants '!
```

```
!SQCFileManager class methods !

new

"Revision of Method: spo1.  "
        "Date of Last Revision: Date today   Apr 11, 1990"

"Create a new instance of the receiver.  "

^super new initialize! !

!SQCFileManager methods !

close

"Revision of Method: spo1.  "
        "Date of Last Revision: Date today   Apr 30, 1990"

"Close the receiver.  "

fileStream close.!

getLastEntry

"Revision of Method: spo1.  "
        "Date of Last Revision: Date today   Apr 11, 1990"

"Get from disk, and return the DateTimeStamp
         of the last log entry.  If none, return nil.  "

^nil!

initialize

"Revision of Method: spo3.  "
        "Date of Last Revision: Date today   Apr 30, 1990"

"Initialize the defaults for the receiver.  "

"Stub for Demo.  "
    fileStream := Disk getUniqueFile.!

lastEntry
        "Revision of Method: spo1.  "
        "Date of Last Revision: Date today   Apr 11, 1990"

"Return the DateTimeStamp of the last
         log entry.  If it is not buffered locally,
         retrieve it from disk.  If none, return
         DateTimeStamp new.  "

lastEntry isNil
        ifFalse: [^lastEntry].
    lastEntry := self getLastEntry.
    lastEntry isNil
        ifFalse: [^lastEntry]
        ifTrue: [^DateTimeStamp new].!

log: aDataSample
    process: aSymbol
    for: anSQCData
    withResults: anArray "Revision of Method: spo6.  "
        "Date of Last Revision: Date today   May  1, 1990"

"Stubbed for Demo.  "

fileStream isNil
        ifTrue: [^self].
    lastEntry := aDataSample dateTimeStamp.
    fileStream
```

```
nextPutAll: ('Process: ' , superModel process asString);
cr;
nextPutAll: ('Task: ' , superModel task asString);
cr;
nextPutAll: ('Date/Time: ' , aDataSample dateTimeStamp printString);
cr;
nextPutAll: ('SQC Call: ' , aSymbol);
cr;
nextPutAll: ('Data Value: ' , anSQCData value printString);
cr;
nextPutAll: ('Data Period: ' , anSQCData period printString);
cr;
nextPutAll: ('Sampling Period Start: ' , superModel startDateTime printS
cr;
nextPutAll: ('Sampling Period End: ' , superModel endDateTime printStrin
cr;
nextPutAll: (
    'Mean: ' ,
    ((anSQCData at: 1) printFraction: 2)
            );
cr;
nextPutAll: (
    'Mean Error: ' ,
    ((anArray at: 1) printString) ,
    ' -- ' ,
    (anArray at: 2)
            );
cr;
nextPutAll: (
    'Sigma: ' ,
    ((anSQCData at: 2) printFraction: 2)
            );
cr;
nextPutAll: (
    'Variance Error: ' ,
    ((anArray at: 3) printString) ,
    ' -- ' ,
    (anArray at: 4)
            );
cr;
nextPutAll: (
    'Sample Size: ' ,
    ((anSQCData at: 28) printFraction: 2)
            );
cr;
cr;
nextPutAll: 'Data: ';
cr;
cr;
nextPutAll: (
    (anSQCData at: 29) printFraction: 2
            );
nextPutAll: '     ';
nextPutAll: (
    (anSQCData at: 35) printFraction: 2
            );
cr;
nextPutAll: (
    (anSQCData at: 30) printFraction: 2
            );
nextPutAll: '     ';
nextPutAll: (
    (anSQCData at: 36) printFraction: 2
            );
cr;
nextPutAll: (
    (anSQCData at: 31) printFraction: 2
            );
nextPutAll: '     ';
nextPutAll: (
    (anSQCData at: 37) printFraction: 2
            );
```

```
        cr;
        nextPutAll: (
            (anSQCData at: 32) printFraction: 2
                    );
        nextPutAll: '    ';
        nextPutAll: (
            (anSQCData at: 38) printFraction: 2
                    );
        cr;
        cr;
        nextPutAll: 'X-Bar t-scores:';
        cr;
        cr;
        nextPutAll: (
            (anSQCData at: 8) printFraction: 2
                    );
        nextPutAll: '    ';
        nextPutAll: (
            (anSQCData at: 13) printFraction: 2
                    );
        cr;
        nextPutAll: (
            (anSQCData at: 9) printFraction: 2
                    );
        nextPutAll: '    ';
        nextPutAll: (
            (anSQCData at: 14) printFraction: 2
                    );
        cr;
        nextPutAll: (
            (anSQCData at: 10) printFraction: 2
                    );
        nextPutAll: '    ';
        nextPutAll: (
            (anSQCData at: 15) printFraction: 2
                    );
        cr;
        nextPutAll: (
            (anSQCData at: 11) printFraction: 2
                    );
        nextPutAll: '    ';
        nextPutAll: (
            (anSQCData at: 16) printFraction: 2
                    );
        cr;
        nextPutAll: (
            (anSQCData at: 12) printFraction: 2
                    );
        nextPutAll: '    ';
        nextPutAll: (
            (anSQCData at: 17) printFraction: 2
                    );
        cr;
        cr;
        nextPutAll: 'Standard Deviation t-scores:';
        cr;
        cr;
        nextPutAll: (
            (anSQCData at: 18) printFraction: 2
                    );
        nextPutAll: '    ';
        nextPutAll: (
            (anSQCData at: 23) printFraction: 2
                    );
        cr;
        nextPutAll: (
            (anSQCData at: 19) printFraction: 2
                    );
        nextPutAll: '    ';
        nextPutAll: (
            (anSQCData at: 24) printFraction: 2
                    );
```

```
    cr;
    nextPutAll: (
        (anSQCData at: 20) printFraction: 2
                );
    nextPutAll: '    ';
    nextPutAll: (
        (anSQCData at: 25) printFraction: 2
                );
    cr;
    nextPutAll: (
        (anSQCData at: 21) printFraction: 2
                );
    nextPutAll: '    ';
    nextPutAll: (
        (anSQCData at: 26) printFraction: 2
                );
    cr;
    nextPutAll: (
        (anSQCData at: 22) printFraction: 2
                );
    nextPutAll: '    ';
    nextPutAll: (
        (anSQCData at: 27) printFraction: 2
                );
    cr;
    cr;
    flush.!
``` release

```
    "Revision of Method: spo2.  "
    "Date of Last Revision: Date today  Apr 11, 1990"

"Release the superModel of the receiver.  "

superModel := nil.
    fileStream isNil
        ifFalse: [
            fileStream close.
            fileStream := nil.
                ].!
``` release: anObject

```
    "Revision of Method: spo2.  "
    "Date of Last Revision: Date today  Apr 11, 1990"

"If the receiver is attached to anObject, release
     it from the receiver, and inform it to release
     the receiver.  Otherwise, do nothing.  "

(anObject isNil)
        ifTrue: [^true].

(anObject = #all)
        ifTrue: [
            self
                release: fileStream;
                release: superModel.
            ^true
                ].

(anObject = superModel)
        ifTrue: [
            superModel := nil.
            ^anObject release: self
                ].
    (anObject = fileStream)
        ifTrue: [
            fileStream close.
            fileStream := nil.
                ].
```

```
^true!

showRawSQCData

"Method Version: spo2.  "
        "Date of Last Revision: Date today Apr 30, 1990"

"Open a FileBrowser window displaying the
         raw SQC data.  <aString> represents the
         taskIdString or processIdString for which
         to get the data.  "
        "Stubbed for Demo.  "

(Smalltalk at: #FileBrowser) new
        open: fileStream file name
        on: Disk.!

superModel

"Revision of Method: spo1.  "
        "Date of Last Revision: Date today  Dec 14, 1989"

"Return the superModel of the receiver.  "

^superModel!

superModel: anSQCModel

"Revision of Method: spo1.  "
        "Date of Last Revision: Date today  Dec 14, 1989"

"Set the superModel of the receiver.  "

superModel := anSQCModel.! !

!DateTimeStamp class methods !

new

"Method Version: spo1.  "
        "Date of Last Revision: Date today  Dec  1, 1989"

"Return a new instance
         of the receiver.  "

^super new date: Date today time: Time now! !

!DateTimeStamp methods !

< anObject
        "Method Version: spo1.  "
        "Date of Last Revision: Date today  Apr 11, 1990"

"Return a Boolean indicating the relationship
         of the receiver to anObject.  anObject may be
         a Date, a Time, or a DateTimeStamp.  "

(anObject isKindOf: Date)
        ifTrue: [^self date < anObject].
    (anObject isKindOf: Time)
        ifTrue: [^self time < anObject].
    (anObject isKindOf: DateTimeStamp)
        ifTrue: [
            (self date < anObject date)
                ifTrue: [^true]
                ifFalse: [
                    (self date = anObject date)
                        ifFalse: [^false]
                        ifTrue: [^self time < anObject time].
                    ]
```

```
                          ].
            ^self error: ('ERROR: Unknown argument ' , anObject printString)!

<= anObject

"Method Version: spol.  "
            "Date of Last Revision: Date today  Apr 11, 1990"

"Return a Boolean indicating the relationship
             of the receiver to anObject.  anObject may be
             a Date, a Time, or a DateTimeStamp.  "

(anObject isKindOf: Date)
            ifTrue: [^self date <= anObject].
        (anObject isKindOf: Time)
            ifTrue: [^self time <= anObject].
        (anObject isKindOf: DateTimeStamp)
            ifTrue: [
                (self date < anObject date)
                    ifTrue: [^true]
                    ifFalse: [
                        (self date = anObject date)
                            ifFalse: [^false]
                            ifTrue: [^self time <= anObject time].
                        ]
                    ].
        ^self error: ('ERROR: Unknown argument ' , anObject printString)!

= anObject

"Method Version: spol.  "
            "Date of Last Revision: Date today  Apr 11, 1990"

"Return a Boolean indicating the relationship
             of the receiver to anObject.  anObject may be
             a DateTimeStamp.  "

(anObject isKindOf: DateTimeStamp)
            ifTrue: [
                (self date = anObject date)
                    ifFalse: [^false]
                    ifTrue: [
                        ^self time = anObject time
                        ]
                    ].
        ^self error: ('ERROR: Unknown argument ' , anObject printString)!

> anObject

"Method Version: spol.  "
            "Date of Last Revision: Date today  Apr 11, 1990"

"Return a Boolean indicating the relationship
             of the receiver to anObject.  anObject may be
             a Date, a Time, or a DateTimeStamp.  "

(anObject isKindOf: Date)
            ifTrue: [^self date > anObject].
        (anObject isKindOf: Time)
            ifTrue: [^self time > anObject].
        (anObject isKindOf: DateTimeStamp)
            ifTrue: [
                (self date > anObject date)
                    ifTrue: [^true]
                    ifFalse: [
                        (self date = anObject date)
                            ifFalse: [^false]
                            ifTrue: [^self time > anObject time].
                        ]
                    ].
        ^self error: ('ERROR: Unknown argument ' , anObject printString)!
```

```
>= anObject

"Method Version: spo1.  "
        "Date of Last Revision: Date today  Apr 11, 1990"

"Return a Boolean indicating the relationship
         of the receiver to anObject.  anObject may be
         a Date, a Time, or a DateTimeStamp.  "

(anObject isKindOf: Date)
        ifTrue: [^self date >= anObject].
    (anObject isKindOf: Time)
        ifTrue: [^self time >= anObject].
    (anObject isKindOf: DateTimeStamp)
        ifTrue: [
            (self date > anObject date)
                ifTrue: [^true]
                ifFalse: [
                    (self date = anObject date)
                        ifFalse: [^false]
                        ifTrue: [^self time >= anObject time].
                        ]
                ].
    ^self error: ('ERROR: Unknown argument ' , anObject printString)!

addDays: anInteger

"Method Version: spo2.  "
        "Date of Last Revision: Date today Apr 11, 1990"

"Answer a DateTimeStamp which is the
         receiver date and time plus <anInteger>
         days.  "

^self class new
        date: (self date addDays: anInteger)
        time: (self time copy)!

addSeconds: anInteger

"Method Version: spo2.  "
        "Date of Last Revision: Date today Apr 11, 1990"

"Answer a DateTimeStamp which is the
         receiver date and time plus <anInteger>
         seconds.  "

| seconds |
    seconds := (self time asSeconds + anInteger).
    ^self class new
        date: (self date addDays: (seconds // 86400))
        time: (Time fromSeconds: (seconds \\ 86400))!

date

"Method Version: spo1.  "
        "Date of Last Revision: Date today  Dec  1, 1989"

"Return the date
         of the receiver.  "

^date!

date: aDate

"Method Version: spo1.  "
        "Date of Last Revision: Date today  Dec  1, 1989"

"Set the date
         of the receiver.  "

date := aDate!
```

```
date: aDate  time: aTime

"Method Version: spo1.  "
    "Date of Last Revision: Date today  Dec  1, 1989"

"Set the date and time
     of the receiver.  "

date := aDate.
    time := aTime.!

printString

"Method Version: spo1.  "
    "Date of Last Revision: Date today  Dec  1, 1989"
    "Answer a String that is an ASCII representation
     of the receiver.  "

^(Array with: date with: time)
        printString!

subtractDays: anInteger

"Method Version: spo2.  "
    "Date of Last Revision: Date today Apr 11, 1990"

"Answer a DateTimeStamp which is the
     receiver date and time minus <anInteger>
     days.  "

^self class new
        date: (self date subtractDays: anInteger)
        time: (self time copy)!

subtractSeconds: anInteger

"Method Version: spo1.  "
    "Date of Last Revision: Date today Apr 11, 1990"

"Answer a DateTimeStamp which is the
     receiver date and time minus <anInteger>
     seconds.  "

| days seconds |
    seconds := (self time asSeconds + 86400 - (anInteger \\ 86400)).
    days := (anInteger // 86400) + (seconds // 86400) + 1.
    ^self class new
        date: (self date subtractDays: days)
        time: (Time fromSeconds: seconds)!

time

"Method Version: spo1.  "
    "Date of Last Revision: Date today  Dec  1, 1989"

"Return the date
     of the receiver.  "

^time!

time: aTime

"Method Version: spo1.  "
    "Date of Last Revision: Date today  Dec  1, 1989"

"Set the time
     of the receiver.  "

time := aTime! !

!SQCData class methods !

errorString: anInteger
```

"Revision of Method: spo1. "
"Date of Last Revision: Date today  Dec 19, 1989"

"Return the error string for code anInteger. "

(ErrorCodes includesKey: anInteger)
    ifFalse: [
       ^self new
          error: ('Illegal Index: ' , (anInteger printString))
          ].
^ErrorCodes at: anInteger!

initErrorCodes

"Revision of Method: spo1. "
    "Date of Last Revision: Date today  Dec 19, 1989"

"Create a new Error Codes dictionary. "

ErrorCodes :=
    (IdentityDictionary new)
       at: 0
       put: 'No Western Electric Rules Violated';
       at: 1
       put: 'Single Data Point More Than 3 S.D. > Mean';
       at: 2
       put: 'Two of Three Data Points More Than 2 S.D. > Mean';
       at: 3
       put: 'Four of Five Data Points More Than 2 S.D. > Mean';
       at: 4
       put: 'Eight Consecutive Data Points > Mean';
       at: 9
       put: 'Single Data Point More Than 3 S.D. < Mean';
       at: 10
       put: 'Two of Three Data Points More Than 2 S.D. < Mean';
       at: 11
       put: 'Four of Five Data Points More Than 2 S.D. < Mean';
       at: 12
       put: 'Eight Consecutive Data Points < Mean';
       at: 999
       put: 'No Western Electric Rules Violated';
       yourself.!

new

"Revision of Method: spo3. "
    "Date of Last Revision: Date today  Dec  4, 1989"

"Create a new instance of the receiver. "

ErrorCodes isNil ifTrue: [self initErrorCodes].
^super new initialize! !

!SQCData methods !

at: anInteger

"Revision of Method: spo1. "
    "Date of Last Revision: Date today  Apr 12, 1990"

"Return the anInteger element of the data array. "
    "STUBBED FOR DEMO ONLY--NO TO BE USEDD. "

(anInteger between: 1 and: data size)
    ifFalse: [^self error: ('Illegal Index: ' , anInteger printString)].
^data at: anInteger!

at: anInteger put: aFloat

"Revision of Method: spo2. "
    "Date of Last Revision: Date today  Nov 29, 1989"

```
            "Set the anInteger element of the data array
             of the receiver to aFloat. "

(aFloat isKindOf: Float)
        ifFalse: [^self error: ('Not a Float: ' , aFloat printString)].
    (anInteger between: 1 and: data size)
        ifFalse: [^self error: ('Illegal Index: ' , anInteger printString)].
    data at: anInteger put: aFloat!

computeSQC

"Method Version: spo1. "
        "Date of Last Revision: Date today Apr 11, 1990"

"Perform an SQC computation.  Default is
         to perform both a short-term analysis and
         a long-term analysis, using one SQCData object.
         Return a two element array containing the
         short-term results and the long-term results. "

| array |
    array := Array new: 2.
    self computeSQC: 0.
    array at: 1 put: self results.
    self computeSQC: 1.
    array at: 2 put: self results.
    ^array!

computeSQC: anInteger

"Revision of Method: spo3. "
        "Date of Last Revision: Date today  Nov 29, 1989"

"Compute the values for the receiver,
         based on function anInteger. "

"Filter out all objects anInteger,
                         which are not an instance of
                         positive SmallInteger."
    ((anInteger isMemberOf: SmallInteger)
          and: [anInteger >= 0])
        ifFalse: [
            ^self
                error: (
                    'Illegal SQC Function: ' ,
                    (anInteger printString)
                )
            ].
    self primComputeSQC: anInteger.!

computeSQCLong

"Method Version: spo1. "
        "Date of Last Revision: Date today Apr 11, 1990"

"Perform an SQC long-term analysis.
         Return self. "

self primComputeSQC: 1.!

computeSQCShort

"Method Version: spo1. "
        "Date of Last Revision: Date today Apr 11, 1990"

"Perform an SQC short-term analysis.
         Return self. "

self primComputeSQC: 0.!

data
```

"Revision of Method: spo2. "
"Date of Last Revision: Date today  Nov 29, 1989"

"Return the data array of the receiver. "

^data!

dataError

"Revision of Method: spo3. "
"Date of Last Revision: Date today  dec 15, 1989"

"Return the data error code of the receiver. "

^dataError!

error: aString

"Method Version: spo1. "
"Date of Last Revision: Date today  Dec 15, 1989"

"Post an error message. "

(superModel notNil)
    ifTrue: [^superModel error: aString].

(Smalltalk includesKey: #FourColorMenu)
    ifTrue: [
        CursorManager normal change.
        (Smalltalk at: #FourColorMenu)
            message: ('Error: ' , aString)
            colorArray: #(4 14 14 4).
        ^false
            ]
    ifFalse: [
        CursorManager normal change.
        Menu
            message: ('Error: ' , aString).
        ^false
            ].!

initFlag

"Revision of Method: spo1. "
"Date of Last Revision: Date today  Apr 11, 1990"

"Return a Boolean indicating
 whether or not any data computation
 has been made by the receiver. "

^(data at: 6) = (-1 asFloat)!

initialize

"Revision of Method: spo6. "
"Date of Last Revision: Date today  Apr 11, 1990"

"Initialize the defaults for the receiver. "

dataError := 0.
rangeError := 0.
period := 1.
data := Array new: 40.
1 to: data size do: [:index |
   data at: index put: Float new.
                ].
data
        "Initialize the Init Flag"
    at: 6
    put: -1 asFloat;
        "Initialize the random sample size. "
    at: 28
    put: 4 asFloat.!

mean

"Revision of Method: spo1. "
"Date of Last Revision: Date today  Apr 11, 1990"

"Return the mean of the receiver. "

^data at: 1!

newValue: aFloat

"Revision of Method: spo3. "
"Date of Last Revision: Date today  Apr 30, 1990"

"Set aFloat as the new data value for
further processing. "

(aFloat isKindOf: Float)
    ifFalse: [^self error: ('Not a Float: ' , aFloat printString)].
self initFlag
    ifTrue: [
        self period: 1.
        data at: 1 put: aFloat.
        data at: 2 put: (aFloat / 3).
        ].
data at: 5 put: aFloat.!

period

"Revision of Method: spo2. "
"Date of Last Revision: Date today  Nov 29, 1989"

"Return the period of the receiver. "

^period!

period: anInteger

"Revision of Method: spo3. "
"Date of Last Revision: Date today  Apr  9, 1990"

"Set the receivers period to anInteger. "
"anInteger should be a SmallInteger
  (between -65536 to +65535 inclusive). "

(anInteger isKindOf: Integer)
    ifFalse: [^self error: ('Not a Integer: ' , anInteger printString)].
period := anInteger!

primComputeSQC: anInteger

"Revision of Method: spo3. "
"Date of Last Revision: Date today  Nov 29, 1989"

"Compute the values for the receiver,
 based on function anInteger, using
 the user primitive #computeSQC. "

"Default primitive assumptions:
    (anInteger == 0) --> SQC Short-Term
    (anInteger == 1) --> SQC Long-Term
    (anInteger > 1) --> Undefined
"

<primitive: computeSQC>
self primitiveFailed.!

rangeError

"Revision of Method: spo3. "
"Date of Last Revision: Date today  dec 15, 1989"

"Return the range error code of the receiver. "

```
^rangeError!

release

"Revision of Method: spol.  "
        "Date of Last Revision: Date today  Dec 15, 1989"
        "Release the superModel of the receiver.  "

superModel := nil.!

release: anObject

"Revision of Method: spol.  "
        "Date of Last Revision: Date today  Apr  9, 1990"

"If the receiver is attached to anObject, release
         it from the receiver, and inform it to release
         the receiver.  Otherwise, do nothing.  "

(anObject = #all)
        ifTrue: [
            ^self release: superModel
                ].

(anObject = superModel)
        ifTrue: [
            superModel := nil.
            ^anObject release: self
                ].

^true!

results

"Revision of Method: spol.  "
        "Date of Last Revision: Date today  Dec 19, 1989"

"Return an Array containing the error codes
         and their string interpretations.  "

^Array
        with: dataError
        with: (SQCData errorString: dataError)
        with: rangeError
        with: (SQCData errorString: rangeError)!

standardDeviation

"Revision of Method: spol.  "
        "Date of Last Revision: Date today  Apr 11, 1990"

"Return the standard deviation of the receiver.  "

^data at: 2!

superModel

"Revision of Method: spol.  "
        "Date of Last Revision: Date today  Dec 15, 1989"

"Return the superModel of the receiver.  "

^superModel!

superModel: anSQCModel

"Revision of Method: spol.  "
        "Date of Last Revision: Date today  Dec 15, 1989"

"Set the superModel of the receiver.  "

superModel := anSQCModel.!
``` value

```
        "Revision of Method: spo1.  "
        "Date of Last Revision: Date today  Apr 30, 1990"

"Return aFloat which is the data value.  "

^data at: 5! !

!SQCPlotter class methods !

new

"Revision of Method: spo1.  "
        "Date of Last Revision: Date today  Dec  4, 1989"

"Create a new instance of the receiver.  "

^super new initialize! !

!SQCPlotter methods !

changePlotParmsFor: anObject

"Method Version: spo3.  "
        "Date of Last Revision: Date today  Dec  4, 1989"

"Prompt the user for new parameters
         to use when plotting.  anObject should
         be a model whose pane will be used to
         display the interaction with the user.  "

| answer height pane prompter position width |
    ((pane := anObject pane)
        isNil)
            ifTrue: [
                ^anObject
                    error: (
                        'Error: ' ,
                        self printString ,
                        ' unable to find output pane'
                            )
                ].

position := Cursor offset.
    Cursor offset: pane frame center.
    answer :=
        (Smalltalk includesKey: #PagingMenu)
            ifTrue: [
                ((Smalltalk at: #PagingMenu)
                labelArray: #(
                    '    Colors'
                    '    Averaging Period(s)'
                    '    Sampling Period(s)'
                    '    Maximum Canvas Size'
                    '    ALL'
                        )
                lineArray: #()
                selectorArray: #(colors averaging sampling canvas all)
                header: 'Change Plotting Parameter...')
                    popUpAt: Cursor offset.
                ]
            ifFalse: [
                (Menu
                    labelArray: #(
                        '    Colors'
                        '    Averaging Period(s)'
                        '    Sampling Period(s)'
                        '    Canvas Size'
                        '    ALL'
```

```
                    )
            lineArray: #()
            selectorArray: #(colors averaging sampling canvas all))
                popUpAt: Cursor offset.
            ].
    Cursor offset: position.
    (answer isNil)
        ifTrue: [^false].

prompter := Prompter.
    (Smalltalk includesKey: #ColorPrompter)
        ifTrue: [prompter := Smalltalk at: #ColorPrompter].

((answer == #canvas)
            or: [answer == #all])
        ifTrue: [
            Cursor
                offset: (
                    pane frame center
                        - (LabelFont width * 11 @ (LabelFont height + 6))
                    ).
            width :=
                prompter
                    prompt: 'Maximum Canvas Width?'
                    default: Display width printString.
            Cursor offset: position.
            width isNil
                ifFalse: [limit x: width asInteger].
            Cursor
                offset: (
                    pane frame center
                        - (LabelFont width * 11 @ (LabelFont height + 6))
                    ).
            height :=
                prompter
                    prompt: 'Maximum Canvas Height?'
                    default: Display height printString.
            Cursor offset: position.
            height isNil
                ifFalse: [limit y: height asInteger].
            Cursor offset: position.
            ].

((answer == #sampling)
            or: [answer == #all])
        ifTrue: [
            self getSamplingPeriod: 1 forPane: pane using: prompter
            ].

((answer == #averaging)
            or: [answer == #all])
        ifTrue: [
            self getAveragingPeriod: 1 forPane: pane using: prompter
            ].

((answer == #colors)
            or: [answer == #all])
        ifTrue: [
            DictionaryEditor new openOn: colors called: 'Colors'.
            ].!

getAveragingPeriod: anInteger
    forPane: pane
    using: aPrompterClass

"Method Version: spol. "
    "Date of Last Revision: Date today  Dec  1, 1989"

"Prompt the user for a new averaging period
     indexed by anInteger.  pane is used to position
     the aPrompterClass used to get the input. "
```

```
| answer endDay endTime position startDay startTime |
[averagingPeriods size >= anInteger]
    whileFalse: [
        averagingPeriods
            add: (
                Array
                    with: (DateTimeStamp new)
                    with: (DateTimeStamp new)
                ).
            ].
startDay := ((averagingPeriods at: anInteger) at: 1) date.
startTime := ((averagingPeriods at: anInteger) at: 1) time.
endDay := ((averagingPeriods at: anInteger) at: 2) date.
endTime := ((averagingPeriods at: anInteger) at: 2) time.
position := Cursor offset.

"Get the Start Day. "
Cursor
    offset: (
        pane frame center
            - (LabelFont width * 13 @ (LabelFont height + 6))
        ).
startDay :=
    aPrompterClass
        prompt: 'Averaging Period Start Day?'
        default: startDay printString.
Cursor offset: position.
startDay isNil
    ifFalse: [startDay := startDay asDate].

"Get the Start Time. "
Cursor
    offset: (
        pane frame center
            - (LabelFont width * 14 @ (LabelFont height + 6))
        ).
startTime :=
    aPrompterClass
        prompt: 'Averaging Period Start Time?'
        default: startTime printString.
Cursor offset: position.
startTime isNil
    ifFalse: [startTime := startTime asTime].

"Get the End Day. "
Cursor
    offset: (
        pane frame center
            - (LabelFont width * 12 @ (LabelFont height + 6))
        ).
endDay :=
    aPrompterClass
        prompt: 'Averaging Period End Day?'
        default: endDay printString.
Cursor offset: position.
endDay isNil
    ifFalse: [endDay := endDay asDate].

"Get the End Time. "
Cursor
    offset: (
        pane frame center
            - (LabelFont width * 13 @ (LabelFont height + 6))
        ).
endTime :=
    aPrompterClass
        prompt: 'Averaging Period End Time?'
        default: endTime printString.
Cursor offset: position.
endTime isNil
    ifFalse: [endTime := endTime asTime].
```

```
averagingPeriods
    at: anInteger
    put: (
        Array
            with: (DateTimeStamp new date: startDay time: startTime)
            with: (DateTimeStamp new date: endDay time: endTime)
        ).

"Get the End Time. "
Cursor
    offset: (
        pane frame center
            - (LabelFont width * 14 @ (LabelFont height + 6))
        ).
answer :=
    aPrompterClass
            prompt: 'Add Another Averaging Period?'
            default: 'No'.
    Cursor offset: position.
    (answer asLowerCase includes: $y)
        ifTrue: [
            self
                getAveragingPeriod: (anInteger + 1)
                forPane: pane
                using: aPrompterClass
            ].!

getSamplingPeriod: anInteger
    forPane: pane
    using: aPrompterClass

"Method Version: spo1. "
        "Date of Last Revision: Date today  Dec  1, 1989"

"Prompt the user for a new sampling period
         indexed by anInteger.  pane is used to position
         the aPrompterClass used to get the input. "

| answer endDay endTime position startDay startTime |
    [samplingPeriods size >= anInteger]
        whileFalse: [
            samplingPeriods
                add: (
                    Array
                        with: (DateTimeStamp new)
                        with: (DateTimeStamp new)
                    ).
            ].
    startDay := ((samplingPeriods at: anInteger) at: 1) date.
    startTime := ((samplingPeriods at: anInteger) at: 1) time.
    endDay := ((samplingPeriods at: anInteger) at: 2) date.
    endTime := ((samplingPeriods at: anInteger) at: 2) time.
    position := Cursor offset.

"Get the Start Day. "
    Cursor
        offset: (
            pane frame center
                - (LabelFont width * 13 @ (LabelFont height + 6))
            ).
    startDay :=
        aPrompterClass
            prompt: 'Sampling Period Start Day?'
            default: startDay printString.
    Cursor offset: position.
    startDay isNil
        ifFalse: [startDay := startDay asDate].

"Get the Start Time. "
    Cursor
        offset: (
```

```
                pane frame center
                    - (LabelFont width * 14 @ (LabelFont height + 6))
                ).
startTime :=
    aPrompterClass
        prompt: 'Sampling Period Start Time?'
        default: startTime printString.
Cursor offset: position.
startTime isNil
    ifFalse: [startTime := startTime asTime].

"Get the End Day. "
Cursor
    offset: (
        pane frame center
            - (LabelFont width * 12 @ (LabelFont height + 6))
            ).
endDay :=
    aPrompterClass
        prompt: 'Sampling Period End Day?'
        default: endDay printString.
Cursor offset: position.
endDay isNil
    ifFalse: [endDay := endDay asDate].

"Get the End Time. "
Cursor
    offset: (
        pane frame center
            - (LabelFont width * 13 @ (LabelFont height + 6))
            ).
endTime :=
    aPrompterClass
        prompt: 'Sampling Period End Time?'
        default: endTime printString.
Cursor offset: position.
endTime isNil
    ifFalse: [endTime := endTime asTime].

samplingPeriods
    at: anInteger
    put: (
        Array
            with: (DateTimeStamp new date: startDay time: startTime)
            with: (DateTimeStamp new date: endDay time: endTime)
        ).

"Get the End Time. "
Cursor
    offset: (
        pane frame center
            - (LabelFont width * 14 @ (LabelFont height + 6))
            ).
answer :=
    aPrompterClass
        prompt: 'Add Another Sampling Period?'
        default: 'No'.
Cursor offset: position.
(answer asLowerCase includes: $y)
    ifTrue: [
        self
            getSamplingPeriod: (anInteger + 1)
            forPane: pane
            using: aPrompterClass
            ].!
initialize "Revision of Method: spol. "
        "Date of Last Revision: Date today  Dec  4, 1989"

"Initialize the defaults for the
          receiver. "
```

```
colors := Dictionary new.
averagingPeriods := OrderedCollection new.
samplingPeriods := OrderedCollection new.
limit := Display width @ Display height.!
``` release

"Revision of Method: spo1.  "
"Date of Last Revision: Date today  Dec 14, 1989"

"Release the superModel of the receiver.  "

superModel := nil.!

release: anObject

"Revision of Method: spo1.  "
"Date of Last Revision: Date today  Apr  9, 1990"

"If the receiver is attached to anObject, release
it from the receiver, and inform it to release
the receiver.  Otherwise, do nothing.  "

```
(anObject = #all)
    ifTrue: [
        ^self release: superModel
            ].

(anObject = superModel)
    ifTrue: [
        superModel := nil.
        ^true
            ].

^true!
``` superModel

"Revision of Method: spo1.  "
"Date of Last Revision: Date today  Dec 14, 1989"

"Return the superModel of the receiver.  "

^superModel!

superModel: anSQCModel

"Revision of Method: spo1.  "
"Date of Last Revision: Date today  Dec 14, 1989"

"Set the superModel of the receiver.  "
superModel := anSQCModel.! !

!SQCPrinter class methods !

initClass

"Revision of Method: spo2.  "
"Date of Last Revision: Date today  Dec 14, 1989"

"Initialize the receiving class.  "

```
Printers :=
    (OrderedCollection new)
        add: #EpsonFXE;
        add: #EpsonFX;
        add: #HPLJII;
        add: #PostScript;
        yourself.
Ports :=
    (OrderedCollection new)
        add: #COM1;
```

```
            add: #COM2;
            add: #LPT1;
            add: #LPT2;
            add: #DiskDrive;
            yourself.!

new

"Revision of Method: spo1.  "
        "Date of Last Revision: Date today   Dec 14, 1989"

"Create a new instance of the receiver.  "

^super new initialize! !

!SQCPrinter methods !

changePrintParmsFor: anObject

"Method Version: spo4.  "
        "Date of Last Revision: Date today   Dec 21, 1989"

"Prompt the user for new parameters
         to use when printing.  anObject should
         be a model whose pane will be used to
         display the interaction with the user.  "

| aCollection answer pane parameter prompter position |
    ((pane := anObject pane)
        isNil)
            ifTrue: [
                ^anObject
                    error: (
                        'Error: ' ,
                        self printString ,
                        ' Unable To Find Output Pane!!'
                    )
            ].
position := Cursor offset.
Cursor offset: pane frame center.
parameter :=
    (Smalltalk includesKey: #PagingMenu)
        ifTrue: [
            ((Smalltalk at: #PagingMenu)
                labelArray: #(
                    '    Color Map'
                    '    Start Page'
                    '    Stop Page'
                    '    Printer Type'
                    '    Printer Port'
                    '    ALL'
                    )
                lineArray: #()
                selectorArray: #(color start stop printerType printerPort al
                header: 'Change Printing Parameter...')
                    popUpAt: Cursor offset.
            ]
        ifFalse: [
            (Menu
                labelArray: #(
                    'Change Printing Parameter: Color Map'
                    'Change Printing Parameter: Start Page'
                    'Change Printing Parameter: Stop Page'
                    'Change Printing Parameter: Printer Type'
                    'Change Printing Parameter: Printer Port'
                    'Change Printing Parameter: ALL'
                    )
                lineArray: #()
                selectorArray: #(color start stop printerType printerPort al
                    popUpAt: Cursor offset.
                ].
```

```
Cursor offset: position.
(parameter isNil)
    ifTrue: [^false].

prompter := Prompter.
(Smalltalk includesKey: #ColorPrompter)
    ifTrue: [prompter := Smalltalk at: #ColorPrompter].

((parameter == #start)
    or: [parameter == #all])
    ifTrue: [
        Cursor
            offset: (
                pane frame center
                    - (LabelFont width * 11 @ (LabelFont height + 6))
                ).
        answer :=
            prompter
                prompt: 'Starting Page?'
                default: startPage printString.
        Cursor offset: position.
        answer isNil
            ifFalse: [startPage := answer asInteger].
        ].
((parameter == #stop)
    or: [parameter == #all])
    ifTrue: [
        Cursor
            offset: (
                pane frame center
                    - (LabelFont width * 11 @ (LabelFont height + 6))
                ).
        answer :=
            prompter
                prompt: 'Stopping Page?'
                default: stopPage printString.
        Cursor offset: position.
        answer isNil
            ifFalse: [stopPage := answer asInteger].
        ].

((parameter == #printerType)
    or: [parameter == #all])
    ifTrue: [
        aCollection := Printers deepCopy.
        position := Cursor offset.
        Cursor offset: pane frame center.
        answer :=
            (Smalltalk includesKey: #PagingMenu)
                ifTrue: [
                    ((Smalltalk at: #PagingMenu)
                        labelArray: aCollection
                        lineArray: #()
                        selectorArray: aCollection
                        header: 'Select Printer Type...')
                            popUpAt: Cursor offset.
                    ]
                ifFalse: [
                    (Menu
                        labelArray:
                            (aCollection collect: [:symbol |
                                ('Select Printer Type...'
                                    , symbol printString)
                                ])
                        lineArray: #()
                        selectorArray: aCollection)
                            popUpAt: Cursor offset.
                    ].
            Cursor offset: position.
        (answer isNil)
            ifTrue: [^false].
        printerType := answer.
            ].
```

```smalltalk
    ((parameter == #printerPort)
            or: [parameter == #all])
        ifTrue: [
            aCollection := Ports deepCopy.
            position := Cursor offset.
            Cursor offset: pane frame center.
            answer :=
                (Smalltalk includesKey: #PagingMenu)
                    ifTrue: [
                                ((Smalltalk at: #PagingMenu)
                                    labelArray: aCollection
                                    lineArray: #()
                                    selectorArray: aCollection
                                    header: 'Select Printer Port...')
                                        popUpAt: Cursor offset.
                                ]
                        ifFalse: [
                            (Menu
                                labelArray:
                                    (aCollection collect: [:symbol |
                                        ('Select Printer Port...'
                                            , symbol printString)
                                                ])
                                lineArray: #()
                                selectorArray: aCollection)
                                    popUpAt: Cursor offset.
                            ].
                    Cursor offset: position.
            (answer isNil)
                ifTrue: [^false].
            printerPort := answer.
            outputStream notNil
                ifTrue: [outputStream close].
            (printerPort == #DiskDrive)
                ifTrue: [outputStream := nil]
                ifFalse: [
                    (Smalltalk includesKey: #NetworkPrinterStream)
                        ifTrue: [
                            outputStream :=
                                NetworkPrinterStream on: printerPort.
                            ]
                        ifFalse: [
                            (Smalltalk includesKey: #PrinterStream)
                                ifTrue: [
                                    outputStream :=
                                        PrinterStream new.
                                    ]
                                ifFalse: [outputStream := nil].
                            ].
                    ].
            ].

((parameter == #color)
            or: [parameter == #all])
        ifTrue: [colorConverter edit].!

initialize

"Revision of Method: spo4. "
    "Date of Last Revision: Date today  Dec 21, 1989"

"Initialize the defaults for the
      receiver. "

Printers isNil
        ifTrue: [SQCPrinter initClass].
    Ports isNil
        ifTrue: [SQCPrinter initClass].
    pageCounter := 0.
    pause := false.
    startPage := 1.
    stopPage := 9999.
```

```
    printerType := Printers at: 4.
    printerPort := Ports at: 3.
    outputStream :=
        (Smalltalk includesKey: #NetworkPrinterStream)
            ifTrue: [
                (Smalltalk at: #NetworkPrinterStream)
                    on: printerPort.
                ]
            ifFalse: [
                (Smalltalk includesKey: #PrinterStream)
                    ifTrue: [
                        (Smalltalk at: #PrinterStream) new
                        ]
                    ifFalse: [nil].
                ].
    colorConverter :=
        (Smalltalk includesKey: #ColorConverter)
            ifTrue: [(Smalltalk at: #ColorConverter) new]
            ifFalse: [nil].!

output: aForm
    withMode: modeSymbol

"Method Version: spo3. "
    "Date of Last Revision: Date today  Dec 15, 1989"

"Output the aForm to outputStream using
    the orientaion modeSymbol, and the
    current printerType. "

printerType == #PostScript
        ifTrue: [
            modeSymbol == #landscape
                ifTrue: [
                    aForm outputAsPostScriptLandscapeOn: outputStream.
                    outputStream flush.
                    ^true
                    ].
            modeSymbol == #portrait
                ifTrue: [
                    aForm outputAsPostScriptOn: outputStream.
                    outputStream flush.
                    ^true
                    ].
            ^superModel
                error: 'Error: Unknown Mode Symbol: '
                with: modeSymbol printString
            ].

printerType == #HPLJII
        ifTrue: [
            modeSymbol == #landscape
                ifTrue: [
                    Menu message: 'Not Implemented Yet!!'.
                    ^false
                    ].
            modeSymbol == #portrait
                ifTrue: [
                    Menu message: 'Not Implemented Yet!!'.
                    ^false
                    ].
            ^superModel
                error: 'Error: Unknown Mode Symbol: '
                with: modeSymbol printString
            ].

printerType == #EpsonFXE
        ifTrue: [
            modeSymbol == #landscape
                ifTrue: [
                    Menu message: 'Not Implemented Yet!!'.
```

```
                    ^false
                        ].
            modeSymbol == #portrait
                ifTrue: [
                    Menu message: 'Not Implemented Yet!!'.
                    ^false
                        ].
            ^superModel
                error: 'Error: Unknown Mode Symbol: '
                with: modeSymbol printString
                ].

printerType == #EpsonFX
        ifTrue: [
            modeSymbol == #landscape
                ifTrue: [
                    CursorManager normal change.
                    ^false
                        ].
            modeSymbol == #portrait
                ifTrue: [
                    Menu message: 'Not Implemented Yet!!'.
                    ^false
                        ].
            ^superModel
                error: 'Error: Unknown Mode Symbol: '
                with: modeSymbol printString
                ].

^superModel
    error: 'Error: Unknown Printer Type: '
    with: printerType printString!

outputToDisk: aForm
    withMode: modeSymbol

"Method Version: spo1.  "
    "Date of Last Revision: Date today  Dec 14, 1989"

"Output the aForm to a disk file using
     the orientaion modeSymbol, and the
     current printerType. "

| aDirectory aFileName |
    aDirectory := Directory getDisk.
    aDirectory isNil
        ifTrue: [^false].
    aFileName :=
        File
            getFileName: (superModel getFormName)
            ext: 'ps'.
    aFileName isNil
        ifTrue: [^false].
    outputStream := (aDirectory file: aFileName).
    ^self output: aForm withMode: modeSymbol.!

printForm: aForm

"Method Version: spo5.  "
    "Date of Last Revision: Date today  Dec 21, 1989"

"Print the aForm to either a disk file or
     a printer, in either portrait or landscape
     mode. "

| answer form mode | mode :=
        (Smalltalk includesKey: #PagingMenu)
            ifTrue: [
                ((Smalltalk at: #PagingMenu)
                    labelArray: #(
```

```
                            ,       Landscape'
                            ,       Portrait'
                                    )
                    lineArray: #()
                    selectorArray: #(landscape portrait)
                    header:
                        'Output Using Layout...')
                    popUpAt: Cursor offset.
                 ]
         ifFalse: [
             (Menu
                 labels: (
                     'Output Using Layout: Landscape' ,
                     'Output Using Layout: Portrait'
                      )
                 lines: #()
                 selectors: #(landscape portrait))
                    popUpAt: Cursor offset.
                 ].
    mode isNil ifTrue: [^false].

CursorManager execute change.
    (aForm isMemberOf: Form)
        ifTrue: [form := aForm]
        ifFalse: [
            colorConverter isNil
                ifFalse: [
                    form := (colorConverter on: aForm) convertToForm.
                    ]
                ifTrue: [
                    form := aForm convertToForm.
                    ].
                ].
    printerPort == #DiskDrive
        ifTrue: [
            self outputToDisk: form withMode: mode.
            CursorManager normal change.
            ^self
                ].

self output: form withMode: mode.
    CursorManager normal change.
    ^self!

release

"Revision of Method: spo1. "
    "Date of Last Revision: Date today   Dec 21, 1989"

"Release the printer. "

outputStream notNil
        ifTrue: [
            outputStream close.
            outputStream := nil.
                ].!

release: anObject

"Revision of Method: spo3. "
    "Date of Last Revision: Date today   Apr 9, 1990"

"If the receiver is attached to anObject, release
     it from the receiver, and inform it to release
     the receiver.  Otherwise, do nothing. "

(anObject = #all)
        ifTrue: [
            ^self release: superModel
                ].
```

```
                (anObject = outputStream)
                    ifTrue: [
                        outputStream close.
                        outputStream := nil.
                        ^true
                            ].

(anObject = superModel)
                    ifTrue: [
                        outputStream notNil
                            ifTrue: [
                                (self release: outputStream)
                                    ifTrue: [
                                        superModel := nil.
                                        ^true
                                            ]
                                    ifFalse: [^false].
                                    ]
                            ifFalse: [
                                superModel := nil.
                                ^true
                                    ].
                        ].!

superModel

"Revision of Method: spo1.  "
        "Date of Last Revision: Date today   Dec 14, 1989"

"Return the superModel of the receiver.  "

^superModel!

superModel: anSQCModel

"Revision of Method: spo1.  "
        "Date of Last Revision: Date today   Dec 14, 1989"

"Set the superModel of the receiver.  "

superModel := anSQCModel.! !

!CenteredListPane class methods ! !

!CenteredListPane methods !

close

"Method Version: spo1.  "
        "Date of Last Revision: Date today Mar 29, 1990"

"Close the pane.  "

super close.
    centeredList := nil.!

getCenteredList

"Method Version: spo1.  "
        "Date of Last Revision: Date today Mar 30, 1990"

"Get the centeredList.  "

| frameWidth |
    ((frame notNil)
            and: [paneScanner notNil])
        ifTrue: [
            centeredList := Array new: list size.
            frameWidth := frame width // paneScanner font width.
            1 to: list size do: [:index |
```

```
                ((list at: index) size < frameWidth)
                    ifTrue: [
                        centeredList
                            at: index
                            put: (
                                (String new:
                                    (frameWidth - (list at: index) size // 2)) ,
                                (list at: index)
                                ).
                            ]
                        ifFalse: [
                            centeredList
                                at: index
                                put: (list at: index)
                                ].
                                ].
                ]
        ifFalse: [centeredList := list].!

lineAt: index

"Method Version: spol. "
        "Date of Last Revision: Date today Mar 30, 1990"

"Private - Answer the line at index. "

(index > centeredList size or: [index < 1])
        ifTrue: [^String new]
        ifFalse: [^centeredList at: index]!

open

"Method Version: spol. "
        "Date of Last Revision: Date today Mar 30, 1990"

"Private - Open the pane. "
        "Get the list and the centeredList. "

super open.
    self getCenteredList.!

refreshAll

"Method Version: spol. "
        "Date of Last Revision: Date today Mar 30, 1990"

"Private - Redraw the receiver
         pane on the display screen. "

paneScanner
        displayAll: centeredList
        from: topCorner y
        to: (list size min:
            (topCorner y + (frame height
                // curFont height)))
        at: topCorner x!

refreshFrom: topCorner
    for: hInteger
    atX: xInteger
    Y: yInteger

"Method Version: spol. "
        "Date of Last Revision: Date today Mar 30, 1990"

"Private - Display from the line pointed to by the point
         topCorner, for a height of hInteger in bits, to
         the point (xInteger @ yInteger) in the pane. "

| firstLine lastLine maxLine loc fontHeight |
    firstLine := topCorner y.
    fontHeight := curFont height.
```

```
    lastLine := firstLine + (hInteger - 1 //
        fontHeight).
    maxLine := lastLine min: centeredList size.
    loc := xInteger @
        (yInteger - fontHeight).
    firstLine to: maxLine do: [:i |
        paneScanner
            display: (centeredList at: i)
            from: topCorner x
            at: (loc y: (loc y +
                fontHeight))].
    ((maxLine := loc y + fontHeight) <
    (hInteger + yInteger)) ifTrue: [
        paneScanner blankRestFrom: maxLine]!
``` restore

```
    "Method Version: spol.  "
    "Date of Last Revision: Date today Mar 30, 1990"

"Refresh the list from the model
     and maintain the position in the list
     without selecting it.  "

topCorner == nil
        ifTrue: [topCorner := 1@1].
    list := model perform: name.
    self getCenteredList.
    topCorner y > centeredList size
        ifTrue: [topCorner y: (centeredList size max: 1)].
    selection := currentLine := nil.
    self refreshAll!
``` restoreSelected

```
    "Method Version: spol.  "
    "Date of Last Revision: Date today Mar 30, 1990"

"Refresh the list from the model
     and keep the old selection.  "

list := model perform: name.
    self getCenteredList.
    self refreshAll.
    self boldLine: selection!
``` restoreWithRefresh: aString

```
    "Method Version: spol.  "
    "Date of Last Revision: Date today Mar 30, 1990"

"Refresh the list from the model
     and keep the line equal to aString
     showing and selected.  "

list := model perform: name.
    self getCenteredList.
    self restoreSelected: aString!
``` searchForLineToShow: anObject

```
    "Method Version: spol.  "
    "Date of Last Revision: Date today Mar 30, 1990"

"Private - Search for and keep the line
     indicated by anObject showing.  anObject
     is either the index into the list or a string
     with which the list is to be searched.  "
    "If anObject is a string it may be either that
     matching the list, or the centeredList.  "

| size index middle |
    list := model perform: name.
```

```
            self getCenteredList.
            (anObject isKindOf: Integer)
                ifTrue: [index := anObject]
                ifFalse: [
                    size := centeredList size.
                    index := 1.
                    [((index > size)
                        or: [(centeredList at: index) = anObject])
                            or: [(list at: index) = anObject]]
                                whileFalse: [index := index + 1]].
            index > list size ifTrue: [^nil].
            middle := index - (self charsInColumn // 2).
            middle < 1
                ifTrue: [topCorner y: 1]
                ifFalse: [topCorner y: middle].
            ^index!

update

"Method Version: spo1.  "
        "Date of Last Revision: Date today Mar 30, 1990"

"Refresh the list from the model and display it.  "

list := model perform: name.
    self getCenteredList.
    selection := currentLine := nil.
    topCorner := 1@1.
    self refreshAll! !

!HierarchyMenu class methods !

labelArray: labelArray lines:
    lineArray selectors: selectorArray

^ (super labelArray: labelArray lines: lineArray selectors: selectorArray)
        subMenus: (Array new: selectorArray size)!

labelArray: labelArray
    lines: lineArray
    selectors: selectorArray
    subMenus: subMenuArray ^ (super labelArray: labelArray lines: lineArray selectors: selectorArray)
        subMenus: subMenuArray!

labels: aString lines: lineArray selectors: selectorArray

^ (super labels: aString lines: lineArray selectors: selectorArray)
        subMenus: (Array new: selectorArray size)!

labels: aString
    lines: lineArray
    selectors: selectorArray
    subMenus: subMenuArray ^ (super labels: aString lines: lineArray selectors: selectorArray)
        subMenus: subMenuArray! !

!HierarchyMenu methods !

popUpAt: aPoint
        "Pop up menu at aPoint, give it control, and
        answer the user response or nil if no response."

| aCharacter aCursor oldLine answer menu subMenu priorCursor |
    aCursor := Cursor.
    priorCursor := Cursor offset.
    self displayAt: aPoint.
    [true] whileTrue: [
```

```
        subMenu := false.
        self showCurrentLine.
        aCharacter := self moveCursor: Terminal read.
        (aCharacter == EndSelectFunction or:
              [aCharacter == SelectFunction]) ifTrue: [
           currentLine isNil ifTrue:[
               self disappear.
               aCursor change.
               currentLine := oldLine.
               ^nil].
           (subMenus at: currentLine) isNil ifFalse: [
               subMenu := true.
               menu := subMenus at: currentLine.
               Cursor offset: offset +  (frame x  @ (currentLine * SysFontHeig
               answer := menu popUpAt: (offset + ((frame x + (menu frame x // 2
               (answer isNil and: [self containsPoint: Cursor offset]) ifFalse:
                   self disappear.
                   aCursor change.
                   ^answer]].
           subMenu ifFalse: [
               self disappear.
               aCursor change.
               currentLine isNil
                   ifTrue:[
                       currentLine := oldLine.
                       ^nil]
                   ifFalse: [
                       Cursor offset: priorCursor.
                       ^selectors at: currentLine]]].
        aCharacter == SetLoc ifFalse: [
           (self containsPoint: Cursor offset) ifFalse: [
               aCursor change.
               self disappear.
               Cursor offset: priorCursor.
               ^nil]]]!

showCurrentLine
        "Private - Reverse the line
         that the cursor is on."
     | oldLine |
     oldLine := currentLine.
     super showCurrentLine.
     currentLine isNil ifTrue: [
         CursorManager normal change.
         ^self].
     oldLine = currentLine ifFalse: [
         (subMenus at: currentLine) isNil
             ifTrue: [CursorManager normal change]
             ifFalse: [CursorManager subMenu change]]!

subMenus: anArray
        "Set the array of submenus."
     subMenus := anArray! !

!SQCModel class methods !

new

"Revision of Method: spol.  "
        "Date of Last Revision: Date today  Dec 15, 1989"

"Create a new instance of the receiver.  "

^super new initialize! !

!SQCModel methods !

changePlotParmsFor: anObject

"Method Version: spol.  "
        "Date of Last Revision: Date today  Dec  1, 1989"
```

"Prompt the user for new parameters
to use when plotting. anObject should
be a model whose pane will be used to
display the interaction with the user. "

(plotter isNil)
       ifTrue: [plotter := SQCPlotter new].
   plotter changePlotParmsFor: anObject.!

changePrintParmsFor: anObject

"Method Version: spo1. "
    "Date of Last Revision: Date today  Dec 14, 1989"

"Prompt the user for new parameters
    to use when printing. anObject should
    be a model whose pane will be used to
    display the interaction with the user. "
    (printer isNil)
       ifTrue: [printer := SQCPrinter new].
   printer changePrintParmsFor: anObject.!

computeSQCLong

"Method Version: spo3. "
    "Date of Last Revision: Date today Apr 30, 1990"

"Perform an SQC long-term computation,
    and return the results. "

^longData computeSQCLong results!

computeSQCShort

"Method Version: spo2. "
    "Date of Last Revision: Date today Apr 30, 1990"

"Perform an SQC short-term computation,
    and return the results. "

^shortData computeSQCShort results!

display

"Method Version: spo1. "
    "Date of Last Revision: Date today  Dec  4, 1989"

"Return the receiver's display. "

^display!

display: anSQCDisplay

"Method Version: spo1. "
    "Date of Last Revision: Date today  Dec  4, 1989"

"Set the receiver's display, and
    update the display's superModel. "

display isNil
       ifFalse: [display release].
   display := anSQCDisplay.
   anSQCDisplay superModel: self.!

displayForm: aForm
    called: aNameString

"Method Version: spo3. "
    "Date of Last Revision: Date today  May  1, 1990"

"Display the aForm using aNameString as
    the window title. "

```
    "SPO3: Date today  May  1, 1990
        Changed initialization protocol."

self
    plotter: SQCPlotter new;
    printer: SQCPrinter new;
    display: SQCDisplay new.
self display
    openOn: aForm
    called: aNameString
    from: #index.!
``` displayForm: aForm
    called: aNameString
    from: sourceSymbol

```
    "Method Version: spo3. "
    "Date of Last Revision: Date today  May  1, 1990"

"Display the aForm, from a source indicated by
     <sourceSymbol>, using <aNameString> as
     the window title.  "
    "SPO3: Date today  May  1, 1990
        Changed initialization protocol."

self
    plotter: SQCPlotter new;
    printer: SQCPrinter new;
    display: SQCDisplay new.
self display
    openOn: aForm
    called: aNameString
    from: sourceSymbol.!
``` endDate

```
    "Method Version: spo1. "
    "Date of Last Revision: Date today  Apr 10, 1990"

"Return the receiver's end date. "

^endDateTime date!
``` endDate: aDate

```
    "Method Version: spo1. "
    "Date of Last Revision: Date today  Apr 10, 1990"

"Set the receiver's end date. "

endDateTime date: aDate!
``` endDateTime

```
    "Method Version: spo1. "
    "Date of Last Revision: Date today  Apr 30, 1990"

"Return the receiver's end date and time. "

^endDateTime!
``` endTime

```
    "Method Version: spo1. "
    "Date of Last Revision: Date today  Apr 10, 1990"
    "Return the receiver's end time. "

^endDateTime time!
``` endTime: aTime

```
    "Method Version: spo1. "
    "Date of Last Revision: Date today  Apr 10, 1990"
```

"Set the receiver's end time. "

endDateTime time: aTime!

error: aString

"Method Version: spo1. "
        "Date of Last Revision: Date today  Dec 14, 1989"

"Post an error message. "

(Smalltalk includesKey: #FourColorMenu)
        ifTrue: [
            CursorManager normal change.
            (Smalltalk at: #FourColorMenu)
                message: ('Error: ' , aString)
                colorArray: #(4 14 14 4).
            ^false
                ]
        ifFalse: [
            CursorManager normal change.
            Menu
                message: ('Error: ' , aString).
            ^false
                ].!

error: messageString
    with: dataString

"Method Version: spo1. "
        "Date of Last Revision: Date today  Dec 14, 1989"

"Post an error message. "

(Smalltalk includesKey: #FourColorMenu)
        ifTrue: [
            CursorManager normal change.
            (Smalltalk at: #FourColorMenu)
                message: ('Error: ' , messageString , dataString)
                colorArray: #(4 14 14 4).
            ^false
                ]
        ifFalse: [
            CursorManager normal change.
            Menu
                message: ('Error: ' , messageString , dataString).
            ^false
                ].!

getFormName
        "Method Version: spo1. "
        "Date of Last Revision: Date today  Dec 14, 1989"

"Get and return a string name for a form. "

^display name!

initialize

"Revision of Method: spo4. "
        "Date of Last Revision: Date today  May  1, 1990"

"Initialize the defaults for the receiver. "
        "SPO4: Date today  May  1, 1990
            Changed initialization protocol. "

samplePeriod := 86400.    " 1 day = 86400 seconds "
    startDateTime := DateTimeStamp new.
    endDateTime := DateTimeStamp new.
    self shortData: SQCData new.
    self shortFileManager: SQCFileManager new.
    self longData: SQCData new.
    self longFileManager: SQCFileManager new.

```
"self plotter: SQCPlotter new.
 self display: SQCDisplay new.
 self printer: SQCPrinter new.
"!

longData

"Method Version: spo2.  "
    "Date of Last Revision: Date today  Apr 30, 1990"

"Return the receiver's long term data processors.  "

^longData!

longData: anSQCData

"Method Version: spo2.  "
    "Date of Last Revision: Date today  Apr 30, 1990"

"Set the receiver's long term data processor.  "

longData isNil
        ifFalse: [longData release].
    longData := anSQCData.
    anSQCData superModel: self.!

longFileManager

"Method Version: spo2.  "
    "Date of Last Revision: Date today  Apr 30, 1990"

"Return the receiver's file manager for long
     term data.  "

^longFileManager!

longFileManager: anSQCFileManager
    "Method Version: spo2.  "
    "Date of Last Revision: Date today  Apr 30, 1990"

"Set the receiver's file manager for SQC long
     term data.  "

longFileManager isNil
        ifFalse: [longFileManager release].
    longFileManager := anSQCFileManager.
    anSQCFileManager superModel: self.!

newValue: aDataSample

"Method Version: spo4.  "
    "Date of Last Revision: Date today Apr 30, 1990"

"Receive, log, and process a new
     datum <aDataSample>.  Return an Array
     with two elements containing the
     short-term results and the long-term
     results.  "

| array results |
    array := Array new: 2.
    results := Array new: 4.

"Perform a short term evaluation.  "
    shortData newValue: (aDataSample value).
    results := self computeSQCShort.
    shortFileManager
        log: aDataSample
        process: #ShortTerm
        for: shortData
        withResults: results.
    array at: 1 put: results.
```

```
                                "Perform a long term evaluation.  "
        [aDataSample dateTimeStamp > endDateTime]
            whileTrue: [
                startDateTime := endDateTime.
                endDateTime := endDateTime addSeconds: self period.
                longData period: (longData period + 1).
                    ].
        longData newValue: (aDataSample value).
        results := self computeSQCLong.
        longFileManager
            log: aDataSample
            process: #LongTerm
            for: longData
            withResults: results.
        array at: 2 put: results.

"Return the results.  "
        ^array!

period

"Method Version: spo1.  "
        "Date of Last Revision: Date today  Apr 11, 1990"

"Return the receiver's period.  "

^samplePeriod!

period: anInteger

"Method Version: spo3.  "
        "Date of Last Revision: Date today  Apr 30, 1990"

"Set the receiver's period.  <anInteger>
         should be expressed in seconds, and is
         the duration for data sample continuity
         for long-term SQC.  "

(samplePeriod = anInteger)
        ifFalse: [
            samplePeriod := anInteger.
            startDateTime := DateTimeStamp new.
            endDateTime := DateTimeStamp new addSeconds: samplePeriod.
            longData period: 1.
                ].!

plotter

"Method Version: spo1.  "
        "Date of Last Revision: Date today  Dec  4, 1989"

"Return the receiver's plotter.  "

^plotter!

plotter: anSQCPlotter

"Method Version: spo1.  "
        "Date of Last Revision: Date today  Dec  4, 1989"

"Set the receiver's plotter, and
         update the plotter's superModel.  "

plotter isNil
        ifFalse: [plotter release].
    plotter := anSQCPlotter.
    anSQCPlotter superModel: self.!

printer

"Method Version: spo1.  "
        "Date of Last Revision: Date today  Dec  4, 1989"
```

"Return the receiver's printer. "

^printer!

printer: anSQCPrinter

"Method Version: spo1. "
"Date of Last Revision: Date today  Dec  4, 1989"

"Set the receiver's printer, and
update the printer's superModel. "

printer isNil
    ifFalse: [printer release].
printer := anSQCPrinter.
anSQCPrinter superModel: self.!

printForm: aForm

"Method Version: spo1. "
"Date of Last Revision: Date today  Dec  4, 1989"

"Print the aForm.  Pass this message on to
the printer. "

printer isNil
    ifTrue: [
        (Smalltalk includesKey: #FourColorMenu)
            ifTrue: [
                (Smalltalk at: #FourColorMenu)
                    message: 'Error: Printer Not Selected!!'
                    colorArray: #(4 14 14 4).
                ^false
                ]
            ifFalse: [
                Menu message: 'Error: Printer Not Selected!!'.
                ].
        ].
^printer printForm: aForm!

process

"Method Version: spo1. "
"Date of Last Revision: Date today  Apr 11, 1990"

"Return the receiver's process. "

^process!

process: aString

"Method Version: spo1. "
"Date of Last Revision: Date today  Apr 11, 1990"

"Set the receiver's process. "

process := aString!

release: anObject

"Method Version: spo9. "
"Date of Last Revision: Date today  Apr 30, 1990"

"If the receiver is attached to anObject, release
it from the receiver, and inform it to release
the receiver.  Otherwise, do nothing. "

| aCollection value |
(anObject = nil)
    ifTrue: [^true].

```
(anObject == #all)
    ifTrue: [
        ((aCollection := OrderedCollection new)
            add: superModel;
            add: display;
            add: shortFileManager;
            add: longFileManager;
            add: printer;
            add: plotter;
            add: shortData;
            add: longData;
            yourself)
                do: [:each | self release: each].
        ^true
        ].

(anObject == shortData)
    ifTrue: [
        shortData := nil.
        ^anObject release: self
        ].

(anObject == longData)
    ifTrue: [
        longData := nil.
        ^anObject release: self
        ].

(anObject == superModel)
    ifTrue: [
        superModel := nil.
        ^anObject release: self
        ].

(anObject == display)
    ifTrue: [
        display := nil.
        self release: printer.
        ^anObject release: self
        ].

(anObject == plotter)
    ifTrue: [
        plotter := nil.
        ^anObject release: self
        ].

(anObject == printer)
    ifTrue: [
        printer := nil.
        ^anObject release: self
        ].

(anObject == shortFileManager)
    ifTrue: [
        shortFileManager close.
        shortFileManager := nil.
        ^anObject release: self
        ].
(anObject == longFileManager)
    ifTrue: [
        longFileManager close.
        longFileManager := nil.
        ^anObject release: self
        ].
                        "For any other objects, do nothing. "
^true!

shortData
```

```
        "Method Version: spo2.  "
        "Date of Last Revision: Date today  Apr 30, 1990"

"Return the receiver's short term data processor.  "

^shortData!

shortData: anSQCData

"Method Version: spo2.  "
        "Date of Last Revision: Date today  Apr 30, 1990"

"Set the receiver's short term data processor.  "

shortData isNil
        ifFalse: [shortData release].
    shortData := anSQCData.
    anSQCData superModel: self.!

shortFileManager

"Method Version: spo2.  "
        "Date of Last Revision: Date today  Apr 30, 1990"

"Return the receiver's file manager for short
         term data.  "

^shortFileManager!

shortFileManager: anSQCFileManager

"Method Version: spo2.  "
        "Date of Last Revision: Date today  Apr 30, 1990"

"Set the receiver's file manager for SQC short
         term data.  "

shortFileManager isNil
        ifFalse: [shortFileManager release].
    shortFileManager := anSQCFileManager.
    anSQCFileManager superModel: self.!

showRawSQCData

"Method Version: spo2.  "
        "Date of Last Revision: Date today Apr 30, 1990"
        "Open a FileBrowser window displaying the
         raw SQC data.  "
        "Stubbed for Demo.  "

| answer |
    (Smalltalk includesKey: #PagingMenu)
        ifTrue: [
            answer :=
                ((Smalltalk at: #PagingMenu)
                    labelArray: #(
                        'Short-Term SQC'
                        'Long-Term  SQC'
                        )
                    lineArray: #()
                    selectorArray: #(short long)
                    header: 'Select Data Group...')
                        popUpAt: Cursor offset.
                ]
        ifFalse: [
            answer :=
                (Menu
                    labelArray: #(
                        'Select Data Group: Short-Term SQC'
                        'Select Data Group: Long-Term  SQC'
                        )
                    lines: #()
```

```
                    selectors: #(short long))
                        popUpAt: Cursor offset.
                ].
    answer isNil
        ifTrue: [^false].
    answer == #short
        ifTrue: [^shortFileManager showRawSQCData].
    answer == #long
        ifTrue: [^longFileManager showRawSQCData].!
``` startDate

```
        "Method Version: spo1. "
        "Date of Last Revision: Date today  Apr 10, 1990"

"Return the receiver's start date. "

^startDateTime date!
``` startDate: aDate

```
        "Method Version: spo1. "
        "Date of Last Revision: Date today  Apr 10, 1990"

"Set the receiver's start date. "

startDateTime date: aDate!
``` startDateTime

```
        "Method Version: spo1. "
        "Date of Last Revision: Date today  Apr 30, 1990"

"Return the receiver's start date and time. "
    ^startDateTime!
``` startTime

```
        "Method Version: spo1. "
        "Date of Last Revision: Date today  Apr 10, 1990"

"Return the receiver's start time. "

^startDateTime time!
``` startTime: aTime

```
        "Method Version: spo1. "
        "Date of Last Revision: Date today  Apr 10, 1990"

"Set the receiver's start time. "

startDateTime time: aTime!
``` superModel

```
        "Method Version: spo1. "
        "Date of Last Revision: Date today  Apr 12, 1990"

"Return the receiver's superModel. "

^superModel!
``` superModel: anSQCSuperModel

```
        "Method Version: spo1. "
        "Date of Last Revision: Date today  Apr 12, 1990"

"Set the receiver's superModel. "

superModel := anSQCSuperModel!
``` task

> "Method Version: spo1. "
> "Date of Last Revision: Date today  Apr 11, 1990"
>
> "Return the receiver's task. "

^task!

task: aString

> "Method Version: spo1. "
> "Date of Last Revision: Date today  Apr 11, 1990"
>
> "Set the receiver's task. "

task := aString!

workstations

> "Method Version: spo1. "
> "Date of Last Revision: Date today  Apr 11, 1990"
>
> "Return the list of workstations from the
> superModel. "

^superModel workstations! !

!SQCSuperModel class methods !

new

> "Revision of Method: spo1. "
> "Date of Last Revision: Date today  Apr 11, 1990"
>
> "Create a new instance of the receiver. "

^super new initialize! !

!SQCSuperModel methods !

addTask: taskIdString
    process: processIdString

> "Method Version: spo1. "
> "Date of Last Revision: Date today Apr 12, 1990"
>
> "Add the task and process indicated, and
> create an SQCModel to handle each.
> Return the SQCModel created.
> Stubbed for demo pending resolution of
> return.
> "

taskIdString notNil
        ifTrue: [
            ^sqcModels
                at: taskIdString
                put: (
                    SQCModel new
                        superModel: self;
                        task: taskIdString;
                        process: processIdString;
                        yourself
                )
            ].
    processIdString notNil
        ifTrue: [
            ^sqcModels

```
                at: processIdString
                put: (
                    SQCModel new
                        superModel: self;
                        task: taskIdString;
                        process: processIdString;
                        yourself
                    )
                ].
    ^self error: 'Task and Pocess are nil'!

display: aString

"Method Version: spo1 ark2. "
        "Date of Last Revision: Date today May  4, 1990 "

"Display the task or process designated by
            <aString>.  Stubbed for Demo. "

"Open the SQCModel. "
    ((sqcModels includesKey: aString)
        ifTrue: [(sqcModels at: aString)]
        ifFalse: [(self addTask: aString process: nil)])
            displayForm: "(
                (Smalltalk at: #SQCDisplay) pictureDictionary
                    at: 'SQC Plot: Example 1'
                    ifAbsent: [^Menu message: 'Not found!!']
                    )" nil
            called: 'Statistical Process Control Plot'
            from: #index.!

exceptionProcessor

"Method Version: spo1. "
        "Date of Last Revision: Date today  Apr 11, 1990"

"Return the receiver's exceptionProcessor. "

^exceptionProcessor!

exceptionProcessor: anExceptionProcessor

"Method Version: spo1. "
        "Date of Last Revision: Date today  Apr 11, 1990"

"Set the receiver's exceptionProcessor. "

exceptionProcessor := anExceptionProcessor!

initialize

"Revision of Method: spo1. "
        "Date of Last Revision: Date today  Apr 11, 1990"

"Initialize the defaults for the receiver. "

sqcModels := Dictionary new.!

newValue: aDataSample
    process: processIdString
    task: taskIdString

"Method Version: spo1. "
        "Date of Last Revision: Date today  Apr 11, 1990"

"Receive and log a datum <aDataSample> for the
         process identified by <processIdString> and the
         task identified by <taskIdString>.  Return an
         OrderedCollection of results, where each result
         is a two element array, containing, respectively,
         the short-term results and the long-term results.
         Each of the term results is in turn a four element
         array, containing the dataError value, dataError
```

```
    explanation, rangeError value, and rangeError
    explanation. "

| match aCollection |
match := false.
aCollection := OrderedCollection new.
sqcModels do: [:sqcModel |
    sqcModel process isNil
        ifTrue: [
            (sqcModel task = taskIdString)
                ifTrue: [
                    match := true.
                    aCollection
                        add: (sqcModel newValue: aDataSample).
                    ].
            ].
    sqcModel task isNil
        ifTrue: [
            (sqcModel process = processIdString)
                ifTrue: [
                    match := true.
                    aCollection
                        add: (sqcModel newValue: aDataSample).
                    ].
            ].
    ((sqcModel task notNil)
            and: [sqcModel process notNil])
        ifTrue: [
            ((sqcModel task = taskIdString)
                    or: [sqcModel process = processIdString])
                ifTrue: [
                    match := true.
                    aCollection
                        add: (sqcModel newValue: aDataSample).
                    ].
            ].
        ].
match
    ifFalse: [
        aCollection
            add: (
                (self
                    addTask: taskIdString
                    process: processIdString)
                        newValue: aDataSample
                ).
            ].
^aCollection!

newValue: aDataSample
    process: processIdString
    task: taskIdString
    period: anInteger "Method Version: spol. "
    "Date of Last Revision: Date today  Apr 11, 1990"
    "Receive and log a datum <aDataSample> for the
     process identified by <processIdString> and the
     task identified by <taskIdString>.  Also,
     set the receiver's period.  <anInteger>
     should be expressed in seconds, and is
     the duration for data sample continuity
     for long-term SQC.  Return an
     OrderedCollection of results, where each result
     is a two element array, containing, respectively,
     the short-term results and the long-term results.
     Each of the term results is in turn a four element
     array, containing the dataError value, dataError
     explanation, rangeError value, and rangeError
     explanation. "
```

```
| match aCollection |
match := false.
aCollection := OrderedCollection new.
sqcModels do: [:sqcModel |
    sqcModel process isNil
        ifTrue: [
            (sqcModel task = taskIdString)
                ifTrue: [
                    match := true.
                    sqcModel period: anInteger.
                    aCollection
                        add: (sqcModel newValue: aDataSample).
                    ].
            ].
    sqcModel task isNil
        ifTrue: [
            (sqcModel process = processIdString)
                ifTrue: [
                    match := true.
                    sqcModel period: anInteger.
                    aCollection
                        add: (sqcModel newValue: aDataSample).
                    ].
            ].
    ((sqcModel task notNil)
            and: [sqcModel process notNil])
        ifTrue: [
            ((sqcModel task = taskIdString)
                    or: [sqcModel process = processIdString])
                ifTrue: [
                    match := true.
                    sqcModel period: anInteger.
                    aCollection
                        add: (sqcModel newValue: aDataSample).
                    ].
            ].
        ].
match
    ifFalse: [
        aCollection
            add: (
                (self
                    addTask: taskIdString
                    process: processIdString)
                        period: anInteger;
                            newValue: aDataSample
                ).
            ].
    ^aCollection!

release: anObject

"Method Version: spo3. "
    "Date of Last Revision: Date today  Apr 30, 1990"

"If the receiver is attached to anObject, release
     it from the receiver, and inform it to release
     the receiver.  Otherwise, do nothing. "

(anObject = nil)
        ifTrue: [^true].

(anObject == #all)
        ifTrue: [
            ((OrderedCollection new)
                add: exceptionProcessor;
                addAll: sqcModels keys;
                yourself)
                    do: [:each | self release: each].
            ^true
            ].
```

```
            (sqcModels includesKey: anObject)
                ifTrue: [
                    (sqcModels at: anObject) release: #all.
                    sqcModels removeKey: anObject.
                    ^true
                        ].

(anObject == exceptionProcessor)
                ifTrue: [
                    exceptionProcessor := nil.
                    ^anObject release: self
                        ].

"For any other objects, do nothing. "
        ^true!

showRawSQCData

"Method Version: spo1. "
        "Date of Last Revision: Date today Apr 12, 1990"

"Open a FileBrowser window displaying the
         raw SQC data. "

(Smalltalk at: #FileBrowser) new
        open: 'sqctest.dat'
        on: Disk.!

showRawSQCDataFor: aString

"Method Version: spo2. "
        "Date of Last Revision: Date today Apr 30, 1990"
        "Open a FileBrowser window displaying the
         raw SQC data.  <aString> represents the
         taskIdString or processIdString for which
         to get the data. "
        "Stubbed for Demo. "

(sqcModels includesKey: aString)
        ifTrue: [
            (sqcModels at: aString)
                showRawSQCData.
                ]
        ifFalse: [
            ^Menu message: 'ERROR: No Raw SQC Data Found!!'
                ].!

workstations

"Method Version: spo1. "
        "Date of Last Revision: Date today  Apr 12, 1990"

"Return the list of workstations from the
         exceptionProcessor. "

^exceptionProcessor workstations! !

!Float class methods !

floatError
        "Query the floating point coprocessor as
         to the type of exception and report it."
    | status |
    status := self status.
    (status bitAnd: 8) ~= 0
        ifTrue: [^self error: 'Float overflow exception'].
    (status bitAnd: 16r10) ~= 0
        ifTrue: [^self error: 'Float underflow exception'].
    (status bitAnd: 4) ~= 0
        ifTrue: [^self error: 'Float divide by zero exception'].
    (status bitAnd: 2) ~= 0
```

```
            ifTrue: [^self error: 'Float denormalized operand'].
        (status bitAnd: 1) ~= 0
            ifTrue: [^self error: 'Float invalid operation'].
        (status bitAnd: 16r80) ~= 0
            ifTrue: [^self error: 'Math coprocessor missing'].
        ^self error: 'Float undefined exception'!

fromInteger: anInteger
        "Check to see if the math coprocessor is present. If it is then
         use the original primitive, else call user defined primitive.
         Answer a floating point representation of the argument
         anInteger."
    | result status |
    <primitive: 40>
    status := self status.
    (status bitAnd: 16r80) ~= 0
        ifTrue: [result := self new.
                 self new floatPrimWith: 0 with: anInteger with: result.
                 ^result]
        ifFalse: [^self floatError]!

new
        "Answer a float initialized to zero"
    ^self basicNew: 8!

pi
        "Answer the floating point
         representation of pi."
    ^1 arcTan * 4!

status
        "Answer the status of the floating point
         coprocessor as a small integer (refer to
         coprocessor status word definition)."
    <primitive: 86>! !

!Float methods !

* aNumber
        "Check to see if the math coprocessor is present. If it is then
         use the original primitive, else call user defined primitive.
         Answer the result of multiplying the receiver by aNumber."
    | result status |
    <primitive: 49>
    aNumber class == Float
        ifTrue: [status := self class status.
                 (status bitAnd: 16r80) ~= 0
                    ifTrue: [result := self class new.
                             self floatPrimWith: 12 with: aNumber with: result
                             ^result]
                    ifFalse: [^self class floatError]]
        ifFalse: [^self * (aNumber asFloat)]!

+ aNumber
        "Check to see if the math coprocessor is present. If it is then
         use the original primitive, else call user defined primitive.
         Answer sum of the receiver and aNumber."
    | result status |
    <primitive: 41>
    aNumber class == Float
        ifTrue: [status := self class status.
                 (status bitAnd: 16r80) ~= 0
                    ifTrue: [result := self class new.
                             self floatPrimWith: 10 with: aNumber with: result.
                             ^result]
                    ifFalse: [^self class floatError]]
        ifFalse: [^self + (aNumber asFloat)]!

- aNumber
        "Check to see if the math coprocessor is present. If it is then
         use the original primitive, else call user defined primitive.
```

```
        Answer the result of subtracting the receiver and aNumber."
    | result status |
    <primitive: 42>
    aNumber class == Float
        ifTrue: [status := self class status.
                (status bitAnd: 16r80) ~= 0
                    ifTrue: [result := self class new.
                            self floatPrimWith: 11 with: aNumber with: result.
                            ^result]
                    ifFalse: [^self class floatError]]
        ifFalse: [^self - (aNumber asFloat)]!

/ aNumber
    "Check to see if the math coprocessor is present. If it is then
    use the original primitive, else call user defined primitive.
    Answer the result of dividing the receiver by aNumber."
    | result status |
    <primitive: 50>
    aNumber class == Float
        ifTrue: [status := self class status.
                (status bitAnd: 16r80) ~= 0
                    ifTrue: [aNumber = 0 ifTrue: [^self error: '0 divisor'].
                            result := self class new.
                            self floatPrimWith: 13 with: aNumber with: result.
                            ^result]
                    ifFalse: [^self class floatError]]
        ifFalse: [^self / (aNumber asFloat)]!

// aNumber
    "Answer the integer quotient after dividing
    the receiver by aNumber with truncation
    towards negative infinity."
    | answer quotient |
    quotient := self / aNumber.
    answer := quotient truncated.
    quotient < 0
        ifTrue: [
            answer = quotient
                ifFalse: [^answer - 1]].
    ^answer!

< aNumber
    "Check to see if the math coprocessor is present. If it is then
    use the original primitive, else call user defined primitive.
    Answer true if the receiver is less than aNumber, else answer false."
    | result status |
    <primitive: 43>
    aNumber class == Float
        ifTrue: [status := self class status.
                (status bitAnd: 16r80) ~= 0
                    ifTrue: [result := self class new.
                            ^self floatPrimWith: 15 with: aNumber with: result]
                    ifFalse: [^self class floatError]]
        ifFalse: [(aNumber isKindOf: Number)
                    ifTrue: [^self < (aNumber asFloat)]
                    ifFalse: [^false]]!

<= aNumber
    "Answer true if the receiver is less than
    or equal to aNumber, else answer false."
    ^(aNumber asFloat < self) not!

= aNumber
    "Check to see if the math coprocessor is present. If it is then
    use the original primitive, else call user defined primitive.
    Answer true if the receiver is equal to aNumber, else answer false."
    | result status |
    <primitive: 47>
    aNumber class == Float
        ifTrue: [status := self class status.
                (status bitAnd: 16r80) ~= 0
                    ifTrue: [result := self class new.
```

```
                           ^self floatPrimWith: 16 with: aNumber with: result]
                iffalse: [^self class floatError]]
        iffalse: [(aNumber isKindOf: Number)
                     ifTrue: [^self = (aNumber asFloat)]
                     iffalse: [^false]]!
```

> aNumber
    "Answer true if the receiver is greater
        than aNumber, else answer false."
    ^aNumber asFloat < self!

>= aNumber
    "Answer true if the receiver is greater than
        or equal to aNumber, else answer false."
    ^(self < aNumber) not!

\\ aNumber
    "Answer the integer remainder after dividing
        the receiver by aNumber with truncation
        towards negative infinity."
    ^(self - (self // aNumber * aNumber))
        truncated!

arcTan
    "Check to see if the math coprocessor is present. If it is then
        use the original primitive, else call user defined primitive.
        Answer the arc-tangent, an angle in radians, of the receiver."
    | result status |
    <primitive: 85>
    status := self class status.
    (status bitAnd: 16r80) -= 0
        ifTrue: [result := self class new.
                self floatPrimWith: 6 with: self with: result.
                ^result]
        iffalse: [^self class floatError]!

asFloat
    "Answer the receiver as a floating
        point number."
    ^self!

cos
    "Check to see if the math coprocessor is present. If it is then
        use the original primitive, else call user defined primitive.
        Answer the cosine of the receiver.  The receiver is an angle
        measured in radians"
    | result status |
    <primitive: 30>
    status := self class status.
    (status bitAnd: 16r80) -= 0
        ifTrue: [result := self class new.
                self floatPrimWith: 4 with: self with: result.
                ^result]
        iffalse: [^self class floatError]!

degreesToRadians
    "Answer the number of radians the
        receiver represents in degrees."
    ^self * Float pi / 180!

exp
    "Check to see if the math coprocessor is present. If it is then
        use the original primitive, else call user defined primitive.
        Answer the exponential of the receiver."
    | result status |
    <primitive: 45>
    status := self class status.
    (status bitAnd: 16r80) -= 0
        ifTrue: [result := self class new.
                self floatPrimWith: 1 with: self with: result.
                ^result]
        iffalse: [^self class floatError]!

exponent
    "Check to see if the math coprocessor is present. If it is then
     use the original primitive, else call user defined primitive.
     Answer the floating point number whose value
     is the exponent part of the floating
     point representation of the receiver."
    | result status |
    <primitive: 53>
    status := self class status.
    (status bitAnd: 16r80) -= 0
        ifTrue: [result := self class new.
            self floatPrimWith: 18 with: self with: result.
            ^result]
        ifFalse: [^self class floatError]!

floatPrimWith: aFunction
    with: anInteger
    with: result
        "Call user's primitive to perform
         floating point calculations"
    <primitive: dispatch>
    self primitiveFailed!

hash
    "Answer the integer hash value for the receiver."
    | answer index |
    answer := 0.
    index := 8.
    [index <= 4]
        whileFalse: [
            answer := answer + ((self at: index) hash).
            index := index - 1].
    ^answer!

ln
    "Check to see if the math coprocessor is present. If it is then
     use the original primitive, else call user defined primitive.
     Answer the natural log of the receiver."
    | result status |
    <primitive: 46>
    status := self class status.
    (status bitAnd: 16r80) -= 0
        ifTrue: [result := self class new.
            self floatPrimWith: 2 with: self with: result.
            ^result]
        ifFalse: [^self class floatError]!

negated
    "Answer the receiver subtracted from zero."
    ^0 asFloat - self!

printOn: aStream
    "Answer the receiver.  Append the ASCII
     representation (maximum of 8 digits) of
     the receiver to aStream."
    | digitCount integer number rounder scale n |
    (number := self) < 0
        ifTrue: [
            aStream nextPut: $-.
            number := self negated].
    rounder := 1/20000000.
    number = 0
        ifTrue: [^aStream nextPutAll: '0.0'].
    scale := 0.
    [number >= 10]
        whileTrue: [
            number := number / 10.
            scale := scale + 1].
    [number < 1]
        whileTrue: [
            number := number * 10.

```
            scale := scale - 1].
number := number + rounder.
number >= 10
    ifTrue: [
        number := number /10.
        scale := scale + 1].
(scale > 7 or: [
scale < -7 or: [
scale < 0 and: [
n := number * (10 raisedToInteger: 7 + scale).
((n - n truncated) * (10 raisedToInteger:
    scale negated)) truncated -= 0]]])
    ifFalse: [
        number := number * (10 raisedToInteger: scale).
        rounder := rounder * (10 raisedToInteger: scale).
        scale := 0].
digitCount := aStream position.
integer := number truncated.
number := number - integer.
integer printOn: aStream.
aStream nextPut: $..
rounder := rounder + rounder.
digitCount := 9 - (aStream position - digitCount).
[number := number * 10.
integer := number truncated.
number := number - integer.
aStream nextPut: (Character digitValue: integer).
(digitCount := digitCount - 1) > 0 and:
[(rounder := rounder * 10) <= number]]
    whileTrue: [].
scale = 0
    ifFalse: [
            aStream nextPut: $e.
            scale printOn: aStream]!

radiansToDegrees
        "Answer the number of degrees the
        receiver represents in radians."
    ^self * 180 / Float pi!

reciprocal
        "Answer one divided by the receiver."
    ^1 asFloat / self!

significand
        "Check to see if the math coprocessor is present. If it is then
        use the original primitive, else call user defined primitive.
        Answer the floating point number whose value
        is the significand part of the floating
        point representation of the receiver."
    | result status |
    <primitive: 52>
    status := self class status.
    (status bitAnd: 16r80) -= 0
        ifTrue: [result := self class new.
                self floatPrimWith: 9 with: self with: result.
                ^result]
        ifFalse: [^self class floatError]!

sin
        "Check to see if the math coprocessor is present. If it is then
        use the original primitive, else call user defined primitive.
        Answer the sine of the receiver.  The receiver is an angle
        measured in radians"
    | result status |
    <primitive: 48>
    status := self class status.
    (status bitAnd: 16r80) -= 0
        ifTrue: [result := self class new.
                self floatPrimWith: 3 with: self with: result.
                ^result]
        ifFalse: [^self class floatError]!
``` sqrt
"Check to see if the math coprocessor is present. If it is then
    use the original primitive, else call user defined primitive.
    Answer the square root of the receiver."
| result status |
<primitive: 44>
status := self class status.
(status bitAnd: 16r80) ~= 0
    ifTrue: [result := self class new.
            self floatPrimWith: 7 with: self with: result.
            ^result]
    ifFalse: [^self class floatError]!

tan
"Check to see if the math coprocessor is present. If it is then
    use the original primitive, else call user defined primitive.
    Answer the tangent of the receiver. The
    receiver is an angle measured in radians"
| result status |
<primitive: 83>
status := self class status.
(status bitAnd: 16r80) ~= 0
    ifTrue: [result := self class new.
            self floatPrimWith: 5 with: self with: result.
            ^result]
    ifFalse: [^self class floatError]!

timesTwoPower: anInteger
    "Check to see if the math coprocessor is present. If it is then
    use the original primitive, else call user defined primitive.
    Answer 2 to the exponent anInteger multiplied by the receiver."
| result status |
<primitive: 54>
status := self class status.
(status bitAnd: 16r80) ~= 0
    ifTrue: [result := self class new.
            self floatPrimWith: 14 with: anInteger with: result.
            ^result]
    ifFalse: [^self class floatError]!

truncated

"Check to see if the math coprocessor
    is present. If it is then use the original
    primitive, else call user defined primitive.
    Answer the receiver as a kind of Integer
    truncating the fraction part."
    "I modified this according to October, 1989
    SCOOP bug fix. "

| answer float i partialInt result scale status |
<primitive: 51>
status := self class status.
(status bitAnd: 16r80) ~= 0
    ifTrue: [
        i := 0.
        result := 0.
        [(self abs) >= (result abs)]
            whileTrue: [result := (2 raisedToInteger: i).
                    i := i + 1].
        result := (self sign) * (result - 1).
        ^self floatPrimWith: 8 with: self with: result
        ]
    ifFalse: [
        scale := self exponent truncated.
        float := self timesTwoPower: scale \\ 13 - scale.
        answer := float truncated.
        float := float - answer asFloat.
        scale // 13 timesRepeat: [
            float := float timesTwoPower: 13.
            partialInt := float truncated.
            answer := answer * 8192 + partialInt.

```
                float := (float - partialInt asFloat).
                                      ].
        ^answer
            ]! !
```

!SQCDisplay class methods !

new

```
        "Method Version: spo1.  "
        "Date of Last Revision: Date today Mar 30, 1990"

"Create an instance of the receiver, but
         do not open it."

^super new initialize! !
```

!SQCDisplay methods !

activateWindow

```
        "Method Version: spo3.  "
        "Date of Last Revision: Date today Apr  5, 1990"

"Perform any window activation processes.  "

startUpFlag
        ifTrue: [self startUp].!
``` active

```
        "Method Version: spo2.  "
        "Date of Last Revision: Date today Apr  5, 1990"

"Return a Boolean indicating the activity
         state of the receiver.  "

^((pane topPane dispatcher active)
        and: [pane topPane collapsed not])!
``` aPoint

```
        "Method Version: ark1.  "
        "Date of Last Revision: Date today May  9, 1990"

"Return point for the button prompters"

| rectangle | rectangle := messagePane topPane frame.
    ^ rectangle center  - ((rectangle width //3 ) @ 0)!
``` changeDisplayParms

```
        "Method Version: spo1.  "
        "Date of Last Revision: Date today  Dec  4, 1989"

"Prompt the user for new parameters
         to use for displaying.  "!
``` changeParameters

```
        "Method Version: spo3.  "
        "Date of Last Revision: Date today  Dec 14, 1989"
        "Prompt the user for the parameters to
         change, and get and set the new values.  "

| answer |
    answer :=
```

```
                    (Smalltalk includesKey: #PagingMenu)
                        ifTrue: [
                            ((Smalltalk at: #PagingMenu)
                                labelArray: #(
                                    '    Display'
                                    '    Plotting'
                                    '    Printing'
                                            )
                                lineArray: #()
                                selectorArray: #(display plot print)
                                header: 'Change Parameters:...')
                                    popUpAt: Cursor offset.
                            ]
                        ifFalse: [
                            (Menu
                                labelArray: #(
                                    'Change Parameters: Display'
                                    'Change Parameters: Plotting'
                                    'Change Parameters: Printing'
                                            )
                                lineArray: #()
                                selectorArray: #(display plot print))
                                    popUpAt: Cursor offset.
                            ].
        (answer == nil)
            ifTrue: [^false].
        (answer == #display)
            ifTrue: [^self changeDisplayParms].
        (answer == #plot)
            ifTrue: [
                (superModel == nil)
                    ifFalse: [^superModel changePlotParmsFor: self]
                    ifTrue: [^false].
                ].
        (answer == #print)
            ifTrue: [
                (superModel == nil)
                    ifFalse: [^superModel changePrintParmsFor: self]
                    ifTrue: [^false].
                ].!

closeIt

"Method Version: spo3.  "
        "Date of Last Revision: Date today    Jun 15, 1989"

"Close the receiver.  Check to see
         if the receiver has been modified
         before allowing it to close.
         If so, prompt the user for
         disposition of the changes.   "

(self clearChanges)
        ifTrue: [
            self release: #all.
            ^super closeIt
            ]
        ifFalse: [^false].!

deadPaneText

"Method Version: spo1.  "
        "Date of Last Revision: Date today    Apr  3, 1990"

"Return the text for the dead pane.   "

^''!

draw: aCharacter

"Method Version: spo1.  "
        "Date of Last Revision: Date today    Nov 29, 1989"
```

```
                "Follow the cursor while drawing until the select button
                 is released."
                "Because this window is read-only, do nothing.   "!

endDateButton

"Method Version: spo1.    "
        "Date of Last Revision: Date today   Apr   4, 1990"

"Return the end date text for the button field.    "

^#('End Date')!

endDateButton: aString

"Method Version: spo1.    "
        "Date of Last Revision: Date today   May   5, 1990"

"The end date button has been pressed on <aString>.
         Take the appropriate action.     "
     "
     self
        changed: #endDateButton
        with: #restore;
        changed: #endDateField
        with: #restore.
     "
     | aPoint date date2 | self
        changed: #endDateButton
        with: #restore.
     "aPoint := ( 0 @ (messagePane topPane frame height // 2) )
               + (messagePane topPane frame origin)."
     "aPoint := messagePane topPane frame center."
     date := PopUpPrompter prompt: 'What is the END DATE ?'
                           default: superModel endDate printString
                           popUpAt: self aPoint.
     date2 := Date fromString: date.
     superModel endDate: date2.
     self changed: #endDateField.!

endDateField

"Method Version: spo3.    "
        "Date of Last Revision: Date today   Apr  13, 1990"

"Return the end date text for the data field.    "

^Array with: (superModel endDate printString)!

endDateField: aString

"Method Version: spo1.    "
        "Date of Last Revision: Date today   Apr   4, 1990"

"The end date field has been pressed on <aString>.
         Take the appropriate action.     "

self
        changed: #endDateField
        with: #restore.!

endTimeButton

"Method Version: spo1.    "
        "Date of Last Revision: Date today   Apr   4, 1990"

"Return the end time text for the button field.    "

^#('End Time')!

endTimeButton: aString
```

```
        "Method Version: spol arkl.  "
        "Date of Last Revision: Date today   May  5, 1990"

"The end time button has been pressed on <aString>.
         Take the appropriate action.  "
"
    self
        changed: #endTimeButton
        with: #restore;
        changed: #endTimeField
        with: #restore.
"
    | aPoint time time2 | self
        changed: #endTimeButton
        with: #restore.
    "aPoint := ( 0 @ (messagePane topPane frame height // 2) )
              + (messagePane topPane frame origin)."
    "aPoint := messagePane topPane frame center."
    time := PopUpPrompter prompt: 'What is the END TIME ?'
                         default: superModel endTime printString
                         popUpAt: self aPoint.
    time2 := Time fromString: time.
    superModel endTime: time2.
    self changed: #endTimeField.!

endTimeField

"Method Version: spo3.  "
        "Date of Last Revision: Date today  Apr 13, 1990"

"Return the end time text for the data field.  "

^Array with: (superModel endTime printString)!

endTimeField: aString

"Method Version: spol.  "
        "Date of Last Revision: Date today  Apr  4, 1990"

"The end time field has been pressed on <aString>.
         Take the appropriate action.  "

self
        changed: #endTimeField
        with: #restore.!

getHelp

"Method Version: spol.  "
        "Date of Last Revision: Date today  Apr  4, 1990"

"Provide help to the user.  "

"Debug code"
    ^Menu message: 'The Lone Ranger has been summoned...'!

help

"Method Version: spol.  "
        "Date of Last Revision: Date today  Apr  3, 1990"

"Return the text for the help control.  "

^#('HELP!!')!

help: aString

"Method Version: spol.  "
        "Date of Last Revision: Date today  Apr  4, 1990"
```

```
            "The help control has been pressed on
             <aString>.  Take the appropriate action.  "

self
        changed: #help
        with: #restore;
        getHelp!

initButtonPane: assoc
    for: aTopPane
    with: ratioInteger
    with: lineHeightInteger "Method Version: spo4.  "
        "Date of Last Revision: Date today  Apr  3, 1990"
        "Initialize the button panes of the receiver.  "

| subpane |
    aTopPane
        addSubpane: (
            subpane :=
                CenteredListPane new
                    name: assoc key;
                    model: self;
                    menu: (assoc value at: #menu);
                    change: (assoc value at: #change);
                    framingBlock: [:box |
                        (box origin + (0 @ lineHeightInteger) +
                        ((((assoc value at: #sequenceNumber)
                            + (ratioInteger - 1)
                                \\  ratioInteger)
                                    * (box width // ratioInteger))
                        @
                        (((assoc value at: #sequenceNumber)
                            + (ratioInteger - 1)
                                // ratioInteger - 1)
                                    * lineHeightInteger)))
                                extent: (
                                    ((box width // ratioInteger) +
                                    (box width \\ ratioInteger))
                                        @ lineHeightInteger
                                )
                                ];
                    yourself
                    ).
        ((subpane respondsTo: #foreColor:)
            and: [assoc value includesKey: #foreColor])
        ifTrue: [subpane foreColor: (assoc value at: #foreColor)].
        ((subpane respondsTo: #backColor:)
            and: [assoc value includesKey: #backColor])
        ifTrue: [subpane backColor: (assoc value at: #backColor)].!

initButtons

"Method Version: spo2.  "
        "Date of Last Revision: Date today  Apr  4, 1990"

"Initialize the button information of the receiver.  "

(buttons := Dictionary new)
        at: #startDateButton
        put: (
            Dictionary new
                at: #sequenceNumber
                put: 1;
                at: #menu
                put: #paneMenuSelector;
                at: #change
                put: #startDateButton: ;
                at: #foreColor
                put: 14;
                at: #backColor
                put: 6;
                yourself
        );
```

```
        at: #startTimeButton
        put: (
            Dictionary new
                at: #sequenceNumber
                put: 2;
                at: #menu
                put: #paneMenuSelector;
                at: #change
                put: #startTimeButton: ;
                at: #foreColor
                put: 14;
                at: #backColor
                put: 6;
                yourself
            );
    at: #endDateButton
    put: (
        Dictionary new
            at: #sequenceNumber
            put: 3;
            at: #menu
            put: #paneMenuSelector;
            at: #change
            put: #endDateButton: ;
            at: #foreColor
            put: 14;
            at: #backColor
            put: 6;
            yourself
        );
    at: #endTimeButton
    put: (
        Dictionary new
            at: #sequenceNumber
            put: 4;
            at: #menu
            put: #paneMenuSelector;
            at: #change
            put: #endTimeButton: ;
            at: #foreColor
            put: 14;
            at: #backColor
            put: 6;
            yourself
        );
    at: #startDateField
    put: (
        Dictionary new
            at: #sequenceNumber
            put: 5;
            at: #menu
            put: #paneMenuSelector;
            at: #change
            put: #startDateField: ;
            at: #foreColor
            put: 14;
            at: #backColor
            put: 1;
            yourself
        );
    at: #startTimeField
    put: (
        Dictionary new
            at: #sequenceNumber
            put: 6;
            at: #menu
            put: #paneMenuSelector;
            at: #change
            put: #startTimeField: ;
            at: #foreColor
            put: 14;
```

```
                    at: #backColor
                    put: 1;
                    yourself
                );
        at: #endDateField
        put: (
            Dictionary new
                at: #sequenceNumber
                put: 7;
                at: #menu
                put: #paneMenuSelector;
                at: #change
                put: #endDateField: ;
                at: #foreColor
                put: 14;
                at: #backColor
                put: 1;
                yourself
            );
        at: #endTimeField
        put: (
            Dictionary new
                at: #sequenceNumber
                put: 8;
                at: #menu
                put: #paneMenuSelector;
                at: #change
                put: #endTimeField: ;
                at: #foreColor
                put: 14;
                at: #backColor
                put: 1;
                yourself
            ).!

initControlPane: assoc
    for: aTopPane
    with: ratioInteger
    with: lineHeightInteger "Method Version: spo5. "
        "Date of Last Revision: Date tōday  Apr  3, 1990"

"Initialize the control panes of the receiver. "

| offset subpane |
    offset :=
        (0 @ lineHeightInteger) +
        (0 @ (buttons size + ratioInteger - 1
                // ratioInteger * lineHeightInteger)).
    aTopPane
        addSubpane: (
            subpane :=
                CenteredListPane new
                    name: assoc key;
                    model: self;
                    menu: (assoc value at: #menu);
                    change: (assoc value at: #change);
                    framingBlock: [:box |
                        (box origin + offset +
                        ((box width
                            * (ratioInteger - 1)
                            // ratioInteger)
                        @
                        (((assoc value at: #sequenceNumber) - 1)
                            * (box height - offset y)
                            + controls size - 1
                            // controls size)))
                        extent: (
                            ((box width // ratioInteger) +
                                (box width \\ ratioInteger))
                                    @ ((box height - offset y)
                                        + controls size - 1
                                        // controls size)
```

```
                            )
                        ];
                  yourself
                  ).
   ((subpane respondsTo: #foreColor:)
        and: [assoc value includesKey: #foreColor])
      ifTrue: [subpane foreColor: (assoc value at: #foreColor)].
   ((subpane respondsTo: #backColor:)
        and: [assoc value includesKey: #backColor])
      ifTrue: [subpane backColor: (assoc value at: #backColor)].!

initControls

"Method Version: spol.  "
    "Date of Last Revision: Date today  Apr  3, 1990"

"Initialize the controller information of the receiver.  "

(controls := Dictionary new)
        at: #help
        put: (
            Dictionary new
                at: #sequenceNumber
                put: 1;
                at: #menu
                put: #paneMenuSelector;
                at: #change
                put: #help: ;
                at: #foreColor
                put: 14;
                at: #backColor
                put: 2;
                yourself
            );
        at: #parameters
        put: (
            Dictionary new
                at: #sequenceNumber
                put: 2;
                at: #menu
                put: #paneMenuSelector;
                at: #change
                put: #parameters: ;
                at: #foreColor
                put: 14;
                at: #backColor
                put: 3;
                yourself
            );
        at: #plot
        put: (
            Dictionary new
                at: #sequenceNumber
                put: 3;
                at: #menu
                put: #paneMenuSelector;
                at: #change
                put: #plot: ;
                at: #foreColor
                put: 14;
                at: #backColor
                put: 3;
                yourself
            );
        at: #print
        put: (
            Dictionary new
                at: #sequenceNumber
                put: 4;
                at: #menu
                put: #paneMenuSelector;
                at: #change
                put: #print: ;
                at: #foreColor
```

```
                put: 14;
                at: #backColor
                put: 3;
                yourself
            );
        at: #restart
        put: (
            Dictionary new
                at: #sequenceNumber
                put: 5;
                at: #menu
                put: #paneMenuSelector;
                at: #change
                put: #restart: ;
                at: #foreColor
                put: 0;
                at: #backColor
                put: 14;
                yourself
            );
        at: #quit
        put: (
            Dictionary new
                at: #sequenceNumber
                put: 6;
                at: #menu
                put: #paneMenuSelector;
                at: #change
                put: #quit: ;
                at: #foreColor
                put: 15;
                at: #backColor
                put: 4;
                yourself
            ).!

initDeadPaneFor: aTopPane
    with: ratioInteger
    with: lineHeightInteger

"Method Version: spc1.  "
    "Date of Last Revision: Date today Mar 30, 1990"

"Initialize the dead pane for the receiver.  "

| subpane |
    aTopPane
        addSubpane: (
            subpane :=
                MessagePane new
                    name: #deadPaneText;
                    model: self;
                    menu: #paneMenuSelector;
                    framingBlock: [:box |
                        (box origin + (0 @ lineHeightInteger) +
                        ((((buttons size + 1)
                            ÷ (ratioInteger - 1)
                                \\ ratioInteger)
                                    * (box width // ratioInteger))
                        @
                        (((buttons size + 1)
                            ÷ (ratioInteger - 1)
                                // ratioInteger - 1)
                                    * lineHeightInteger)))
                        extent: (
                            (box width -
                                ((box width // ratioInteger)
                                    * (buttons size \\ ratioInteger)))
                                        @ lineHeightInteger
                        )
                    ];
                    yourself
        ).
```

```
          (subpane respondsTo: #foreground:background:)
              ifTrue: [
                  subpane
                      foreground: (aTopPane foreColor)
                      background: (aTopPane backColor)
                      ].!

initialize
         "Method Version: spo2.  "
         "Date of Last Revision: Date today  Apr  3, 1990"

"Initialize the receiver, prior to openning it.  "

startUpFlag := true.
    self initButtons.
    self initControls.!

initMenus

"Method Version: spo3.  "
         "Date of Last Revision: Date today  Apr  5, 1990"

"Initialize the menus.  "

super initMenus.
    menu
        at: #mainMenu
        put: (
            ((Smalltalk includesKey: #FourColorMenu)
                ifTrue: [(Smalltalk at: #FourColorMenu)]
                ifFalse: [Menu])
                    labelArray: #(
                        'Help!!'
                        'Change Parameters...'
                        'Re-Plot'
                        'Print'
                        'Restart'
                        'Quit'
                                )
                    lineArray: #()
                    selectorArray: #(
                        getHelp
                        changeParameters
                        replot
                        printDisplay
                        startUp
                        closeIt
                                )
            );
        at: #parameterMenu
        put: (
            ((Smalltalk includesKey: #FourColorMenu)
                ifTrue: [(Smalltalk at: #FourColorMenu)]
                ifFalse: [Menu])
                    labelArray: #(
                        'Change Plot Parameters...'
                        'Change Printer Parameters...'
                                )
                    lineArray: #()
                    selectorArray: #(
                        changePlotter
                        changePrinter
                                )
            );
        at: #topPaneMenu
        put: (
            ((Smalltalk includesKey: #FourColorMenu)
                ifTrue: [(Smalltalk at: #FourColorMenu)]
                ifFalse: [Menu])
                    labelArray: #(
                        'Close Window'
                        'Change Window Color'
                        'Cycle Windows'
                        'Reframe Window'
```

```
                        'Move Window'
                        'Collapse Window'
                                    )
                    lineArray: #(1 5)
                    selectorArray: #(
                        closeIt
                        color
                        cycle
                        resize
                        move
                        collapse
                                    )
                );
        at: #startUpMenu
        put: (
            HierarchyMenu
                labels: ' TASK \ PROCESS ' withCrs
                lines: #()
                selectors: #(
                    'place holder for task'
                    'place holder for process'
                            )
                subMenus: (
                    Array
                        with:
                            (Menu
                                labelArray:   superModel workstations
                                lines: #()
                                selectors:    superModel workstations)
                        with:
                            (Menu
                                labelArray: #(
                                    ' Process 27 '
                                    ' Process 28 '
                                    ' Process 40 '
                                            )
                                lines: #()
                                selectors: #('Process 27'
                                            'Process 28'
                                            'Process 40' ))
                                )
                ).!

initWindowSize

"Method Version: spo1 ark1. "
        "Date of Last Revision: Date today  May  4, 1990"

"Answer the initial window extent. "

^Display width * 7 // 8 @
        (Display height * 47 // 64)!

messages

"Method Version: spo2. "
        "Date of Last Revision: Date today  Apr  4, 1990"

"Initialize the message pane of the receiver. "

^#('')!

name

"Method Version: spo1. "
        "Date of Last Revision: Date today  Dec 14, 1989"

"Return the name of the graph being displayed. "

^pane topPane label!

openOn: aForm
    called: aNameString
    from: aSourceSymbol
```

```
"Method Version: spo5 ark2.  "
"Date of Last Revision: Date today   May  4, 1990"

"Open a free drawing window on aForm
 with name aNameString from aSourceSymbol.  "

| listLineHeight ratio topPane |
self initMenus.
initialForm := aForm.

"Following changes handle if nil is passed as form.  This is the case
when there is no plot to be displayed when the window is first opened"
    "formOffset := initialForm offset."
    (initialForm isNil)
        ifFalse:[ formOffset := initialForm offset.
                  initialForm offset: 0@0].
    "initialForm offset: 0@0."

source := aSourceSymbol.
ratio := 4.
listLineHeight := ListFont height + 4.
topPane :=
    TopPane new
        model: self;
        label: aNameString;
        menu: #topPaneMenu ;
        leftIcons: #();  "Added to prevent window close w/o doing releases i
        minimumSize: (Display extent // 2);
        yourself.
topPane
    addSubpane: (
        messagePane :=
            MessagePane new
                model: self;
                name: #messages ;
                menu: #paneMenuFunction;
                framingBlock: [:box |
                    box origin extent: (box width @ listLineHeight)
                    ];
                yourself
            ).
(messagePane respondsTo: #foreColor:)
    ifTrue: [messagePane foreColor: 14].
(messagePane respondsTo: #backColor:)
    ifTrue: [messagePane backColor: 2].

buttons associationsDo: [:assoc |
    self
        initButtonPane: assoc
        for: topPane
        with: ratio
        with: listLineHeight.
            ].
((buttons size \\ ratio) == 0)
    ifFalse: [
        self
            initDeadPaneFor: topPane
            with: ratio
            with: listLineHeight.
            ].

controls associationsDo: [:assoc |
    self
        initControlPane: assoc
        for: topPane
        with: ratio
        with: listLineHeight.
            ].

topPane
    addSubpane: (
        pane :=
            FreeDrawPane new
                model: self;
```

```
                name: #initialize: ;
                menu: #paneMenuFunction;
                change: #change;
                framingBlock: [:box |
                    box origin +
                    (0 @
                        (1 + (buttons size + ratio - 1 // ratio))
                            * listLineHeight)
                        corner: (
                            box corner -
                            ((box width // ratio) @ 0)
                            )
                                ];
                yourself
                ).
    topPane dispatcher open scheduleWindow!

parameters

"Method Version: spo1. "
        "Date of Last Revision: Date today   Apr   3, 1990"

"Return the text for the parameters control.  "
    ^#('Parameters')!

parameters: aString

"Method Version: spo1. "
        "Date of Last Revision: Date today   Apr   4, 1990"

"The parameters control has been pressed on
          <aString>.  Take the appropriate action.  "

self
        changed: #parameters
        with: #restore;
        changeParameters!

plot

"Method Version: spo1. "
        "Date of Last Revision: Date today   Apr   3, 1990"

"Return the text for the plot control.  "

^#('Plot')!

plot: aString

"Method Version: spo1 ark1. "
        "Date of Last Revision: Date today   May   4, 1990"

"The plot control has been pressed on
          <aString>.  Take the appropriate action.  "

| aForm |

"Hard wire a sample graph for demo purposes"

aForm := (Smalltalk at: #SQCDisplay) pictureDictionary
                at: 'SQC Plot: Example A'.
    initialForm := aForm.
    formOffset := initialForm offset.
    initialForm offset: 0@0.

self
        changed: #plot
        with: #restore";
        replot".

"Plot the graph"
    Time waitSeconds: 2.
    self changed: #initialize:.!
```

```
print

"Method Version: spo1.  "
    "Date of Last Revision: Date today   Apr  3, 1990"

"Return the text for the print control.   "

^#('Print')!

print: aString

"Method Version: spo1.  "
    "Date of Last Revision: Date today  Apr  4, 1990"

"The print control has been pressed on
     <aString>.  Take the appropriate action.   "

self
        changed: #print
        with: #restore;
        printDisplay!

printDisplay

"Method Version: spo1.  "
    "Date of Last Revision: Date today  Apr  4, 1990"

"Print out the displayed graph using the currently
     set parameters.  "

(Menu yesOrNoFor: 'Print Using Current Settings?')
        ifTrue: [self printForm].!

printForm

"Method Version: spo2.  "
    "Date of Last Revision: Date today  Dec  1, 1989"

"Print the picture.  "

(superModel == nil)
        ifFalse: [^superModel printForm: pane form]
        ifTrue: [^false].!

quit

"Method Version: spo1.  "
    "Date of Last Revision: Date today  Apr  3, 1990"

"Return the text for the quit control.   "

^#('Quit')!

quit: aString

"Method Version: spo1.  "
    "Date of Last Revision: Date today  Apr  4, 1990"

"The quit control has been pressed on
     <aString>.  Take the appropriate action.   "

self
        changed: #quit
        with: #restore;
        closeIt.!

release

"Revision of Method: spo1.  "
    "Date of Last Revision: Date today  Dec 14, 1989"

"Release the superModel of the receiver.  "

superModel := nil.
    super release.!
```

```
release: anObject

"Revision of Method: spo1.  "
    "Date of Last Revision: Date today  Apr  9, 1990"

"If the receiver is attached to anObject, release
     it from the receiver, and inform it to release
     the receiver.  Otherwise, do nothing.  "

(anObject = #all)
        ifTrue: [
            ^self release: superModel
                ].

(anObject = superModel)
        ifTrue: [
            superModel := nil.
            super release.
            ^anObject release: self
                ].

^true!

replot

"Method Version: spo1.  "
    "Date of Last Revision: Date today  Apr  4, 1990"

"Regenerate the displayed plot based on the
     currently set parameters.  "

"Debug code"
    ^Menu message: 'Re-Plotting...'!

restart

"Method Version: spo1.  "
    "Date of Last Revision: Date today  Apr  3, 1990"

"Return the text for the restart control.  "

^#('Restart')!

restart: aString

"Method Version: spo1 ark1.  "
    "Date of Last Revision: Date today  May  6, 1990"

"The restart control has been pressed on <aString>.
     Take the appropriate action.  "
"
    self
        changed: #restart
        with: #restore;
        startUp
"

self
        changed: #restart
        with: #restore.

initialForm := nil.
    self changed: #initialize:.

self startUp!

showWindow

"Method Version: spo3.  "
    "Date of Last Revision: Date today Apr  5, 1990'

"Respond to #showWindow.  "
```

```
        (self active)
            ifTrue: [self activateWindow].!

startDateButton

"Method Version: spo1.  "
        "Date of Last Revision: Date today   Apr  4, 1990"

"Return the start date text for the button field.  "

^#('Start Date')!

startDateButton: aString

"Method Version: spo1 ark2.  "
        "Date of Last Revision: Date today   May  4, 1990"

"The start date button has been pressed on <aString>.
         Take the appropriate action.  "
    | aPoint date date2 |
    "
    self
        changed: #startDateButton
        with: #restore;
        changed: #startDateField
        with: #restore.
    "
    self
        changed: #startDateButton
        with: #restore.
    "aPoint := ( 0 @ (messagePane topPane frame height // 2) )
               + (messagePane topPane frame origin)."
    "aPoint := messagePane topPane frame center."
    date := PopUpPrompter prompt: 'What is the START DATE ?'
                          default: superModel startDate printString
                          popUpAt: self aPoint.
    date2 := Date fromString: date.
    superModel startDate: date2.
    self changed: #startDateField.!

startDateField

"Method Version: spo3.  "
        "Date of Last Revision: Date today   Apr 13, 1990"

"Return the start date text for the data field.  "

^Array with: (superModel startDate printString)!

startDateField: aString

"Method Version: spo1.  "
        "Date of Last Revision: Date today   Apr  4, 1990"

"The start date field has been pressed on <aString>.
         Take the appropriate action.  "

self
        changed: #startDateField
        with: #restore.!

startTimeButton

"Method Version: spo1.  "
        "Date of Last Revision: Date today   Apr  4, 1990"

"Return the end time text for the button field.  "

^#('Start Time')!

startTimeButton: aString

"Method Version: spo1 ark1.  "
        "Date of Last Revision: Date today   May  5, 1990"
```

```
        "The start time button has been pressed on <aString>.
         Take the appropriate action.  "
"
    self
        changed: #startTimeButton
        with: #restore;
        changed: #startTimeField
        with: #restore.
"
    | aPoint time time2 | self
        changed: #startTimeButton
        with: #restore.
    "aPoint := ( 0 @ (messagePane topPane frame height // 2) )
             + (messagePane topPane frame origin)."
    "aPoint := messagePane topPane frame center."
    time := PopUpPrompter prompt: 'What is the START TIME ?'
                         default: superModel startTime printString
                         popUpAt: self aPoint.
    time2 := Time fromString: time.
    superModel startTime: time2.
    self changed: #startTimeField.!

startTimeField

"Method Version: spo3.  "
        "Date of Last Revision: Date today   Apr 13, 1990"

"Return the start time text for the data field.  "

^Array with: (superModel startTime printString)!

startTimeField: aString

"Method Version: spo1.  "
        "Date of Last Revision: Date today   Apr  4, 1990"

"The start time field has been pressed on <aString>.
         Take the appropriate action.  "

self
        changed: #startTimeField
        with: #restore.!

startUp

"Method Version: spo1 ark3.  "
        "Date of Last Revision: Date today    May  6, 1990"

"Start-up the application.  Perform whatever
         scripting and/or menu-ing is appropriate.  "

| choice |
    startUpFlag := false.
    messagePane
        clearAllMessages;
        addMessage: 'Pick a choice '.
    [(choice := (menu
            at: #startUpMenu
            ifAbsent: [^self])
                popUpAt: pane topPane frame origin)
     isNil] whileTrue: [].
    messagePane clearMessage: 'Pick a choice ';
            addMessage: (choice centeredTitleInPane: messagePane).! !

!DictionaryEditor class methods ! !

!DictionaryEditor methods !

add
```

```
"Method Version: spo1. "
"Date of Last Revision: Date today  Dec  4, 1989"

"Private - Add a new key to the dictionary
 by prompting for a new key expression. "

| function key index promptString size |
(object isKindOf: IdentityDictionary)
    ifTrue: [
        promptString := 'New Key Expression?...'.
        function := #prompt:defaultExpression:.
        ]
    ifFalse: [
        promptString := 'New Key String?...'.
        function := #prompt:default:.
        ].
(Smalltalk includesKey: #ColorPrompter)
    ifTrue: [
        key :=
            (Smalltalk at: #ColorPrompter)
                perform: function
                with: promptString
                with: String new.
        ]
    ifFalse: [
        key :=
            Prompter
                perform: function
                with: promptString
                with: String new.
            ].
key isNil
    ifTrue: [^self].
(object includesKey: key)
    ifTrue: [
        (Smalltalk includesKey: #FourColorMenu)
            ifTrue: [
                (Smalltalk at: #FourColorMenu)
                    message: 'Error: Key Already Exists!!'
                    colorArray: #(4 14 14 4).
                ^self
                ]
            ifFalse: [
                Menu message: 'Error: Key Already Exists!!'.
                ^self
                    ].
        ].
object at: key put: nil.
instList add:
    (Association key: key value: key printString).
size := instList size.
index := 1.
[index > size
    or: [(instList at: index) key = key]]
        whileFalse: [index := index + 1].
instIndex := index.
self
    changed: #instVarList
        with: #restoreSelected:
        with: instIndex;
    changed: #instance!

inspectMenu

"Method Version: spo1. "
    "Date of Last Revision: Date today  Dec  4, 1989"

"Private - Answer the receiver's
    list pane menu. "
^Menu
    labels: 'Remove Selected Entry\Add New Entry' withCrs
    lines: Array new
    selectors: #(remove add)!
``` openOn: aDictionary called: aNameString

"Method Version: spo1. "
"Date of Last Revision: Date today  Dec  1, 1989"

"Open an inspector window on aDictionary.  Define
 the pane sizes and behavior, and shedule the
 window. "

| aTopPane aSubPane |
CursorManager execute change.
object := aDictionary.
aTopPane := TopPane new.

aTopPane
    label: aNameString;
    model: aTopPane dispatcher;
    menu: #workSpaceMenu;
    minimumSize: 80@80;
    foreColor: 4;
    backColor: 14;
    yourself.

aTopPane addSubpane:
    (aSubPane := ListPane new
        menu: #inspectMenu;
        model: self;
        name: #instVarList;
        change: #selectInstance:;
        returnIndex: true;
        framingRatio: (
            0@0 extent: 1/2 @ 1)).
(aSubPane respondsTo: #foreColor)
    ifTrue: [aSubPane foreColor: 4].
(aSubPane respondsTo: #backColor)
    ifTrue: [aSubPane backColor: 14].

instPane := TextPane new
    model: self;
    name: #instance;
    change: #accept:from:;
    foreColor: 4;
    backColor: 14;
    framingRatio: (1/2 @ 0
        extent: 1/2 @ 1).
(instPane respondsTo: #foreColor)
    ifTrue: [aSubPane foreColor: 4].
(instPane respondsTo: #backColor)
    ifTrue: [aSubPane backColor: 14].

aTopPane addSubpane: instPane.
self setInstList.
aTopPane dispatcher open scheduleWindow! !

!DataSample class methods !

new

"Revision of Method: spo3. "
"Date of Last Revision: Date today  Apr 11, 1990"

"Create a new instance of the receiver. "

^super new initialize! !

!DataSample methods !

= anObject

"Revision of Method: spo1. "
"Date of Last Revision: Date today  Apr 11, 1990"

"Return the equality relationship for the receiver
and anObject. "

equalityBlock isNil
    ifTrue: [^super = anObject]
    ifFalse: [^equalityBlock value: self value: anObject].!

dateTimeStamp

"Revision of Method: spol. "
    "Date of Last Revision: Date today  Apr 11, 1990"

"Return the DateTimeStamp for the receiver. "

^dateTimeStamp!

dateTimeStamp: aDateTimeStamp

"Revision of Method: spol. "
    "Date of Last Revision: Date today  Apr 11, 1990"

"Set the DateTimeStamp for the receiver. "

dateTimeStamp := aDateTimeStamp!

equalityBlock

"Revision of Method: spol. "
    "Date of Last Revision: Date today  Apr 11, 1990"

"Return the equalityBlock for the receiver. "

^equalityBlock!

equalityBlock: aBlock

"Revision of Method: spol. "
    "Date of Last Revision: Date today  Apr 11, 1990"

"Set the equalityBlock for the receiver.
    <aBlock> should be a two element Block
    which returns a Boolean indicating whether
    some equality relationship has been satisfied. "

equalityBlock := aBlock!

initialize

"Revision of Method: spol. "
    "Date of Last Revision: Date today  Apr 11, 1990"

"Initialize the defaults for the receiver. "

dateTimeStamp := DateTimeStamp new.
miscInfo := Dictionary new.!

miscInfo

"Revision of Method: spol. "
    "Date of Last Revision: Date today  Apr 11, 1990"

"Return the miscInfo for the receiver. "

^miscInfo!

miscInfo: aDictionary

"Revision of Method: spol. "
    "Date of Last Revision: Date today  Apr 11, 1990"

"Set the miscInfo for the receiver. "

miscInfo := aDictionary!

value

"Revision of Method: spol. "
    "Date of Last Revision: Date today  Apr 11, 1990"

"Return the value for the receiver. "

^value!

value: anObject

"Revision of Method: spol. "
    "Date of Last Revision: Date today  Apr 11, 1990"

"Set the value for the receiver. "

value := anObject! !

!String methods !
asTime

"Method Version: spol. "
    "Date of Last Revision: Date today  Dec  1, 1989"

"Convert the receiver to a time.
     The expected format is  '24:59:59'. "
    | time seconds |
    time := ReadStream on: (self select: [:char | char ~= $:]).
    seconds :=
        ((time next: 2) asInteger * 60 * 60)
            + ((time next: 2) asInteger * 60)
               + ((time next: 2) asInteger ).
    ^Time new seconds: seconds! !

!String methods !
centeredTitleInPane: aPane

"Method Version: ark1. "
    "Date of Last Revision: Date today May  6, 1990"

"Center the reciever in the middle of the
    pane aPane as for a title"

| delta output paneWidth stringLength   | paneWidth := aPane charsInRow.
    stringLength := self size.

delta := (paneWidth - stringLength) // 2.

(delta <= 0)
        ifTrue: [ ^self ].

output := self deepCopy.
    1 to: delta do: [ :dummy |
        output := ' ' , output].
    ^ output! !

!String methods !
asDate

"Method Version: spol. "
    "Date of Last Revision: Date today  Dec  1, 1989"

"Answer a Date representing the date
     described by the receiver.  The receiver
     must contain first the month name, then
     the day number, and then the year
     separated by blanks. "

^Date fromString: self! !

```
!ColorForm methods !
convertToForm

"Method Version: spo1.  "
        "Date of Last Revision: Date today  Dec  6, 1989"

"Return a copy of the receiver as a Form.
         The default conversion is colors 0-14
         become 16r00 (off), and color 15 becomes
         16rFF (on).  "

| form |
     form :=
        Form new
            width: self width
            height: self height
            initialByte: 16rFF.
     BitBlt new
         destForm: form
         sourceForm: self
         halftone: nil
         combinationRule: Form over
         destOrigin: 0@0
         sourceOrigin: 0@0
         extent: self extent
         clipRect: (0@0 extent: (self extent));
         copyBits.
     ^form! !

!Dictionary methods !
collect: aBlock

"Method Version: spo1.  "
        "Date of Last Revision: Date today  Dec 14, 1989"

"For each association in the receiver, evaluate
         aBlock with that association as the argument.
         Answer a new OrderedCollection containing the
         results from the aBlock evaluations as its elements.  "
        "I added this method because collect: did not work
         correctly for Dictionarys.  Admittedly, returning
         an OrderedCollection may not be strictly correct,
         but it seems to work better where ever it is used
         than would returning a Dictionary.  This is because
         Dictionary is the only 'non-flat' collection.  "

| answer |
     answer := OrderedCollection new: self size.
     self associationsDo: [:assoc |
        answer add: (aBlock value: assoc).
                   ].
     ^answer! !

!Time methods !
subtractSeconds: anInteger

"Method Version: spo1.  "
        "Date of Last Revision: Date today Apr 11, 1990"

"Answer a Time which is the receiver time
         minus anInteger seconds.  "

^self class fromTotalSeconds:
         (self asSeconds - anInteger)! !

!Time methods !
addSeconds: anInteger

"Method Version: spo1.  "
        "Date of Last Revision: Date today Apr 11, 1990"

"Answer a Time which is the receiver time
         plus anInteger seconds.  "
```

```
        ^self class fromTotalSeconds:
            (self asSeconds + anInteger)! !

!FileStream methods !
previous

"Method Version: spo1.  "
        "Date of Last Revision: Date today May   2, 1990"

"Return the element of the receiver just before
         the current position.  Report an error if the
         current position is zero.  Do not change the
         receiver's position.  "

(self position <= 0)
        ifTrue: [
            ^self error: 'ERROR: Attempt to read before the beginning'
                ].
    self position: (self position - 1).
    ^self next! !

!Directory methods !
defaultPath

"Method Version: spo2.  "
        "Date of Last Revision: Date today  Oct 24, 1989"

"Answer a string representing the pathName
         for the default DOS directory for
         the drive of the receiver. "

| aString aDos index driveNumber |
    driveNumber := self drive asciiValue - $a asciiValue + 1.
    aString := (String new: 64).
    aDos := Dos new.
    aDos
        setReg: 3 to: driveNumber;    "DL=0, default drive"
        setReg: 6 to: aString;        "DS:SI point to aString"
        setReg: 4 to: aString;
        setRegHigh: 0 to: 16r47;
        interrupt: 16r21.
    index := 1.
    [(aString at: index) asciiValue > 0]
        whileTrue: [index := index + 1].
    aString := aString copyFrom: 1 to: (index - 1).
    (aString isEmpty or: [(aString at: 1) ~= $\])
        ifTrue: [aString := '\', aString].
    ^aString! !

!Time class methods !
waitSeconds: anInteger

"Method Version: ark1.  "
        "Date of Last Revision: Date today May  5, 1990"

"Wait anInteger number of seconds"

| mark |
    mark := Time now addSeconds: anInteger.
    [ Time now < mark ] whileTrue: []! !

!Time class methods !
fromString: aString

"Method Version: ark1.  "
        "Date of Last Revision: Date today   May  5, 1990"

"Answer a Time specified by aString.  aString
          contains a representation in military time.  "

| aStream hour minutes seconds time|
    aStream := ReadStream on: aString .
```

```
[aStream peekFor: $: ] whileTrue: [].
hour := (aStream upTo: $: ) asInteger.

[aStream peekFor: $: ] whileTrue: [].
minutes :=  (aStream upTo: $: ) asInteger .

[aStream peekFor: $ ] whileTrue: [].
seconds := (aStream upTo: $ ) asInteger.

^ self new
    seconds: (
        ( hour * 3600 ) + ( minutes * 60) + seconds
            ).! !

!File class methods !
getFileName: aString ext: extString

"Revision of Method: spo3.  "
    "Date of Last Revision: Date today  Sep 11, 1989"

"Prompt the user with the filename and extension
     derived from 'aString.extString'.  Return
     the user's selection as a fileName.  "

| aDirectory answer guess newPosition position |
    position := Cursor offset.
    newPosition := (position - ((LabelFont width * 3) @ (LabelFont height + 6))).
    guess := self fileName: aString extension: extString.
    Cursor offset: newPosition.
    answer :=
        ((Smalltalk includesKey: #ColorPrompter)
            ifTrue: [Smalltalk at: #ColorPrompter]
            ifFalse: [Prompter])
                prompt: 'File Name?'
                default: guess.
    Cursor offset: position.
    answer isNil
        ifTrue: [^nil].
    ^self fileName: (answer fileName) extension: (answer fileExtension)! !

!File class methods !
fileName: nString extension: eString

"Method Version: spo2.  "
    "Date of Last Revision: Date today  Oct 24, 1989"
    "Answer a String which is a derived file name
     from nString and eString. Illegal characters
     are stripped, and lower case vowels are dropped
     from the right of nString until it is less than
     or equal to 8 characters.  "

| char extInStream extOutStream extString
      illegalCharacters nameInStream nameOutStream
      nameString size | size := nString size.
    illegalCharacters := #(32 34 42 43 44 46 47 58
                    59 60 61 62 63 91 92 93 124 127).
    nameInStream := ReadStream on: nString.
    nameOutStream := WriteStream on: String new.
    extInStream := ReadStream on: eString.
    extOutStream := WriteStream on: String new.
    [nameInStream atEnd]
        whileFalse: [char := nameInStream next.
                    (((illegalCharacters includes: (char asAscii))
                        or: [(char asAscii) > 127])
                        or: [(char asAscii) < 32])
                        ifFalse: [nameOutStream nextPut: char]
                    ].
    (eString size > 0)
        ifTrue: [extInStream := ReadStream on: eString.
```

```
                    extOutStream := WriteStream on: String new.
                    [extInStream atEnd]
                        whileFalse: [char := extInStream next.
                                        (((illegalCharacters includes: (char asAscii))
                                                or: [(char asAscii) > 127])
                                                or: [(char asAscii) < 32])
                                            ifFalse: [extOutStream nextPut: char]
                                    ].
                ].
        nameString :=
            (nameOutStream contents reversed select: [:char |
                (char isVowel and: [char isLowerCase])
                    ifTrue: [(size := size - 1) <= 8]
                    ifFalse: [true]
                                ]
            ) reversed.
        extString := extOutStream contents.
        ^(nameString copyFrom: 1 to: (nameString size min: 8)) ,
            (String with: $.) ,
            (extString copyFrom: 1 to: (extString size min: 3))! !

!Directory class methods !
getDisk

"Method Version: spo3. "
        "Date of Last Revision: Date today   Dec 13, 1989"

"Prompt the user with the default disk drive letter
            and path name.  Return the user's selection. "

| aDirectory answer newPosition position |
        position := Cursor offset.
        newPosition := (
            position
            - ((LabelFont width * 3)
            @ (LabelFont height + 6))
                        ).
Cursor offset: newPosition.
answer :=
    ((Smalltalk includesKey: #ColorPrompter)
        ifTrue: [Smalltalk at: #ColorPrompter]
        ifFalse: [Prompter])
            prompt: 'Disk?'
            default: ((String with: (Disk drive)) asUpperCase).
Cursor offset: position.
answer isNil
    ifTrue: [^nil].
(answer size == 1)
    ifFalse: [
        ((Smalltalk includesKey: #FourColorMenu)
            ifTrue: [
                (Smalltalk at: #FourColorMenu)
                    message: 'Error: Input Requires Drive Letter Only!!'
                    colorArray: #(14 4 4 14).
                ^self getDisk
                ]
            ifFalse: [
                Menu
                    message: 'Error: Input Requires Drive Letter Only!!'.
                ^self getDisk
                    ])
            ].
aDirectory := Directory new.
(((answer := answer asLowerCase) >= 'a')
        and: [answer <= 'z'])
    ifTrue: [aDirectory drive: (answer at: 1)]
    ifFalse: [
        ((Smalltalk includesKey: #FourColorMenu)
            ifTrue: [
                (Smalltalk at: #FourColorMenu)
                    message: ('Error: Unknown Drive Letter: ' , answer)
                    colorArray: #(14 4 4 14).
                ^self getDisk
```

```
                    ]
            ifFalse: [
                Menu
                    message: ('Error: Unknown Drive Letter: ' , answer).
                ^self getDisk
                    ])
                ].
    Cursor offset: newPosition.
    answer :=
        ((Smalltalk includesKey: #ColorPrompter)
            ifTrue: [Smalltalk at: #ColorPrompter]
            ifFalse: [Prompter])
                prompt: 'Directory Name?'
                default: (aDirectory defaultPath).
    Cursor offset: position.
    ((answer isNil) or: [answer = ''])
        ifTrue: [^nil].
    aDirectory pathName: answer.
    ^aDirectory! !

!Menu class methods !

yesOrNoFor: aString

"Method Version: spo2.  "
        "Date of Last Revision: Date today  Sep 11, 1989"

"Menu the user with aString,
         giving choices of 'Yes' or 'No'.
         If 'Yes' is chosen, return true.
         Otherwise, return false.  "

| answer |
    answer := (
        self
            labelArray: (Array with: aString with: 'Yes' with: 'No')
            lineArray: #(1)
            selectorArray: #(nil y n)
            ) popUpAt: Cursor offset.
    answer == #y
        ifTrue: [^true].
    ^false! !

!Menu class methods !
labelArray: labelArray
    lineArray: lineArray
    selectorArray: selectorArray "Revision of Method: spo2.  "
        "Date of Last Revision: Date today  Sep 11, 1989"

"Answer a menu with labelArray for the items,
         selectorArray for actions, and lines drawn
         under the item numbers contained in lineArray.  "

^self new
        selectors: selectorArray;
        labels: labelArray lines: lineArray;
        yourself! !

!Date class methods !
fromString: aString

"Method Version: spo1.  "
        "Date of Last Revision: Date today  Dec  1, 1989"

"Answer a Date specified by aString.  aString
         contains first the month name, then the day
         number, and then the year, separated with
         blanks.  "

| aStream day month year |
    aStream := ReadStream on: aString.
```

```
[aStream peekFor: $ ] whileTrue: [].
month := (aStream upTo: $ ) asLowerCase.

[aStream peekFor: $ ] whileTrue: [].
day := aStream upTo: $ .

[aStream peekFor: $ ] whileTrue: [].
year := aStream upTo: $ .
month := MonthStrings at: month
    ifAbsent: [self errorInMonth].

^self
    newDay: day asInteger
    month: month
    year: year asInteger! !
"construct application"
    ((Smalltalk at: #Application ifAbsent: [])
        isKindOf: Class) ifTrue: [
            ((Smalltalk at: #Application) for:'ESQC')
                addClass: SQCFileManager;
                addClass: DateTimeStamp;
                addClass: SQCData;
                addClass: SQCPlotter;
                addClass: SQCPrinter;
                addClass: CenteredListPane;
                addClass: HierarchyMenu;
                addClass: SQCModel;
                addClass: SQCSuperModel;
                addClass: Float;
                addClass: SQCDisplay;
                addClass: DictionaryEditor;
                addClass: DataSample;
                addMethod: #waitSeconds: forClass: Time class;
                addMethod: #fromString: forClass: Time class;
                addMethod: #getFileName:ext: forClass: File class;
                addMethod: #fileName:extension: forClass: File class;
                addMethod: #getDisk forClass: Directory class;
                addMethod: #yesOrNoFor: forClass: Menu class;
                addMethod: #labelArray:lineArray:selectorArray: forClass: Menu c
                addMethod: #fromString: forClass: Date class;
                addMethod: #asTime forClass: String;
                addMethod: #centeredTitleInPane: forClass: String;
                addMethod: #asDate forClass: String;
                addMethod: #convertToForm forClass: ColorForm;
                addMethod: #collect: forClass: Dictionary;
                addMethod: #subtractSeconds: forClass: Time;
                addMethod: #addSeconds: forClass: Time;
                addMethod: #previous forClass: FileStream;
                addMethod: #defaultPath forClass: Directory;
    comments: '************************* COMMENTS *******************
Date of Last Revision: Date today  May  2, 1990
Date of Last File Out: Date today  May  2, 1990.
Application Version: 2.10

The ESQC Application is designed to connect Smalltalk
applications with SQC code modules written in C,
and to provide extended capabilities for creation
and display of graphs.

This application requires the following applications
to be previously installed:

ChangePane
    Edit Pane/Menu Classes
    Dictionary Inspector
    UniqueFile
    FileBrowser
    NetworkPrinter
    ColorConverter
    PostScriptPrinter
    FreeDrawing
    Table
```

```
In addition, this application will automatically use
the following applications if they are installed:

PagingMenu
    FourColorMenu
    ColorPrompter
    Escape

This application is NOT SUPPORTED, however, bug reports,
improvement suggestions, and kudos can be directed to
the author (please refrain from criticisms until they
have metamorphed into constructive suggestions):

Steve O''Neill
    Org. G-8941, MS 7L-22
    Phone 865-3452

';

initCode: '
"The initialize code will be executed automatically,
 at the beginning of the fileIn. "

Transcript
    cr;
    nextPutAll: ''Filing in ESQC Application...'';
    cr;
    nextPutAll: ''  (requires aprox. <1 min.) '';
    cr.

';

finalizeCode: '
"The finalize code will be executed automatically,
 when the fileIn is complete. "

"Initialize the ErrorCodes dictionary. "
| chunk fileStream position string1 string2 |
(Smalltalk at: #SQCData)
    initErrorCodes.

Transcript
    cr;
    nextPutAll: ''Installing Printers...'';
    cr.

(Smalltalk includesKey: #Printers)
    ifTrue: [
        (Smalltalk includesKey: #OldPrinters)
            ifFalse: [
                Smalltalk
                    at: #OldPrinters
                    put: (Smalltalk at: #Printers).
                Transcript
                    cr;
                    nextPutAll: ''#Printers moved to #OldPrinters.'';
                    cr.
                Smalltalk
                    at: #Printers
                    put: (
                        (IdentityDictionary new)
                            at: #LPT1
                            put: (NetworkPrinterStream on: #LPT1);
                            at: #COM1
                            put: (NetworkPrinterStream on: #COM1);
                            yourself
                    ).
                Transcript
                    cr;
                    nextPutAll: ''Printers Installed.'';
                    cr.
                ].
        ]
    ifFalse: [
        Smalltalk
```

```smalltalk
                at: #Printers
                put: (
                    (IdentityDictionary new)
                        at: #LPT1
                        put: (NetworkPrinterStream on: #LPT1);
                        at: #COM1
                        put: (NetworkPrinterStream on: #COM1);
                        yourself
                    ).
            Transcript
                cr;
                nextPutAll: ''Printers Installed.'';
                cr.
                ].

Transcript
    cr;
    nextPutAll: ''Checking GO file...'';
    cr.
string1 :=
    ''Smalltalk loadPrimitivesFrom: (Disk fullDirName , ''''uniqfile.bin''''
string2 :=
    ''Smalltalk loadPrimitivesFrom: (Disk fullDirName , ''''sqc.bin''''). ''
fileStream := Disk file: ''go''.
position := fileStream position.
[fileStream atEnd]
    whileFalse: [
        (fileStream peekFor: fileStream lineDelimiter)
            ifTrue: [
                (fileStream lineDelimiter == (13 asCharacter))
                    ifTrue: [fileStream peekFor: (10 asCharacter)].
                ].
        chunk := fileStream upTo: (33 asCharacter).
        (fileStream previous = (33 asCharacter))
            ifTrue: [position := fileStream position].
        (chunk = string1)
            ifTrue: [string1 := nil].
        (chunk = string2)
            ifTrue: [string2 := nil].
                ].
(string1 = nil)
    ifFalse: [
        Transcript
            nextPutAll: ''    Modifing GO file...'';
            cr.
        fileStream position: position.
        (fileStream peekFor: fileStream lineDelimiter)
            ifTrue: [
                (fileStream lineDelimiter == (13 asCharacter))
                    ifTrue: [fileStream peekFor: (10 asCharacter)].
                ]
            ifFalse: [fileStream cr.].
        fileStream
            nextPutAll: string1;
            nextPut: (33 asCharacter).
        position := fileStream position.
        fileStream
            cr;
            flush.
            ].
(string2 = nil)
    ifFalse: [
        Transcript
            nextPutAll: ''    Modifing GO file...'';
            cr.
        fileStream position: position.
        (fileStream peekFor: fileStream lineDelimiter)
            ifTrue: [
                (fileStream lineDelimiter == (13 asCharacter))
                    ifTrue: [fileStream peekFor: (10 asCharacter)].
                ]
            ifFalse: [fileStream cr.].
        fileStream
```

```
            nextPutAll: string2;
            nextPut: (33 asCharacter).
        position := fileStream position.
        fileStream
            cr;
            flush.
            ].
fileStream close.

Transcript
    cr;
    nextPutAll: ''Loading primitives...'';
    cr.

Smalltalk
    loadPrimitivesFrom:
        (Disk fullDirName , ''uniqfile.bin'');
    loadPrimitivesFrom:
        (Disk fullDirName , ''sqc.bin'').

Transcript
    cr;
    nextPutAll: ''ESQC Application FileIn Complete.'';
    cr.

';

startUpCode: '
    This startup code will not be executed.
    This is a template for starting the application.
    The following code fragment can be used to
    start-up an ESQC application:

SQCModel new.
']!

"Finalize"

"The finalize code will be executed automatically,
     when the fileIn is complete.  "

"Initialize the ErrorCodes dictionary. "
    | chunk fileStream position string1 string2 |
    (Smalltalk at: #SQCData)
        initErrorCodes.

Transcript
        cr;
        nextPutAll: 'Installing Printers...';
        cr.

(Smalltalk includesKey: #Printers)
        ifTrue: [
            (Smalltalk includesKey: #OldPrinters)
                ifFalse: [
                    Smalltalk
                        at: #OldPrinters
                        put: (Smalltalk at: #Printers).
                    Transcript
                        cr;
                        nextPutAll: '#Printers moved to #OldPrinters.';
                        cr.
                    Smalltalk
                        at: #Printers
                        put: (
                            (IdentityDictionary new)
                                at: #LPT1
                                put: (NetworkPrinterStream on: #LPT1);
                                at: #COM1
                                put: (NetworkPrinterStream on: #COM1);
                                yourself
                            ).
```

```
                    Transcript
                        cr;
                        nextPutAll: 'Printers Installed.';
                        cr.
                        ].
            ]
    ifFalse: [
        Smalltalk
            at: #Printers
            put: (
                (IdentityDictionary new)
                    at: #LPT1
                    put: (NetworkPrinterStream on: #LPT1);
                    at: #COM1
                    put: (NetworkPrinterStream on: #COM1);
                    yourself
                ).
        Transcript
            cr;
            nextPutAll: 'Printers Installed.';
            cr.
            ].

Transcript
    cr;
    nextPutAll: 'Checking GO file...';
    cr.
string1 :=
    'Smalltalk loadPrimitivesFrom: (Disk fullDirName , ''uniqfile.bin''). '
string2 :=
    'Smalltalk loadPrimitivesFrom: (Disk fullDirName , ''sqc.bin''). '.
fileStream := Disk file: 'go'.
position := fileStream position.
[fileStream atEnd]
    whileFalse: [
        (fileStream peekFor: fileStream lineDelimiter)
            ifTrue: [
                (fileStream lineDelimiter == (13 asCharacter))
                    ifTrue: [fileStream peekFor: (10 asCharacter)].
                ].
        chunk := fileStream upTo: (33 asCharacter).
        (fileStream previous = (33 asCharacter))
            ifTrue: [position := fileStream position].
        (chunk = string1)
            ifTrue: [string1 := nil].
        (chunk = string2)
            ifTrue: [string2 := nil].
            ].
(string1 = nil)
    ifFalse: [
        Transcript
            nextPutAll: '   Modifing GO file...';
            cr.
        fileStream position: position.
        (fileStream peekFor: fileStream lineDelimiter)
            ifTrue: [
                (fileStream lineDelimiter == (13 asCharacter))
                    ifTrue: [fileStream peekFor: (10 asCharacter)].
                ]
            ifFalse: [fileStream cr.].
        fileStream
            nextPutAll: string1;
            nextPut: (33 asCharacter).
        position := fileStream position.
        fileStream
            cr;
            flush.
            ].
(string2 = nil)
    ifFalse: [
        Transcript
            nextPutAll: '   Modifing GO file...';
            cr.
```

```
            fileStream position: position.
            (fileStream peekFor: fileStream lineDelimiter)
                ifTrue: [
                    (fileStream lineDelimiter == (13 asCharacter))
                        ifTrue: [fileStream peekFor: (10 asCharacter)].
                    ]
                ifFalse: [fileStream cr.].
            fileStream
                nextPutAll: string2;
                nextPut: (33 asCharacter).
            position := fileStream position.
            fileStream
                cr;
                flush.
                ].
    fileStream close.

Transcript
        cr;
        nextPutAll: 'Loading primitives...';
        cr.

Smalltalk
        loadPrimitivesFrom:
            (Disk fullDirName , 'uniqfile.bin');
        loadPrimitivesFrom:
            (Disk fullDirName , 'sqc.bin').

Transcript
        cr;
        nextPutAll: 'ESQC Application FileIn Complete.';
        cr.
  !

"
****************************************************************************
Project : EPX
Date    : Oct 30, 1990
Time    : 20:04:08

Classes :
    ColorTextPane WorkEP ListPrompter ListPromptEditor
    WorkCellSuperModel OperatorScreen TTYTextEditor Methods :
    #isAsciiZ defined in Character.
    #copyWithoutLastOccurenceOf: defined in IndexedCollection.
    #copyWithoutFirstOccurenceOf: defined in IndexedCollection.
    #indexReverseOf:ifAbsent: defined in IndexedCollection.
    #isYesOrNo defined in String.
    #isYes defined in String.
    #isAcknowledgement defined in String.
    #isACKorNAK defined in String.
    #isACK defined in String.
    #isDecimalInteger defined in String.
    #isRecoveryPlanRequest defined in String.
    #isNo defined in String.
    #isNAK defined in String.
    #lastTwo defined in Stream.

****************************************************************************
"!

TextPane subclass: #ColorTextPane
  instanceVariableNames:
    'foreColor backColor '
  classVariableNames: ''
  poolDictionaries: ''!

Object variableSubclass: #WorkEP
  instanceVariableNames:
```

```
    'busyState opmsgStream superModel symptomStream textStream '
  classVariableNames:
    'AlarmKeys '
  poolDictionaries: ''!

Prompter subclass: #ListPrompter
  instanceVariableNames: ''
  classVariableNames: ''
  poolDictionaries: ''!

ListSelector variableSubclass: #ListPromptEditor
  instanceVariableNames: ''
  classVariableNames: ''
  poolDictionaries:
    'FunctionKeys CharacterConstants '!

Smalltalk at: #Stream ifAbsent: [
Object subclass: #Stream
  instanceVariableNames:
    'collection position readLimit '
  classVariableNames: ''
  poolDictionaries:
    'CharacterConstants ']!
Smalltalk at: #Character ifAbsent: [
Magnitude subclass: #Character
  instanceVariableNames:
    'asciiInteger '
  classVariableNames: ''
  poolDictionaries:
    'CharacterConstants ']!

Object variableSubclass: #WorkCellSuperModel
  instanceVariableNames:
    'commInterface exceptionProcessor history historyStream inComingMessages tex
  classVariableNames:
    'CommandKeys TimeOutIntervalInSeconds '
  poolDictionaries:
    'ProtocolConstants CharacterConstants '!

TextEditor variableSubclass: #TTYTextEditor
  instanceVariableNames:
    'buffer '
  classVariableNames: ''
  poolDictionaries:
    'FunctionKeys CharacterConstants '!

Smalltalk at: #String ifAbsent: [
FixedSizeCollection variableByteSubclass: #String
  classVariableNames: ''
  poolDictionaries:
    'CharacterConstants ']!

Object variableSubclass: #OperatorScreen
  instanceVariableNames:
    'actionList actionPane aCauseApplication currentAlarmCode displayMessage dis
  classVariableNames:
    'MessageKeys '
  poolDictionaries: ''!

Smalltalk at: #IndexedCollection ifAbsent: [
Collection subclass: #IndexedCollection
  instanceVariableNames: ''
  classVariableNames: ''
  poolDictionaries: '']!

!ColorTextPane class methods ! !

!ColorTextPane methods !

backColor

^ backColor!
```

```
backColor: anInteger backColor := anInteger!

foreColor

^ foreColor!
foreColor: anInteger foreColor := anInteger!

open
        "Private - Open the pane."
    selection selectAfter: 0@1.
    self paneScanner setForeColor: foreColor backColor: backColor.
    self cancel! !

!WorkEP class methods !

alarmKeysInitialize

AlarmKeys := Dictionary new.
    AlarmKeys
        at: '1 3 6 A'
        put: #recoveryPlanCase3:;
        at: '9 8 7 B'
        put: #recoveryPlanCase1:;
        at: '1 3 3 A'
        put: #recoveryPlanCase2:;
        at: '1 1 1 A'
        put: #recoveryPlanCase5a:;
        at: '1 2 1 A'
        put: #recoveryPlanCase5b:;
        at: '1 3 1 A'
        put: #recoveryPlanCase5c:;
        at: '1 8 5 A'
        put: #recoveryPlanSample1:;
        at: '1 8 6 A'
        put: #recoveryPlanSample1:;
        at: '1 8 7 A'
        put: #recoveryPlanSample1:;
        at: '8 7 6 B'
        put: #recoveryPlanCase5:;
        at: '2 3 8 F'
        put: #recoveryPlanSample2:;
        at: '2 3 9 F'
        put: #recoveryPlanSample2:;
        at: '2 3 0 F'
        put: #recoveryPlanSample2:;
        at: '238F'
        put: #recoveryPlanSample2:;
        at: '1101'
        put: #recoveryPlanSample3:.!

getAlarmKeyFor: aString

^ AlarmKeys at: aString ifAbsent: [ nil]!

getAlarmKeys

^ AlarmKeys!

new
    self alarmKeysInitialize.
    ^ super new! !

!WorkEP methods !

acknowledgeAlarm: aString
```

" Revision Level.ark02
Date of Last Revision  Aug 24, 1990 "

"Answers
    true if the sent message is acknowledged,
    false if there are a combination of 3 NAKs or time outs'

Send an alarm acknowledgement for the alarm in aString (ascii)"

| alarmAcknowledgement numberOfTransmissionAttempts response | self write: ('Transmitting alarm acknowledgement for alarm ' , aString , '.'
alarmAcknowledgement := AMessage alarmAcknowledgementMessageStringForAlarm:

numberOfTransmissionAttempts := 0.

[ numberOfTransmissionAttempts < 3 ]
    whileTrue: [superModel transmitOutput: alarmAcknowledgement.
                response := superModel waitForACKOrNAK.
                ( response == #timeOut or: [ response isNAK ] )
                    ifTrue: [   Terminal bell.
                                numberOfTransmissionAttempts := numberOfTr
                            ]
                    ifFalse:[   ( response isACK )
                                    ifTrue: [ ^ true ]
                            ]
                ].
    ^ false!

busyState

^ busyState!

busyState: aBoolean busyState := aBoolean!

checkForAna

| a b c d e f | a := superModel inComingMessages.
    b := a includes: 'I am fine.' .
    c := a includes: 'a' .
    c ifTrue:[^ textStream nextPutAll: 'Got it';cr]
        ifFalse: [textStream nextPutAll: 'Dont have it';cr ].
    self halt.!

checkForAnInput
    |a b c d e f g | a := CommScript new cnPort:
        (CommPort port: 2).
    a ifTimeOut: [ Terminal bell.
                   Terminal bell].
    a echo: true.
    a waitForInput: 3.!

checkForAnx

| a b c d e f time timeLimit| timeLimit := Time totalSeconds + 10.
    [timeLimit <= Time totalSeconds ]
        whileFalse: [
    a := superModel inComingMessages.
    b := a includes: 'I am fine.' .
    c := a includes: 'x' .
    c ifTrue:[^ textStream nextPutAll: 'Got it';cr]
        ifFalse: [textStream nextPutAll: 'Dont have it';cr ].
                ].
    self halt.

```
        nilCount := 0.
        (c := self processInput) isNil
            ifFalse: [^c].
        timeLimit := Time totalSeconds + seconds.
        [timeLimit <= Time totalSeconds]
            whileFalse: [
                (c := self processInput) isNil
                    ifFalse: [^c]].
        captureStream isNil
            ifFalse: [captureStream flush].
        messageStream
            cr; cr;
            show: 'timed out';
            cr; cr.
        ^timeOutBlock value

"!

clearTextPane self changed: #text.
    self changed: #opmsg.
    self changed: #symptoms!

clockEvent: anInteger textStream nextPutAll: 'It is now ', Time now printString;cr.!

commTap superModel commTap!

dataUpdateForVariable: aString withValue: bString
    " Revision Level ark01
    Date of Last Revision  Aug 24, 1990 "

"Answers
        true if the sent message is acknowledged,
        false if there are a combination of 3 NAKs or time outs'

Send a data update for the variable named (ascii) with value bString (ascii)

| dataUpdate numberOfTransmissionAttempts response | self write: ('Updating value of variable ' , aString , ' to value = ', bStri
    dataUpdate := AMessage dataUpdateMessageStringForVariableNamed: aString with numberOfTransmissionAttempts := 0.

[ numberOfTransmissionAttempts < 3 ]
        whileTrue: [superModel transmitOutput: dataUpdate.
                    response := superModel waitForACKOrNAK.
                    ( response == #timeOut or: [ response isNAK ] )
                        ifTrue: [   Terminal bell.
                                    numberOfTransmissionAttempts := numberOfTran
                                ]
                        ifFalse:[   ( response isACK )
                                        ifTrue: [ ^ true ]
                                ]
                    ].
    ^ false!

displayInfo: aString
        atWST: bString (superModel anyPendingInput) ifTrue: [ superModel getPendingInput2. "superModel self omsg1: aString.
textStream nextPutAll: ('Display the message, ', aString , ' at ' , bString);cr.
superModel transmitOutput: (bString, '/' , aString).!

displayMessage: aString
```

```
            textStream nextPutAll: aString;cr!

echoInput: aString textStream nextPutAll: ('Recovery plan received input = ' , aString printString)

empty

^ String new!

getACKNAK
    | a |
    a:= superModel getACKNAK.
    ^ a!

getACKorNAK

| a b c d timeOutCount|
    1 to: 3 do: [ :invalidInputCount | a := nil. timeOutCount := 0.
        [ a isNil ] whileTrue: [

( timeOutCount >= 3) ifTrue: [
                            textStream nextPutAll: ('Time out');cr.
                        ^ nil ].

a := self getACKNAK.

timeOutCount := timeOutCount + 1.

].

textStream nextPutAll: ('Received input = ' , a );cr.

d := AMessage fromString: a.
        ( d notNil and: [ (d type = 99) or: [ d type = 98] ] ) ifTrue: [ ^ a].

].

^ 'false'!

getMeMyInput
        | a |
    a:= superModel getInput.
    ^ a!

getMeMyInput2
        | a |
    a:= superModel getInput2.
    ^ a!

getRecoveryPlanNameFor: aString

^ self class getAlarmKeyFor: aString!

initializeAlarmKeys self class alarmKeysInitialize!

inspectAlarmKeys self class getAlarmKeys inspect!

maskAll
    "Generate a mask to color the op msg  pane "
    (BitBlt destForm: Display sourceForm: nil)
     mask: (BiColorForm color:14);
    destRect:(opmsgStream pane frame);
    combinationRule: Form andRule;
    copyBits.
```

```
    "Generate a mask to color the symptom pane "
(BitBlt destForm: Display sourceForm: nil)
 mask: (BiColorForm color:14);
destRect:(symptomStream pane frame);
combinationRule: Form andRule;
copyBits!

maskAllMenu
    "Implement masks for the symptom and operator msg panes"
    ^ Menu labels: ' '
    lines: #()
    selectors:#(maskAll )!

maskItopmsg
    "Generate a mask to color the window pane "
"(BitBlt destForm: Display sourceForm: nil)
 mask: (BiColorForm color:14);
destRect:(opmsgStream pane frame);
combinationRule: Form andRule;
copyBits
"
self maskAll!

maskItSymptom
    "Generate a mask to color the window pane "
"(BitBlt destForm: Display sourceForm: nil)
 mask: (BiColorForm color:14);
destRect:(symptomStream pane frame);
combinationRule: Form andRule;
copyBits
"
 self maskAll!

omsg1: aString
    "Scroll up and output a text string to the Operator Message Pane "
      opmsgStream pane scrollUp: -126.
      opmsgStream nextPutAll: aString; cr.
    ^ self maskItopmsg!

omsgClear

"Scroll up and clear the Operator Message Pane "

opmsgStream cr.
    opmsgStream pane scrollUp: (opmsgStream pane frame height) negated.
    self maskItopmsg.!

open

| opmsgPane symptomPane topPane textPane | busyState := false.

topPane := TopPane new label: 'EP Handler'.

topPane addSubpane:
        (textPane := TextPane new
            model: self;
            name: #text;
            menu: #textMenu;
            framingRatio: (0@0 corner: 1@(2/3) );
            yourself).

topPane addSubpane:
        (symptomPane := ColorTextPane new
            model: self;
            name: #opmsg;
            foreColor: 0;
            backColor: 14;
            framingRatio: (0@(2/3) corner: (1/3)@1 );
            yourself).

topPane addSubpane:
```

```
    ( opmsgPane:= ColorTextPane new
        model: self;
        name: #symptoms;
        foreColor: 0;
        backColor: 14;
        framingRatio: ((2/3)@(2/3) corner: 1@1 );
        yourself).

topPane addSubpane:
    (TextPane new
        model: self;
        name: #empty;
        menu: #maskAllMenu;
        framingRatio: ((1/3)@(2/3) corner: (2/3)@1 );
        yourself).

topPane reframe: (0@00 corner: 640@175).

textStream := textPane dispatcher.
opmsgStream := opmsgPane dispatcher.
symptomStream := symptomPane dispatcher.

topPane dispatcher openWindow scheduleWindow!

opmsg

^ String new!

planRequest: aString

"Process a rewuest for a recovery plan"

| plan |

"Choose the correct plan e.g.

plan := planDictionary at: aString.
        self perfrom: plan.

"
    "busyState := true. "

superModel logHistoryFor: aString.
    plan := self getRecoveryPlanNameFor: aString.
    self perform: plan with: aString.

"busyState := false. "!

receiveDataFromWS: aString
        ofKind: aSelectorSymbol
        withPrompt: bString
    | a b c d timeOutCount|

1 to: 3 do: [ :invalidInputCount | a := nil. timeOutCount := 0.
    [ a isNil ] whileTrue: [

( timeOutCount >= 3) ifTrue: [
                    textStream nextPutAll: ('Time out');cr.
                    self displayInfo: ('Time out at ', aString) atWST: 'CO
                    ^ 'nil' ].

self sendCommand: bString
            toWS: aString.

a := self getMeMyInput2.

timeOutCount := timeOutCount + 1.
                    ].
```

```
        textStream nextPutAll: ('Received from ' , aString , ' input = ' , a printSt d := a perform: aSelectorSymbol.
    d ifTrue: [ ^ a].

(invalidInputCount < 3) ifTrue: [ textStream nextPutAll: ('Received incorrec
            ].
        self displayInfo: ('Invalid response after three tries:\Message was, ' , bS_
            ' displayed on ' , aString ) withCrs
            atWST: 'COT#1'.
    ^ 'false'!

receiveInfoFromWST: aString
            ofKind: aSelectorSymbol
            withPrompt: bString

| a b c d timeOutCount|

1 to: 3 do: [ :invalidInputCount | a := nil. timeOutCount := 0.
    [ a isNil ] whileTrue: [

( timeOutCount >= 3) ifTrue: [
                    textStream nextPutAll: ('Time out');cr.
                    self displayInfo: ('Time out at ', aString) atWST: 'CO
                    ^ 'nil' ].

self displayInfo: bString
            atWST: aString.

a := self getMeMyInput2.

timeOutCount := timeOutCount + 1.
                    ].

textStream nextPutAll: ('Received from ' , aString , ' input = ' , a printSt d := a perform: aSelectorSymbol.
    d ifTrue: [ self cmsgClear. ^ a].

(invalidInputCount < 3) ifTrue: [ self displayInfo: 'Wrong input. Try again.
            ].

self displayInfo: ('Invalid response after three tries:\Message was, ' , bSt
            ' displayed on ' , aString ) withCrs
            atWST: 'COT#1'.
    ^ 'false'!

receiveInput: aString textStream nextPutAll: aString;cr.!

recoveryPlanCase1: aString

| answer1 | self recoveryProcedureStart: aString.

self smsg1: 'No Sheet Motion'.
self write: 'Symptom is No Sheet Motion'.
self write: 'Error Code = NNNN   Device Number = XXXXXX'.

self sendCommand: ('Set Alarm ' , aString , ' ') toWS: 'CC'.
self displayInfo: ('Sheet not available - \Load Sheet') withCrs atWST: 'COT#1' self recoveryProcedureCompleted.!

recoveryPlanCase2: aString

| barCodeFromCC barCodeFromWand numberRead readable |
```

```
        self recoveryProcedureStart: aString.

self smsg1: 'No Sheet Motion'.
        self write: 'Symptom is No Sheet Motion'.
        self write: 'Error Code = NNNN  Device Number = XXXXXX'.

self sendCommand: 'Send Sheet from WS#1 to WS#7 ' toWS: 'CC'.

barCodeFromWand := self receiveInfoFromWST: 'WST#4'
                                ofKind: #isDecimalInteger
                                withPrompt: 'Barcode error - \Clean and Wand Barcode Num barCodeFromCC := self receiveDataFromWS: 'CC'
                                ofKind: #isDecimalInteger
                                withPrompt: 'Read BARCODE NUMBER '.

(barCodeFromCC = barCodeFromWand)
            ifTrue: [ self write: 'Barcode number matched'.
                      self sendCommand: 'RESET ' toWS: 'WS#1'.
                      self sendCommand: 'Send Sheet from WS#1 to WS#7 ' toWS: 'CC'.
                    ]
            ifFalse:[ self write: 'Barcode number did not match'.
                      readable := self receiveInfoFromWST: 'WST#4'
                                    ofKind: #isYesOrNo
                                    withPrompt: 'Is it PERSON READABLE ? (Yes or No)'
                      ( readable isYes )
                        ifTrue: [ numberRead := self receiveInfoFromWST: 'WST#4'
                                                    ofKind: #isDecimalInteger
                                                    withPrompt: 'Enter the Number: '.
                                  ( numberRead == barCodeFromCC )
                                    ifTrue: [ self sendCommand: 'Initiate Cell Audit ' t
                                              ^ self recoveryProcedureCompleted
                                            ].
                                ]. "Do the following if it is not readable or it is re
                      self sendCommand: 'PRINT BARCODE LABEL ' toWS: 'DPD#1'.
                      self displayInfo: 'New Barcode Label printed - \APPLY TO SHEET'
                    ].

self recoveryProcedureCompleted.!

recoveryPlanCase3: aString

| aCauseHasBeenFound answer1 answer2 clampSensor toolLife toolUsage vacuumGa self recoveryProcedureStart: aString.

self smsg1: 'Excessive Flagging'.
        self write: 'Symptom is Excessive Flagging'.
        self write: 'Error Code = PERR  Device Number = NNNN'.
        aCauseHasBeenFound := false.

self write: 'Checking first potential cause - Excessive Tool Wear'.

toolLife := self receiveDataFromWS: 'CC'
                        ofKind: #isDecimalInteger
                        withPrompt: 'Read TOOL LIFE '.
        self echoInput: toolLife.

toolUsage := self receiveDataFromWS: 'WS#4'
                        ofKind: #isDecimalInteger
                        withPrompt: 'Read TOOL USAGE '.
        self echoInput: toolUsage.

self write: 'Comparing TOOL USAGE with TOOL LIFE'.

( (toolUsage asInteger) < (toolLife asInteger) )
            ifTrue: [ self write: 'Ruling out Excessive Tool Wear as a cause'.]
            ifFalse:[ self write: 'Excessive Tool Wear detected'.
                      aCauseHasBeenFound := true.
                      answer1 := self receiveInfoFromWST: 'WST#4'
                                    ofKind: #isYesOrNo
                                    withPrompt: 'Excessive Tool Wear - \OK to change tool?'
                      ( answer1 isYes )
```

```
                    ifTrue: [ self sendCommand: 'TOOL CHANGE' toWS: 'WS#4'.
                              self displayInfo: 'Tool Changed - Continue' atWST: 'WS
                            ]
        ].

self write: 'Checking second potential cause - Inadequate Vacuum'.

vacuumGage := self receiveDataFromWS: 'WS#4'
              ofKind: #isDecimalInteger
              withPrompt: 'Read VACUUM GAGE '.
self echoInput: vacuumGage.

self write: 'Comparing VACUUM GAGE Reading with ALLOWABLE VALUE'.

(vacuumGage asInteger <= 3)
    ifTrue: [ self write: 'Ruling out Inadequate Vacuum as a cause']
    ifFalse:[ self write: 'VACUUM GAGE Reading greater than allowable value of 3
              aCauseHasBeenFound := true.
              self write: 'Inadequate Vacuum detected'.
              self displayInfo: 'Clogged Vacuum Pickup - \Check and clean vacuum
                  atWST: 'WST#4'
            ].

self write: 'Checking third potential cause - Inadequate Clamping'.

clampSensor := self receiveDataFromWS: 'WSS#2'
               ofKind: #isDecimalInteger
               withPrompt: 'Read Sensor '.
self echoInput: clampSensor.

(clampSensor asInteger = 0)
    ifTrue: [ self write: 'Ruling out Inadequate Clamping as a cause'.]
    ifFalse:[ self write: 'Inadequate Clamping detected'.
              aCauseHasBeenFound := true.
              self displayInfo: 'Incorrect clamping - \Check clamp pressure.' wi
                  atWST: 'WST#4'.
            ].
"
(aCauseHasBeenFound)
    ifFalse: [ self displayInfo:
'Excessive Flagging has been detected.

The problem does not appear to be
the result of any of the known causes.

Operator J. Smith suggests increasing
the air blowoff by 10 psi.'
                     atWST: 'WST#4'.].
"
(aCauseHasBeenFound)
    ifFalse: [ answer2 := self receiveInfoFromWST: 'WST#4'
                              ofKind: #isYesOrNo
                              withPrompt:
'Excessive Flagging has been detected.

The problem does not appear to be
the result of any of the known causes.

Would you like to see some
operator suggestions ? (yes or no) '.
             ( answer2 isYes )
                 ifTrue: [ "self displayInfo:

Operator J. Smith suggests increasing
the air blowoff by 10 psi.'
                                        atWST: 'WST#4'."
self receiveInfoFromWST: 'WST#4'
    ofKind: #isAcknowledgement
    withPrompt:
'
Operator J. Smith suggests increasing
the air blowoff by 10 psi.'
```

```
                           ].
self recoveryProcedureCompleted.!

recoveryPlanCase5: aString

| answer1  a| self recoveryProcedureStart: aString.

a :=
'The following message is being sent to WST#4 -
Sheet may be short in length -
Divert to manual station for check ? (yes or no) '.

self displayInfo: a atWST: 'COT#1'.

answer1 := self receiveInfoFromWST: 'WST#4'
                  ofKind: #isYesOrNo
                  withPrompt: 'Sheet may be short in length -
Divert to manual station for check ? (yes or no)_'.

(answer1 isYes)
    ifTrue: [ self sendCommand: 'Send Sheet from WS#5 to WS#4 '
                  toWS: 'CC'.
              self displayInfo: 'Sheet may be short in length - Check'
                  atWST: 'WST#4'.
             ].

self recoveryProcedureCompleted.!

recoveryPlanCase5a: aString self smsg1: 'Location Error'.
self write: '\Location Error detected for Operation 11.1' withCrs.
self write: 'Error Code = NNNNN   Device Number = DPD #1'.
self write: 'Cause is Sheet Length Too Small'.
self write: 'Non-procedural error\' withCrs.

self recoveryWarningCompleted!

recoveryPlanCase5b: aString self smsg1: 'Location Error'.
self write: '\Location Error detected for Operation 12.1' withCrs.
self write: 'Error Code = NNNNN   Device Number = DPD #2'.
self write: 'Cause is Sheet Length Too Small'.
self write: 'Non-procedural error\' withCrs.

self recoveryWarningCompleted!

recoveryPlanCase5c: aString self smsg1: 'Location Error'.
self write: '\Software Limit detected for Operation 13.1' withCrs.
self write: 'Error Code = XXXXX   Device Number = DPD #3'.
self write: 'Cause is Sheet Length Too Small'.
self write: 'Non-procedural error\' withCrs.

self recoveryWarningCompleted!

recoveryPlanSample1: aString

| answer1 | self recoveryProcedureStart: aString.

self write: ('Sample plan for ' , aString).

self recoveryProcedureCompleted.!

recoveryPlanSample2: aString

| answer1 |
```

```
    self recoveryProcedureStart: aString.

self write: ('Alarm Filtering Demo processing alarm ' , aString).

self receiveInfoFromWST: 'WST#4'
        ofKind: #isDecimalInteger
        withPrompt: 'What is the data value ? ' withCrs.

self recoveryProcedureCompleted.!

recoveryPlanSample3: aString

| answer1 | self recoveryProcedureStart: aString.

self write: ('Protocol Test Demo processing alarm ' , aString).
    "answer1 := self acknowledgeAlarm: aString.
    "
    "answer1 := superModel waitForAMessage."
    "answer1 := superModel waitForAMessageOfType: 99."
    answer1 := superModel waitForACKOrNAK.
    "answer1 := superModel waitForACKOrNAKSymbol."
    "answer1 := self acknowledgeAlarm: aString."
    "answer1 := self dataUpdateForVariable: 'ABCD' withValue: '1234'."
    "answer1 := self requestForDataNamed: 'ABCD'. "

self write: ('The response is ' , answer1 printString).
    ( answer1 isKindOf: AMessage ) ifTrue: [self write: ('The message data is ' , a
    self recoveryProcedureCompleted.!

recoveryProcedureCompleted

"Clean up after a completed recovery procedure"

symptomStream cr.
    symptomStream pane scrollUp: (symptomStream pane frame height) negated.
    self maskItSymptom.
    opmsgStream cr.
    opmsgStream pane scrollUp: (opmsgStream pane frame height) negated.
    self maskItopmsg.

textStream nextPutAll: '*** recovery operation completed ***';cr.

self terminationOperations!

recoveryProcedureDone
    "Clean up after a completed recovery procedure:
        (1) Send a message to the recovery message log
        (2) Clear the Symptoms pane
        (3) Clear the Operator Message pane "

| a b c d e f |

" self rmsg1: '* recovery operation completed *'. "
    " symptomStream pane scrollUp: 1000. "
    " self smsg1: ' '.
     symptomStream pane homeCursor."
    " self changed: #symptoms.
     self maskItSymptom.
     self changed: #opmsg.
     self maskItopmsg "
    " Transcript show: symptomStream pane topCorner printString "
    " Transcript show: symptomStream pane textHolder extent printString"

" the argument to scrollup is 14* the number of lines to scroll.
Since the symptom pane and the operator mesage pane can hold
a maximum of 9 lines, the default argument is 9 * 14 = 126. "
    symptomStream cr.
    " symptomStream pane scrollUp: -126. "
```

```
    a := (symptomStream pane frame height) negated.
    symptomStream pane scrollUp: a.
    self maskItSymptom.
    opmsgStream cr.
    b := (symptomStream pane frame height) negated.
"   opmsgStream pane scrollUp: -126. "
    opmsgStream pane scrollUp: b.
    self maskItopmsg.

"   self samplePlan2   "

"   Perform termination operations"

self terminationOperations!

recoveryProcedureStart: aString textStream cr;
        nextPutAll: '***Automatically starting Recovery Procedure for "', aStrin
        cr;
        nextPutAll: ('*** ', (Date today printString), ' ' ,(Time now printStri
        cr.!

recoveryWarningCompleted

"Clean up after a completed non-procedural error"
    symptomStream cr.
    symptomStream pane scrollUp: (symptomStream pane frame height) negated.
    self maskItSymptom.

opmsgStream cr.
    opmsgStream pane scrollUp: (opmsgStream pane frame height) negated.
    self maskItopmsg.

"textStream nextPutAll: '*** recovery operation completed ***';cr. "

self terminationOperations!

requestForDataNamed: aString

" Revision Level ark02
    Date of Last Revision  Aug 24, 1990 "

"Answers
        false if the request message is not acknowledged i.e. there are a
            combination of 3 NAKs or time outs in response to the request
            message,
        false if there is no data transmission,
        a String (ascii) containing the value of the the variable named aString.

Send a TYPE 3 Mesage - Request For Data for the value for the variable
    named aString (ascii)"

| dataReceived numberOfTransmissionAttempts request response |

" Send the request and wait for an ACK"

self write: ('Transmitting request for data for "' , aString , '.' ).
    request := AMessage requestForDataMessageStringForVariableNamed: aString.

numberOfTransmissionAttempts := 0.
    response := #NAK.

[ response ~= #ACK ]
        whileTrue: [superModel transmitOutput: request.
                    response := superModel waitForACKOrNAKSymbol.
                    ( response == #timeOut or: [ response == #NAK ] )
                        ifTrue: [   Terminal bell.
                                    numberOfTransmissionAttempts := numberOfTran
                                    ( numberOfTransmissionAttempts >= 3 )
                                        ifTrue: [ ^false ]
                                ]
                    ].
```

" Wait for a type 4 message ( Data transmission ) whose variable name
  matches aString "

self write: ('Waiting for the data transmission.' ).

3 timesRepeat: [
        dataReceived := superModel waitForAMessageDescribedBy:
                            [ :message | ( message type = 4 ) and:
                                [ (message extractVariableNameAndValue at: 1)
                                    = aString
                                ]
                            ].

( dataReceived isKindOf: AMessage )
            ifTrue: [ ^ dataReceived extractVariableNameAndValue at: 2 ].
        Terminal bell. "time out signal"
                    ].

^ false!

samplePlan1

|a b c d e f g | a := self getMeMyInput.
    textStream nextPutAll: 'Got it' , (a printString);cr.!

samplePlan10: aString

| a b| self recoveryProcedureStart: aString.

self smsg1: 'A Symptom'.

self displayInfo: 'Just a message for the operator'
        atWST: 'WST#2'.

self sendCommand: 'A command goes here'
        toWS: 'WS#9'.

a := self receiveInfoFromWST: 'WST#14'
            ofKind: #isDecimalInteger
            withPrompt: 'What is the temperature ? '.
textStream nextPutAll: ('Recovery plan received input = ' , a printString);cr.

a := self receiveInfoFromWST: 'WST#2'
            ofKind: #isDecimalInteger
            withPrompt: 'What is the pressure ? '.
textStream nextPutAll: ('Recovery plan received input = ' , a printString);cr.

a := self receiveInfoFromWST: 'WST#14'
            ofKind: #isDecimalInteger
            withPrompt: 'What is the volume ? '.
textStream nextPutAll: ('Recovery plan received input = ' , a printString);cr.

"
b := self receiveDataFromWS: 'CC'
            ofKind: #isDecimalInteger
            withPrompt: 'Poll ToolLife'.
textStream nextPutAll: ('Recovery plan received input = ' , b printString);cr.

b := self receiveDataFromWS: 'CC'
            ofKind: #isDecimalInteger
            withPrompt: 'Poll Tool'.
textStream nextPutAll: ('Recovery plan received input = ' , b printString);cr.
"
b := self receiveDataFromWS: 'WSS#2'
            ofKind: #isDecimalInteger

```
                withPrompt: 'Poll Tool'.
textStream nextPutAll: ('Recovery plan received input = ' , b printString);cr.

a := self receiveInfoFromWST: 'WST#14'
            ofKind: #isDecimalInteger
            withPrompt: 'What is the volume ? '.
textStream nextPutAll: ('Recovery plan received input = ' , a printString);cr.

self recoveryProcedureCompleted.!

samplePlan11: aString

| a b| self recoveryProcedureStart: aString.

self smsg1: 'A Symptom'.

self displayInfo:
'Just a message for the operator
that is second line here.'
        atWST: 'WST#2'.

self sendCommand:
'A command goes here
which is multi line
input.'
        toWS: 'WS#1'.

self sendCommand: 'Print new label' toWS: 'DPD#1'.

a := self receiveInfoFromWST: 'WST#4'
            ofKind: #isDecimalInteger
            withPrompt: 'What is the temperature ? '.
textStream nextPutAll: ('Recovery plan received input = ' , a printString);cr.

a := self receiveInfoFromWST: 'WST#2'
            ofKind: #isDecimalInteger
            withPrompt: 'What is the pressure ? '.
textStream nextPutAll: ('Recovery plan received input = ' , a printString);cr.

a := self receiveInfoFromWST: 'WST#4'
            ofKind: #isDecimalInteger
            withPrompt: 'What is the volume ? '.
textStream nextPutAll: ('Recovery plan received input = ' , a printString);cr.

b := self receiveDataFromWS: 'CC'
            ofKind: #isDecimalInteger
            withPrompt: 'Read ToolLife '.
textStream nextPutAll: ('Recovery plan received input = ' , b printString);cr.

b := self receiveDataFromWS: 'CC'
            ofKind: #isDecimalInteger
            withPrompt: 'Read Tool '.
textStream nextPutAll: ('Recovery plan received input = ' , b printString);cr.

b := self receiveDataFromWS: 'WSS#2'
            ofKind: #isDecimalInteger
            withPrompt: 'Read Tool '.
textStream nextPutAll: ('Recovery plan received input = ' , b printString);cr a := self receiveInfoFromWST: 'WST#4'
            ofKind: #isDecimalInteger
            withPrompt: 'What is the volume ? '.
textStream nextPutAll: ('Recovery plan received input = ' , a printString);cr.

b := self receiveDataFromWS: 'WS#1'
            ofKind: #isDecimalInteger
            withPrompt: 'Read Tool1 '.
textStream nextPutAll: ('Recovery plan received input = ' , b printString);cr.
```

```
b := self receiveDataFromWS: 'WS#4'
        ofKind: #isDecimalInteger
        withPrompt: 'Read Tool4 '.
textStream nextPutAll: ('Recovery plan received input = ' , b printString);cr.

b := self receiveDataFromWS: 'WS#5'
        ofKind: #isDecimalInteger
        withPrompt: 'Read Tool5 '.
textStream nextPutAll: ('Recovery plan received input = ' , b printString);cr.

b := self receiveDataFromWS: 'WS#7'
        ofKind: #isDecimalInteger
        withPrompt: 'Read Tool7 '.
textStream nextPutAll: ('Recovery plan received input = ' , b printString);cr.

self recoveryProcedureCompleted.!

samplePlan2

|a b c d e f g | b := self getMeMyInput.  (b = 'stop') ifTrue: [^self].
    textStream cr;
        nextPutAll: '***Automatically starting Recovery Procedure for "', b, '"'
        cr;
        nextPutAll: ('*** ', (Date today printString), ' ' ,(Time now printStri
        cr.

self smsg1: 'No Sheet Motion'.
    self omsg1: 'Just an informative message.'.

textStream nextPutAll: 'Display an informative message on WST#14';cr.
    superModel transmitOutput: 'WST#14/Just an informative message. '.

self omsg1: 'What is the temperature ? '.
    textStream nextPutAll: 'Display on WST#2 - What is the temperature ? ';cr.
    superModel transmitOutput: 'WST#2/What is the temperature ? '.
    a := self getMeMyInput.
    textStream nextPutAll: 'Received from WST#2 a temperature reading of ' ,   ;

textStream cr;
        nextPutAll: '*** recovery operation completed ***';
        cr.
     self recoveryProcedureDone!

samplePlan3

|a b c d e f g | b := self getMeMyInput.  (b = 'stop') ifTrue: [^self].
    textStream cr;
        nextPutAll: '***Automatically starting Recovery Procedure for "', b, '"'
        cr;
        nextPutAll: ('*** ', (Date today printString), ' ' ,(Time now printStri
        cr.

self smsg1: 'No Sheet Motion'.

self omsg1: 'Just an informative message.'.
    textStream nextPutAll: 'Display an informative message on WST#14';cr.
    superModel transmitOutput: 'WST#14/Just an informative message. '.

self omsg1: 'What is the temperature ? '.
    textStream nextPutAll: 'Display on WST#2 - What is the temperature ? ';cr.
    superModel transmitOutput: 'WST#2/What is the temperature ? '.
    a := self getMeMyInput.
    textStream nextPutAll: 'Received from WST#2 a temperature reading of ' , a ;

textStream nextPutAll: 'Send Sheet from WS1 to WS7.';cr.
    superModel transmitOutput: 'CC/Send Sheet from WS1 to WS7. '.

textStream
```

```
            nextPutAll: '*** recovery operation completed ***';
            cr.

self recoveryProcedureDone!

samplePlan4: aString

| a b c d e f g |

" b := self getMeMyInput.  (b = 'stop') ifTrue: [^self]."
    textStream cr;
        nextPutAll: '***Automatically starting Recovery Procedure for "', aStrin
        cr;
        nextPutAll: ('*** ', (Date today printString), ' ' ,(Time now printStri
        cr.

self smsg1: 'No Sheet Motion'.

self omsg1: 'Just an informative message.'.
    textStream nextPutAll: 'Display an informative message on WST#14';cr.
    superModel transmitOutput: 'WST#14/Just an informative message. '.

self omsg1: 'What is the temperature ? '.
    textStream nextPutAll: 'Display on WST#2 - What is the temperature ? ';cr.
    superModel transmitOutput: 'WST#2/What is the temperature ? '.
    a := self getMeMyInput.
    textStream nextPutAll: 'Received from WST#2 a temperature reading of ' , a ;

Terminal bell.
    textStream nextPutAll: 'Send Sheet from WS1 to WS7.';cr.
    superModel transmitOutput: 'CC/Send Sheet from WS1 to WS7. '.

Terminal bell.

textStream
        nextPutAll: '* recovery operation completed *';
        cr.

self recoveryProcedureDone!

samplePlan5: aString

| a b c d e f g |

" b := self getMeMyInput.  (b = 'stop') ifTrue: [^self]."
    textStream cr;
        nextPutAll: '***Automatically starting Recovery Procedure for "', aSt:
        cr;
        nextPutAll: ('*** ', (Date today printString), ' ' ,(Time now printStri
        cr.

self smsg1: 'No Sheet Motion'.

self omsg1: 'Just an informative message.'.
    textStream nextPutAll: 'Display an informative message on WST#14';cr.
    superModel transmitOutput: 'WST#14/Just an informative message. '.

self omsg1: 'What is the temperature ? '.
    textStream nextPutAll: 'Display on WST#2 - What is the temperature ? ';cr.
    superModel transmitOutput: 'WST#2/What is the temperature ? '.
    a := self getMeMyInput.
    textStream nextPutAll: 'Received from WST#2 a temperature reading of ' , a ;

"Terminal bell."
    textStream nextPutAll: 'Send Sheet from WS1 to WS7.';cr.
 "Terminal bell."
    superModel transmitOutput: 'CC/Send Sheet from WS1 to WS7. '.
 "Terminal bell. "

textStream
        nextPutAll: '* recovery operation completed *';
        cr.

self recoveryProcedureDone!
```

```
samplePlan6: aString

|a b c d e f g |

" b := self getMeMyInput.  (b = 'stop') ifTrue: [^self]."
    textStream cr;
        nextPutAll: '***Automatically starting Recovery Procedure for "', aStrin
        cr;
        nextPutAll: ('*** ', (Date today printString), ' ' ,(Time now printStri
        cr.

self smsg1: 'No Sheet Motion'.

self omsg1: 'Just an informative message.'.
    textStream nextPutAll: 'Display an informative message on WST#14';cr.
    superModel transmitOutput: 'WST#14/Just an informative message. '.
  " self omsg1: 'What is the temperature ? '.
    textStream nextPutAll: 'Display on WST#2 - What is the temperature ? ';cr.
    superModel transmitOutput: 'WST#2/What is the temperature ? '.
    a := self getMeMyInput.
    textStream nextPutAll: 'Received from WST#2 a temperature reading of ' , a
  "
"Terminal bell. "
    textStream nextPutAll: 'Send Sheet from WS1 to WS7.';cr.
    superModel transmitOutput: 'CC/Send Sheet from WS1 to WS7. '.
"Terminal bell. "

textStream
        nextPutAll: '* recovery operation completed *';
        cr.

self recoveryProcedureDone!

samplePlan7: aString

|a b c d e f g |

" b := self getMeMyInput.  (b = 'stop') ifTrue: [^self]."
    textStream cr;
        nextPutAll: '***Automatically starting Recovery Procedure for "', aStrin
        cr;
        nextPutAll: ('*** ', (Date today printString), ' ' ,(Time now printStri
        cr.

self smsg1: 'No Sheet Motion'.

self omsg1: 'Just a multi line informative message.'.
    textStream nextPutAll: 'Display an informative message on WST#14';cr.
    superModel transmitOutput: 'WST#14/Just an informative message. That
takes up several lines.
And just keeps going. '.

" self omsg1: 'What is the temperature ? '.
    textStream nextPutAll: 'Display on WST#2 - What is the temperature ? ';cr.
    superModel transmitOutput: 'WST#2/What is the temperature ? '.
    a := self getMeMyInput.
    textStream nextPutAll: 'Received from WST#2 a temperature reading of ' , a ;
  "
"Terminal bell. "
    textStream nextPutAll: 'Send Sheet from WS1 to WS7.';cr.
    superModel transmitOutput: 'CC/Send Sheet from WS1 to WS7. '.
"Terminal bell. "

textStream
        nextPutAll: '* recovery operation completed *';
        cr.

self recoveryProcedureDone!

samplePlan8: aString

|a b c d e f g |

" b := self getMeMyInput.  (b = 'stop') ifTrue: [^self]."
```

```
    textStream cr;
        nextPutAll: '***Automatically starting Recovery Procedure for "', aStrin
        cr;
        nextPutAll: ('*** ', (Date today printString), ' ' ,(Time now printStri
        cr.

self smsg1: 'No Sheet Motion'.

self omsg1: 'Just a multi line informative message.'.
    textStream nextPutAll: 'Display an informative message on WST#14';cr.
    superModel transmitOutput: 'WST#14/Just an informative message. That
takes up several lines.
And just keeps going. '.

self omsg1: 'What is the temperature ? '.
    textStream nextPutAll: 'Display on WST#2 - What is the temperature ? ';cr.
    superModel transmitOutput: 'WST#2/What is the temperature ? '.
    a := self getMeMyInput.
    textStream nextPutAll: 'Received from WST#2 a temperature reading of ' , a ;

self omsg1: 'Just a simple informative message.'.
    textStream nextPutAll: 'Display an informative message on WST#14';cr.
    superModel transmitOutput: 'WST#14/Just an informative message. '.

"Terminal bell. "
    textStream nextPutAll: 'Send Sheet from WS1 to WS7.';cr.
    superModel transmitOutput: 'CC/Send Sheet from WS1 to WS7. '.
"Terminal bell. "

textStream
        nextPutAll: '* recovery operation completed *';
        cr.

self recoveryProcedureDone!

samplePlan9: aString

|a b c d e f g |

" b := self getMeMyInput.   (b = 'stop') ifTrue: [^self]."
    textStream cr;
        nextPutAll: '***Automatically starting Recovery Procedure for "', aStrin
        cr;
        nextPutAll: ('*** ', (Date today printString), ' ' ,(Time now printStri
        cr.

self smsg1: 'No Sheet Motion'.

self omsg1: 'Just a multi line informative message.'.
    textStream nextPutAll: 'Display an informative message on WST#14';cr.
    superModel transmitOutput: 'WST#14/Just an informative message. That
takes up several lines.
And just keeps going. '.

self omsg1: 'The temperature message here. '.
    textStream nextPutAll: 'Display on WST#2 - The temperature message here.
    superModel transmitOutput: 'WST#2/The temperature message here. '.
"   a := self getMeMyInput.
    textStream nextPutAll: 'Received from WST#2 a temperature reading of ' , a ;
"
    self omsg1: 'Just a simple informative message.'.
    textStream nextPutAll: 'Display an informative message on WST#14';cr.
    superModel transmitOutput: 'WST#14/Just an informative message. '.

"Terminal bell. "
    textStream nextPutAll: 'Send Sheet from WS1 to WS7.';cr.
    superModel transmitOutput: 'CC/Send Sheet from WS1 to WS7. '.
"Terminal bell. "

textStream
        nextPutAll: '* recovery operation completed *';
        cr.
```

```
        self recoveryProcedureDone!

sendCommand: aString
       toWS: bString (superModel anyPendingInput) ifTrue: [ superModel getPendingInput2. "superModel textStream nextPutAll: ('Send the command, ' , aString , 'to ' , bString);cr. sel
superModel transmitOutput: (bString, '/' , aString).!

sendType2MessageForAlarm: aString

".Revision Level ark01
    Date of Last Revision  Aug 16, 1990 "

"Send an alarm acknowledgement for the alarm in aString (ascii)"

| alarmAcknowledgement | self write: ('Transmitting alarm acknowledgement for alarm ' , aString , '.'
    alarmAcknowledgement := AMessage alarmAcknowledgementMessageStringForAlarm:
    superModel transmitOutput: alarmAcknowledgement.
    ^ true!

smsg1: aString
    "Output.a text string to the Symptoms Pane "
      symptomStream nextPutAll: aString; cr.
    ^ self maskItSymptom.!

superModel

^ superModel!

superModel: aModel superModel := aModel!

symptoms

^ String new!

terminationOperations

| a | superModel transmitOutput: 'CC/Exception Processor Done. '.
    "  a := superModel getStackedRecoveryPlanRequest.
     ( a notNil  )
         ifTrue: [ self planRequest: a].
    "
    " superModel epDone "!

testMessageToWST14 superModel transmitOutput: 'WST#14/How are you ? '.!

text

^ String new!

textMenu

^Menu
        labels: 'Test Message to WST#14\Check for an  a\Check for an x\Check for
        lines: #(1 )
        selectors: #( testMessageToWST14   checkForAna checkForAnx checkForAnInpu timerSet Time initialize.
    Time clockTickPeriod: 40.!
```

```
timerUnset

Time clockTicksOff!

write: aString textStream nextPutAll: aString;cr.!

xopen

| topPane textPane | topPane := TopPane new label: 'Test Exception Processor'.

topPane addSubpane:
        (textPane := TextPane new
            model: self;
            name: #text;
            menu: #textMenu;
            framingRatio: (0@0 corner: 1@1);
            yourself).

topPane reframe: (0@00 corner: 640@125).

textStream := textPane dispatcher.

topPane dispatcher openWindow scheduleWindow!

xreceiveInfoFromWST: aString
          ofKind: aSelectorSymbol

| a b c d| a := self getMeMyInput.
    d := a perform: aSelectorSymbol.
    d ifTrue: [ ^ a]
      ifFalse: [ ^ nil]!

xreceiveInfoFromWST: aString
          ofType: aClass

| a b c d| a := self getMeMyInput. self halt.
    c := [ :q | q isMemberOf: aClass ].
    d := c value: a.
    d ifTrue: [ ^ a]
      ifFalse: [ ^ nil]!

xrecoveryPlanCase3: aString

| aCauseHasBeenFound answer1 answer2 clampSensor toolLife toolUsage vacuumGa self recoveryProcedureStart: aString.

self smsg1: 'Excessive Flagging'.
self write: 'Symptom is Excessive Flagging'.
self write: 'Error Code = PERR  Device Number = NNNN'.
aCauseHasBeenFound := false.

self write: 'Checking first potential cause - Excessive Tool Wear'.

toolLife := self receiveDataFromWS: 'CC'
          ofKind: #isDecimalInteger
          withPrompt: 'Read TOOL LIFE '.
self echoInput: toolLife.

toolUsage := self receiveDataFromWS: 'WS#4'
          ofKind: #isDecimalInteger
          withPrompt: 'Read TOOL USAGE '.
self echoInput: toolUsage.
```

```
self write: 'Comparing TOOL USAGE with TOOL LIFE'.

( (toolUsage asInteger) < (toolLife asInteger) )
    ifTrue: [ self write: 'Ruling out Excessive Tool Wear as a cause'.]
    ifFalse:[ self write: 'Excessive Tool Wear detected'.
              aCauseHasBeenFound := true.
              answer1 := self receiveInfoFromWST: 'WST#4'
                             ofKind: #isYesOrNo
                             withPrompt: 'Excessive Tool Wear - \OK to change tool?
              ( answer1 isYes )
                  ifTrue: [ self sendCommand: 'TOOL CHANGE' toWS: 'WS#4'.
                            self displayInfo: 'Tool Changed - Continue' atWST: 'WS
                          ]
            ].

self write: 'Checking second potential cause - Inadequate Vacuum'.

vacuumGage := self receiveDataFromWS: 'WS#4'
                   ofKind: #isDecimalInteger
                   withPrompt: 'Read VACUUM GAGE '.
self echoInput: vacuumGage.
self write: 'Comparing VACUUM GAGE Reading with ALLOWABLE VALUE'.

(vacuumGage asInteger <= 3)
    ifTrue: [ self write: 'Ruling out Inadequate Vacuum as a cause']
    ifFalse:[ self write: 'VACUUM GAGE Reading greater than allowable value of 3
              aCauseHasBeenFound := true.
              self write: 'Inadequate Vacuum detected'.
              self displayInfo: 'Clogged Vacuum Pickup - \Check and clean vacuum
                  atWST: 'WST#4'
            ].

self write: 'Checking third potential cause - Inadequate Clamping'.

clampSensor := self receiveDataFromWS: 'WSS#2'
                    ofKind: #isDecimalInteger
                    withPrompt: 'Read Sensor '.
self echoInput: clampSensor.

(clampSensor asInteger = 0)
    ifTrue: [ self write: 'Ruling out Inadequate Clamping as a cause'.]
    ifFalse:[ self write: 'Inadequate Clamping detected'.
              aCauseHasBeenFound := true.
              self displayInfo: 'Incorrect clamping - \Check clamp pressure.' wi
                  atWST: 'WST#4'.
            ].
"
(aCauseHasBeenFound)
    ifFalse: [ self displayInfo:
'Excessive Flagging has been detected.

The problem does not appear to be
the result of any of the known causes.

Operator J. Smith suggests increasing
the air blowoff by 10 psi.'
                  atWST: 'WST#4'.].
"
(aCauseHasBeenFound)
    ifFalse: [ answer2 := self receiveInfoFromWST: 'WST#4'
                               ofKind: #isYesOrNo
                               withPrompt:
'Excessive Flagging has been detected.

The problem does not appear to be
the result of any of the known causes.

Would you like to see some
operator suggestions ? (yes or no) '.
               ( answer2 isYes )
                   ifTrue: [ self displayInfo:
```

```
Operator J. Smith suggests increasing
the air blowoff by 10 psi.'
                                atWST: 'WST#4'.
                        ]
                ].
self recoveryProcedureCompleted.! !
!ListPrompter class methods !

prompt: questionString default: answerString popUpAt: aPoint
        "Open a Prompter with questionString as
         its question and answerString as its
         default answer.  Answer the user
         response (a String) with leading and
         trailing spaces trimmed."
    ^self new
        evaluating: false;
        withBlank: false;
        prompt: questionString default: answerString popUpAt: aPoint! !

!ListPrompter methods !

listReply: aSymbol
    " ^ self reply: aSymbol
    "

^ self reply: (replyPane selection)!

prompt: questionString default: aCollection
        "Private - Initialize a Prompter window
          and give it control."
    | topPane promptBox tempOffset offset cursor |
    cursor := Cursor.
    CursorManager normal change.
    reply := aCollection.
    exitBlock := [
        cursor change.
        ^reply].
    topPane := TopPane new
        label: questionString;
        leftIcons: Array new;
        rightIcons: Array new;
        backColor: 10;
        minimumSize:
            ((questionString size max: reply size) + 4
                * (LabelFont width max: TextFont width)
                min: 60 * SysFontWidth)
            @ (LabelFont height + ((TextFont height) * (aCollection size)) + 10)
        yourself.
    topPane addSubpane:
        (replyPane := ListPane new
            model: self;
            menu: #menu;
            dispatcher: ListPromptEditor new;
            name: #reply;
            change: "#acceptReply:from:"#listReply:;
            framingBlock: [:box|
                box origin corner: box corner]).
    offset := Cursor offset.
    promptBox :=
        Rectangle
            origin: offset
            extent: topPane minimumSize.
    tempOffset := (Display extent - promptBox extent)
        min: (offset - (4 @ (SysFontHeight * 2))) max: 0 @ 0.
        promptBox moveTo: tempOffset.
        "topPane unzoom."
        hiddenArea := Display compatibleForm fromDisplay: promptBox.
        hiddenArea offset: tempOffset.
        topPane dispatcher openIn: promptBox.
        " replyPane
            selectAtEnd;
```

```
        homeCursor. "
    topPane activateWindow.
    [topPane dispatcher active] whileTrue: [
        replyPane dispatcher processInput]!

prompt: questionString default: aCollection  popUpAt: aPoint
        "Private - Initialize a Prompter window
         and give it control."
    | topPane promptBox tempOffset offset cursor |
    cursor := Cursor.
    CursorManager normal change.
    reply := aCollection.
    exitBlock := [
        cursor change.
        ^reply].
    topPane := TopPane new
        label: questionString;
        leftIcons: Array new;
        rightIcons: Array new;
        backColor: 10;
        minimumSize:
            ("(questionString size max: reply size) ÷ 4
                * (LabelFont width max: TextFont width)
             min:" 75 * SysFontWidth)
            @ (LabelFont height + ((TextFont height) * (aCollection size)) ÷ 10)
        yourself.
    topPane addSubpane:
        (replyPane := ListPane new
            model: self;
            menu: #menu;
            dispatcher: ListPromptEditor new;
            name: #reply;
            change: "#acceptReply:from:"#listReply:;
            framingBlock: [:box|
                box origin corner: box corner]).
    offset := "Cursor offset." aPoint.
    promptBox :=
        Rectangle
            origin: offset
            extent: topPane minimumSize.
    tempOffset := "(Display extent - promptBox extent)
        min: (offset - (4 @ (SysFontHeight * 2))) max: 0 @ 0)." aPoint.
    promptBox moveTo: tempOffset.
    "topPane unzoom."
    hiddenArea := Display compatibleForm fromDisplay: promptBox.
    hiddenArea offset: tempOffset.
    topPane dispatcher openIn: promptBox.
" replyPane
        selectAtEnd;
        homeCursor. "
    topPane activateWindow.
    [topPane dispatcher active] whileTrue: [
        replyPane dispatcher processInput]! !

!ListPromptEditor class methods ! !

!ListPromptEditor methods !

isControlActive

^ active!

processFunctionKey: aCharacter
        "Private - Process function keys
         from the keyboard or mouse."

"This is a copy of the same method from class
        PromptEditor. It is repeated here to avoid
        inheriting  processFunctionKey: from TextEditor
        when executing 'super processFunctionKey:'. This
        is necessary because the textEditor method assumes
        a text pane. Note that the list select function
``` is handled in class Dispatcher which does a
self select which, in turn, is answered by class
List Selector."

```
aCharacter == CycleFunction
      ifTrue: [^Terminal bell].
   aCharacter == WindowMenuRequest
      ifTrue: [^Terminal bell].
   (aCharacter == SelectFunction
   or: [aCharacter == PaneMenuRequest])
      ifTrue: [
         pane hasCursor ifFalse: [
            ^Terminal bell]].
   ZoomFunction == aCharacter
      ifTrue: [^Terminal bell].
   super processFunctionKey: aCharacter! !

!WorkCellSuperModel class methods !

commandKeysInitialize

CommandKeys := Dictionary new.
   CommandKeys
      at: 'ACK'
      put: #sendACK;
      at: 'Alarm #1101'
      put: #sendAlarm1101;
      at: 'Alarm #1100'
      put: #sendAlarm1100;
      at: 'Data Transmission'
      put: #sendDataTransmission;
      at: 'NAK'
      put: #sendNAK;
      at: 'Alarm - User Selected'
      put: #sendAlarmSelected;
      at: 'Bad Type'
      put: #sendBadType;
      at: 'Three Good Type 1s'
      put: #sendThreeGoodType1;
      at: 'One Bad Type then 2 Good Type 1s'
      put: #sendOneBadTwoGoodType1;
      at: 'One Good Type 1 One Bad Type One Good Type 1'
      put: #sendOneGoodType1OneBadTypeOneGoodType1.!

getCommandKeyFor: aString

^CommandKeys at: aString ifAbsent: [ #invalidKey ]!

new
   self commandKeysInitialize.
   TimeOutIntervalInSeconds := 1500.
   super new initialize! !

!WorkCellSuperModel methods !

anyPendingInput

^commInterface anyPendingInput!

changeTimeOutIntervalInSeconds

| a |

[a := Prompter prompt: 'Enter the Time Out Interval in Seconds'
              default: TimeOutIntervalInSeconds printString.
    a isDecimalInteger] whileFalse: [Terminal bell].
   TimeOutIntervalInSeconds := a asInteger.!
``` checkForAnInput

```
    |a b c d e f g | a := CommScript new onPort:
        (CommPort port: 2).
    a ifTimeOut: [ Terminal bell.
                    Terminal bell].
     a echo: true.
     a waitForInput: 3.!
``` clearAlarmCalled: aString

```
    | a b c d e f |
    exceptionProcessor write: ('\Clearing alarm  ' withCrs , aString).
    b :=  inComingMessages copyWithoutFirstOccurenceOf: aString.
    inComingMessages := b.
    self changed: #text.
    self logHistoryFor: (aString , ' (clear)').!
``` clearAndResetAll

```
    self resetHistory.
    self resetText.
"   self resetData.
    self reInitializeInComingMessages.

exceptionProcessor clearTextPane; maskAll.
    self resetEP.
"
    commInterface clearPanes.

operatorMessageScreen reset.!
``` clearCurrentAlarmCalled: aString

```
    | a b c d e f |
    exceptionProcessor write: ('\Clearing alarm   ' withCrs , aString).
"   b :=  inComingMessages copyWithoutFirstOccurenceOf: aString.
    inComingMessages := b.
    self changed: #text. "
    self logHistoryFor: (aString , ' (clear)').!
``` commInterface

```
    ^ commInterface!
``` commInterface: aCommModel

```
    commInterface := aCommModel!
``` commTap

```
    commInterface showCommContents2!
``` data

```
    ^ String new!
``` dataMenu

```
    ^Menu
        labels: 'reset data\inspect data\ HALT' withCrs
        lines: #(1 )
        selectors: #( resetData   inspectData halt)!
``` determineWhatEPShouldDo: aString

```
    " check for patterns here"
```

| a b c d e f |

"This is a made up pattern:

check sequence
    13.3 (CC) Verifies Barcode
    13.6 (Shop) Inspects Ditch
    13.3 (CC) Verifies Barcode
 if matched do just the first 13.3
and clear the rest
"
"
( recoveryPlanHistory includes: '13.3 (CC) Verifies Barcode'
      and: [ (aString = '13.6 (Shop) Inspects Ditch')
          and: [ incomingMessages includes: '13.3 (CC) Verifies Barcode']
      ]
 ) ifTrue: [ exceptionProcessor displayMessage: '\\Eliminating pattern' with
    self clearAlarmCalled: '13.3 (CC) Verifies Barcode'.
    ^ self ]
"
" ******** C H E C K   P A T T E R N  185A 186A 187A  ******************"
" check a pattern of 185A 186A 187A
  Assume 185A has been processed and key on 186A.
  Action is to clear 186A and 187A"

( aString = '1 8 6 A' and:
    [ (a:= history last) = '1 8 5 A' and:
      [ inComingMessages includes: '1 8 7 A']
    ] )
    ifTrue: [ Terminal bell .
b :=
'\I have detected a Pattern of Alarms.

The pattern is 1 8 5 A followed by 1 8 6 A and 1 8 7 A.
Since 1 8 5 A has already been processed, I can clear
1 8 6 A and 1 8 7 A.' withCrs.
         exceptionProcessor write: b .
         self clearCurrentAlarmCalled: '1 8 6 A'.
         self clearAlarmCalled: '1 8 7 A'.
         ^ self].
" ******** E N D   P A T T E R N  185A 186A 187A  ******************"

" ******** C H E C K   P A T T E R N  238F 239F 230F  ******************"
    "This pattern is functionally the same as the 185a 186A 187A except
    that the alarms are started manually/individually from from CC while
    the 18xx series can be started by a single pick on the 185A operation"

" check a pattern of 238F 239F 230F
  Assume 238F has been processed and key on 239F.
  Action is to clear 239F and 230F"

( aString = '2 3 9 F' and:
    [ (a:= history last) = '2 3 8 F' and:
      [ inComingMessages includes: '2 3 0 F']
    ] )
    ifTrue: [ Terminal bell .
b :=
'\I have detected a Pattern of Alarms.

The pattern is 2 3 8 F followed by 2 3 9 F and 2 3 0 F.
Since 2 3 8 F has already been processed, I can clear
2 3 9 F and 2 3 0 F.' withCrs.
         exceptionProcessor write: b .
         self clearCurrentAlarmCalled: '2 3 9 F'.
         self clearAlarmCalled: '2 3 0 F'.
         ^ self].
" ******** E N D   P A T T E R N  238F 239F 230F  ******************"

" ******** C H E C K   P A T T E R N  CASE 5  ******************"

" If the 3 non-procedural error occur (111A 121A 131A) execute recoveryPlan5"

```
( (aString = '1 3 1 A')
    and: [ (history includes: '1 2 1 A') & (history includes: '1 1 1 A')] )
        ifTrue: [ Terminal bell.
b :=
'\Three  non-procedural error have occured which are symtoms
of SHEET LENGTH TOO SMALL.

The warning for the last of these will be logged and then,
Recovery plan 876B will being queued.' withCrs.
                    exceptionProcessor write: b.
                    exceptionProcessor planRequest: '1 3 1 A'.
                    inComingMessages addFirst: '8 7 6 B'.
                    self changed: #text.
                    ^ self].

" ***** Process the selected plan *****"

exceptionProcessor planRequest: aString.!

determineWhatToDoNext

| a b c d e f|

[ true ] whileTrue: [

(self anyPendingInput)
        ifTrue: [ self getPendingInput2 ].

a := self getStackedRecoveryPlanRequest.
    ( a notNil  )
        ifTrue: [ "exceptionProcessor planRequest: a"
                    self determineWhatEPShouldDo: a. ]
        ifFalse:[ ^ nil ]

].!

dummy

^ self!

dummy: aSymbol

^ Terminal bell!

dumpLogToFile

CursorManager execute change.
historyStream pane fileOutOn: ( Directory current file: 'LOG').
CursorManager normal change.!

dumpLogToPrinter

CursorManager execute change.
historyStream pane
                selectAll;
                hideSelection;
                print;
                selectAtEnd.
CursorManager normal change.!

epDone
    | a b c d e f| a := self getStackedRecoveryPlanRequest.
    ( a notNil  )
        ifTrue: [ "exceptionProcessor planRequest: a"
                    self determineWhatEPShouldDo: a].!

exceptionProcessor
```

^ exceptionProcessor!

exceptionProcessor: anExceptionProcessor exceptionProcessor := anExceptionProcessor!

getACKNAK

```
|a b c d e f g | a := CommScript new onPort:
    (CommPort port: 2).
b := WriteStream on: String new.
a captureIn: b.
a ifTimeOut: [ Terminal bell. Terminal bell.^nil
              ].
a echo: true.
a wait: TimeOutIntervalInSeconds forString: "Lf" "( 0 asCharacter )" "′′" A
c := b lastTwo .
^c!
``` getInput

```
|a b c d e f g |

(false) " is data requested on stack"
    ifTrue:[ "^ data"]
    ifFalse:[ d := ' '. " d := recoveryPlan"
[ d isRecoveryPlanRequest] whileTrue:
    [
a := CommScript new onPort:
    (CommPort port: 2).
b := WriteStream on: String new.
a captureIn: b.
a ifTimeOut: [ Terminal bell.
               Terminal bell.
              ].
a echo: true.
a wait: 15 forCharacter: "Lf" ( 0 asCharacter ).
"^ b contents "
c := b contents.
d := c zapCrs trimBlanks.    "self halt. "
    ] .

]!
``` getInput2

```
|a b c d e f g |

(false) " is data requested on stack"
    ifTrue:[ "^ data"]
    ifFalse:[ d := ' '. " d := recoveryPlan"
[ d isRecoveryPlanRequest] whileTrue:
    [
a := CommScript new onPort:
    (CommPort port: 2).
b := WriteStream on: String new.
a captureIn: b.
a ifTimeOut: [ Terminal bell. Terminal bell.^nil
              ].
a echo: true.
a wait: TimeOutIntervalInSeconds forCharacter: "Lf" "( 0 asCharacter )" ( 6
"^ b contents "
c := b contents.
```

```
        d := c zapCrs "trimBlanks."    "self halt."
            ] .
    ^ d

]!

getPendingInput

| a b c d e f g |

(false) " is data requested on stack"
        ifTrue:[ "^ data"]
        ifFalse:[ d := '  '. " d := recoveryPlan"
    [ d isRecoveryPlanRequest] whileTrue:
        [
    a := CommScript new onPort:
        (CommPort port: 2).
    b := WriteStream on: String new.
    a captureIn: b.
    a ifTimeOut: [ Lf
                ].
    a echo: true.
    a wait: 1 forCharacter: Lf.
    "^ b contents "
    c := b contents.
    d := c zapCrs trimBlanks.
        ] .
    ^ d

]!

getPendingInput2 commInterface getPendingInput!

getStackedRecoveryPlanRequest

| a b c d e f |
"
    a := inComingMessages detect: [ :each | each isRecoveryPlanRequest]
                        ifNone: [ ^nil].
    b :=  inComingMessages copyWithoutFirstOccurenceOf: a.
    inComingMessages := b.
    self changed: #text.
    ^ a
"
    ( inComingMessages isEmpty ) ifTrue: [ ^ nil].
    a := inComingMessages removeFirst.
    self changed: #text.
    ^ a!

history

^ String new!

historyMenu

^Menu
        labels: ' dump LOG to File \ dump LOG to printer ' withCrs
        lines: #(  )
        selectors: #( dumpLogToFile dumpLogToPrinter )!

inComingMessages

^ inComingMessages!
```

```
initialize

| a b c | inComingMessages := OrderedCollection new.

self class commandKeysInitialize.

a := WorkEP new.
    a superModel: self.
    self exceptionProcessor: a.

CommModel checkCommPrimitives.
    c:= CommModel new.
    c superModel: self.
    self commInterface: c.

b := OperatorScreen new.
    b superModel: self.
    operatorMessageScreen := b.

self open!
initializeCommandKeys self class commandKeysInitialize.
self changed: #text!

inspectCommandKeys

CommandKeys inspect!

inspectData dataInput inspect.!

inspectHistory history inspect.!

invalidKey

Terminal bell. Terminal bell. Terminal bell.

^ false!

logHistoryFor: aString

"Place the recovery plan identified in aString
in the history log"

(history isNil) ifTrue:[history := OrderedCollection new].

history addLast: aString.
historyStream nextPutAll: aString;cr.!

open

| dataPane historyPane topPane textPane | topPane := TopPane new label: 'Cell Simulator';
                        backColor: 12.

topPane addSubpane:
        (textPane := ListPane new
            model: self;
            name: #text;
            menu: #textMenu;
            change: #selectionMade:;
            framingRatio: (0@0 corner: (1/3)@1);
            yourself).
```

```
" topPane addSubpane:
       (dataPane := TextPane new
           model: self;
           name: #data;
           menu: #dataMenu;
           change: #dummy:;
           framingRatio: (0@0 corner: (1/3)@1);
           yourself).    "

topPane addSubpane:
         (historyPane := TextPane new
            model: self;
            name: #history;
            menu: #historyMenu;
            change: #dummy:;
            framingRatio: ((1/3)@0 corner: 1@1);
            yourself).

topPane reframe: (0@0 corner: 640@200).

" dataInputStream := dataPane dispatcher. "
    textStream := textPane dispatcher.
    historyStream := historyPane dispatcher.

topPane dispatcher openWindow scheduleWindow!

openCommInterface commInterface open!

openOperatorDisplay operatorMessageScreen open!

openTestEP exceptionProcessor open!

prettyPrintMessage: aMessage aMessage prettyPrint: historyStream!

processInvalidMessage self write: ('\\Exception Processor returned an invalid message.'withCrs).
Terminal bell.
Terminal bell.
self halt.!

receiveInput2: aMessage

" self halt. "

"exceptionProcessor receiveInput: aString. "
    " self halt. "

" inComingMessages addLast: aString.
    self changed: #text.
  "

"(aString isRecoveryPlanRequest)
        ifTrue:[ (exceptionProcessor busyState)    ""is the EP idle ?" "
                 ifFalse: [ """^ exceptionProcessor planRequest: aString" "
                            ^ self determineWhatEPShouldDo: aString ]
                 ifTrue:[   textStream pane topPane activateWindow.
                            inComingMessages addLast: aString.
                            self changed: #text.
                            ^ aString]
           ]
```

```
        ifFalse:[  "" input is data. Assume that CommScript will handle" "
                dataInput addLast: ('***' , aString).
                self changed: #data.
                ^ aString
                ]
"

"
    (aMessage isRecoveryPlanRequest)
        ifTrue: [ "textStream pane topPane activateWindow."
                inComingMessages addLast: (aMessage extractAlarmID).
                self changed: #text.
                (exceptionProcessor  busyState)
                   ifFalse: [    exceptionProcessor  busyState: true.
                                self determineWhatToDoNext .
                                exceptionProcessor  busyState: false.
                            ]
                ]
        ifFalse:[ ""input is data. Assume CommScript will handle." "
                ""dataInput addLast: ('***' , aString).
                self changed: #data.""
                dataInputStream nextPutAll: aMessage data;cr.
            ].

"
    ( aMessage type = 6 ) ifTrue: [ operatorMessageScreen displayOperatorMessage:
    ( aMessage type = 7 ) ifTrue: [ operatorMessageScreen displayTTYMessage: aMes
    self write: '\Received a message from Exception Processor:'withCrs.
    self prettyPrintMessage: aMessage.

^ true!

receiveInput: aString

" self halt. "

"exceptionProcessor receiveInput: aString. "
    " self halt. "

" inComingMessages addLast: aString.
     self changed: #text.
    "

(aString isRecoveryPlanRequest)
        ifTrue:[ (exceptionProcessor busyState)   "is the EP idle ?"
                    ifFalse: [ "^ exceptionProcessor planRequest: aString"
                             ^ self determineWhatEPShouldDo: aString ]
                    ifTrue:[ inComingMessages addLast: aString.
                            self changed: #text.
                            ^ aString]
                ]
        ifFalse:[  " input is data. Assume that CommScript will handle"
                inComingMessages addLast: ('***' , aString).
                self changed: #text.
                ^ aString
                ]!
reInitializeInComingMessages inComingMessages := OrderedCollection new.
    self changed: #text.!

release

| a b c | exceptionProcessor := nil.

commInterface := nil.
```

```
    operatorMessageScreen := nil.!

resetData dataInput := OrderedCollection new.
    self changed: #data!

resetEP exceptionProcessor busyState: false!

resetHistory history := OrderedCollection new.
    self changed: #history!

resetText self changed: #text!

runScreenTest
    operatorMessageScreen perform: #test3Exit!

runTimeTest

| a b| a := Time millisecondsToRun: [ self getPendingInput2 ] .

b := Time millisecondsToRun: [ 1 to: 100 do: [ :dummy | self anyPendingInput]
                             ] .

self halt.!

selectionMade: aString

| selectedOperation | selectedOperation := self class getCommandKeyFor: aString.

( self respondsTo: selectedOperation ) ifFalse: [ Terminal bell. Terminal bell.

self perform: selectedOperation.!

sendACK self write: '\Sending an ACK.'withCrs.
    self transmitOutput: '1006'.!

sendAlarm1100 self write: '\Sending Alarm Notification for 1100.'withCrs.
    self transmitOutput: '10023031303030343131303010033043'.!

sendAlarm1101 self write: '\Sending Alarm Notification for 1101.'withCrs.
    self transmitOutput: '10023031303030343131303110033044'.!

sendAlarmSelected

| message alarmName | self write: '\Sending Alarm Notification.'withCrs.

[ (alarmName := Prompter prompt: 'Alarm Name = ?'
                              default: '1234') isNil]
        whileTrue: [].
```

```
    self write: ('Alarm Name = ' , alarmName ).

message := AMessage alarmNotificationforAlarm: alarmName.

self transmitOutput: message.!

sendBadType self write: '\Sending a Message with a Bad Type Value.'withCrs.
    self transmitOutput: '100238363030303431313031100341 44'.!

sendDataTransmission

| message variableName variableValue | self write: '\Sending Data Transmission.'withCrs.

[ (variableName := Prompter prompt: 'Variable Name = ?'
                                default: 'ABCD;EFGH;IJKL') isNil]
        whileTrue: [].
    [ (variableValue := Prompter prompt: 'Variable Value = ?'
                                default: '1234') isNil]
        whileTrue: [].

self write: ('Variable Name = ' , variableName, ' Value = ' , variableValue)

message := AMessage dataTransmissionMessageStringForVariableNamed: variableN
                    withValue: variableValue.

self transmitOutput: message.!

sendNAK self write: '\Sending an NAK.'withCrs.
    self transmitOutput: '1005'.!

sendOneBadTwoGoodType1 self write: '\Sending 1 bad type followed by 2 Alarm Notifications for 1101.
    "self transmitOutput: '10023039303030343131303110034144100230313030303431313
    self transmitOutput:   '10023039303030343131303110033135100230313030303431313 sendOneGoodType1OneBadTypeOneGoodType1 self write: '\Sending 3 Alarm Notifications for 1101.'withCrs.
    "self transmitOutput: '10023031303431313031100341441002303930343131303110034
    self transmitOutput: '10023031303030343131303110033044100230393030303431313 0 sendThreeGoodType1 self write: '\Sending 3 Alarm Notifications for 1101.'withCrs.
    self transmitOutput: '10023031303030343131303110033044100230313030303431313 0 testMessageToWST14 self transmitOutput: 'WST#14/How are you ? '.!

testUpdateInComingMessages inComingMessages addLast: 'a'.
    self changed: #text.!

text

" ^'Text Messages here '"

" ^ #(
'ACK'
'Alarm Notification - #1001'
'Alarm Notification - User Selected'
'NAK'
```

) "

^ CommandKeys keys asSortedCollection!

textMenu

^Menu
        labels: ' Inspect Command Keys \ Initialize Command Keys \  clear and re
        lines: #( 2 )
        selectors: #(inspectCommandKeys initializeCommandKeys clearAndResetAll o timeOutIntervalInSeconds ^ TimeOutIntervalInSeconds!

transmitOutput: aString commInterface transmitOutputWithoutZero: aString!

waitForACKOrNAK

"   Revision Level ark01
    Date of Last Revision  Aug 24, 1990 "

"   comment"

^commInterface waitForACKOrNAKForSeconds: TimeOutIntervalInSeconds!

waitForACKOrNAKSymbol

"   Revision Level ark01
    Date of Last Revision  Aug 24, 1990 "

"   comment"

^commInterface waitForACKOrNAKSymbolForSeconds: TimeOutIntervalInSeconds!

waitForAMessage

"   Revision Level ark01
    Date of Last Revision  Aug 23, 1990 "

"   comment"

^ commInterface waitForAMessageForSeconds: TimeOutIntervalInSeconds.!

waitForAMessageDescribedBy: aBlock

"   Revision Level ark01
    Date of Last Revision  Aug 24, 1990 "

"   comment"

^ commInterface waitForAMessageDescribedBy: aBlock
                    forSeconds: TimeOutIntervalInSeconds.!

waitForAMessageForSeconds: anInteger

"   Revision Level ark01
    Date of Last Revision  Aug 23, 1990 "

"   comment"

^ commInterface waitForAMessageForSeconds: TimeOutIntervalInSeconds.!

waitForAMessageOfType: anInteger

"   Revision Level ark01
    Date of Last Revision  Aug 23, 1990 "

"   comment"

```
^ commInterface waitForAMessageOfType: anInteger
                forSeconds: TimeOutIntervalInSeconds.!
``` write: aString

```
    historyStream nextPutAll: aString;cr.!
``` xgetInput

```
    |a b c d e f g | a := CommScript new onPort:
        (CommPort port: 2).
    a ifTimeOut: [ Terminal bell.
                   Terminal bell.
                   nil].
    a echo: true.
    b := a waitForInput: 3.
    ^ b!
``` xtextMenu

```
    ^Menu
        labels: ' Inspect Command Keys \ Initialize Command Keys \ Reset EP\Op .
        lines: #( 2 )
        selectors: #(inspectCommandKeys initializeCommandKeys resetEP openCommIn
```

!OperatorScreen class methods !

getMessageKeyFor: aString

```
^MessageKeys at: aString ifAbsent: [ #invalidKey ]!
``` messageKeysInitialize

```
    MessageKeys := Dictionary new.
    MessageKeys
        at: 'ARK1990'
        put: #test3;
        at: 'KR1990'
        put: #test3.!
``` new
```
    self messageKeysInitialize.
    ^ super new initialize! !
```

!OperatorScreen methods !

actions

```
( actionList isNil) ifTrue: [ ^ #() ].
^ actionList!
``` actionSelected: aString

| selectedItem selectionIndex |

```
( aString = 'EXIT' ) ifTrue: [  "displayStream pane scrollUp: (displayStream pan
                                ^self getOperatorResponse
                                "^self operatorMessageDisplayCompleted" ].
"( aString = 'TEST' ) ifTrue: [ ^self testVIEWLIB ]. "

selectionIndex := actionPane selection.
selectedItem := messageList at: selectionIndex.

(selectedItem isKindOf: String)

ifTrue: [
displayMessage := messageList at: selectionIndex.
```

```smalltalk
self changed: #message.
^ true].

(selectedItem isKindOf: Array)
ifTrue: [
self testVIEWLIB.
^true].!

displayOperatorMessage: aMessage

"displayStream nextPutAll: (aMessage dataInAscii);
            cr.
  "
    | messageKey aStream |

" superModel transmitOutput: '1006'. "

aStream := ReadStream on: aMessage dataInAscii.

messageKey := aStream upTo: $;.
    currentAlarmCode := aStream upTo: $;.
    self processOperatorMessage: messageKey.
    ^ true!

displayTTYMessage: aMessage

| text | text := aMessage dataInAscii.
displayStream nextPutAll: text;cr.
Cursor offset: (displayStream pane frame corner - (2@2)).

"displayStream topDispatcher activateWindow."!

getOperatorResponse

| a b|

( exitAction isNil )
    ifFalse: [
^ self perform: exitAction
"a := self perform: exitAction.
b := AMessage dataTransmissionMessageStringForValue: a.
^ superModel transmitOutput: b "
            ]
    ifTrue: [
a := 'No Operator action required'.
b := AMessage dataTransmissionMessageStringForValue: a.
^ superModel transmitOutput: b
            ]!

initialize exitAction := nil.
displayMessage := nil.
actionList := #().
aCauseApplication := CauseApp new.
aCauseApplication myScreen: self.

^ self!

initializeMessageKeys self class messageKeysInitialize!

inspectMessageKeys

MessageKeys inspect!

message
```

```
"   ^ 'Hi There Sports Fans\\' withCrs "
"  ^String new "

( displayMessage isNil ) ifTrue: [ ^ String new ].
^ displayMessage!

messageMenu

^Menu
        labels: ' Inspect Message Keys \ Initialize Message Keys \  HALT' withCr
        lines: #( 2 )
        selectors: #(inspectMessageKeys initializeMessageKeys  halt)!

open

| messagePane topPane  | topPane := TopPane new label: 'OPERATOR MESSAGES';
                          backColor: 14.

topPane addSubpane:
        (messagePane := TextPane new
            model: self;
            name: #message;
            dispatcher: TTYTextEditor new;
            menu: #messageMenu;
            change: #dummy:;
            framingRatio: (0@0 corner: 1@(3/4) );
            yourself).

topPane addSubpane:
        (actionPane := ListPane new
            model: self;
            name: #actions;
            menu: #actionMenu;
            change: #actionSelected:;
            framingRatio: (0@(3/4) corner: 1@1);
            yourself).

topPane reframe: (360@0 corner: 640@350).

displayStream := messagePane dispatcher.

topPane dispatcher openWindow scheduleWindow!

operatorMessageDisplayCompleted

Terminal bell.
    self reset.
    "superModel transmitOutput: '1006'."!

processOperatorMessage: aString

| messageTextMethod | messageTextMethod := self class getMessageKeyFor: aString.
self perform: messageTextMethod.!

reset exitAction := nil.
displayMessage := nil.
actionList := #().

(actionPane topPane collapsed)
    ifFalse: [
self changed: #message.
self changed: #actions.
            ].!

superModel: aModel
```

```
superModel := aModel!

test1

| a b c d |

Terminal bell. Terminal bell. Terminal bell.
self write:
'Error message from C.C.

Check MHC - PLC 5:
There are 3 possible causes
    -Cable Fault
    -Hardware Fault
    -Software fault

- First check cable connections
    -Unplug connector #NNN1 and plug it back in firmly

- Test for communications

If still not good,
    -Do a Continuity Check.'.

"self operatorMessageDisplayCompleted"

a := ListPrompter new
        prompt: 'Please select the next action -'
        default: #( 'See detail for TEST FOR COMMUNICATIONS'
                    'See detail for CONTINUITY CHECK'
                    'EXIT')
        popUpAt: (0@232).

(a = 1 )
    ifTrue: [
self write:
'These are the instructions for the Communications Test -Step 1: Reset the primary power unit.

-Step 2: Reconnect all loose wires.

-Step 3: Run diagnostic test 27-b.

-Step 4: Clear the main manifold.'.

ListPrompter new prompt: 'Select here when you are done'
                default: #('Exit')
                popUpAt: (0@232).
^ self operatorMessageDisplayCompleted
        ].

( a =2)
    ifTrue:[
self write:
'These are the instructions for for a Continuity Check -Step 1: Run Diagnostic test 25.

-Step 2: Rest all line feeders.

-Step 3: Test all leads.'.
ListPrompter new prompt: 'Select here when you are done'
                default: #('Exit')
                popUpAt: (0@232).
^ self operatorMessageDisplayCompleted].

(a = 3)
    ifTrue:[ ^self operatorMessageDisplayCompleted  ].!

test2
```

| a b c d |

Terminal bell. Terminal bell. Terminal bell.

```
actionList := #(
    'Detail #1: Test For Communications '
    'Detail #2: Do a Continuity Check '
    'Detail #3: View the Cable Schematic '
    'First Message'
    'EXIT'
              ).

messageList := #(
    'Detail #1: TEST FOR COMMUNICATIONS
```

This procedure is for testing the main communications link:

- Disconnect the main power lead to the port housing

- Reset the server

- Unplug the serial cable

- Test the Power Source

- Re-attach the cable

- Reset the server.'

'Detail #2: CONTINUITY CHECK

This procedure is for testing the cables with Data Tracker DT-4:

-Disconnect both ends of the cable from the controller

-Plug the CTA(Cable Test Adapter) to "far" end of cable

-Disconnect the other cables and clip leads from Data Tracker
    Ensure that all switches are open -Plug the other end of the cable into Data Tracker -Close the "LEFT COMM" and "NEG BATT" switches -Connect one end of a clip lead to the positive battery pin -Using the free end of the clip lead, scan each of the 25
  numbered turret pins Analysis:

(a) If only one LED lights up, then that line is not connected to
  the other end. - NO CONNECTION (b) If LED on line #7 lights up in addition to the LED on the line,
  then that line is connected to the other end - CONNTINUITY OK (c) If two or more LEDs light up, but not Line #7, then they
  make single sided connections and do not go to the other side.
  If these are not the designed connections, then they indicate
  SHORTS.

(d) A combination of (b) & (c) indicates definite possiblity of
  SHORT CIRCUIT.

Recovery:

If cable is detected as faulty, test the controller communication
  with a different cable. If that proves successful, then replace
  the faulty cable.

```
    ( 'IMAGE.FMK' )

'Check MHC-PLC5:
There are 3 possible causes
    -Cable Fault
    -Hardware Fault
    -Software Fault First check cable connections
    -Unplug Connector #NNN1 and plug it back in firmly (see Detail #3).

TEST FOR COMMUNICATIONS (see Detail #1)

If still not good, do a CONTINUITY CHECK (see Detail #2).'

).

exitAction := #test2Exit.

displayMessage := messageList last.
self changed: #actions.
self changed: #message.!

test2Exit

| answer | answer := PopUpPrompter prompt: 'What did you do to fix the problem ?'
            default: ''
            popUpAt: ( displayStream pane frame origin + ( 10 @ 10 ) ).
^ answer!

test3

| a b c d |

Terminal bell. Terminal bell. Terminal bell.

actionList := #(
    'Detail #1: Test For Communications '
    'Detail #2: Do a Continuity Check '
    'Detail #3: View the Cable Schematic '
    'First Message'
    'EXIT'
            ).

messageList := OrderedCollection new.
messageList add:
    'Detail #1: TEST FOR COMMUNICATIONS This procedure is for testing the main communications link:

- Disconnect the main power lead to the port housing

- Reset the server

- Unplug the serial cable

- Test the Power Source

- Re-attach the cable

- Reset the server.';

add:

'Detail #2: CONTINUITY CHECK

This procedure is for testing the cables with Data Tracker DT-4:

-Disconnect both ends of the cable from the controller
```

-Plug the CTA (Cable Test Adapter) to "far" end of cable

-Disconnect the other cables and clip leads from Data Tracker
    Ensure that all switches are open -Plug the other end of the cable into Data Tracker -Close the "LEFT COMM" and "NEG BATT" switches -Connect one end of a clip lead to the positive battery pin -Using the free end of the clip lead, scan each of the 25
numbered turret pins Analysis:

(a) If only one LED lights up, then that line is not connected to
the other end. - NO CONNECTION (b) If LED on line #7 lights up in addition to the LED on the line,
then that line is connected to the other end - CONNTINUITY OK (c) If two or more LEDs light up, but not Line #7, then they
make single sided connections and do not go to the other side.
If these are not the designed connections, then they indicate
SHORTS.

(d) A combination of (b) & (c) indicates definite possiblity of
SHORT CIRCUIT.

Recovery:

If cable is detected as faulty, test the controller communication
with a different cable. If that proves successful, then replace
the faulty cable.

```
';
add:
  (Array with: 'IMAGE.FMK' );

add:  'Alarm code is = ' , currentAlarmCode , '
    Check MHC-PLC5:
There are 3 possible causes
    -Cable Fault
    -Hardware Fault
    -Software Fault First check cable connections
    -Unplug Connector #NNN1 and plug it back in firmly (see Detail #3).

TEST FOR COMMUNICATIONS (see Detail #1)

If still not good, do a CONTINUITY CHECK (see Detail #2).' exitAction := #test3Exit.

displayMessage := messageList last.
self changed: #actions.
self changed: #message.!

test3Exit

" | answer choice responses | responses := #( 'Replaced Cable'
                'Reset System'
                'Other'
              ).
choice := ListPrompter prompt: 'What did you do to fix the problem ?'
            default: responses
              popUpAt: ( displayStream pane frame origin + ( 10 @ 10 ) ).
```

```
( choice = 3 )
    ifTrue: [ answer := PopUpPrompter prompt: 'Please state, briefly what action
                          default: ''
                          popUpAt: ( displayStream pane frame origin + ( 10 @ 10 )
              ^ answer
              ]
    ifFalse:[ ^ responses at: choice  ]
"
| a | a := aCauseApplication.

a causes: #('Cable fault'
            'Software fault'
            'Hardware fault').

a terminator: 'DONE'.

a start!

testVIEWLIB

"Terminal bell. Terminal bell."

Scheduler systemDispatcher executeCommands:
  "  #( 'ECHO OFF' 'cd \' 'dir' ). "
  "  #( 'test borfig1.psd 0 0 349 639'). "
     #( 'vimage image.fmk 0 0 349 470' ).

"Terminal bell. Terminal bell."!

transmit: aString self transmitOutput: aString.
self reset.
^ true!

transmitOutput: aString

| a |
a := AMessage dataTransmissionMessageStringForValue: aString.
superModel transmitOutput: a.

^ true!

write: aString displayStream pane scrollUp: (displayStream pane frame height) negated.
displayStream nextPutAll: aString;
              cr.!

writeWithoutScroll: aString displayStream nextPutAll: aString;
              cr.!

xactionSelected: aString

| selectionIndex |

( aString = 'EXIT' ) ifTrue: [ "displayStream pane scrollUp: (displayStream pan
                                ^self operatorMessageDisplayCompleted ].
( aString = 'TEST' ) ifTrue: [ ^self testVIEWLIB ].

selectionIndex := actionPane selection.

displayMessage := messageList at: selectionIndex.
self changed: #message.!

xgetOperatorResponse

| a b|
```

```
( exitAction isNil )
    ifFalse: [
a := self perform: exitAction.
b := AMessage dataTransmissionMessageStringForValue: a.
^ superModel transmitOutput: b
            ]
    ifTrue: [
a := 'No Operator action required'.
b := AMessage dataTransmissionMessageStringForValue: a.
^ superModel transmitOutput: b
            ]!

xtest2

| a b c d |

Terminal bell. Terminal bell. Terminal bell.

actionList := #(
    'Detail #1 '
    'Detail #2 '
    'Detail #3 '
    'Main Message'
    'EXIT'
    'TEST'
            ).

messageList := #(
    'This is the text for Detail #1
Detail #1 - aaa
Detail #1 - bbb'
    'This is the text for Detail #2
Detail #2 - aaa
Detail #2 - bbb'
    'This is the text for Detail #3
Detail #3 - aaa
Detail #3 - bbb'
    'This is the initial Main Message Text
Main Message text 1
Main Message Text 2
Main Message text 3'

).

displayMessage := messageList last.
self changed: #actions.
self changed: #message.!

xtest3Exit

| answer choice responses | responses := #( 'Replaced Cable'
                'Reset System'
                'Other'
                    ).
choice := ListPrompter prompt: 'What did you do to fix the problem ?'
            default: responses
            popUpAt: ( displayStream pane frame origin + ( 10 @ 10 ) ).

( choice = 3 )
    ifTrue: [ answer := PopUpPrompter prompt: 'Please state, briefly what action
                        default: ''
                        popUpAt: ( displayStream pane frame origin + ( 10 @ 10 )
            ^ answer
            ]
    ifFalse:[ ^ responses at: choice ]! !

!TTYTextEditor class methods ! !
```

!TTYTextEditor methods !

initialize
        "Initialize the instance variable lineBuffer to be
          an empty ReadWriteStream."
    buffer := ReadWriteStream on: (String new: 120).
    buffer reset truncate.

super initialize!

processControlKey: aCharacter

| message |

(aCharacter == Cr or: [aCharacter == Lf])
    ifTrue: [   message := buffer contents.
                buffer reset truncate.
                pane model perform: #transmit: with: message.
                super processInputKey: Lf]
    ifFalse:[super processControlKey: aCharacter] .!

processInputKey: aCharacter super processInputKey: aCharacter.
buffer nextPut: aCharacter! !

!Character methods !
isAsciiZ

^ self == ( 0 asCharacter )! !

!IndexedCollection methods !
copyWithoutLastOccurenceOf: anObject
        "Answer a copy of the receiver excluding
          the last element that equals anObject,
          if any.  This corrects the copyWithout: method
          which actually removes ALL occurences
          of anObject."
    | index |
    index := self
        indexReverseOf: anObject
        ifAbsent: [^self copy].
    ^(self copyFrom: 1 to: index - 1),
        "("(self copyFrom: index + 1 to: self size)
          " copyWithout: anObject) "! !

!IndexedCollection methods !
copyWithoutFirstOccurenceOf: anObject
        "Answer a copy of the receiver excluding
          the first element that equals anObject,
          if any.  This corrects the copyWithout: method
          which actually removes ALL occurences
          of anObject."
    | index |
    index := self
        indexOf: anObject
        ifAbsent: [^self copy].
    ^(self copyFrom: 1 to: index - 1),
        "("(self copyFrom: index + 1 to: self size)
          " copyWithout: anObject) "! !

!IndexedCollection methods !
indexReverseOf: anObject ifAbsent: aBlock
        "Answer the index position of the element equal
          to anObject starting from the end of the receiver.  If no such element
          is found, evaluate aBlock (without any arguments)."
    | index size |
    size := self size.
    index := size.
    [index > 0]
        whileTrue: [

```
        (self at: index) = anObject
            ifTrue: [^index].
        index := index - 1].
    ^aBlock value! !

!String methods !
isYesOrNo

^ (self isYes or: [ self isNo])! !

!String methods !
isYes

^ ( (self trimBlanks at: 1) asLowerCase = $y)! !

!String methods !
isAcknowledgement

^ true! !

!String methods !
isACKorNAK

^ (self isACK or: [ self isNAK])! !

!String methods !
isACK

^ self = ''! !

!String methods !
isDecimalInteger self detect: [ :char |
        ('0123456789' includes: char) not ]
        ifNone: [ ^true ].
    ^false! !

!String methods !
isRecoveryPlanRequest

^self includes: $ .! !

!String methods !
isNo

^ ( (self trimBlanks at: 1) asLowerCase = $n)! !

!String methods !
isNAK

^ self = ''! !

!Stream methods !
lastTwo

" Revision Level ark01
    Date of Last Revision  Aug 20, 1990 "

"Answer a string containing the last two characters of the reciever stream"
    | a b c e f g |
    a := collection at: (position - 1).
    b:=  collection at: position.
    c := String new: 2.
    c at: 1 put: a.
    c at: 2 put: b.
    ^ c.
    " ^ (String new: 2)
        at: 1 put: (collection at: (position - 1));
        at: 2 put: (collection at: (position    ))
    "! !
```

```
"construct application"
    ((Smalltalk at: #Application ifAbsent: [])
        isKindOf: Class) ifTrue: [
            ((Smalltalk at: #Application) for:'EPX')
                addClass: ColorTextPane;
                addClass: WorkEP;
                addClass: ListPrompter;
                addClass: ListPromptEditor;
                addClass: WorkCellSuperModel;
                addClass: OperatorScreen;
                addClass: TTYTextEditor;
                addMethod: #isAsciiZ forClass: Character;
                addMethod: #copyWithoutLastOccurenceOf: forClass: IndexedCollect
                addMethod: #copyWithoutFirstOccurenceOf: forClass: IndexedCollec
                addMethod: #indexReverseOf:ifAbsent: forClass: IndexedCollection
                addMethod: #isYesOrNo forClass: String;
                addMethod: #isYes forClass: String;
                addMethod: #isAcknowledgement forClass: String;
                addMethod: #isACKorNAK forClass: String;
                addMethod: #isACK forClass: String;
                addMethod: #isDecimalInteger forClass: String;
                addMethod: #isRecoveryPlanRequest forClass: String;
                addMethod: #isNo forClass: String;
                addMethod: #isNAK forClass: String;
                addMethod: #lastTwo forClass: Stream;
            comments: nil;
            initCode: nil;
            finalizeCode: nil;
            startUpCode: nil]!

"
**************************************************************************
Project : Try2
Date    : Oct 30, 1990
Time    : 17:23:25

Classes :
    ListSelectorPane CauseWindow CauseApp ListSelectorMany

Methods :

**************************************************************************
"!

ListPane variableSubclass: #ListSelectorPane
  instanceVariableNames:
    'performAtTermination selectionsMade terminator '
  classVariableNames: ''
  poolDictionaries: ''!

Object variableSubclass: #CauseWindow
  instanceVariableNames:
    'causePaneDispatcher model '
  classVariableNames: ''
  poolDictionaries: ''!

Object variableSubclass: #CauseApp
  instanceVariableNames:
    'causes myWindow terminator '
  classVariableNames:
    'CausesAndFixes '
  poolDictionaries: ''!

ListSelector variableSubclass: #ListSelectorMany
  instanceVariableNames: ''
  classVariableNames: ''
  poolDictionaries:
    'FunctionKeys '!

!ListSelectorPane class methods ! !
```

!ListSelectorPane methods !

change: aSymbol

"Method Version: ark1
    Date of Last Revision: Date today  Oct  3, 1990
    Copyright (C) 1990 The Boeing Company
        All Rights Reserved"

"Set the method to be performed when the
terminator key is entered to aSymbol.
NOTE that this redefines the change method
 in the superclass.  The change selector
for this type of pane is set in the
initialize method to a private method"

performAtTermination := aSymbol!
clearTerminator

"Method Version: ark1
    Date of Last Revision: Date today  Oct  3, 1990
    Copyright (C) 1990 The Boeing Company
        All Rights Reserved"

"  "

| terminatorLine | terminatorLine := self searchForLineToShow: terminator.
  ( terminatorLine = currentLine )
    ifTrue: [ self boldLine: terminatorLine].!

defaultDispatcherClass

"Method Version: ark1
    Date of Last Revision: Date today  Oct  3, 1990
    Copyright (C) 1990 The Boeing Company
        All Rights Reserved"

"Answer the default dispatcher."

^ListSelectorMany!

initialize

"Method Version: ark1
    Date of Last Revision: Date today  Oct  3, 1990
    Copyright (C) 1990 The Boeing Company
        All Rights Reserved"

super initialize.
selectionsMade := OrderedCollection new.
changeSelector := #selectionMade:!

restoreSelectedFromCollection: aCollection

"Method Version: ark1
    Date of Last Revision: Date today  Oct  3, 1990
    Copyright (C) 1990 The Boeing Company
        All Rights Reserved"

"Display the list with the lines
indicated by aCollection selected.
aCollection is a collection of
strings."

self refreshAll.
    aCollection do: [ :aString |
        currentLine :=
            self searchForLineToShow: aString.
    selection := currentLine.
    self boldLine: selection
                ]!

```
restoreWithRefreshFromCollection: aCollection

"Method Version: ark1
      Date of Last Revision: Date today  Oct  3, 1990
      Copyright (C) 1990 The Boeing Company
         All Rights Reserved"

"Refresh the list from the model
and keep the lines contained in
aCollection showing and selected."
"Modified to restore from a collection"

list := model perform: name.
    self restoreSelectedFromCollection: aCollection!

selectAtCursorWithOutHiding

"Method Version: ark1
      Date of Last Revision: Date today  Oct  3, 1990
      Copyright (C) 1990 The Boeing Company
         All Rights Reserved"

"Private - Set currentLine to the line
at the cursor position."
"Modified to permit multiple selections"
"Modified to have the changeSelector
handled by the pane and not the model"

self findCurrentLine.
    self topPane textModified
        ifTrue: [^self].
    currentLine isNil
        ifTrue: [^self]
        ifFalse: [
            currentLine > list size
                ifTrue: [^self]].
    " currentLine == selection
        ifFalse: [
            self hideSelection. "
            self boldLine: currentLine.
            selection := currentLine "]".
    "model" self
        perform: changeSelector
        with:
            (returnIndex
                ifTrue: [selection]
                ifFalse: [list at: selection])!

selectionMade: aSymbol

"Method Version: ark1
      Date of Last Revision: Date today  Oct  3, 1990
      Copyright (C) 1990 The Boeing Company
         All Rights Reserved"

"Private - a selection has been made.
If the selection is the terminator key, notify the model
by executing the performAtTermination methid.
Otherwise toggle the selection as appropriate  "

( aSymbol = terminator )
    ifTrue: [ ^ model perform: performAtTermination with: selectionsMade].

( selectionsMade includes: aSymbol )
    ifTrue: [ selectionsMade remove: aSymbol ifAbsent: [ self halt] ]
    ifFalse:[ selectionsMade addLast: aSymbol].!

terminator: aString

"Method Version: ark1
      Date of Last Revision: Date today  Oct  3, 1990
      Copyright (C) 1990 The Boeing Company
         All Rights Reserved"
```

"Set the terminator control to aString "

terminator := aString! !

!CauseWindow class methods ! !

!CauseWindow methods !

allDone: aCollection

"Method Version: ark1
   Date of Last Revision: Date today  Oct   3, 1990
   Copyright (C) 1990 The Boeing Company
       All Rights Reserved"

"The ListSelectorPane has received a selection equal to the terminator key.
Inform the application"

^ model processSelection: aCollection!

causeList

"Method Version: ark1
   Date of Last Revision: Date today  Oct   3, 1990
   Copyright (C) 1990 The Boeing Company
       All Rights Reserved"

"Answer the list of causes to select from  "

( model isNil ) ifTrue: [ ^ #(a)].
   ( model respondsTo: #causes ) ifFalse: [ ^#(ab)].
   ^ model causes!

clearTerminator

"Method Version: ark1
   Date of Last Revision: Date today  Oct   3, 1990
   Copyright (C) 1990 The Boeing Company
       All Rights Reserved"

" "
causePaneDispatcher pane clearTerminator!

closeYourself

"Method Version: ark1
   Date of Last Revision: Date today  Oct  3, 1990
   Copyright (C) 1990 The Boeing Company
       All Rights Reserved"

" "

causePaneDispatcher pane topPane dispatcher closeIt!

model: aCauseApp

"Method Version: ark1
   Date of Last Revision: Date today  Oct  3, 1990
   Copyright (C) 1990 The Boeing Company
       All Rights Reserved"

" "
model := aCauseApp!

openOn: aString

"Method Version: ark1
   Date of Last Revision: Date today  Oct  3, 1990

```
Copyright (C) 1990 The Boeing Company
    All Rights Reserved"

| causePane myTopPane | causePane :=
    ListSelectorPane new
        name: #causeList;
        model: self;
        change: #allDone:;
        terminator: ( model terminator );
        menu: #causeMenu;
        framingRatio: ( 0@0 corner: 1@1);
        yourself.

myTopPane :=
    TopPane new
        label: 'Select one or more causes found';
        model: self;
        addSubpane: causePane;
        yourself.

causePaneDispatcher := causePane dispatcher.

myTopPane reframe: ( 150@100 corner: 530@300).

myTopPane dispatcher openWindow scheduleWindow! !

!CauseApp class methods !

startup
        "Method Version: ark1
         Date of Last Revision: Date today  Oct  3, 1990
         Copyright (C) 1990 The Boeing Company
            All Rights Reserved"

" "
^ super new initialize.! !

!CauseApp methods !

causes

"Method Version: ark1
         Date of Last Revision: Date today  Oct  3, 1990
         Copyright (C) 1990 The Boeing Company
            All Rights Reserved"

"Answer the list of causes"

^ causes asOrderedCollection
        addLast: 'OTHER';
        addLast: terminator;
        yourself!

displayResults: aCollection

"Method Version: ark1
         Date of Last Revision: Date today  Oct  3, 1990
         Copyright (C) 1990 The Boeing Company
            All Rights Reserved"

" "

| aStream | aStream := WriteStream on: String new.
aCollection do: [ :response |
    aStream nextPutAll: response;cr].
```

```
BigPrompter prompt: 'The operator took the following actions'
        default: aStream contents.

myWindow closeYourself!

initialize

"Method Version: ark1
         Date of Last Revision: Date today  Oct  3, 1990
         Copyright (C) 1990 The Boeing Company
            All Rights Reserved"

"Set up "

terminator := 'DONE'.

CausesAndFixes := Dictionary new.
CausesAndFixes
    at: 'Cable fault'
        put: #( 'fix cable'
                'replace cable'
            );
    at: 'Software fault'
        put: #( 'fix software'
            );
    at: 'Hardware fault'
        put: #( 'fix hardware'
                'replace hardware'
            ).

causes := CausesAndFixes keys asSortedCollection.

myWindow := CauseWindow new.
myWindow model: self.
myWindow openOn: 'aa'!

processAction: anInteger withCauses: aCollection forCause: aString

"Method Version: ark1
         Date of Last Revision: Date today  Oct  3, 1990
         Copyright (C) 1990 The Boeing Company
            All Rights Reserved"

"  "

| action answer | action := aCollection at: anInteger.

( action = 'OTHER' )
    ifTrue: [ answer := Prompter prompt: ('What action did you take to fix the
                                default: ''.
            ^ answer].

( action = 'Cancel This Cause')
    ifTrue: [ ^ nil ].

^ action!

processInput: aCollection

"Method Version: ark1
         Date of Last Revision: Date today  Oct  3, 1990
         Copyright (C) 1990 The Boeing Company
            All Rights Reserved"

"  "

| actionIndex actionTaken causesFound choices comments fixChoices operatorAction Terminal bell. Terminal bell.
```

```
myWindow clearTerminator.
causesFound := aCollection.
operatorActions := OrderedCollection new.

causesFound do: [ :cause |
    ( cause = 'OTHER' )
    ifFalse: [
        fixChoices := CausesAndFixes at: cause.
        choices := fixChoices asOrderedCollection
                    add: 'OTHER';
                    add: 'Cancel This Cause';
                    yourself.
        actionIndex := ListPrompter
                prompt: ('What action did you take to fix the ' , cause )
                default: choices.

"myWindow display: actionIndex printString."

actionTaken := self processAction: actionIndex withCauses: choices forCa
        ]
    ifTrue: [ actionTaken := Prompter prompt: 'What OTHER cause did you find and
                        default: ''
            ].
    ( actionTaken notNil )
        ifTrue: [ operatorActions add: ( 'CAUSE: ' , cause , ' ' , 'ACTION TAKE

].

comments := Prompter prompt: 'What other comments do you have ?  Press ENTER
            default: ''.
    ( comments isEmpty ) ifFalse: [ operatorActions add: ( 'Additional comments:

self displayResults: operatorActions!

processSelection: aCollection

"Method Version: ark1
      Date of Last Revision: Date today  Oct  3, 1990
      Copyright (C) 1990 The Boeing Company
        All Rights Reserved"

"The user has selected the terminator key from the list  "

( aCollection isEmpty )
    ifTrue: [ Terminal bell.
              Prompter prompt: 'You must choose at least one cause.  Try again.'
                    default: 'Press ENTER to continue'.
              ^ myWindow clearTerminator]
    ifFalse:[ ^ self processInput: aCollection]!

terminator

"Method Version: ark1
      Date of Last Revision: Date today  Oct  3, 1990
      Copyright (C) 1990 The Boeing Company
        All Rights Reserved"

"Answer the key to be used to signal end of selection of causes  "

^ 'DONE'! !

!ListSelectorMany class methods ! !

!ListSelectorMany methods !

select
        "Private - Inform the pane to select the
         line where the cursor is positioned."
    MouseEvent ifTrue: [
        [Terminal read == EndSelectFunction]
```

```
                whileFalse: []].
    pane selectAtCursorWithOutHiding! !

"construct application"
    ((Smalltalk at: #Application ifAbsent: [])
        isKindOf: Class) ifTrue: [
            ((Smalltalk at: #Application) for:'Try2')
                addClass: ListSelectorPane;
                addClass: CauseWindow;
                addClass: CauseApp;
                addClass: ListSelectorMany;
            comments: nil;
            initCode: nil;
            finalizeCode: nil;
            startUpCode: nil]!
"
***************************************************************************
Project : PrompterExtensions
Date    : Oct 30, 1990
Time    : 17:22:27

Classes :
    ListPrompter ListPromptEditor SDPrompter
    BigPrompter SDPrompterReminder PopUpPrompter Methods :

***************************************************************************
"!

Prompter subclass:-#ListPrompter
  instanceVariableNames: ''
  classVariableNames: ''
  poolDictionaries: ''!

ListSelector variableSubclass: #ListPromptEditor
  instanceVariableNames: ''
  classVariableNames: ''
  poolDictionaries:
    'FunctionKeys CharacterConstants '!

Prompter variableSubclass: #SDPrompter
  instanceVariableNames: ''
  classVariableNames: ''
  poolDictionaries: ''!

Prompter subclass: #BigPrompter
  instanceVariableNames: ''
  classVariableNames: ''
  poolDictionaries:
    'CharacterConstants '!

SDPrompter variableSubclass: #SDPrompterReminder
  instanceVariableNames:
    'warnings '
  classVariableNames: ''
  poolDictionaries: ''!

Prompter subclass: #PopUpPrompter
  instanceVariableNames: ''
  classVariableNames: ''
  poolDictionaries: ''!

!ListPrompter class methods !

prompt: questionString default: answerString popUpAt: aPoint
    "Open a Prompter with questionString as
    its question and answerString as its
    default answer.  Answer the user
    response (a String) with leading and
    trailing spaces trimmed."
```

```
^self new
    evaluating: false;
    withBlank: false;
    prompt: questionString default: answerString popUpAt: aPoint! !

!ListPrompter methods !

listReply: aSymbol
    " ^ self reply: aSymbol
    "

^ self reply: (replyPane selection)!

prompt: questionString default: aCollection
        "Private - Initialize a Prompter window
         and give it control."
    | topPane promptBox tempOffset offset cursor |
    cursor := Cursor.
    CursorManager normal change.
    reply := aCollection.
    exitBlock := [
        cursor change.
        ^reply].
    topPane := TopPane new
        label: questionString;
        leftIcons: Array new;
        rightIcons: Array new;
        backColor: 10;
        minimumSize:
            ((questionString size max: reply size) + 4
                * (LabelFont width max: TextFont width)
                min: 60 * SysFontWidth)
            @ (LabelFont height + ((TextFont height) * (aCollection size)) + 1
        yourself.
    topPane addSubpane:
        (replyPane := ListPane new
            model: self;
            menu: #menu;
            dispatcher: ListPromptEditor new;
            name: #reply;
            change: "#acceptReply:from:"#listReply:;
            framingBlock: [:box|
                box origin corner: box corner]).
    offset := Cursor offset.
    promptBox :=
        Rectangle
            origin: offset
            extent: topPane minimumSize.
    tempOffset := (Display extent - promptBox extent)
        min: (offset - (4 @ (SysFontHeight * 2))) max: 0 @ 0).
    promptBox moveTo: tempOffset.
    "topPane unzoom."
    hiddenArea := Display compatibleForm fromDisplay: promptBox.
    hiddenArea offset: tempOffset.
    topPane dispatcher openIn: promptBox.
    " replyPane
        selectAtEnd;
        homeCursor. "
    topPane activateWindow.
    [topPane dispatcher active] whileTrue: [
        replyPane dispatcher processInput]!

prompt: questionString default: aCollection popUpAt: aPoint
        "Private - Initialize a Prompter window
         and give it control."
    | topPane promptBox tempOffset offset cursor |
    cursor := Cursor.
    CursorManager normal change.
    reply := aCollection.
    exitBlock := [
        cursor change.
```

```
        ^reply].
    topPane := TopPane new
        label: questionString;
        leftIcons: Array new;
        rightIcons: Array new;
        backColor: 10;
        minimumSize:
            ("(questionString size max: reply size) + 4
                * (LabelFont width max: TextFont width)
                min:" 80 * SysFontWidth)
            @ (LabelFont height + ((TextFont height) * (aCollection size)) + 10)
        yourself.
    topPane addSubpane:
        (replyPane := ListPane new
            model: self;
            menu: #menu;
            dispatcher: ListPromptEditor new;
            name: #reply;
            change: "#acceptReply:from:"#listReply:;
            framingBlock: [:box|
                box origin corner: box corner]).
    offset := "Cursor offset." aPoint.
    promptBox :=
        Rectangle
            origin: offset
            extent: topPane minimumSize.
    tempOffset := "(Display extent - promptBox extent)
        min: (offset - (4 @ (SysFontHeight * 2)) max: 0 @ 0)." aPoint.
    promptBox moveTo: tempOffset.
    "topPane unzoom."
    hiddenArea := Display compatibleForm fromDisplay: promptBox.
    hiddenArea offset: tempOffset.
    topPane dispatcher openIn: promptBox.
    " replyPane
        selectAtEnd;
        homeCursor. "
    topPane activateWindow.
    [topPane dispatcher active] whileTrue: [
        replyPane dispatcher processInput]! !

!ListPromptEditor class methods ! !

!ListPromptEditor methods !

isControlActive

^ active!

processFunctionKey: aCharacter
        "Private - Process function keys
         from the keyboard or mouse."

"This is a copy of the same method from class
        PromptEditor. It is repeated here to avoid
        inheriting processFunctionKey: from TextEditor
        when executing 'super processFunctionKey:'. This
        is necessary because the textEditor method assumes
        a text pane. Note that the list select function
        is handled in class Dispatcher which does a
        self select which, in turn, is answered by class
        List Selector."

aCharacter == CycleFunction
        ifTrue: [^Terminal bell].
    aCharacter == WindowMenuRequest
        ifTrue: [^Terminal bell].
    (aCharacter == SelectFunction
    or: [aCharacter == PaneMenuRequest])
        ifTrue: [
```

```
            pane hasCursor ifFalse: [
                ^Terminal bell]].
    ZoomFunction == aCharacter
        ifTrue: [^Terminal bell].
    super processFunctionKey: aCharacter! !

!SDPrompter class methods !

prompt: questionString default: answerString secondsToExist: anInteger

"Method Version: ark1
         Date of Last Revision: Date today  Oct  4, 1990
         Copyright (C) 1990 The Boeing Company
            All Rights Reserved"

"Open a Prompter with questionString as
         its question and answerString as its
         default answer.  Answer the user
         response (a String) with leading and
         trailing spaces trimmed."

"Modified to self destruct in anInteger
number of seconds if there is no answer"
    ^self new
        evaluating: false;
        withBlank: false;
        prompt: questionString default: answerString secondsToExist: anInteger!

!SDPrompter methods !

clockEvent: anInteger

Terminal bell. Terminal bell.
"replyPane topPane dispatcher deactivate."
"replyPane topPane dispatcher closeIt."
self cancelPrompter.!
prompt: questionString default: answerString
        "Private - Initialize a Prompter window
         and give it control."
    | topPane promptBox tempOffset offset cursor |
    cursor := Cursor.
    CursorManager normal change.
    reply := answerString.
    exitBlock := [
        Time clockTicksOff.
        cursor change.
        ^reply].
    topPane := TopPane new
        label: questionString;
        leftIcons: Array new;
        rightIcons: Array new;
        backColor: 14;
        minimumSize:
            ((questionString size max: reply size) + 4
                * (LabelFont width max: TextFont width)
              min: 60 * SysFontWidth)
            @ (LabelFont height + TextFont height + 10);
        yourself.
    topPane addSubpane:
        (replyPane := TextPane new
            model: self;
            menu: #menu;
            dispatcher: PromptEditor new;
            name: #reply;
            change: #acceptReply:from:;
            framingBlock: [:box|
                box origin corner: box corner]).
    offset := Cursor offset.
    promptBox :=
```

```
        Rectangle
            origin: offset
            extent: topPane minimumSize.
    tempOffset := (Display extent - promptBox extent)
        min: (offset - (4 @ (SysFontHeight * 2))) max: 0 @ 0).
    promptBox moveTo: tempOffset.
    "topPane unzoom."
    hiddenArea := Display compatibleForm fromDisplay: promptBox.
    hiddenArea offset: tempOffset.
    topPane dispatcher openIn: promptBox.
    replyPane
        selectAtEnd;
        homeCursor.
    topPane activateWindow.

Time initialize.
Time clockTickPeriod: 91.
    [topPane dispatcher active] whileTrue: [
        replyPane dispatcher processInput]!

prompt: questionString default: answerString secondsToExist: anInteger
        "Private - Initialize a Prompter window
         and give it control.  If there is no answer in anInteger seconds, close
    | topPane promptBox tempOffset offset cursor |
    cursor := Cursor.
    CursorManager normal change.
    reply := answerString.
    exitBlock := [
        Time clockTicksOff.
        cursor change.
        ^reply].
    topPane := TopPane new
        label: questionString;
        leftIcons: Array new;
        rightIcons: Array new;
        backColor: 14;
        minimumSize:
            ((questionString size max: reply size) + 4
                * (LabelFont width max: TextFont width)
              min: 60 * SysFontWidth)
            @ (LabelFont height + TextFont height + 10);
        yourself.
    topPane addSubpane:
        (replyPane := TextPane new
            model: self;
            menu: #menu;
            dispatcher: PromptEditor new;
            name: #reply;
            change: #acceptReply:from:;
            framingBlock: [:box|
                box origin corner: box corner]).
    offset := Cursor offset.
    promptBox :=
        Rectangle
            origin: offset
            extent: topPane minimumSize.
    tempOffset := (Display extent - promptBox extent)
        min: (offset - (4 @ (SysFontHeight * 2))) max: 0 @ 0).
    promptBox moveTo: tempOffset.
    "topPane unzoom."
    hiddenArea := Display compatibleForm fromDisplay: promptBox.
    hiddenArea offset: tempOffset.
    topPane dispatcher openIn: promptBox.
    replyPane
        selectAtEnd;
        homeCursor.
    topPane activateWindow.

Time initialize.
Time clockTickPeriod: "91" (1000*anInteger)//55.
    [topPane dispatcher active] whileTrue: [
        replyPane dispatcher processInput]! !
```

!BigPrompter class methods !

```smalltalk
prompt: questionString default: answerString
        "Open a Prompter with questionString as
        its question and answerString as its
        default answer. Answer the user
        response (a String) with leading and
        trailing spaces trimmed."
    | aStream aBag len wid |
    "Calculate the width of the lonest subString "
    aStream := ReadStream on: answerString.
    aBag := Bag new.
    [aStream atEnd] whileFalse: [ aBag add: ( aStream nextLine size ) ].
    wid := aBag asSortedCollection last .
    "Calculate the length of the pane"
    len := answerString occurrencesOf: Lf.
    ^self new
        evaluating: false;
        withBlank: false;
        prompt: questionString length: (len + 1) width: (wid + 0) default: answe prompt: questionString length: len width: wid default: answerString
        "Open a Prompter with questionString as
        its question and answerString as its
        default answer. Answer the user
        response (a String) with leading and
        trailing spaces trimmed."
    ^self new
        evaluating: false;
        withBlank: false;
        prompt: questionString length: len width: wid default: answerString! !
```

!BigPrompter methods !

```smalltalk
prompt: questionString "length: anInteger" default: answerString
        "Private - Initialize a Prompter window
        and give it control. This prompter can display
        anInteger number of lines in the answerString"
    | topPane promptBox tempOffset offset cursor |
    cursor := Cursor.
    CursorManager normal change.
    reply := answerString.
    exitBlock := [
        cursor change.
        ^reply].
    topPane := TopPane new
        label: questionString;
        leftIcons: Array new;
        rightIcons: Array new;
        backColor: 14;
        minimumSize:
"modify width of pane"
            ((questionString size max: 48 " reply size") + 4
                * (LabelFont width max: TextFont width)
            min: 60 * SysFontWidth)
"modify lenght of pane"
            @ (LabelFont height + (10 * TextFont height ) + 10);
        yourself.
    topPane addSubpane:
        (replyPane := TextPane new
            model: self;
            menu: #menu;
            dispatcher: PromptEditor new;
            name: #reply;
            change: #acceptReply:from:;
            framingBlock: [:box|
                box origin corner: box corner]).
    offset := Cursor offset.
    promptBox :=
        Rectangle
            origin: offset
```

```
            extent: topPane minimumSize.
    tempOffset := (Display extent - promptBox extent)
        min: offset - (4 @ (SysFontHeight * 2)).
    promptBox moveTo: tempOffset.
    "topPane unzoom."
    hiddenArea := ColorForm fromDisplay: promptBox.
    hiddenArea offset: tempOffset.
    topPane dispatcher openIn: promptBox.
    replyPane
        selectAtEnd;
        homeCursor.
    topPane activateWindow.
    [topPane dispatcher active] whileTrue: [
        replyPane dispatcher processInput]!

prompt: questionString length: anInteger default: answerString
        "Private - Initialize a Prompter window
         and give it control. This prompter can display
         anInteger number of lines in the answerString"
    | topPane promptBox tempOffset offset cursor |
    cursor := Cursor.
    CursorManager normal change.
    reply := answerString.
    exitBlock := [
        cursor change.
        ^reply].
    topPane := TopPane new
        label: questionString;
        leftIcons: Array new;
        rightIcons: Array new;
        backColor: 14;
        minimumSize:
            ((questionString size max: reply size) ÷ 4
                * (LabelFont width max: TextFont width)
            min: 60 * SysFontWidth)
"modify lenght of pane"
            @ (LabelFont height + (anInteger * TextFont height ) + 10);
        yourself.
    topPane addSubpane:
        (replyPane := TextPane new
            model: self;
            menu: #menu;
            dispatcher: PromptEditor new;
            name: #reply;
            change: #acceptReply:from:;
            framingBlock: [:box|
                box origin corner: box corner]).
    offset := Cursor offset.
    promptBox :=
        Rectangle
            origin: offset
            extent: topPane minimumSize.
    tempOffset := (Display extent - promptBox extent)
        min: offset - (4 @ (SysFontHeight * 2)).
    promptBox moveTo: tempOffset.
    "topPane unzoom."
    hiddenArea := ColorForm fromDisplay: promptBox.
    hiddenArea offset: tempOffset.
    topPane dispatcher openIn: promptBox.
    replyPane
        selectAtEnd;
        homeCursor.
    topPane activateWindow.
    [topPane dispatcher active] whileTrue: [
        replyPane dispatcher processInput]!

prompt: questionString length: anInteger width: anInt default: answerString
        "Private - Initialize a Prompter window
         and give it control. This prompter can display
         anInteger number of lines for anInt width
         in the answerString"
    | topPane promptBox tempOffset offset cursor |
```

```
    cursor := Cursor.
    CursorManager normal change.
    reply := answerString.
    exitBlock := [
        cursor change.
        ^reply].
    topPane := TopPane new
        label: questionString;
        leftIcons: Array new;
        rightIcons: Array new;
        backColor: 14;
        minimumSize:
"modify width of pane"
            ((questionString size max: anInt " reply size") + 4
                * (LabelFont width max: TextFont width)
              min: 80 * SysFontWidth)
"modify lenght of pane"
            @ (LabelFont height + (anInteger * TextFont height ) + 10);
        yourself.
    topPane addSubpane:
        (replyPane := TextPane new
            model: self;
            menu: #menu;
            dispatcher: PromptEditor new;
            name: #reply;
            change: #acceptReply:from:;
            framingBlock: [:box|
                box origin corner: box corner]).
    offset := Cursor offset.
    promptBox :=
        Rectangle
            origin: offset
            extent: topPane minimumSize.
    tempOffset := (Display extent - promptBox extent)
        min: offset - (4 @ (SysFontHeight * 2)).
    promptBox moveTo: tempOffset.
    "topPane unzoom."
    hiddenArea := ColorForm fromDisplay: promptBox.
    hiddenArea offset: tempOffset.
    topPane dispatcher openIn: promptBox.
    replyPane
        selectAtEnd;
        homeCursor.
    topPane activateWindow.
    [topPane dispatcher active] whileTrue: [
        replyPane dispatcher processInput]! !
!SDPrompterReminder class methods !

prompt: questionString default: answerString secondsToExist: anInteger

"Method Version: ark1
         Date of Last Revision: Date today  Oct  4, 1990
         Copyright (C) 1990 The Boeing Company
            All Rights Reserved"

"Open a Prompter with questionString as
         its question and answerString as its
         default answer.  Answer the user
         response (a String) with leading and
         trailing spaces trimmed."

"Modified to self destruct in anInteger
number of seconds if there is no answer"
    ^self new
        evaluating: false;
        withBlank: false;
        warnings: 0;
        prompt: questionString default: answerString secondsToExist: anInteger!

!SDPrompterReminder methods !
``` clockEvent: anInteger

Terminal bell. Terminal bell.
warnings := warnings + 1.
(warnings > 3)
    ifTrue: [self cancelPrompter].!

warnings: anInteger

"Method Version: ark1
         Date of Last Revision: Date today  Oct  4, 1990
         Copyright (C) 1990 The Boeing Company
            All Rights Reserved"

" "

warnings := anInteger.! !

!PopUpPrompter class methods !

prompt: questionString default: answerString popUpAt: aPoint
        "Open a Prompter with questionString as
         its question and answerString as its
         default answer.  Answer the user
         response (a String) with leading and
         trailing spaces trimmed."
    ^self new
        evaluating: false;
        withBlank: false;
        prompt: questionString default: answerString popUpAt: aPoint!

prompt: questionString length: len width: wid default: answerString
        "Open a Prompter with questionString as
         its question and answerString as its
         default answer.  Answer the user
         response (a String) with leading and
         trailing spaces trimmed."
    ^self new
        evaluating: false;
        withBlank: false;
        prompt: questionString length: len width: wid default: answerString! !

!PopUpPrompter methods !

prompt: questionString default: answerString
        "Private - Initialize a Prompter window
         and give it control."
    | topPane promptBox tempOffset offset cursor |
    cursor := Cursor.
    CursorManager normal change.
    reply := answerString.
    exitBlock := [
        cursor change.
        ^reply].
    topPane := TopPane new
        label: questionString;
        leftIcons: Array new;
        rightIcons: Array new;
        backColor: 14;
        minimumSize:
            ((questionString size max: reply size) + 4
                * (LabelFont width max: TextFont width)
"  @@@ Modification 3/27/89 for Auburn - changed 60 to 75"
            min: 75 * SysFontWidth)
            @ (LabelFont height + TextFont height + 10);
        yourself.
    topPane addSubpane:
        (replyPane := TextPane new
            model: self;

```
            menu: #menu;
            dispatcher: PromptEditor new;
            name: #reply;
            change: #acceptReply:from:;
            framingBlock: [:box|
                box origin corner: box corner]).
    offset := Cursor offset.
    promptBox :=
        Rectangle
            origin: offset
            extent: topPane minimumSize.
    tempOffset := (Display extent - promptBox extent)
        min: offset - (4 @ (SysFontHeight * 2)).
    promptBox moveTo: tempOffset.
    "topPane unzoom."
    hiddenArea := ColorForm fromDisplay: promptBox.
    hiddenArea offset: tempOffset.
    topPane dispatcher openIn: promptBox.
    replyPane
        selectAtEnd;
        homeCursor.

topPane activateWindow.
    [topPane dispatcher active] whileTrue: [
        replyPane dispatcher processInput]!

prompt: questionString default: answerString popUpAt: aPoint
        "Private - Initialize a Prompter window
         and give it control."
    | topPane promptBox tempOffset offset cursor |
    cursor := Cursor.
    CursorManager normal change.
    reply := answerString.
    exitBlock := [
        cursor change.
        ^reply].
    topPane := TopPane new
        label: questionString;
        leftIcons: Array new;
        rightIcons: Array new;
        backColor: 14;
        minimumSize:
            ((questionString size max: reply size) + 4
                * (LabelFont width max: TextFont width)
" @@@ Modification 3/27/89 for Auburn - changed 60 to 75"
                min: 75 * SysFontWidth)
            @ (LabelFont height + TextFont height + 10);
        yourself.
    topPane addSubpane:
        (replyPane := TextPane new
            model: self;
            menu: #menu;
            dispatcher: PromptEditor new;
            name: #reply;
            change: #acceptReply:from:;
            framingBlock: [:box|
                box origin corner: box corner]).
"Pop up the prompter at aPoint"
    offset := "Cursor offset" aPoint .
    promptBox :=
        Rectangle
            origin: offset
            extent: topPane minimumSize.
    tempOffset := "(Display extent - promptBox extent)
        min: offset - (4 @ (SysFontHeight * 2))" aPoint.
    promptBox moveTo: tempOffset.
    "topPane unzoom."
    hiddenArea := ColorForm fromDisplay: promptBox.
    hiddenArea offset: tempOffset.
    topPane dispatcher openIn: promptBox.
    replyPane
        selectAtEnd;
        homeCursor.
```

```
topPane activateWindow.
[topPane dispatcher active] whileTrue: [
    replyPane dispatcher processInput]! !

"construct application"
    ((Smalltalk at: #Application ifAbsent: [])
        isKindOf: Class) ifTrue: [
            ((Smalltalk at: #Application) for:'PrompterExtensions')
                addClass: ListPrompter;
                addClass: ListPromptEditor;
                addClass: SDPrompter;
                addClass: BigPrompter;
                addClass: SDPrompterReminder;
                addClass: PopUpPrompter;
                comments: nil;
                initCode: nil;
                finalizeCode: nil;
                startUpCode: nil]!
```

What is claimed is:

1. For use in a manufacturing facility involving a plurality of preplanned steps and procedures for making parts, such steps and procedures being implemented by a plurality of individual work stations whose respective operations are coordinated by a cell controller, an exception processing system for correcting unplanned events during the operation of said facility, comprising:

a computer connected to said cell controller to send and receive information to and from the same, said computer being programmed to receive an alarm from said controller indicating an unplanned event in the operation of said automated manufacturing facility, and to acknowledge to said controller receipt of said alarm, and being further programmed to selectively request certain data from said controller concerning said alarm, and to receive such data;

a set of recovery procedures, each procedure providing a preplanned pattern of potential corrective actions for returning said manufacturing facility to normal operation after a given unplanned event, wherein said computer is further programmed to access and implement, by determining a cause of an unplanned event and implementing corrective actions, at least one of said recovery procedures in response to said cell controller alarm; and a user interface connected to said computer, for enabling communications between said computer and a human operator, wherein said computer is still further programmed to prompt the input of certain information from said operator via said user interface, to assist said computer in implementing a recovery procedure.

2. For use in a manufacturing facility involving a plurality of preplanned steps and procedures for making parts, such steps and procedures being implemented by a plurality of individual work stations whose respective operations are coordinated by a cell controller, an exception processing system for correcting unplanned events during the operation of said facility, comprising:

a computer connected to said cell controller to send and receive information to and from the same, said computer being programmed to receive an alarm from said controller indicating an unplanned event in the operation of said automated manufacturing facility, and to acknowledge to said controller receipt of said alarm, and being further programmed to selectively request certain data from said controller concerning said alarm, and to receive such data;

a set of recovery procedures, each procedure providing a preplanned pattern of potential corrective actions for returning said manufacturing facility to normal operation after a given unplanned event, wherein said computer is further programmed to access and implement at least one of said recovery procedures in response to said cell controller alarm;

a user interface connected to said computer, for enabling communications between said computer and a human operator, wherein said computer is still further programmed to prompt the input of certain information from said operator via said user interface, to assist said computer in implementing a recovery procedure; and statistical process control of said manufacturing facility, wherein said computer is further programmed to monitor said automated manufacturing facility by periodically requesting information from said cell controller concerning part-making steps and procedures under the cell controller's control, said computer storing such information into a statistical knowledge base, for both monitoring operation of said facility and anticipating when a step and procedure in said facility is deviating from normal operation.

3. The exception processing system of claim 1, wherein said computer is further programmed to log into memory any unplanned event in the operation of said manufacturing facility, and the corrective action taken to correct such unplanned event.

4. For use in a manufacturing facility involving a plurality of preplanned steps and procedures for making parts, such steps and procedures being implemented by a plurality of individual work stations whose respective operations are coordinated by a cell controller, an exception processing system having a combination of heuristic, deterministic and statistical procedures for monitoring operation of said facility, and forth both correcting unplanned events during the operation of said facility and anticipating when a step and procedure in said facility is deviating from normal operation, said exception processing system comprising:

a computer connected to said cell controller to send and receive information to and from the same, said computer being programmed to receive an alarm from said controller indicating an unplanned event in the operation of said automated manufacturing facility, and to acknowledge to said controller receipt of said alarm, and being further programmed to periodically request information from said cell controller concerning part-making steps and procedures under the cell controller's control, said computer storing such information into a statistical knowledge base for monitoring operation of said facility;

a set of recovery procedures, each procedure providing a preplanned pattern of potential corrective actions to return said manufacturing facility to normal operation after a given unplanned event, wherein said computer is further programmed to access and implement at least one of said recovery procedures in response to said cell controller alarm; and a user interface connected to said computer, for enabling communications between said computer and a human operator, wherein said computer is still further programmed to prompt the input of certain information from said operator via said user interface.

5. The exception processing system of claim 4, wherein said computer is programmed by an "object-oriented" program.

6. The exception processing system of claim 5, wherein said object-oriented program includes a communications interface object.

7. The exception processing system of claim 5, wherein said object-oriented program includes a protocol object.

8. The exception processing system of claim 5, wherein said object-oriented program includes a message object.

9. The exception processing system of claim 5, wherein said object-oriented program includes an operator screen object.

10. The exception processing system of claim 5, wherein said object-oriented program includes a recovery log object.

11. The exception processing system of claim 5, wherein said object-oriented program includes an exception processor handler object.

12. The exception processing system of claim 5, wherein said object-oriented program includes a statistical processing object.

13. The exception processing system of claim 6, wherein said communications interface object includes means for formulating and transmitting information in terms of TCP/IP interface protocols.

14. The exception processing system of claim 6, wherein said communications interface object includes means for formulating and transmitting information in terms of Ethernet interface protocols.

15. The exception processing system of claim 5, wherein said manufacturing facility is an automated manufacturing facility having sensors operable to monitor the steps and procedures of said facility, and wherein said computer is connected directly to said sensors, for receiving periodic data updates from them.

* * * * *

UNITED STATES PATENT AND TRADEMARK OFFICE
CERTIFICATE OF CORRECTION

PATENT NO. : 5,247,447
DATED : September 21, 1993
INVENTOR(S) : Alan R. Korncoff and Karapurath Ramachandran It is certified that error appears in the above-identified patent and that said Letters Patent is hereby corrected as shown below:

On the Title page, item [75], change "Alan Korncoff" to
    -- Alan R. Korncoff --.
On the cover, Section [56], "References Cited", please add under "U.S. PATENT DOCUMENTS", -- 4,750,110   6/1988 Mothersole et al. ......364/200 --.

Column 2, line 15, there is a period after "experience".
Column 2, line 42, there is a period after "facility".
Column 2, line 67, "The exception" begins a new paragraph.
Column 4, line 14, "conclustions" should be -- conclusions --.
Column 6, line 38, delete "10" after "alarm".
Column. 7, line 35, "determinsitic" should be
    -- deterministic --.
Column 8, line 5, "determined" should be -- determine --.
Column 11, line 20, "Whether" should be -- whether --.
Column 11, line 45, "if" should be -- If --.
Column 12, line 59, "in" should be -- In --.
Column 13, line 14, "Was" should be -- was --.
Column 13, line 21, "Which" should be -- which --.
Column 13, line 53, "DOS 4.0" should be -- DOS 4.01 --.

UNITED STATES PATENT AND TRADEMARK OFFICE
CERTIFICATE OF CORRECTION

PATENT NO. : 5,247,447
DATED : September 21, 1993
INVENTOR(S) : Alan R. Korncoff and Karapurath Ramachandran It is certified that error appears in the above-identified patent and that said Letters Patent is hereby corrected as shown below:

Column 14, line 3, "parallel port" should be -- 1 parallel port --.
Column 15, lines 12 and 13, "SmallTalk)IV" should be -- SmallTalk/V --.
Claim 4, column 542, line 58, "forth" should be -- for --.

Signed and Sealed this

Thirtieth Day of August, 1994

Attest:

BRUCE LEHMAN

Attesting Officer

Commissioner of Patents and Trademarks